(12) United States Patent
Patton et al.

(10) Patent No.: US 9,080,792 B2
(45) Date of Patent: Jul. 14, 2015

(54) METHOD AND APPARATUS FOR MOUNTING SOLAR PANELS

(71) Applicant: IronRidge, Inc., Hayward, CA (US)

(72) Inventors: John C. Patton, Roseville, CA (US);
Todd Lindstrom, Auburn, CA (US);
Eric Hafter, Sacramento, CA (US)

(73) Assignee: IronRidge, Inc., Hayward, CA (US)

( * ) Notice: Subject to any disclaimer, the term of this patent is extended or adjusted under 35 U.S.C. 154(b) by 0 days.

(21) Appl. No.: 14/254,778

(22) Filed: Apr. 16, 2014

(65) Prior Publication Data

US 2015/0034355 A1 Feb. 5, 2015

Related U.S. Application Data

(63) Continuation of application No. PCT/US2014/033697, filed on Apr. 10, 2014.

(60) Provisional application No. 61/966,652, filed on Feb. 26, 2014, provisional application No. 61/965,167, filed on Jan. 24, 2014, provisional application No. 61/958,564, filed on Jul. 31, 2013.

(51) Int. Cl.
*E04D 13/18* (2014.01)
*F24J 2/52* (2006.01)
*F24J 2/46* (2006.01)

(52) U.S. Cl.
CPC ............... *F24J 2/5245* (2013.01); *F24J 2/465* (2013.01); *Y02B 10/12* (2013.01)

(58) Field of Classification Search
CPC ........ Y02B 10/12; Y02B 10/20; Y02E 10/50; Y02E 10/52; F24J 2/5245; F24J 2/465

USPC .......... 52/173.3; 126/621, 622, 623; 136/251, 136/259

See application file for complete search history.

(56) References Cited

U.S. PATENT DOCUMENTS 3,685,863 A 8/1972 Oetiker
4,111,188 A 9/1978 Murphy, Jr.
(Continued)

FOREIGN PATENT DOCUMENTS

AU 10286953 A1 2/2012
AU 12220665 A1 10/2013
(Continued)

OTHER PUBLICATIONS

ZS Comp for composition shingle roofs, p. 1-2.
(Continued)

*Primary Examiner* — Jeanette E Chapman
*Assistant Examiner* — James Buckle, Jr.
(74) *Attorney, Agent, or Firm* — Santangelo Law Offices, P.C.

(57) ABSTRACT

Solar panel array with a plurality of solar panels on support system attached at corners or off such corners for foundation structure needs and irregularities secured to roof by lag bolt with mount channel and flashing pre-assembled into mount by crimp for positive seal and mount riser height adjustable can include bilateral or quadrilateral mounts, a coupler seat to affix panel to mount and lateral movement seat for solar panel. An intercalative junction piece, nut, or washer has tines for grounding, a dissociation guide and flexture and keeps off the surface for association and perforation to clamp panel firmly via different clamps including wedge clamps, top restraints, lip end clamps, side support clamps, compression clamps, etc.

23 Claims, 87 Drawing Sheets

(56) References Cited

U.S. PATENT DOCUMENTS

| | | | |
|---|---|---|---|
| 4,184,476 | A | 1/1980 | McArthur |
| 4,371,139 | A | 2/1983 | Clark |
| 4,421,943 | A | 12/1983 | Withjack |
| 4,429,872 | A | 2/1984 | Capachi |
| 4,896,992 | A | 1/1990 | Muhlethaler |
| 4,966,631 | A | 10/1990 | Matlin et al. |
| 4,991,370 | A | 2/1991 | Gailey et al. |
| 5,067,605 | A | 11/1991 | Gordon |
| 5,143,556 | A | 9/1992 | Matlin |
| 5,164,020 | A | 11/1992 | Wagner et al. |
| 5,197,589 | A | 3/1993 | Gordon |
| 5,228,644 | A | 7/1993 | Garriott et al. |
| 5,232,518 | A | 8/1993 | Nath et al. |
| 5,289,356 | A | 2/1994 | Winston |
| 5,338,369 | A | 8/1994 | Rawlings |
| 5,344,496 | A | 9/1994 | Stern et al. |
| 5,409,549 | A | 4/1995 | Mori |
| 5,460,660 | A | 10/1995 | Albright et al. |
| 5,497,587 | A | 3/1996 | Hirai et al. |
| 5,505,788 | A | 4/1996 | Dinwoodie |
| 5,522,180 | A | 6/1996 | Adler et al. |
| 5,537,991 | A | 7/1996 | Winston et al. |
| 5,571,338 | A | 11/1996 | Kadomome et al. |
| 5,596,981 | A | 1/1997 | Soucy |
| 5,706,617 | A | 1/1998 | Hirai et al. |
| 5,746,029 | A | 5/1998 | Ullman |
| 5,746,839 | A | 5/1998 | Dinwoodie |
| 5,881,713 | A | 3/1999 | Lai |
| 6,058,930 | A | 5/2000 | Shingleton |
| 6,093,884 | A | 7/2000 | Toyomura et al. |
| 6,105,317 | A | 8/2000 | Tomiuchi et al. |
| 6,111,189 | A | 8/2000 | Garvison et al. |
| 6,201,180 | B1 | 3/2001 | Meyer et al. |
| 6,207,889 | B1 | 3/2001 | Toyomura et al. |
| 6,269,596 | B1 | 8/2001 | Ohtsuka et al. |
| 6,360,491 | B1 | 3/2002 | Ullman |
| 6,370,828 | B1 | 4/2002 | Genschorek |
| 6,405,494 | B1 | 6/2002 | Wismeth |
| 6,465,724 | B1 | 10/2002 | Garvison et al. |
| 6,467,916 | B2 | 10/2002 | Winston |
| 6,501,013 | B1 | 12/2002 | Dinwoodie |
| 6,521,821 | B2 | 2/2003 | Makita et al. |
| 6,534,703 | B2 | 3/2003 | Dinwoodie |
| 6,670,541 | B2 | 12/2003 | Nagao et al. |
| 6,672,018 | B2 | 1/2004 | Shingleton |
| 6,745,869 | B2 | 6/2004 | Garrett |
| 6,784,360 | B2 | 8/2004 | Nakajima et al. |
| D496,248 | S | 9/2004 | Liebendorfer |
| D496,249 | S | 9/2004 | Liebendorfer |
| 6,809,251 | B2 | 10/2004 | Dinwoodie |
| D510,315 | S | 10/2005 | Shugar et al. |
| 6,958,868 | B1 | 10/2005 | Pender |
| 6,959,517 | B2 | 11/2005 | Poddany et al. |
| 6,987,604 | B2 | 1/2006 | Rabinowitz et al. |
| RE38,988 | E | 2/2006 | Dinwoodie |
| 7,012,188 | B2 | 3/2006 | Erling |
| D519,444 | S | 4/2006 | Mascolo |
| 7,043,884 | B2 | 5/2006 | Moreno |
| 7,156,088 | B2 | 1/2007 | Luconi |
| 7,260,918 | B2 | 8/2007 | Liebendorfer |
| D567,643 | S | 4/2008 | Campbell |
| 7,388,146 | B2 | 6/2008 | Fraas et al. |
| 7,406,800 | B2 | 8/2008 | Cinnamon et al. |
| 7,434,362 | B2 | 10/2008 | Liebendorfer |
| 7,435,134 | B2 | 10/2008 | Lenox |
| 7,447,292 | B2 | 11/2008 | Hsu et al. |
| D586,737 | S | 2/2009 | Shugar et al. |
| 7,554,030 | B2 | 6/2009 | Shingleton |
| 7,592,537 | B1 | 9/2009 | West |
| 7,600,349 | B2 | 10/2009 | Liebendorfer |
| 7,748,175 | B2 | 7/2010 | Liebendorfer |
| 7,762,027 | B1 | 7/2010 | Wentworth et al. |
| 7,766,292 | B2 | 8/2010 | Liebendorfer |
| 7,779,592 | B2 | 8/2010 | Bernardi et al. |
| 7,866,099 | B2 | 1/2011 | Komamine et al. |
| 7,895,808 | B1 | 3/2011 | Wentworth et al. |
| D649,929 | S | 12/2011 | Hafter et al. |
| 8,099,922 | B2 | 1/2012 | Kellerman |
| 8,109,048 | B2 | 2/2012 | West |
| 8,128,044 | B2 | 3/2012 | Liebendorfer |
| 8,291,653 | B2 | 10/2012 | Suarez et al. |
| 8,307,606 | B1 | 11/2012 | Rego et al. |
| 8,316,618 | B1 | 11/2012 | Rodowca et al. |
| 8,316,619 | B1 | 11/2012 | Rego et al. |
| 8,336,277 | B1 | 12/2012 | Rego et al. |
| 8,371,076 | B2 | 2/2013 | Jones et al. |
| 8,375,654 | B1 | 2/2013 | West et al. |
| 8,376,298 | B2 | 2/2013 | McPheeters |
| 8,413,944 | B2 * | 4/2013 | Harberts et al. ............... 248/500 |
| 8,443,558 | B2 | 5/2013 | Buller et al. |
| 8,505,248 | B1 | 8/2013 | Leong et al. |
| 8,536,442 | B2 | 9/2013 | Stancel |
| 8,567,134 | B1 | 10/2013 | Grushkowitz et al. |
| 8,585,000 | B2 | 11/2013 | McPheeters |
| 8,631,614 | B2 | 1/2014 | Livsey et al. |
| 8,640,400 | B2 | 2/2014 | Liebendorfer |
| 8,752,338 | B2 * | 6/2014 | Schaefer et al. ................... 52/60 |
| 2002/0066235 | A1 | 6/2002 | Stearns et al. |
| 2002/0096395 | A1 | 7/2002 | Garrett |
| 2003/0015636 | A1 | 1/2003 | Liebendorfer |
| 2003/0015637 | A1 | 1/2003 | Liebendorfer |
| 2003/0070368 | A1 | 4/2003 | Shingleton |
| 2003/0230451 | A1 | 12/2003 | Garrett |
| 2004/0007260 | A1 | 1/2004 | Dinwoodie |
| 2004/0163338 | A1 | 8/2004 | Liebendorfer |
| 2004/0187909 | A1 | 9/2004 | Sato et al. |
| 2004/0261955 | A1 | 12/2004 | Shingleton et al. |
| 2005/0035244 | A1 | 2/2005 | Conger |
| 2005/0144870 | A1 | 7/2005 | Dinwoodie |
| 2006/0054212 | A1 | 3/2006 | Fraas et al. |
| 2006/0090789 | A1 | 5/2006 | Thompson |
| 2007/0102036 | A1 | 5/2007 | Cinnamon |
| 2007/0144575 | A1 | 6/2007 | Mascolo et al. |
| 2007/0151594 | A1 | 7/2007 | Mascolo et al. |
| 2007/0157963 | A1 | 7/2007 | Metten et al. |
| 2007/0272234 | A1 | 11/2007 | Allen et al. |
| 2007/0295384 | A1 | 12/2007 | Uozumi et al. |
| 2007/0295392 | A1 | 12/2007 | Cinnamon |
| 2007/0295393 | A1 | 12/2007 | Cinnamon |
| 2008/0029148 | A1 | 2/2008 | Thompson |
| 2008/0053517 | A1 | 3/2008 | Plaisted et al. |
| 2008/0099062 | A1 | 5/2008 | Armstrong et al. |
| 2008/0105489 | A1 | 5/2008 | Garrett |
| 2008/0216418 | A1 | 9/2008 | Durham |
| 2008/0230047 | A1 | 9/2008 | Shugar et al. |
| 2008/0245360 | A1 | 10/2008 | Almy et al. |
| 2008/0283112 | A1 | 11/2008 | Conger |
| 2008/0283113 | A1 | 11/2008 | Conger |
| 2008/0302407 | A1 * | 12/2008 | Kobayashi .................... 136/251 |
| 2009/0014130 | A1 | 1/2009 | Heidenreich |
| 2009/0019796 | A1 | 1/2009 | Liebendorfer |
| 2009/0032093 | A1 | 2/2009 | Fang |
| 2009/0038672 | A1 | 2/2009 | Conger |
| 2009/0050194 | A1 | 2/2009 | Noble et al. |
| 2009/0078299 | A1 | 3/2009 | Cinnamon et al. |
| 2009/0199846 | A1 | 8/2009 | Collins et al. |
| 2009/0223142 | A1 | 9/2009 | Shingleton et al. |
| 2009/0232616 | A1 | 9/2009 | Sekreta et al. |
| 2009/0242014 | A1 | 10/2009 | Leary |
| 2009/0320906 | A1 | 12/2009 | Botkin et al. |
| 2009/0320907 | A1 | 12/2009 | Botkin et al. |
| 2010/0000516 | A1 | 1/2010 | Conger |
| 2010/0043781 | A1 | 2/2010 | Jones et al. |
| 2010/0065108 | A1 | 3/2010 | West et al. |
| 2010/0089433 | A1 | 4/2010 | Conger |
| 2010/0236610 | A1 | 9/2010 | Stancel et al. |
| 2010/0243023 | A1 | 9/2010 | Patton et al. |
| 2010/0263297 | A1 | 10/2010 | Liebendorfer |
| 2010/0293874 | A1 | 11/2010 | Liebendorfer |
| 2010/0319277 | A1 | 12/2010 | Suarez et al. |
| 2011/0000519 | A1 | 1/2011 | West |
| 2011/0000520 | A1 | 1/2011 | West |
| 2011/0000526 | A1 | 1/2011 | West |
| 2011/0000544 | A1 | 1/2011 | West |

(56) References Cited

U.S. PATENT DOCUMENTS

| | | |
|---|---|---|
| 2011/0108083 A1 | 5/2011 | Ravestein et al. |
| 2011/0203637 A1 | 8/2011 | Patton et al. |
| 2011/0214368 A1 | 9/2011 | Haddock et al. |
| 2011/0250011 A1 | 10/2011 | Schwarze |
| 2011/0296773 A1 | 12/2011 | Kellerman |
| 2012/0085394 A1 | 4/2012 | McPheeters et al. |
| 2012/0107043 A1 | 5/2012 | Kellerman |
| 2012/0125410 A1 | 5/2012 | West et al. |
| 2012/0145227 A1 | 6/2012 | Jun et al. |
| 2012/0152326 A1 | 6/2012 | West et al. |
| 2012/0186169 A1 | 7/2012 | Tomaso |
| 2012/0234378 A1 | 9/2012 | West et al. |
| 2012/0240489 A1 | 9/2012 | Rivera et al. |
| 2012/0255598 A1 | 10/2012 | West |
| 2012/0260972 A1 | 10/2012 | West et al. |
| 2012/0266946 A1 | 10/2012 | West et al. |
| 2012/0273029 A1 | 11/2012 | Bragagna et al. |
| 2012/0279558 A1 | 11/2012 | West et al. |
| 2012/0298186 A1 | 11/2012 | West |
| 2012/0298188 A1 | 11/2012 | West et al. |
| 2012/0298817 A1 | 11/2012 | West et al. |
| 2012/0301661 A1 | 11/2012 | West et al. |
| 2012/0312355 A1 | 12/2012 | Patton et al. |
| 2012/0318322 A1 | 12/2012 | Lanyon et al. |
| 2012/0318757 A1 | 12/2012 | Liebendorfer |
| 2013/0036685 A1 | 2/2013 | Suarez et al. |
| 2013/0133270 A1 | 5/2013 | West |
| 2013/0136528 A1 | 5/2013 | Kellerman |
| 2013/0140416 A1 | 6/2013 | West et al. |
| 2013/0180572 A1 | 7/2013 | West |
| 2013/0180573 A1 | 7/2013 | West |
| 2013/0180574 A1 | 7/2013 | West et al. |
| 2013/0183084 A1 | 7/2013 | West et al. |
| 2013/0192150 A1 | 8/2013 | Dupont |
| 2013/0220403 A1 | 8/2013 | Rizzo |
| 2013/0240008 A1 | 9/2013 | Baker |
| 2013/0312812 A1 | 11/2013 | Meyer et al. |
| 2014/0014158 A1 | 1/2014 | Wildes et al. |
| 2014/0026946 A1 | 1/2014 | West et al. |
| 2014/0053891 A1 | 2/2014 | West et al. |

FOREIGN PATENT DOCUMENTS

| | | |
|---|---|---|
| CA | 2820935 A1 | 6/2012 |
| CA | 2817611 A1 | 12/2013 |
| CN | 103081119 A | 5/2013 |
| DE | 29703481 U1 | 11/1997 |
| EP | 2260211 A1 | 9/2009 |
| EP | 2425169 A1 | 3/2012 |
| EP | 2443297 A1 | 4/2012 |
| EP | 2449596 A2 | 5/2012 |
| EP | 2449598 A2 | 5/2012 |
| EP | 2449599 A2 | 5/2012 |
| EP | 2260211 B1 | 12/2012 |
| EP | 2360740 B1 | 10/2013 |
| EP | 2678492 A1 | 1/2014 |
| JP | 2000064523 | 2/2000 |
| KR | 2012098589 A | 9/2012 |
| WO | 2011019460 A2 | 2/2001 |
| WO | 03007688 A2 | 1/2003 |
| WO | 03007688 A3 | 10/2003 |
| WO | 2004077517 A2 | 9/2004 |
| WO | 2004077517 C1 | 10/2005 |
| WO | 2005119769 A1 | 12/2005 |
| WO | 2004077517 A3 | 3/2006 |
| WO | 2007038760 A2 | 4/2007 |
| WO | 2008124158 A1 | 10/2008 |
| WO | 2009086150 A1 | 7/2009 |
| WO | 2009111796 A1 | 9/2009 |
| WO | 2009137809 A1 | 11/2009 |
| WO | 2010045129 A2 | 4/2010 |
| WO | 2010123929 A1 | 10/2010 |
| WO | 2010126770 A1 | 11/2010 |
| WO | 2010129420 A1 | 11/2010 |
| WO | 2010148387 A1 | 12/2010 |
| WO | 2011022125 A2 | 2/2011 |
| WO | 2011025585 A2 | 3/2011 |
| WO | 2011019460 A3 | 8/2011 |
| WO | 2011022125 A3 | 9/2011 |
| WO | 2011025585 A3 | 9/2011 |
| WO | 2012079060 A2 | 6/2012 |
| WO | 2012079061 A1 | 6/2012 |
| WO | 2012082806 A2 | 6/2012 |
| WO | 2012116121 A1 | 8/2012 |
| WO | 2013009523 A1 | 1/2013 |
| WO | 2013143178 A1 | 10/2013 |

OTHER PUBLICATIONS

OMG PowerGrip Roof Mount System; p. 1-2; Roofing Products; RM1004, Rev.1113.
OMG Roofing Products, Roofing Report; p. 1-2; GEN1009A, Rev. 1113.
U.S. Appl. No. 61/958,564, filed Jul. 31, 2013.
U.S. Appl. No. 61/956,167, filed Jan. 24, 2014.
U.S. Appl. No. 61/966,652, filed Feb. 26, 2014.
PCT International Patent Application No. PCT/US/2014/033697; filed Apr. 10, 2014; Titled: Solar Panel Mounting System.
www.thompsontec.com; Flush Mount Rail System, Technical Specifications; 2008; 2 pgs.
http://www.quickmountpv.com/products.php; Quick Mount PV Products; Manufacturer of Waterproof Mounts for the PV Industry; 2 pages, Oct. 2007.
www.thompsontec.com; Flat Jack, Technical Specifications; 2008; 2 pages.
www.quickmountpv.com; Installation Instructions; 1 pg; 2009.
Solar Power System Installation Manual; SRS Mounting System, Rectantular Modules; Sharp Electronics Corp., 44 pages; May 6, 2007.
http://www.we-llc.com/WEEB_howitworks.html; Wiley Electronics, LLC; Bonding a PV module to an anodized aluminum frame using the WEEB; 1 page; 2005.
http://ttisolar.com/products/flatjack.html; Flat Jack Roof Mount Order Form; 2 pgs; 2008.
Chorus Tubes—Structural & Conveyance Business; Design guide for SHS Concrete Filled Columns; Apr. 2005, 64 pages.
www.csufresno.edu; A Photovoltaic (PV) Solar Parking Structure; California State University—Fresno; 2007, 1 page.
Photovoltaic Parking Shade Structure; Enviromena Power Systems, LLC; 2 pages; 2009.
www.envisionsolar.com/project-portfolio; 2010, 4 pages.
nmsu.edu; NMSU Student Health Center, 18kW Grid-Tied Photovoltaic Parking Structure description; 2007, 1 page.
nmsu.edu; NMSU Student Health Center, 18kW Grid-Tied Photovoltaic Parking Structure pictures; 2007, 2 pages.
www.protekparksolar.com/solar-structures, 2 pages, printed Mar. 30, 2010.
U.S. Appl. No. 61/214,088, filed Apr. 20, 2009, entitled Elevated Photovoltaic Shading Structure.
International Application No. PCT/US2009/043368; International Search Report dated Jul. 9, 2009.
International Application No. PCT/US2009/043368; Written Opinion of the International Searching Authority dated Jul. 9, 2009.
International Application No. PCT/US2010/031792; International Search Report dated Aug. 10, 2010.
International Application No. PCT/US2010/031792; Written Opinion of the International Searching Authority dated Aug. 10, 2010.
International Application No. PCT/US2010/033202; International Search Report dated Jul. 20, 2010.
International Application No. PCT/US2010/033202; Written Opinion of the International Searching Authority dated Jul. 20, 2010.
International Application No. PCT/US2009/060291; International Search Report dated Jun. 15, 2010.
International Application No. PCT/US2009/060291; Corrected Written Opinion of the International Searching Authority dated Jul. 19, 2010.
U.S. Appl. No. 61/195,780, filed Oct. 11, 2008, entitled Flat Roof Mounted Solar Panel Support System.

(56) References Cited

OTHER PUBLICATIONS

U.S. Appl. No. 61/214,857, filed Apr. 28, 2009, entitled Flat Roof Mounted Solar Panel Support System.
U.S. Appl. No. 61/208,323, filed Feb. 23, 2009, entitled Flat Roof Mounted Solar Panel Support System.
U.S. Appl. No. 61/126,947, filed May 8, 2008, entitled Provisional Patent Application for Flat Roof Mounted Solar Panel Support System.
U.S. Appl. No. 61/130,359, filed May 29, 2008, entitled Flat Roof Mounted Solar Panel Support System.
U.S. Appl. No. 61/205,556, filed Jan. 21, 2009, entitled Provisional Patent Application for Flat Roof Mounted Solar Panel Support System.
U.S. Appl. No. 61/215,414, filed May 2, 2009, entitled High Strength Photovoltaic Module.
Chinese Patent Application No. 200980126953.X, Office Action dated Nov. 13, 2012.
http://www.we-llc.com/contact-us/about-wiley, printed Jun. 12, 2014, 3 pages.
http://www.omgroofing.com/roof-mount-systems/PowerGrip.html, printed Jun. 12, 2014, 1 page.
http://www.pv-magazine.com, printed Jun. 12, 2014, OMG Roofing Products introduces PowerGrip for solar panel attachment; 1 page.
Office Action dated Mar. 18, 2013 from U.S. Appl. No. 13/123,472, 9 pages.
International Application No. PCT/US2009/043368; International Preliminary Report on Patentability dated Apr. 5, 2012, 108 pages.
Office Action dated Feb. 13, 011 from U.S. Appl. No. 12/680,732; 20 pages.
Office Action dated Apr. 11, 2014 from U.S. Appl. No. 13/561,905; 10 pages.
Office Action dated Oct. 4, 2013 from U.S. Appl. No. 13/561,905; 7 pages.
Office Action dated Feb. 27, 2013 from U.S. Appl. No. 13/561,905; 8 pages.
Office Action dated Sep. 28, 2012 from U.S. Appl. No. 13/561,905; 16 pages.

\* cited by examiner

See FIG. 3

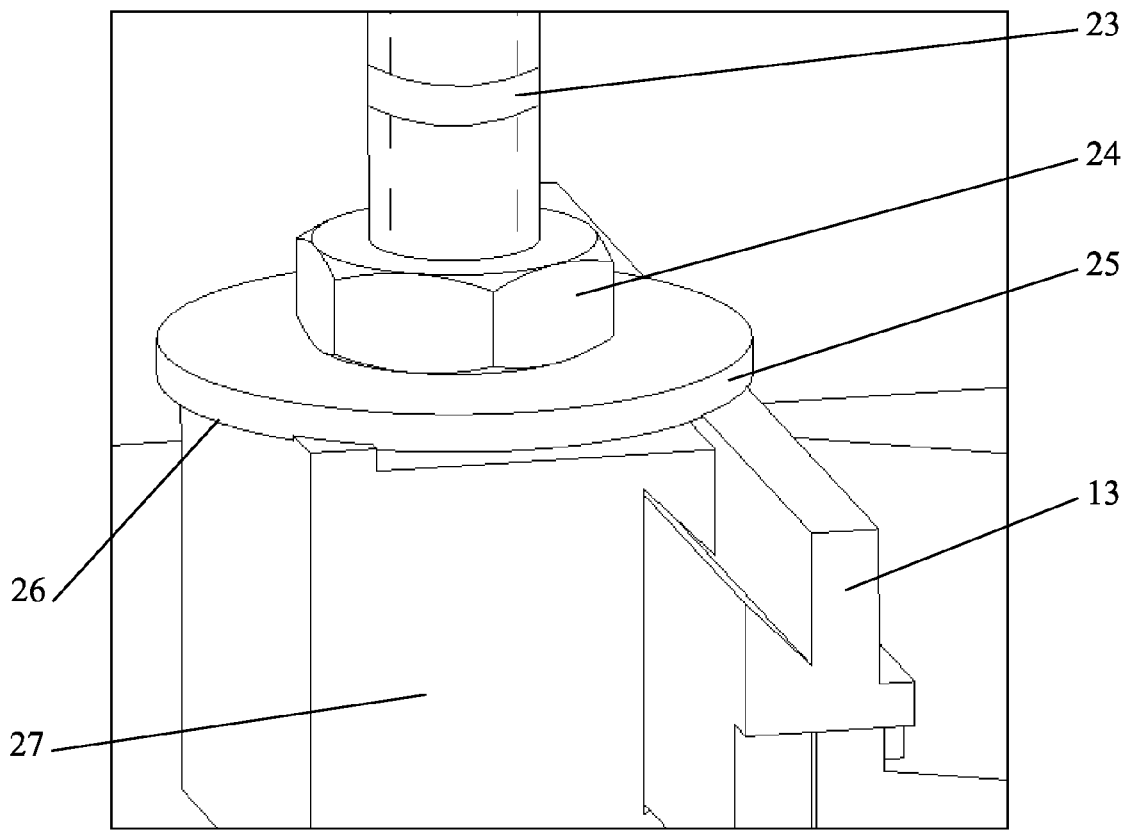
FIG. 13
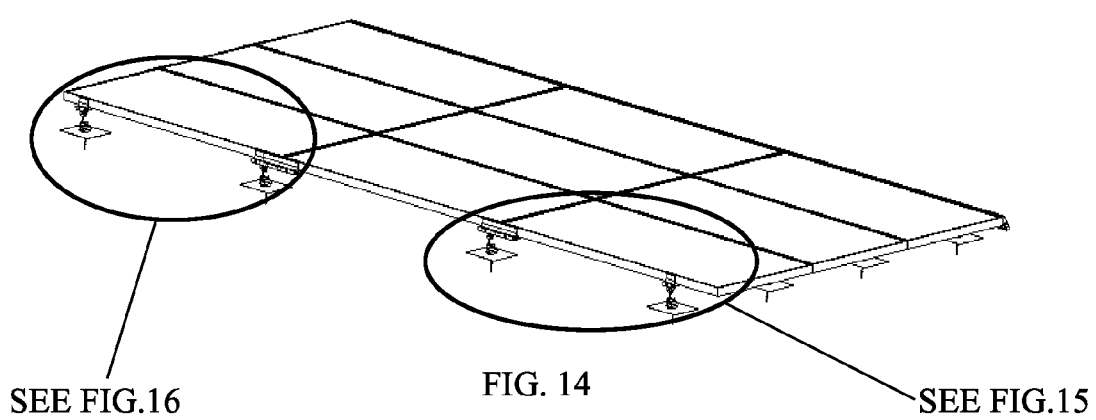
SEE FIG.16　　　FIG. 14　　　SEE FIG.15

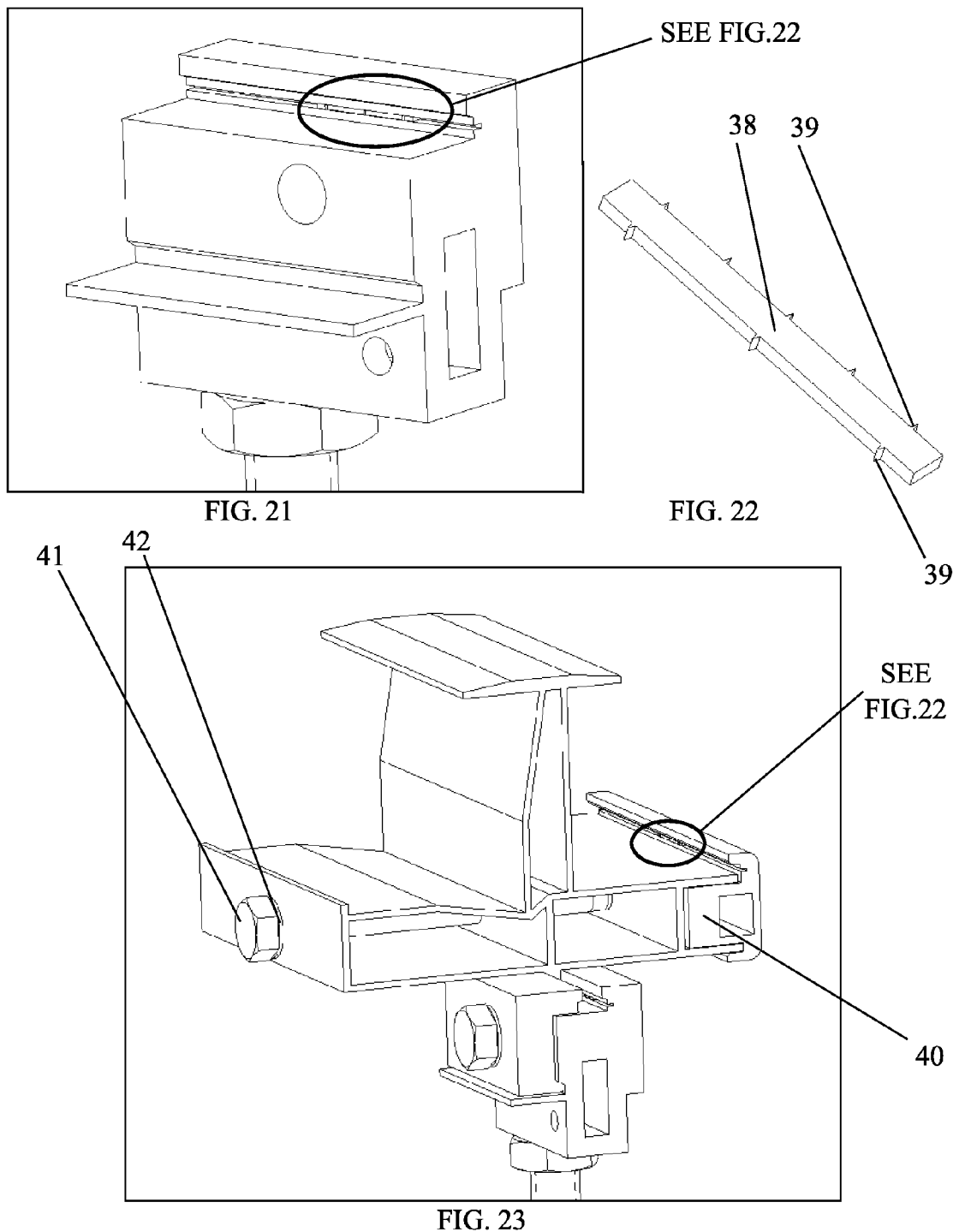

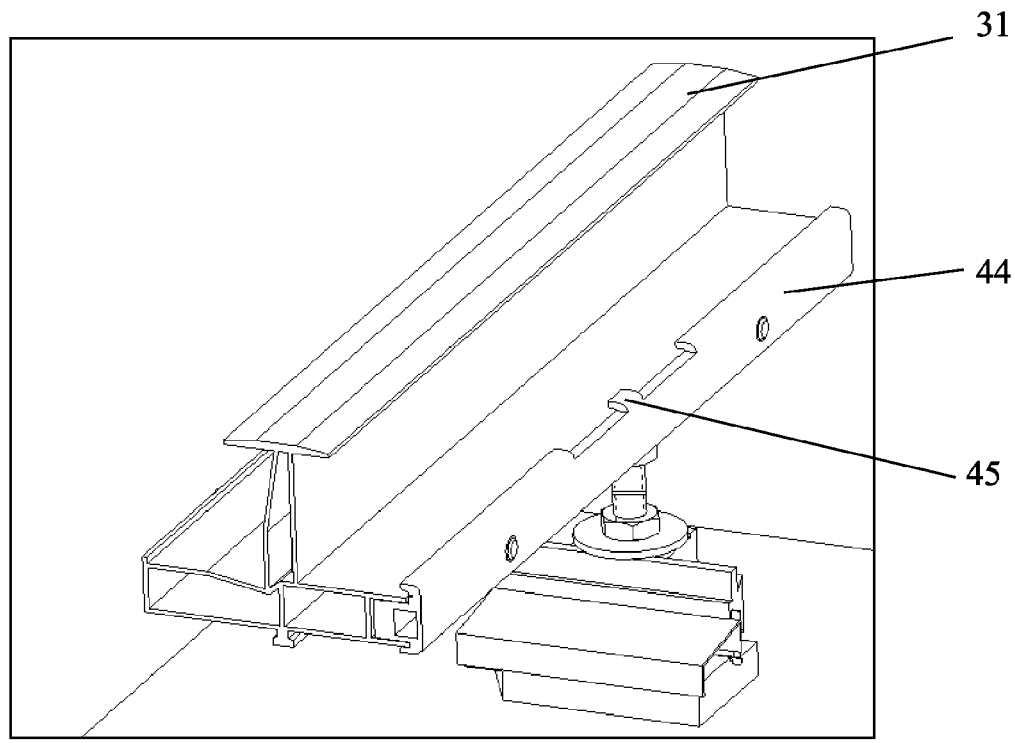
FIG. 26
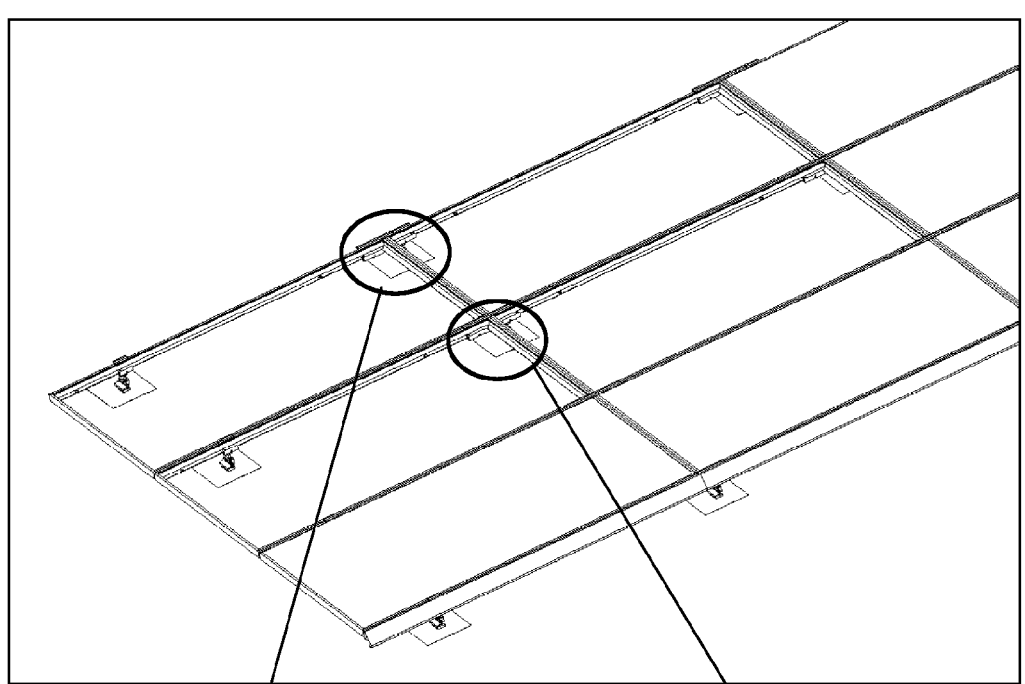
SEE FIG.28    FIG. 27    SEE FIG.29

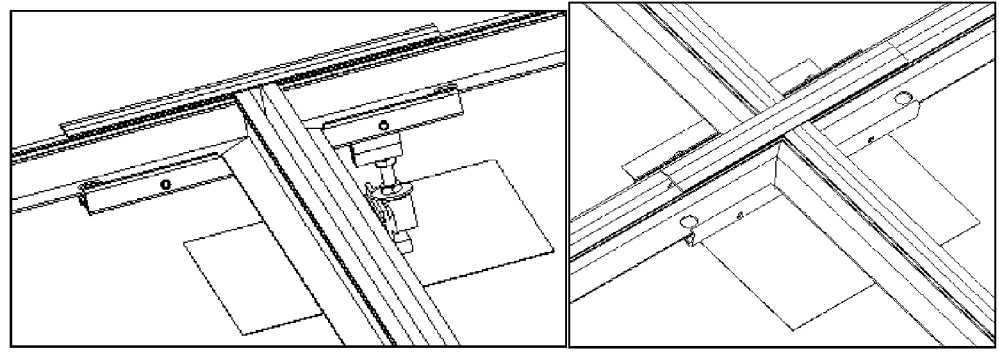
FIG. 28                    FIG. 29
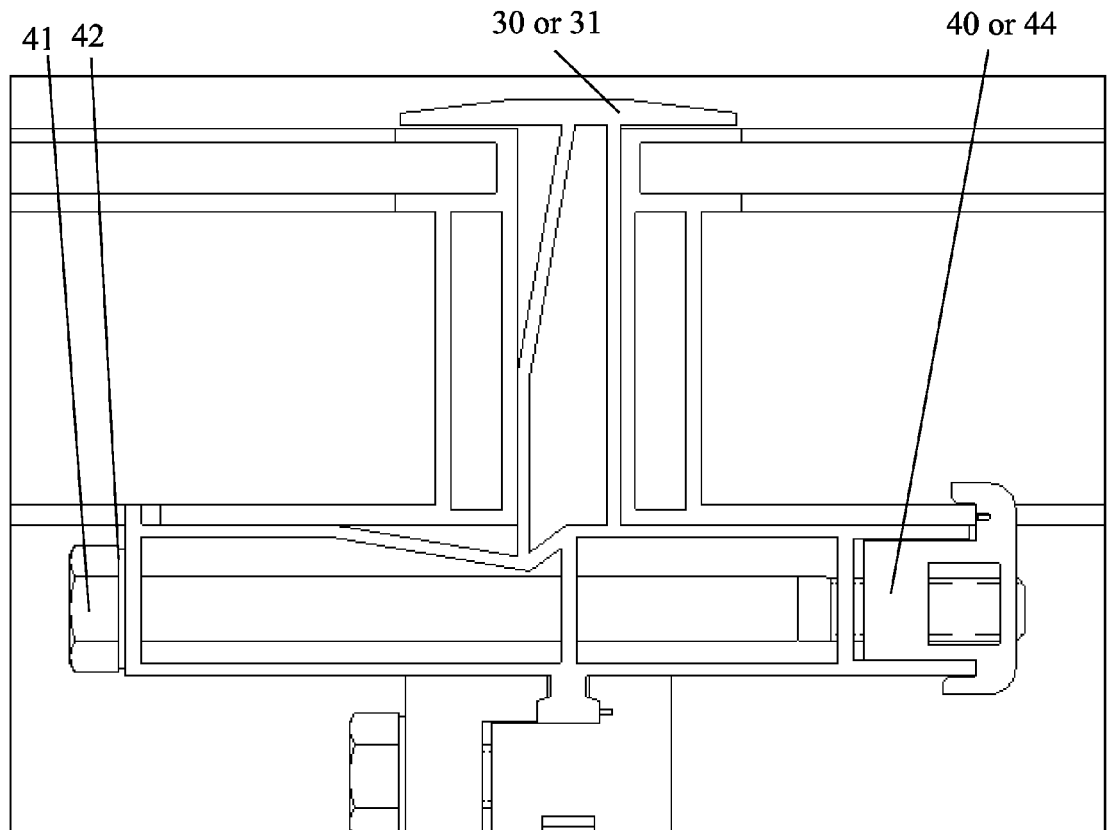
FIG. 30

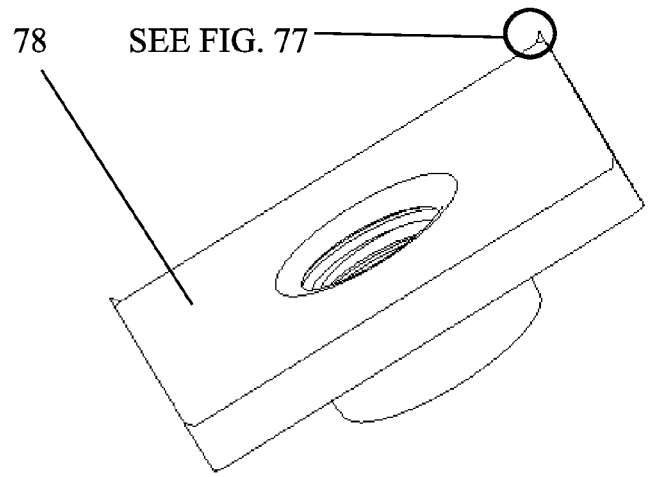
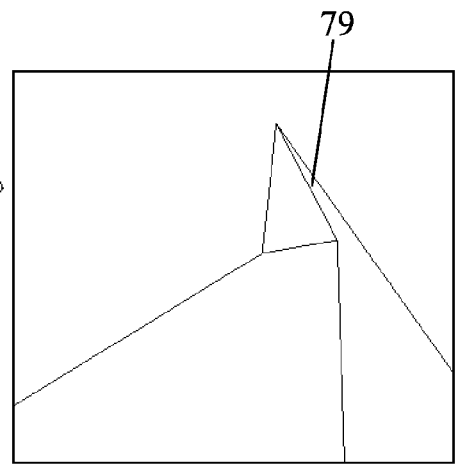
FIG. 76  FIG. 77
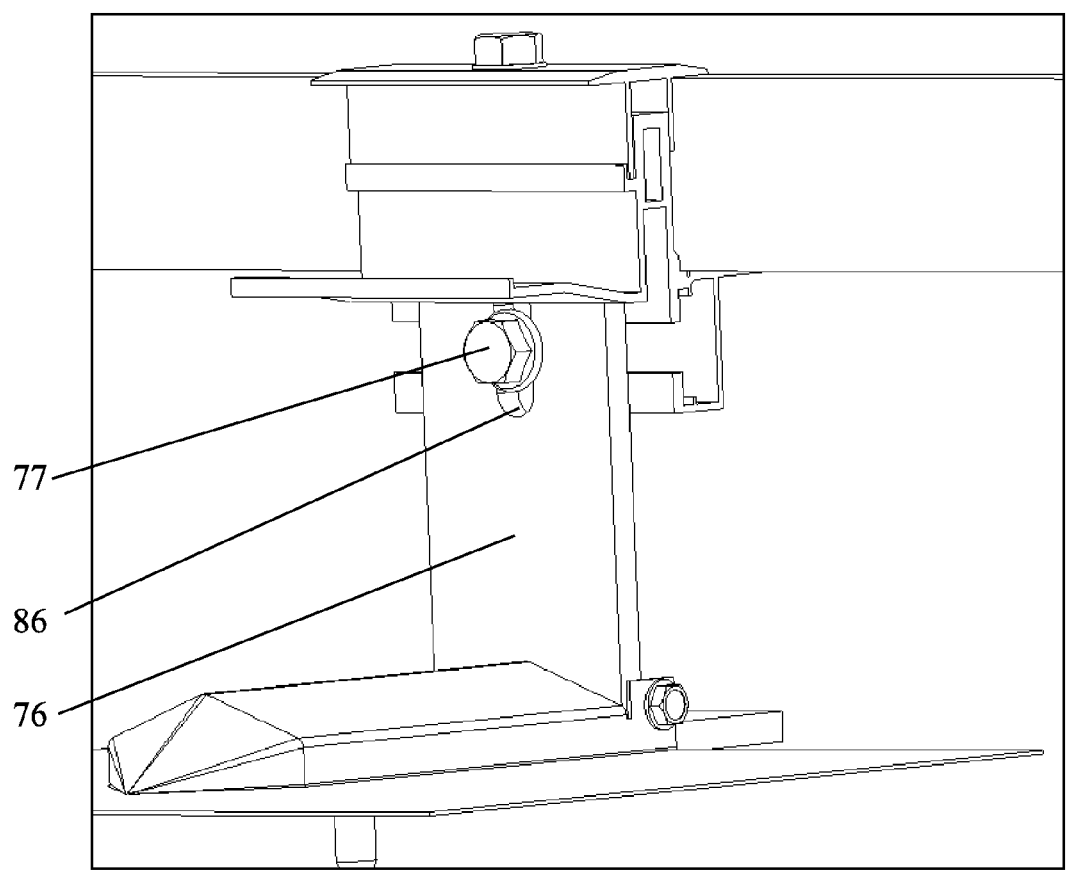
FIG. 78

METHOD AND APPARATUS FOR MOUNTING SOLAR PANELS

CROSS-REFERENCES TO RELATED APPLICATIONS

This application is a continuation of International Patent Application Number PCT/US14/33697, filed Apr. 10, 2014, which claims the benefit of and priority to, and this application also separately claims the benefit of and priority to U.S. Provisional Application No. 61/966,652, filed Feb. 26, 2014, U.S. Provisional Application No. 61/965,167, filed Jan. 24, 2014, and U.S. Provisional Application No. 61/958,564, filed Jul. 31, 2013, each hereby incorporated by reference herein in their entirety.

BACKGROUND OF THE INVENTION

This patent relates to solar panel mounting and support systems such as may be used for pitched roofs and other applications. It especially relates to mounting systems that are very easy and quick to install and that have low overall cost.

Solar panel mounting systems have provided a number of features, however none has adequately provided specific features and adequately combined features that make an economical, easy to install system as now provided that allows adequate grounding, provides installation ease, and universal application to a great variety of solar panel manufactures as the present system.

DISCLOSURE OF INVENTION

The solar collector PV panel array is formed by a plurality of solar panels on a support system. The support system can either be secured to the roof rafters by a roof mount or to the OSB, plywood or sheathing.

Panel supports attach to the edge of the panels and also attach to the roof mounts. The roof mount attachment to the panel supports can be adjusted in height to allow for uneven roofs. The panel supports can be attached anywhere along the edge of the solar panel including along two adjacent solar panels. This allows for adjustment in the horizontal direction and which allows for easy attachment to any of the roof rafters. The roof mounts are adjustable in the up/down direction of the roof. These adjustments allow for adjustment in all three dimensions which allows more flexibility in the location of the solar panels on the roof.

All metal parts are electrically grounded together including the solar panel frames. This means that the earth ground can be attached anywhere and all of the metal parts will be electrically grounded together.

Standard framed solar panels are used in the solar panel support system.

BRIEF DESCRIPTION OF THE DRAWINGS

FIG. 13 is a perspective view of one component of one embodiment of the invention.

FIG. 14 is a perspective view of one embodiment of the invention.

FIG. 21 is a perspective view of one component of one embodiment of the invention.

FIG. 22 is a perspective view of one component of one embodiment of the invention.

FIG. 23 is a perspective view of one component of one embodiment of the invention.

FIG. 26 is a perspective view of one component of one embodiment of the invention.

FIG. 27 is a perspective view of one embodiment of the invention.

FIG. 28 is a perspective view of one component of one embodiment of the invention.

FIG. 29 is a perspective view of one component of one embodiment of the invention.

FIG. 30 is a cross-sectional view of one component of one embodiment of the invention.

FIG. 76 is a perspective view of one component of one embodiment of the invention.
FIG. 77 is a perspective view of one component of one embodiment of the invention.
FIG. 78 is a perspective view of one component of one embodiment of the invention.

DETAILED DESCRIPTION OF THE PREFERRED EMBODIMENTS

Figure 1:
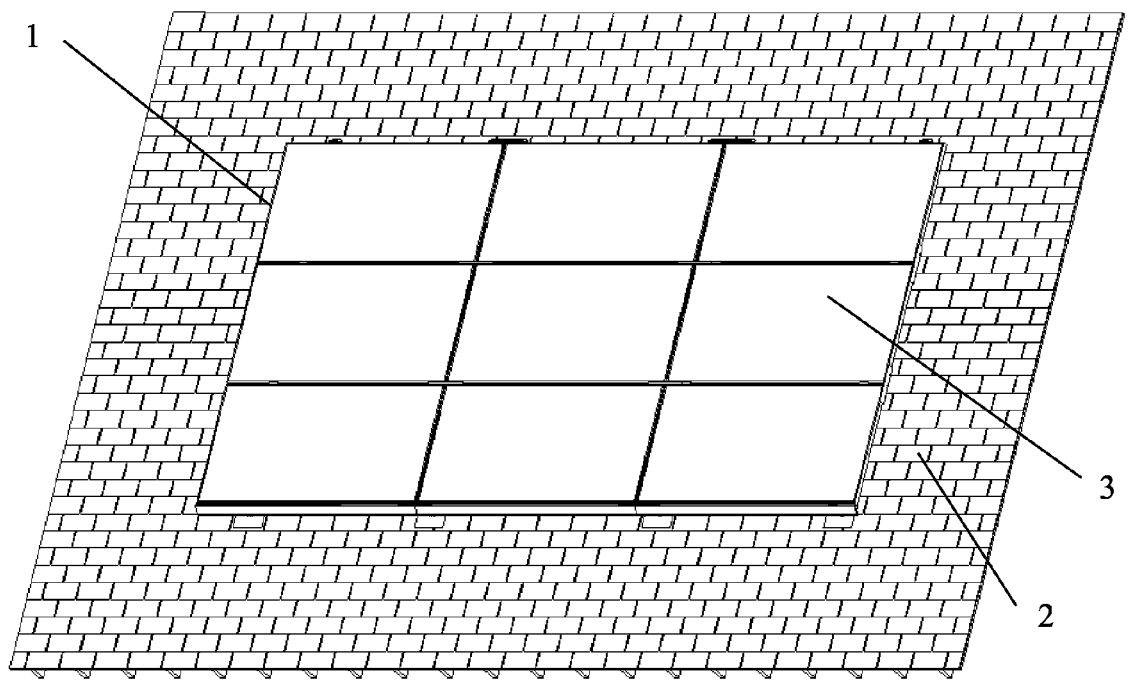
FIG. 1 is a perspective view of one embodiment of the invention.
Figure 2:
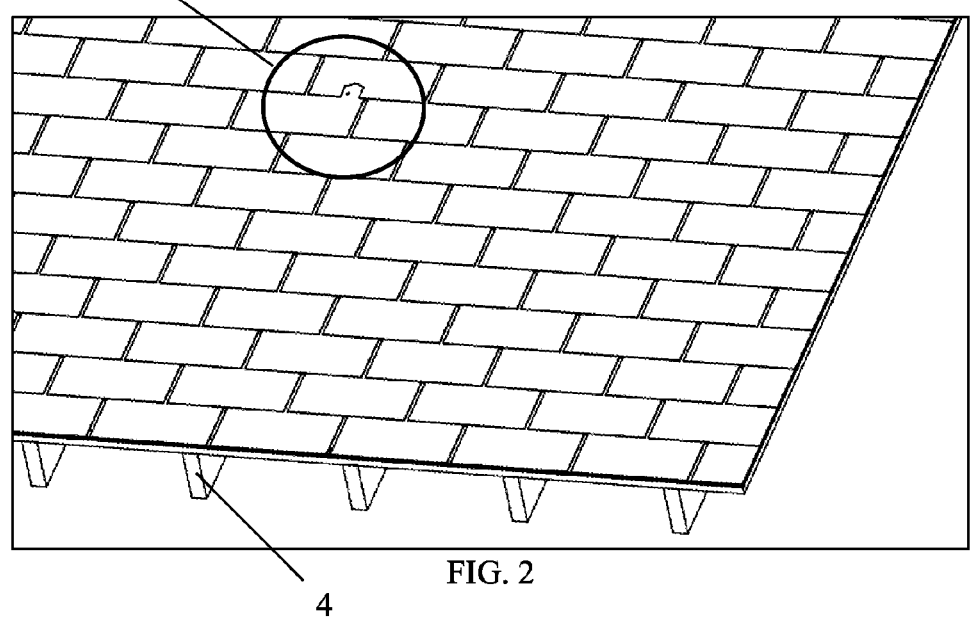
FIG. 2 is a perspective view of one component of one embodiment of the invention.
Figure 3:
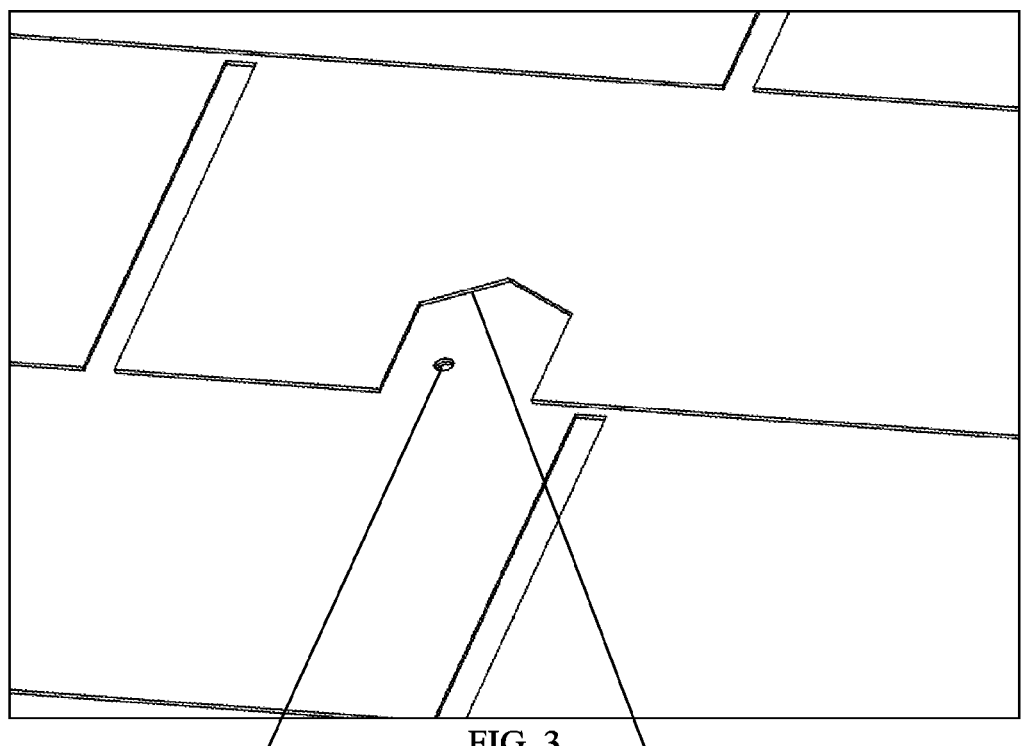
FIG. 3 is a perspective view of one component of one embodiment of the invention.
Figure 4:
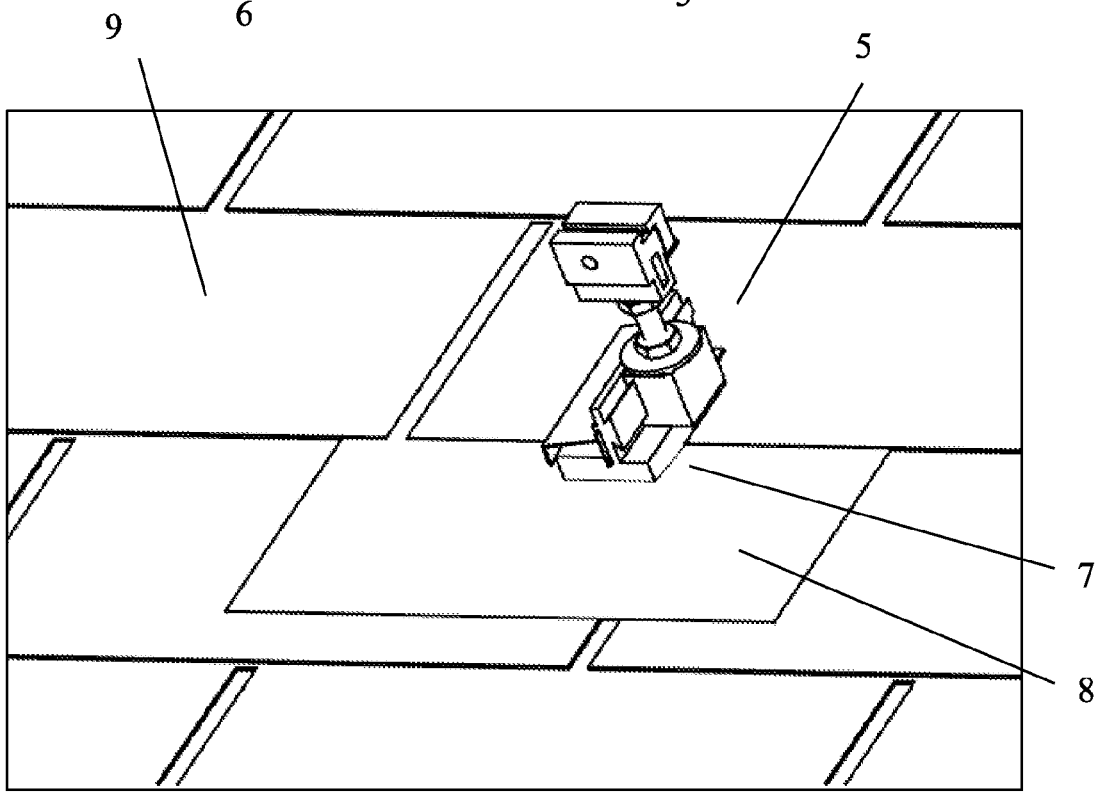
FIG. 4 is a perspective view of one component of one embodiment of the invention.
Figure 5:
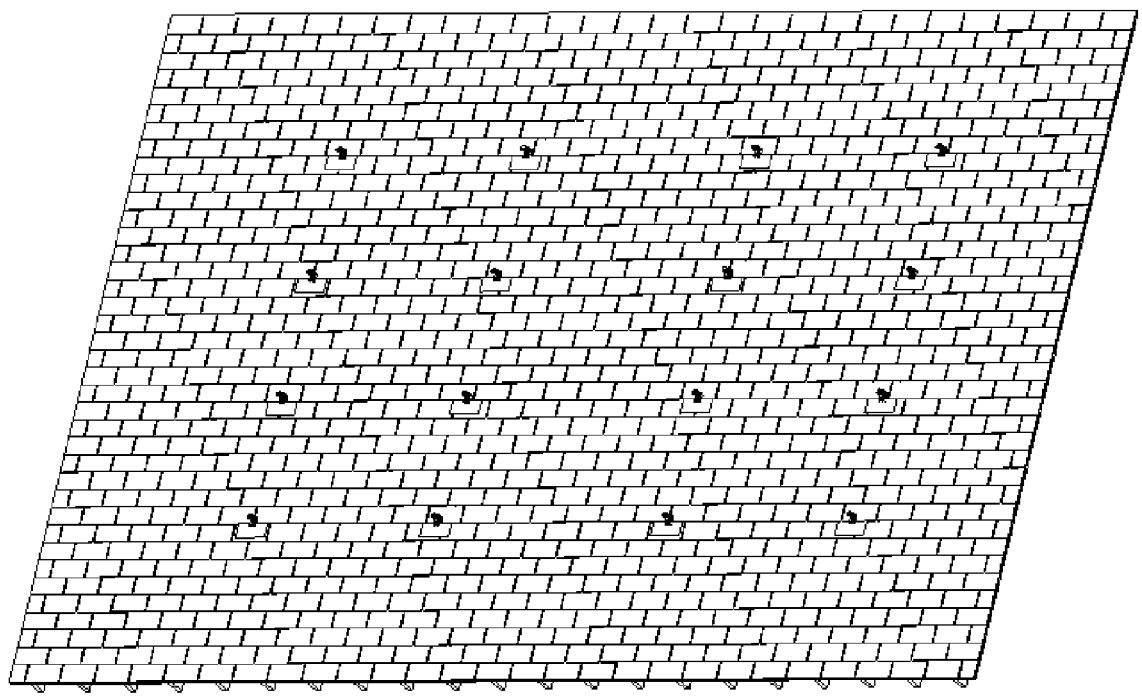
FIG. 5 is a perspective view of one embodiment of the invention.

FIG. 1 shows a solar panel support system, 1, on a pitched roof, 2. Shown are 6 solar panels, 3, in an embodiment of a solar panel mounting or support system, 1. FIG. 2 shows the lower right corner of FIG. 1 without the solar panel support system, 1. In order to attach the roof mount, 7, a hole may be drilled into the roof, 2, into the roof rafter, 4, as shown in FIGS. 2, 3, and 4. The drilled hole, 6, can be seen in FIG. 3. The roof mount, 7, shown in FIG. 4 is one aspect of the invention. FIG. 5, shows numerous the roof mounts, 7, installed on the roof, 2.

Figure 6:
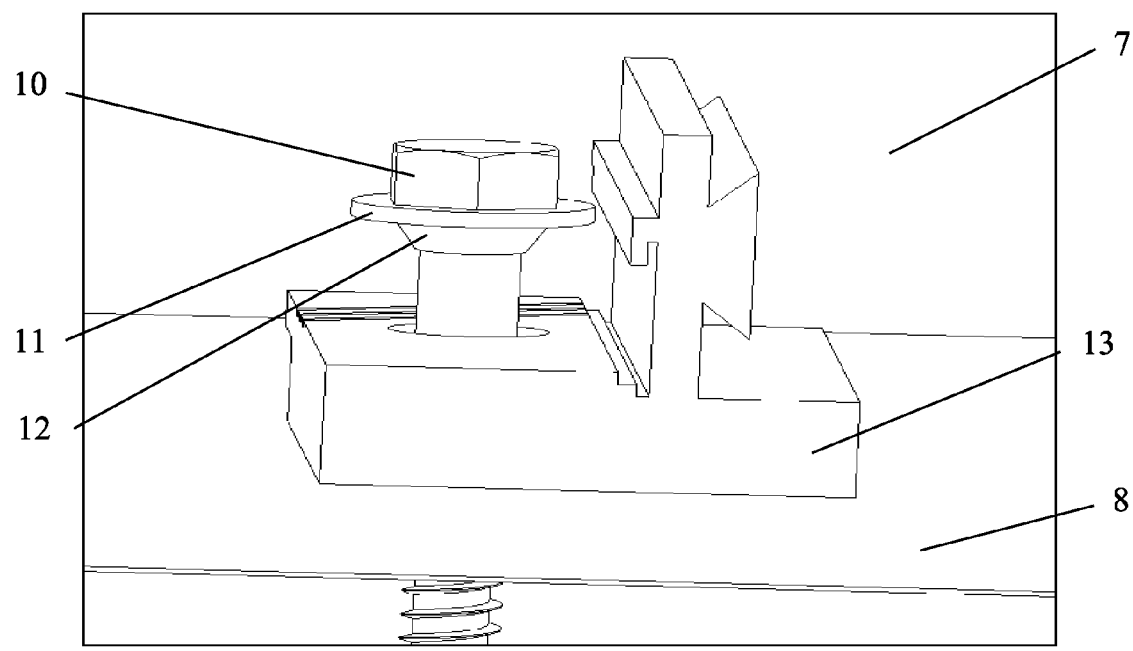
FIG. 6 is a perspective view of one component of one embodiment of the invention.
Figure 8:
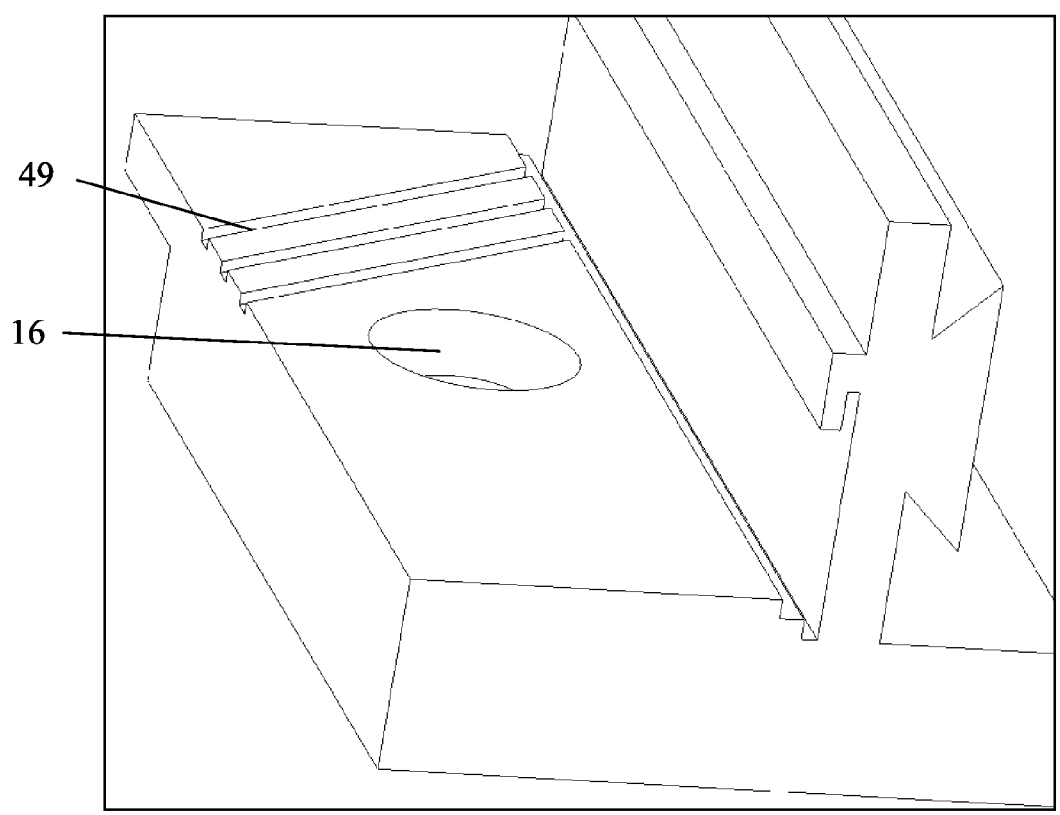
FIG. 8 is a perspective view of one component of one embodiment of the invention.
Figures 9, 10:
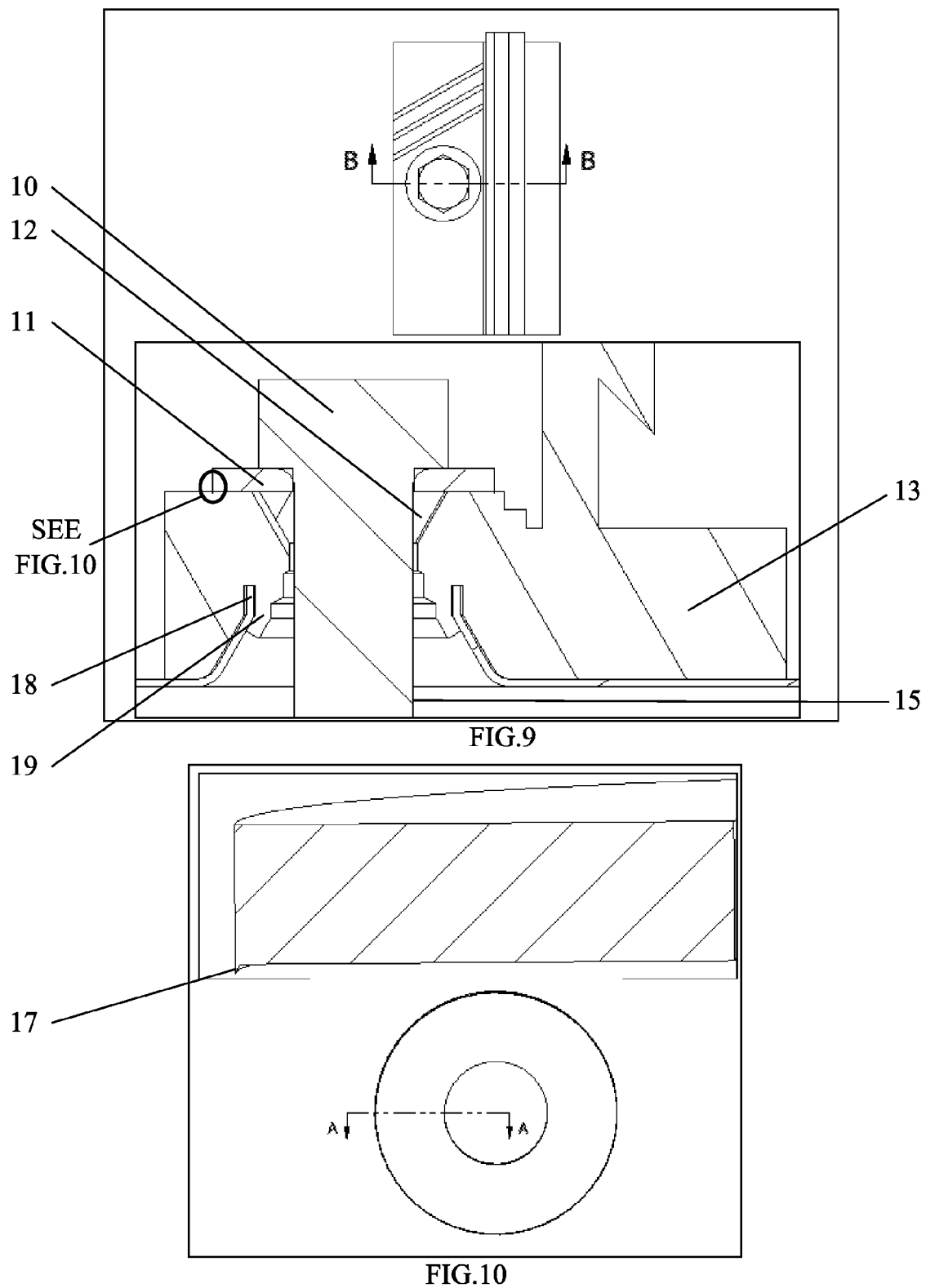
FIG. 9 is a cross-sectional view of one component of one embodiment of the invention.
FIG. 10 is a cross-sectional view of one component of one embodiment of the invention.

FIGS. 6 and 8 show one embodiment of a solar panel mount base, 13, also referred to a mount channel, 13, as such may include a slide adjustment. As the cross section view in FIG. 9 shows, the flashing, 8, may be pinched into the solar panel mount base, 13, on the roof mount, 7, such as at location 18 and may be inserted under the cut shingle, 5 and the shingle, 9, and aligned to the drilled hole, 6. See FIGS. 3 and 4. A lag bolt, 10, may hold the roof mount, 7, onto the roof, 2. See FIGS. 6, 9, and 11. As shown in FIG. 6, the lag bolt may go through the mount channel, 13, on the roof mount, 7. FIG. 6 also shows the seal, 12, and lag bolt washer, 11.

Figure 7:
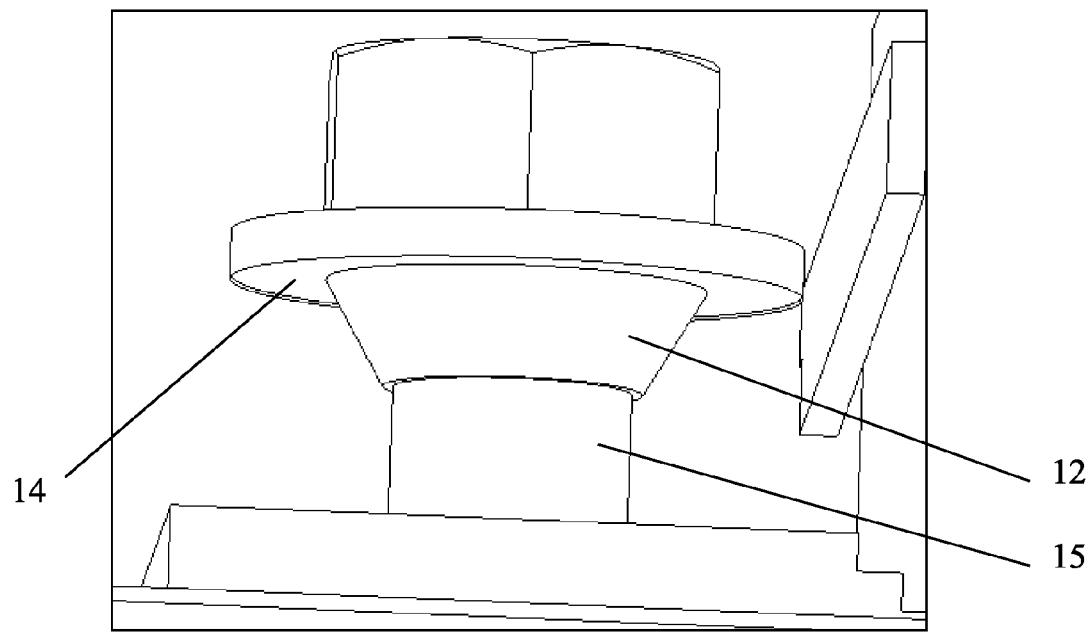
FIG. 7 is a perspective view of one component of one embodiment of the invention.

When the lag bolt is tightened, the seal, 12, may be pushed up against the lag bolt washer bottom, 14, the lag bolt shank, 15, and the mount channel tapered hole, 16, as shown in FIGS. 7 and 8. A compressed seal, 12, may form a liquid tight seal. See FIG. 9. As may be understood, this embodiment can present a permanent underside sealed junction between the solar panel mount base, 13, and the bottom flashing, 8. Further, the seal of the flashing to the mount base, 13, may be pre-assembled to underside permanently seal the flashing to the structure foundation such as the solar panel mount base, 13. The lag bolt washer, 11, may also have a lag bolt washer biting lip, 17, which can cut into the mount channel, 13, as shown in FIGS. 9 and 10. This may form an electrical ground between the lag bolt, 10, lag bolt washer, 11 and the mount channel, 13. By having a pre-assembled juncture perhaps such as a crimp as shown, a preassemble, crimped item such as an assembly mount base can be provided. As shown, the design may present an inner radius deformation capture that can provide a good seal.

As can be seen, there can be a base flashing portion flat on the bottom, and a raised flashing portion that lift up, the raised flashing portion may have an upper terminus flashing portion and the crimp may be in the vicinity of a transition between any of these portions. By establishing a base flashing portion, a raised flashing portion, an upper terminus flashing portion, and sealing the crimped item in the vicinity of a transition between a portions, sealing can be reliably accomplished. As shown in this embodiment, the crimp may be positioned below the substantially vertical terminus flashing portion, and the crimped item may be positioned below the substantially vertical terminus flashing portion.

Figure 12:
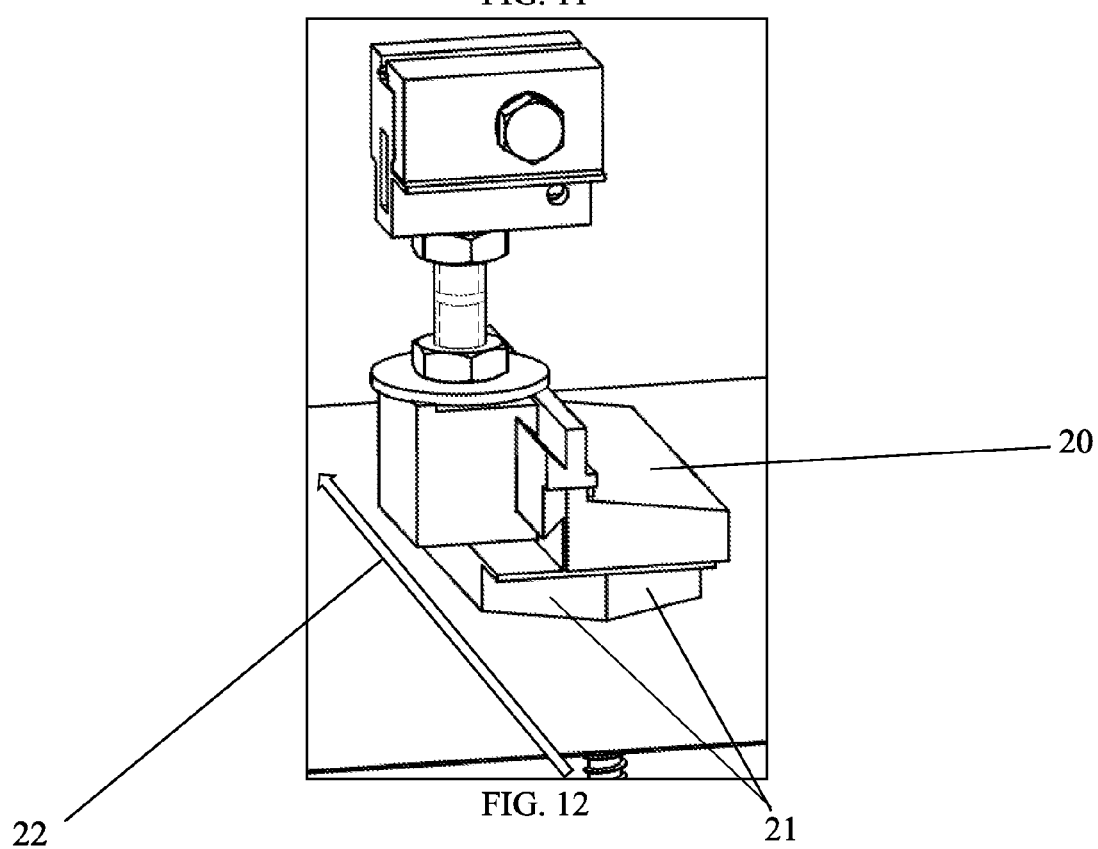
FIG. 12 is a perspective view of one component of one embodiment of the invention.

In embodiments, the flashing raised lip, 18, may be secured to the solar panel mount base, 13, with the high pressure of the mount channel swage lip, 19 by a crimped junction. This can be pre-manufactured and can create a strong seal between the flashing-pinched, 8, and the mount channel or solar panel mount base. In some embodiments, the mount channel, 13, can be designed to divert water around the attachment location such as may arise from water flowing down the roof or the like. The channel mount up shape, 21, such as configured for the upper side when mounted on a pitched roof or the like is shown in FIG. 12. The water flow direction, 22 is also shown. Embodiments may include a lag bolt cover, 20, to help deflect water before it reaches the lag bolt, 10 or other attachment element. The cover may also be made non-metallic so it may not require electrical grounding. Drainage grooves, 49, shown in FIG. 8 may also be provided to deflect any moisture that may get near the lag bolt, 10. Both the lag bolt cover, 20, and the drainage grooves, 49, may be a redundancy to the lag bolt seal so normally may not be required.

Figure 17:
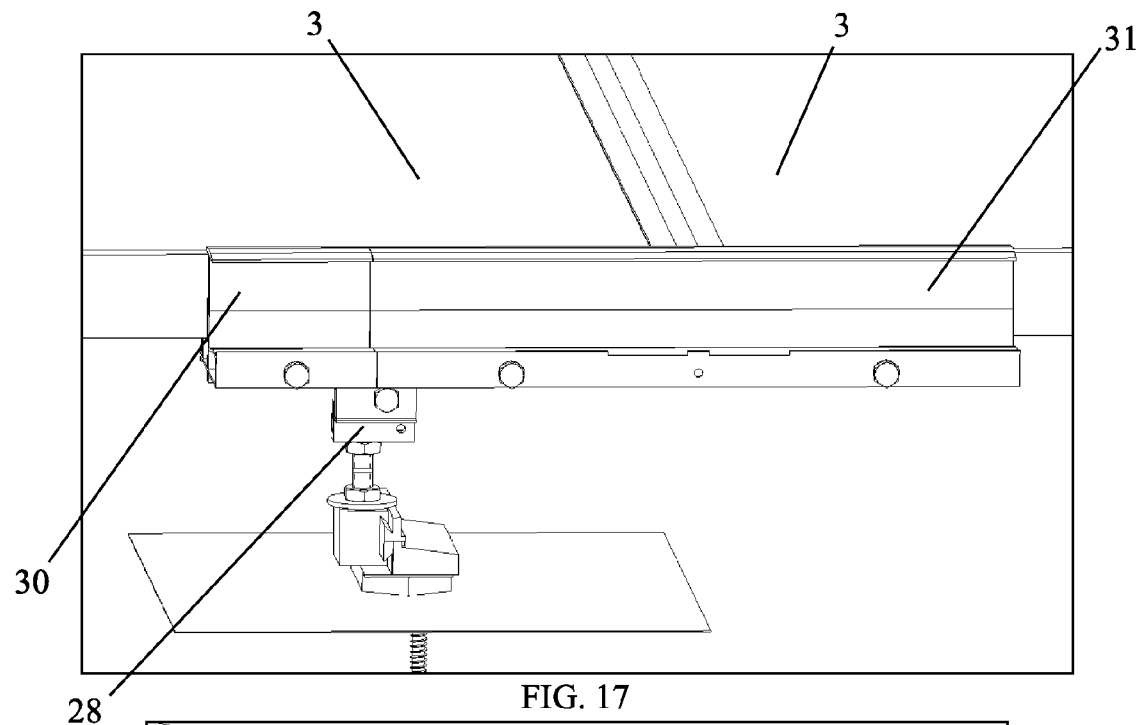
FIG. 17 is a perspective view of one component of one embodiment of the invention.

FIGS. 13 and 17 show how designs can include a solar panel support slider, 27, that has a first slider side and a second slider side, and can be positioned adjacent the solar panel foundation mount. By positioning a solar panel support slider, 27, at this location adjacent to a solar panel foundation mount such as the attachment by the lag bolt, 10, additional adjustment to accommodate mounting surface irregularities, mounting location needs, roof rafter locations, or the like.

Figure 11:
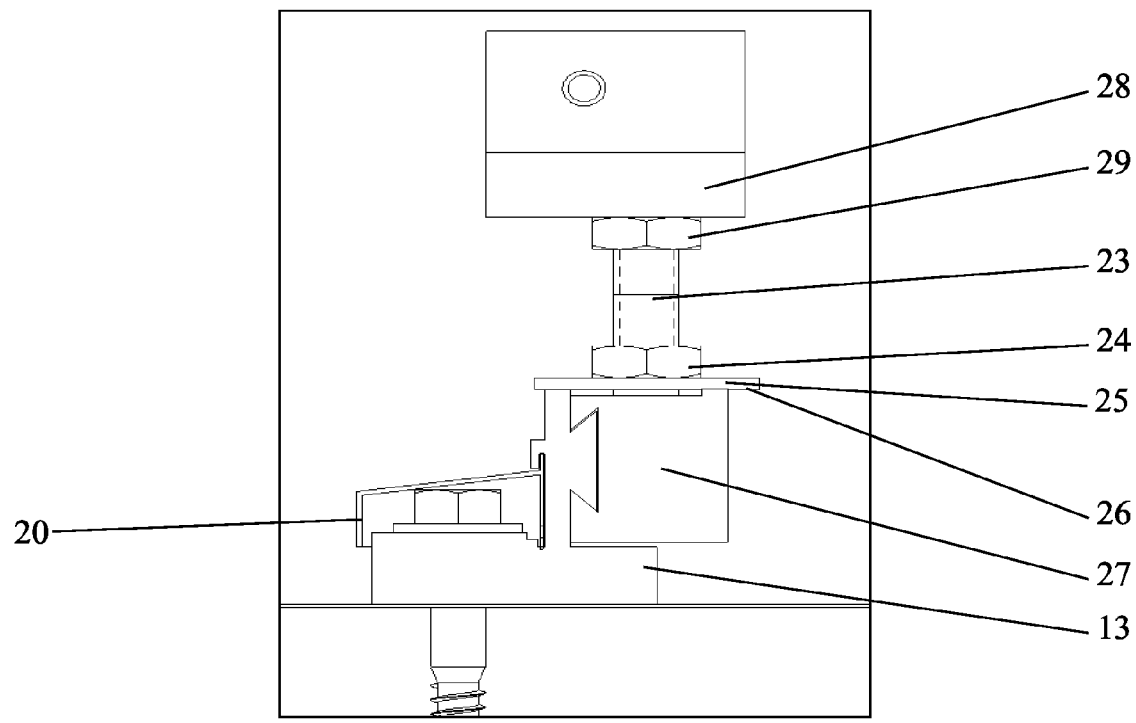
FIG. 11 is a perspective view of one component of one embodiment of the invention.

As shown in FIG. 11, the slider, 27, can move back and forth on the mount channel, 13, until the slider nut, 24, is tightened. This can allow for adjustment of the location for the panel support mount-grip, 28, in the roof top to bottom direction. The adjust stud, 23, can present a mount riser and can be threaded in opposite directions on each end, so turning it allows adjustment of the height of the panel support mount-grip, 28, in the up and down direction from the roof, 2. When the slider nut, 24, is tightened, tines such as the slider biting teeth, 26, can be included to penetrate into or perforate the mount channel, 13, and the slider, 27 to create a better ground connection. See FIGS. 11 and 13.

The adjust stud, 23, may be secured to the panel support mount-grip, 28, by the panel support nut, 29. This can also create a good electrical ground path between the panel support mount-grip, 28, and the adjust stud, 23 and may also include a tined nut or washer or the like. By including tined elements, the use of biting parts can provide that the material or surface is penetrated or perforated. In this manner any two surfaces, such as two mount surfaces or mount surfaces and solar panel surfaces can be well grounded, or at least well electrically connected to each other. Of course, a first surface can be a panel surface and a second surface can be a mount surface. Regardless, for connecting any two surfaces in proximity to each other, one or both can be perforated. One direction can be designated a "forward" direction or more generally a progressive direction of perforation and the other can be designated a regressive direction of perforation. Mount surfaces can include a mount base surface, a panel surface or other mount surfaces, and by perforating a mount surface such as on a mount base, better grounding can occur.

Such surfaces can even include a conductive material with an insulating coating. The insulating coating can be intentionally included or can result from use such as but not limited to a material having a surface that has anodized from exposure to weather and the like, or intentionally manufactured coatings such as anodized aluminum. As discussed below, other structural parts and hardware may be a conductive material with a conductive surface such as, but not limited to, stainless steel and the like. Threads formed into conductive material with a non-conductive surface may be initially considered non-conductive if the threads are formed after some non-conductive coating is applied. If a conductive material with a conductive surface is threaded into the conductive material with a non-conductive coating, then an electrical ground path can be formed as long as the thread contacts or other connection is established are under high pressure such as by adequately tightening a nut, bolt, or other element. In this manner, there can now be provided an adequate grounding path such as between the lag bolt, 10, and through to the panel support mount-grip, 28.

Figure 15:
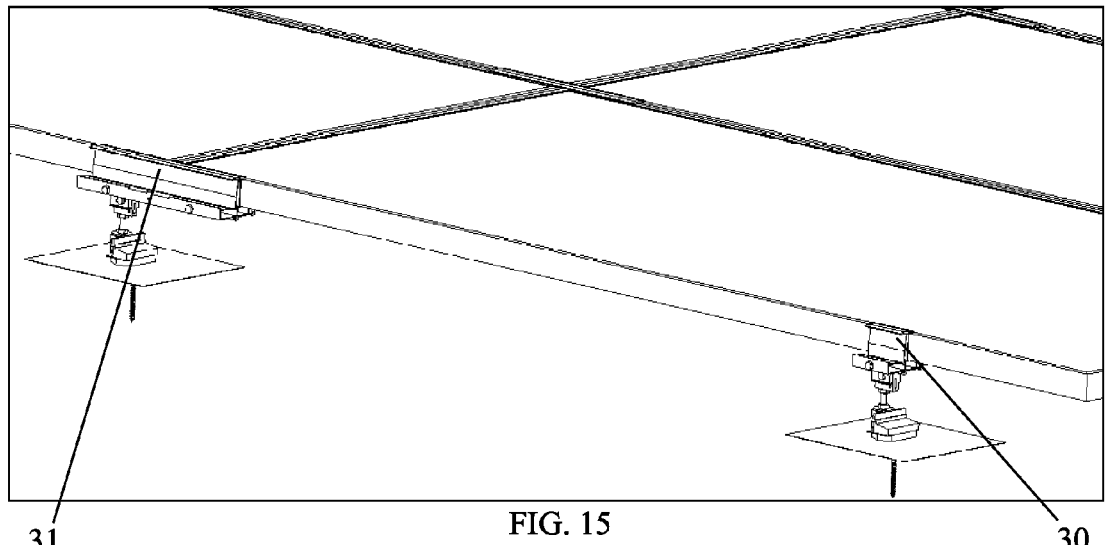
FIG. 15 is a perspective view of one component of one embodiment of the invention.
Figure 16:
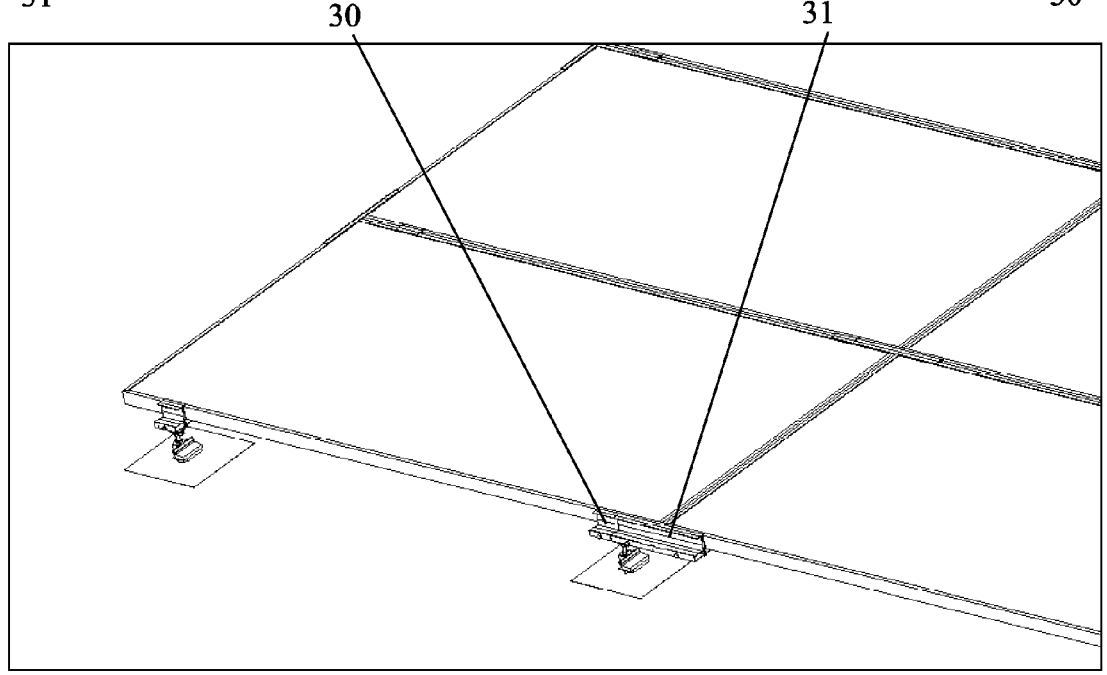
FIG. 16 is a perspective view of one component of one embodiment of the invention.

FIGS. 14 and 15 show a solar panel support system, 1, without the roof, 2. A long panel support-slide, 31, can be attached as a foundation mount to the sides of the solar panel, 3, in between two adjacent solar panels, 3 or at a corner of one or more solar panels and can thus constitute a corner solar panel mount, 31, or can accomplish foundation mounting a system by a corner solar panel mount and engaging a solar panel corner. Similarly, the foundation mounting system can be attached to intermediate along the sides of the solar panel, 3, off the corner, and can present an off corner solar panel mount and engaging the solar panel off of a corner. In this manner, the foundation mount to which the solar panel mount such as short panel support-slide, 30, is connected, can be optimally positioned to locate the structure foundation attachment that may extend through the solar panel mount base for foundation surface irregularities, roof rafter locations, or the like. Both including a short panel support-slide, 30, attached to the sides of the solar panel, 3, and allowing attachment in areas where there is not a long panel support-slide, 31 can allow the steps of establishing the solar panel mount base adjacent a structure foundation and attaching through the solar panel mount base to the structure foundation as desired locations so that the solar panel foundation mount is established adjacent the structure foundation where needed.

Figure 18:
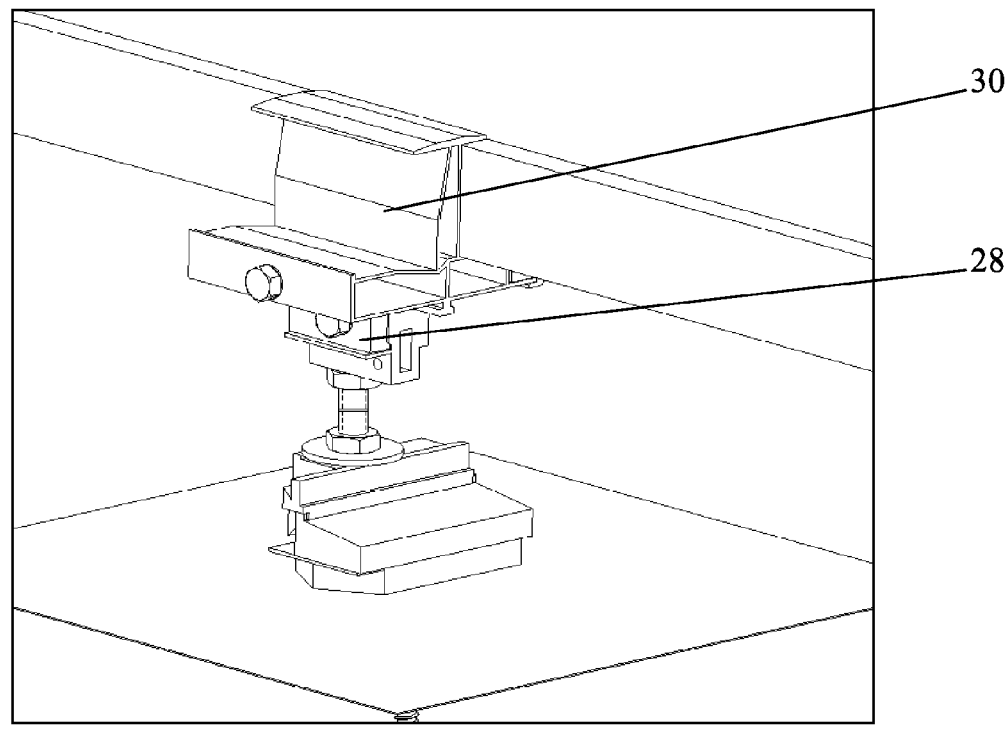
FIG. 18 is a perspective view of one component of one embodiment of the invention.

Embodiments as shown can facilitate and allow the short panel support-slide, 30 to also be placed adjacent to a long panel support-slice, 31, so the panel support mount-grip, 28, can be placed so it is touching and is connected to both supports. See FIG. 17. FIG. 18 shows the short panel support-side, 30, in the middle area of the solar panel, 3 such as off the corner as an off corner solar panel mount. This means that the panel support mount-grip, 28, can be placed at any location along the edges of the solar panel, 3.

Figure 19:
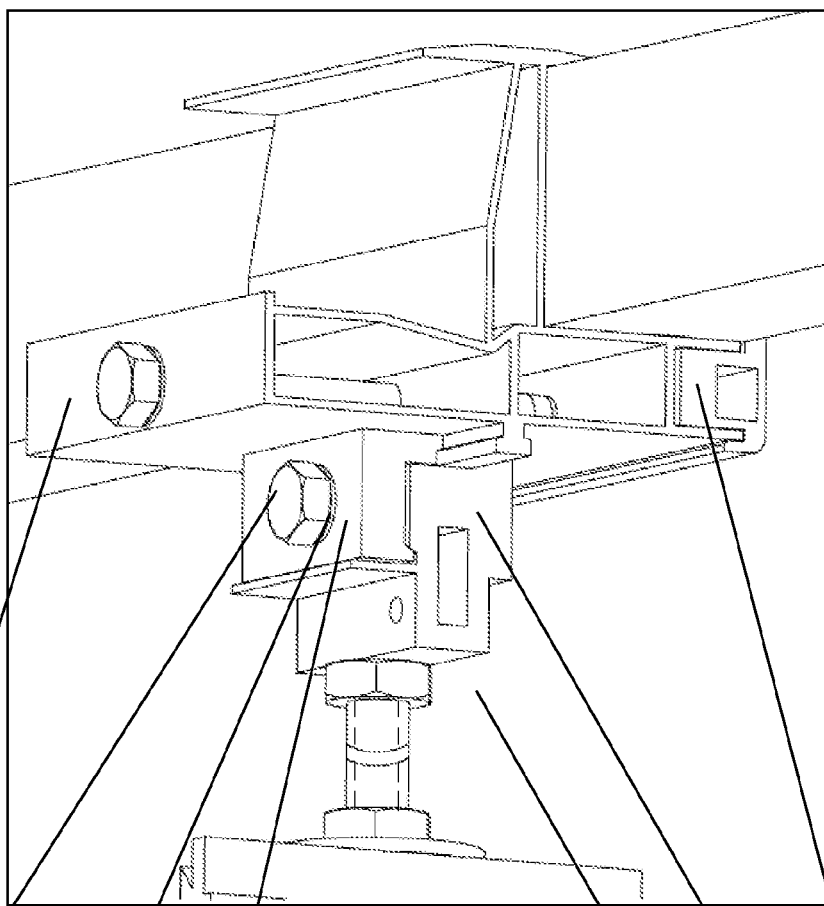
FIG. 19 is a perspective view of one component of one embodiment of the invention.
Figure 20:
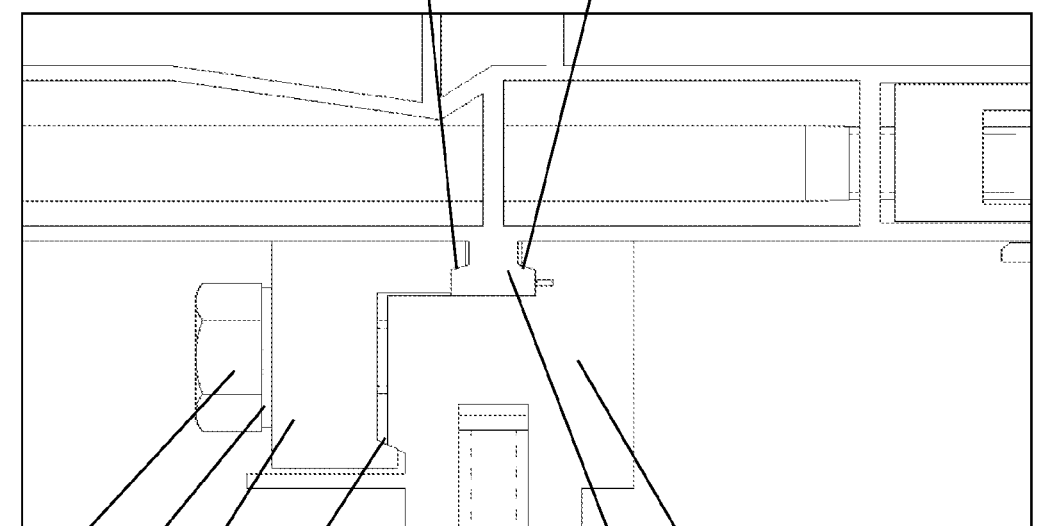
FIG. 20 is a cross-sectional view of one component of one embodiment of the invention.
Figure 24:
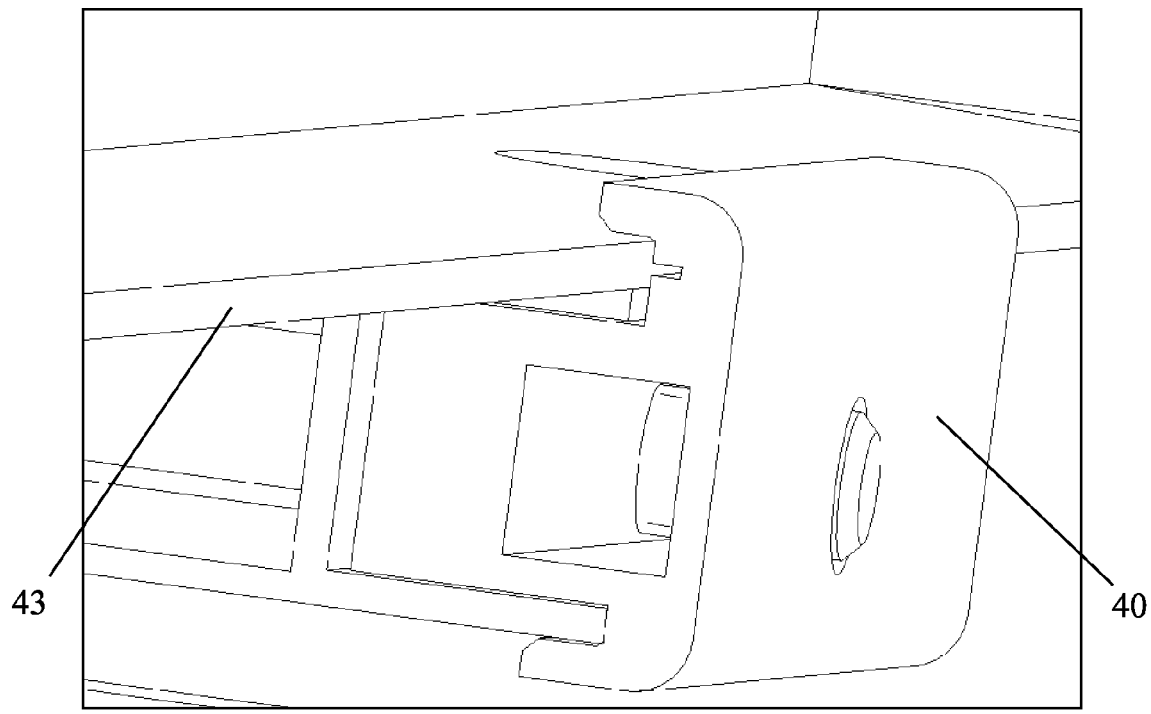
FIG. 24 is a perspective view of one component of one embodiment of the invention.
Figure 25:
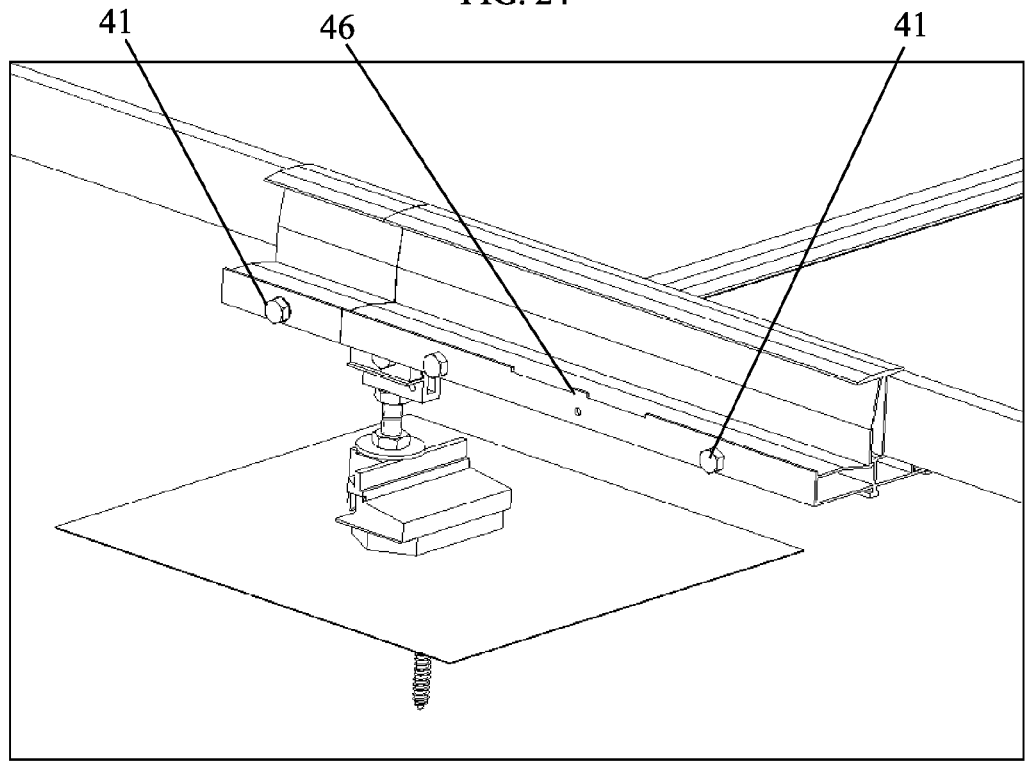
FIG. 25 is a perspective view of one component of one embodiment of the invention.

FIGS. 19 and 20 show one method of attaching a solar panel mount base such as the panel support mount-grip, 28, to the short panel support-slide, 30. When the transverse bolt is tightened such as by tightening the panel support-mount bolt, 35, the forces on the angled support-mount contact edges, 36, and the angled mount support contact edge, 37, can firmly attach the panel support mount-grip, 28, to the short panel support-slide, 30. As mentioned above, and as shown in FIGS. 18-23, for assured grounding, the panel support mount clamp lock washer, 34, can include tines to bite into the panel support mount clamp, 33. In addition or alternatively, tines can be included as biting bar teeth, 39, such as on a separate intercalative junctionpiece that can be positioned adjacent a first solar panel system surface and a second solar panel system surface so as to intercalarily associate the first solar panel surface and the second solar panel surface. This is shown in this embodiment by inclusion of biting bar, 38. The intercalative junctionpiece can be an intercalative bar member or even a tined flat bar. This can pierce into the short panel support-slide, 30. The biting bar, 38, may be pre-installed in the short panel support-slide, 30 so the biting bar teeth, 39, have penetrated the panel support mount-grip base, 32. As initially mentioned above, different materials can be used and the intercalative junctionpiece can be made of stainless steel and thus present a stainless junctionpiece, or can be made of other such material so as to join with a perhaps softer aluminum solar panel surface (which can be on the solar panel or merely in or on the mount system). As can be appreciated, and as especially shown in FIG. 89, by utilizing a tined flat bar having a width that can be coordinated with a slotted surface also having a similar width, the intercalative bar member or the like can be held in place. The slot can be configured to accept less than the maximum width of the intercalative bar member so a portion of it is forced to stick out and thus forced to perforate a solar panel mount surface and by providing a slot that has less than the full width of a tined flat bar or the like, the grounding effect can be achieved.

As can be understood, the intercalative junctionpiece can be positioned between a first panel system surface and a second panel system surface to provide an item between the two surfaces. As shown in FIG. 22, the intercalative junctionpiece can be a unitary junctionpiece and can have tines on it so as to be a mechanical deformation junctionpiece. Through the step of mechanically deforming one or perhaps at least two solar panel system surfaces that may even be made of different substances, perhaps such as one (likely the tines) to be made of a harder surface, the substances and surfaces (perhaps softer substances) can be intercalarily associated. There can now be an electrical ground between the short panel support-slide, 30, and the panel support mount-grip base, 32.

The biting bar, 38, can also be used for grounding between the short panel support-slide, 30, and the short panel support slide bar, 40. See FIGS. 22-24 and 30. When the panel support bolt, 41, is tightened, the biting bar teeth, 39, can penetrate into or perforate the solar panel frame bottom, 43. The biting bar teeth has now penetrated into the short panel support-slide, 30. The panel support lock washer, 42, can also penetrate into or perforate the short panel support-slide, 30. There can now be a good electrical ground between the solar panel frame bottom, 43, and the short panel support-slide, 30. The solar panel, 3, can thus be securely fastened to the short panel support-slide, 30.

The electrical grounding and attachment method of the long panel support-slide, 31, and the solar panel, 3, is very similar to the short panel-slide, 30, and the solar panel, 3, as previously described. One difference may be that two panel support bolts, 41, may be used and there is a biting bar, 38, at each panel support bolt, 41, location. Also, a long panel support slide bar, 44, can be used instead of a short panel support slide bar, 40. See FIGS. 25-30.

To aid in solar panel, 3 spacing, spacing tabs can be used. See FIGS. 25-26 to see the slide bar spacer tabs, 45, and panel support-slide spacer tabs, 46. Refer to FIGS. 27-29 to see the solar panel, 3, spacing.

As can be understood from the above, a solar panel mount can be established above a solar panel foundation mount. As shown in one embodiment in FIG. 26, the solar panel mount can be the component against which solar panels are situated. This can include multiple seats on which a solar panel can be placed. Such seats can include at least one solar panel coupler seat which may be configured to firmly couple a solar panel to the solar panel mount. As discussed in more detail below, it can also include one or more lateral movement seats. A solar panel coupler seat is shown on the right side of the drawing of the embodiment of the solar panel mount shown in FIG. 26. In this embodiment, there is a solar panel frame lip end restraint, such as the long panel support slide bar, 44. This solar panel frame lip end restraint can be used in one way of clamping and coupling the solar panel to the solar panel mount. By solar panel lip end clamping the solar panel against the intermediate support shown as extending upward in FIG. 26, the a solar panel underside lip can be placed in the solar panel underside lip capture seat. In this manner, one type of bottom lip compression clamp system is shown. As a lip end clamp system, compression forces can initially restrain (which may allow some limited movement) and, when tightened, retain (which may firmly affix) the solar panel to the solar mount.

In addition, as shown in FIG. 26, four panels can be joined by one solar panel mount, such as at a corner where four panels meet. This is one type of quadrilateral solar panel mount that achieves the step of quadrilaterally mounting a plurality of solar panels. When including a clamp such as shown in one embodiment, the system can have a firmly fixed solar panel retainer mount. Further as shown in FIG. 26, slide bar spacer tabs, 45, and panel support-slide spacer tabs, 46 can be positioned in between where two panels might meet. This can allow the mount to be an adjacent firmly fixed solar panel retainer mount. When two other panels, considered first and second panels, are mounted on the other side of the mount shown in FIG. 26, the mount can achieve affixing a third solar panel and adjacently affixing a fourth solar panel, perhaps even with an intermediate support extending from the solar panel mount as shown.

As may be understood from FIG. 30, a solar panel can be attached by operating a clamp position adjuster such as the panel support bolt, 41 that may move a solar panel movable restraint such as the long panel support slide bar, 44, or the short panel support slide bar, 40 in the embodiment shown. This can achieve clamping a solar panel perhaps by operation of a threaded adjuster such as by turning the threaded adjuster. As shown in FIG. 30, the solar panel movable restraint can have a solar panel lip overhang that covers some part of a solar panel lip such as the bottom lip situated against the solar panel coupler seat. In some embodiments, there can also be an intermediate support and a top restraint such as shown at location 30 or 31. By causing the solar panel end to be pushed against the intermediate support, designs can achieve internally intermediate support clamping the solar panel. Further, by causing the solar panel top to be held down as shown, designs can achieve top restraining the solar panel.

Figure 31:
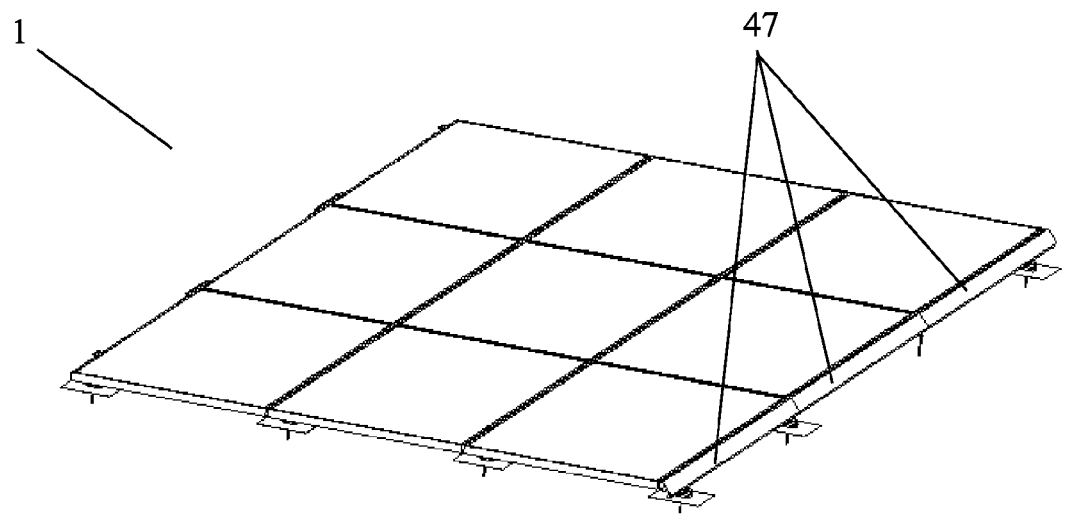
FIG. 31 is a perspective view of one embodiment of the invention.
Figure 32:
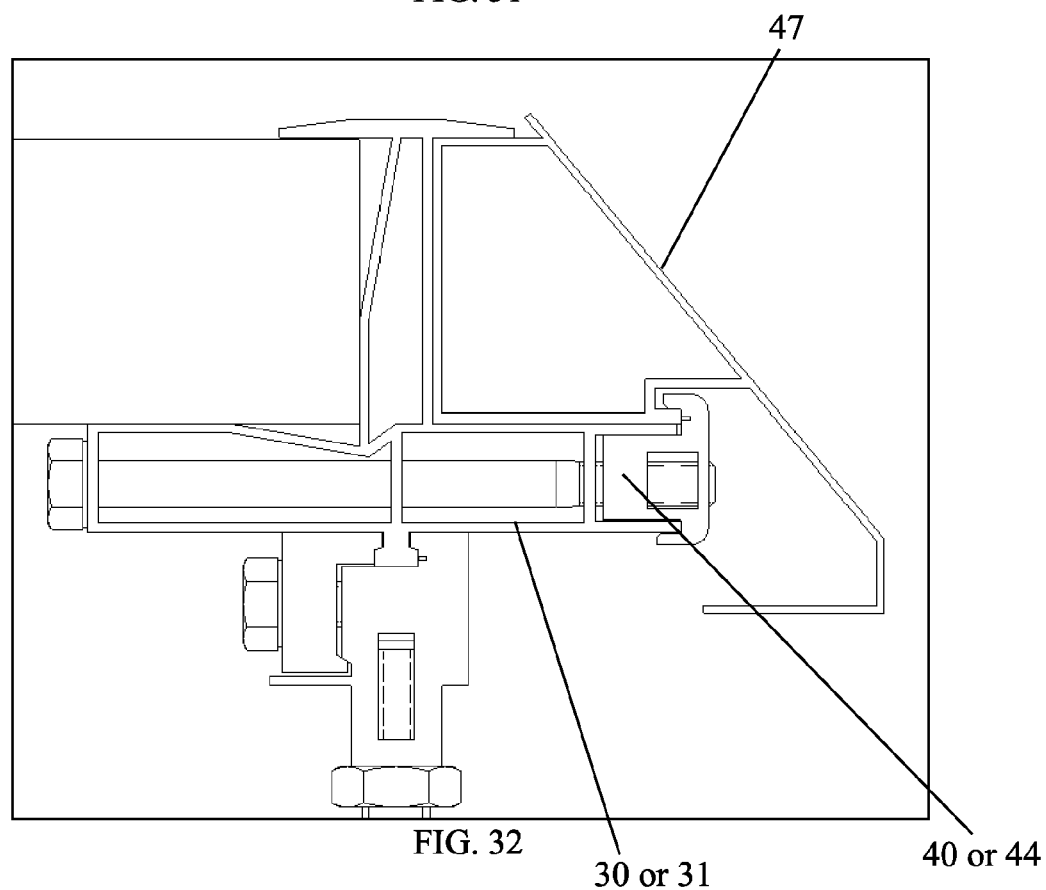
FIG. 32 is a cross-sectional view of one component of one embodiment of the invention.
Figure 33:
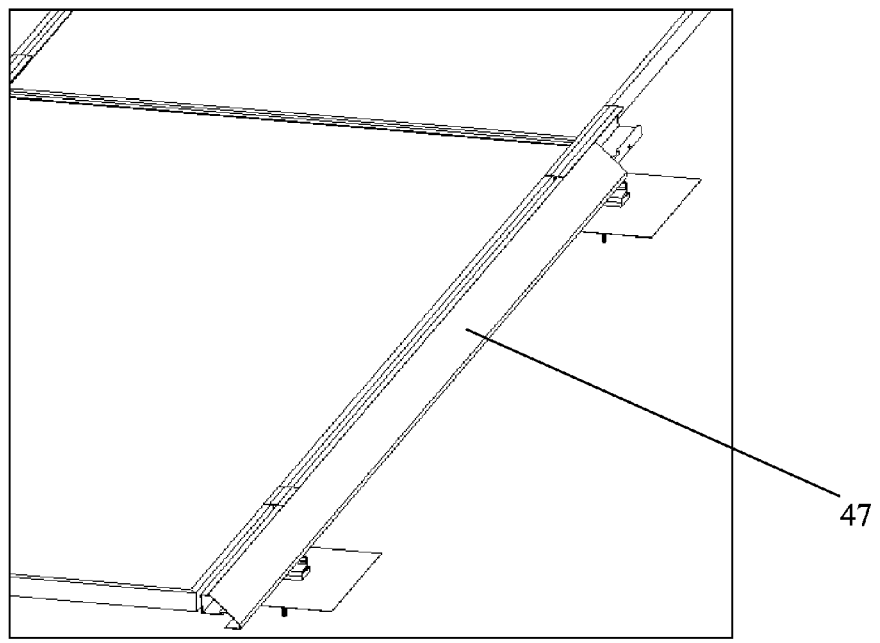
FIG. 33 is a perspective view of one component of one embodiment of the invention.

In some installations, there can be fascia on the downward edge of the solar panel support system, 1. FIG. 31-33 show fascia, 47, on the solar panel support system, 1. The fascia, 47, is clamped into the short panel support-slide, 30 and the long panel support-slide, 31, the same way the solar panel, 3, is clamped into the panel support-slides. This can be seen in FIG. 32. FIG. 33 shows only one fascia, 47, attached. The solar panel support system shown has 3 of them. Electrical grounding of the fascia, 47, to the panel support-slides, 30 and 31, can be the same as the solar panel, 3, to the panel support-slides, 30 and 31.

Figure 34:
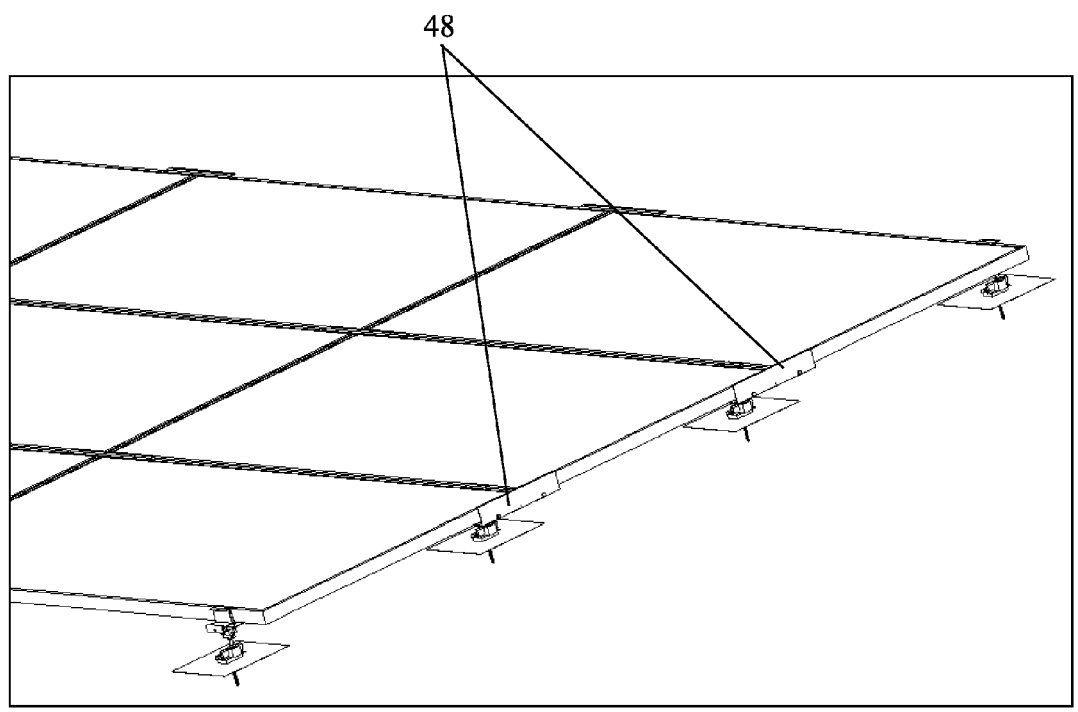
FIG. 34 is a perspective view of one embodiment of the invention.
Figure 35:
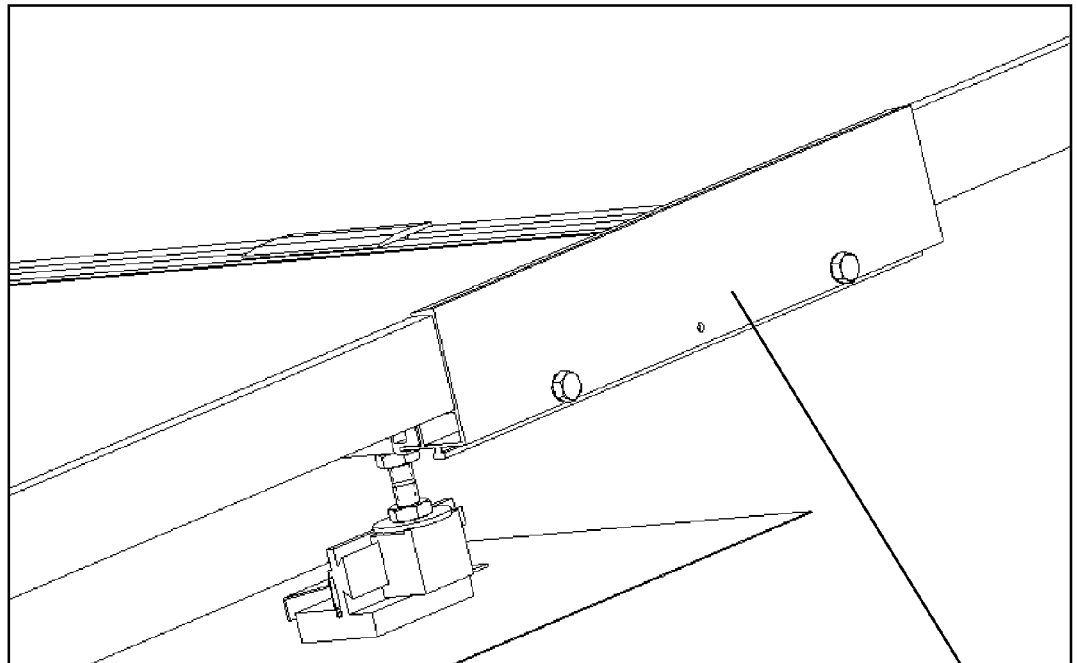
FIG. 35 is a perspective view of one component of one embodiment of the invention.
Figure 36:
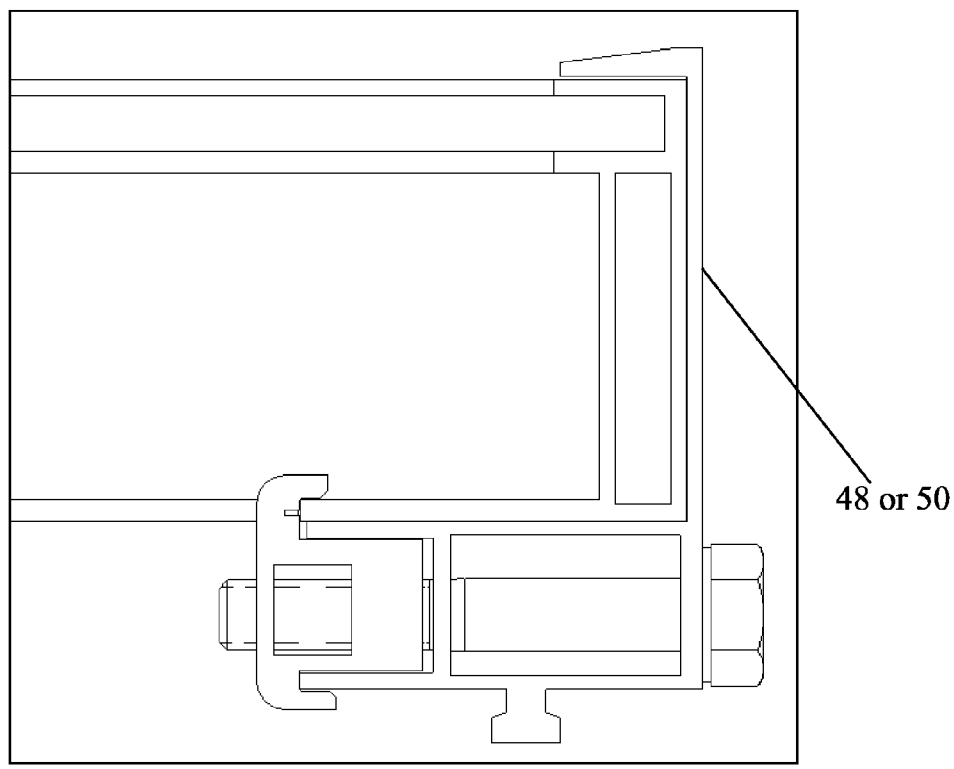
FIG. 36 is a cross-sectional view of one component of one embodiment of the invention.

Now all the metal parts can be electrically grounded in each of the solar panel, 3, rows. The row reference is the horizontal direction. Each row preferably needs to be electrically grounded together. This can be accomplished using the long panel support-slide, 31 in between the solar panels, 3, on either side of the rows. The long panel support, 31, would stick out the side similar to the long panel support, 31, shown in FIG. 15, which is the top of the edge of the solar panel support system, 1. To avoid this, a partial long panel support can be used. FIGS. 34 and 35 show the long panel support-slide-single side, 48. Since long panel support-slide-single side, 48, can have the same clamping features as the long panel support-slide, 31, electrical ground can be established between the rows. All the conductive parts of the solar panel support system, 1, may now be electrically grounded. Note that the lag bolt cover, can be non-metallic so it may not need grounding.

Figure 37:
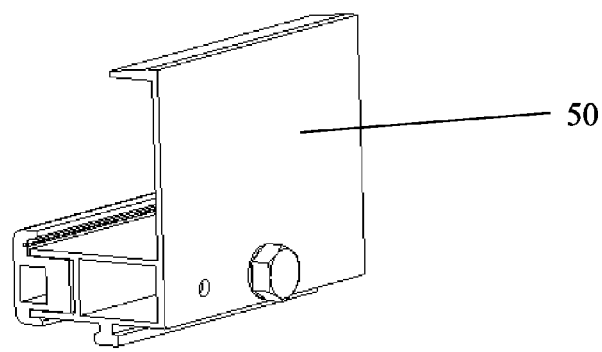
FIG. 37 is a perspective view of one component of one embodiment of the invention.

The long panel support-slide-single side, 48, could also be used instead of the long panel support-slide, 31, in the front of the solar panel support system, 1. Fascia, 47, would not be required. If this is done, then a short panel support-slide-single side, 50, could be used instead of the short panel support-slide, 30. The short panel support-slide-single side, 50, is shown in FIG. 37. This is more aesthetic but may not be as aesthetic as the fascia.

Again, in the embodiment shown, a solar panel frame lip end restraint can be used to solar panel lip end clamp the solar panel or the fascia against the intermediate support. The a solar panel underside lip capture seat can be used to underside lip clamp the solar panel or the fascia and the a bottom lip compression clamp system shown and lip end clamp system shown can be universally applied.

Figure 38:
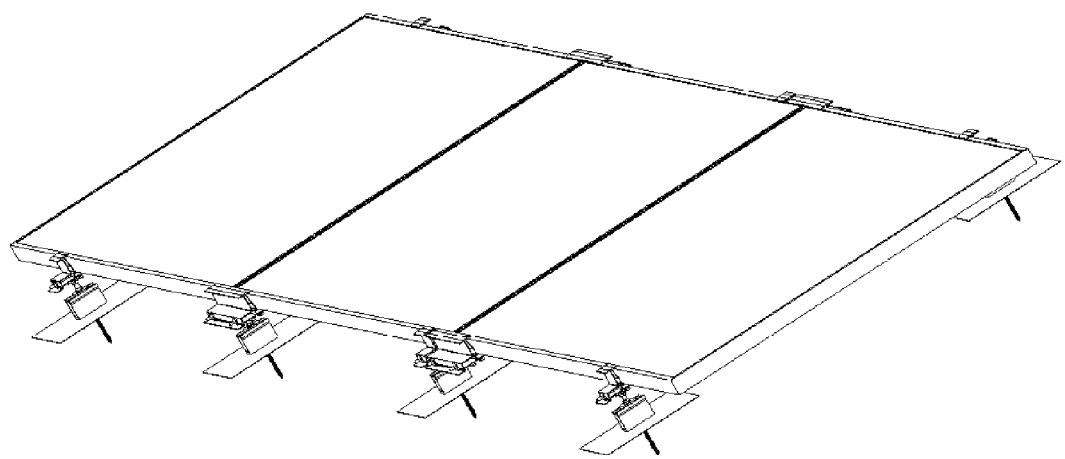
FIG. 38 is a perspective view of one embodiment of the invention.
Figure 39:
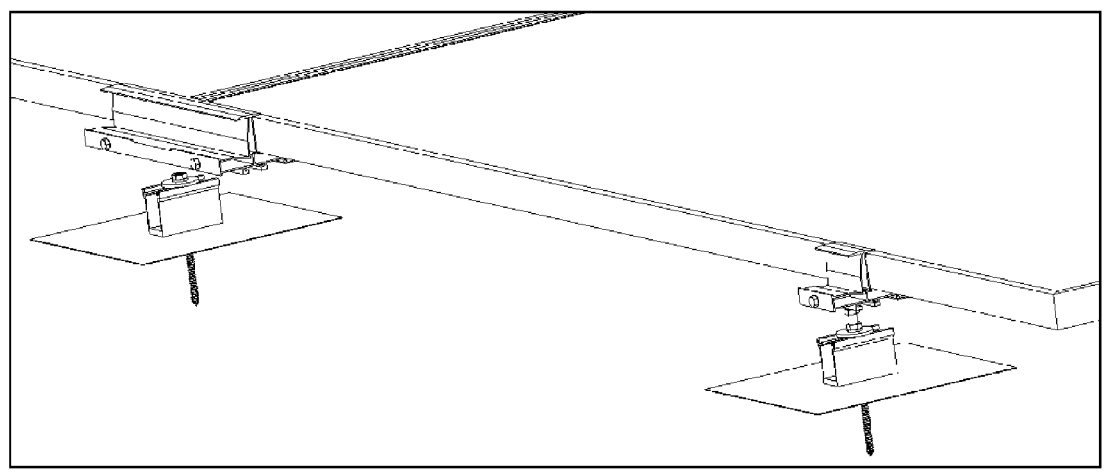
FIG. 39 is a perspective view of one component of one embodiment of the invention.
Figure 40:
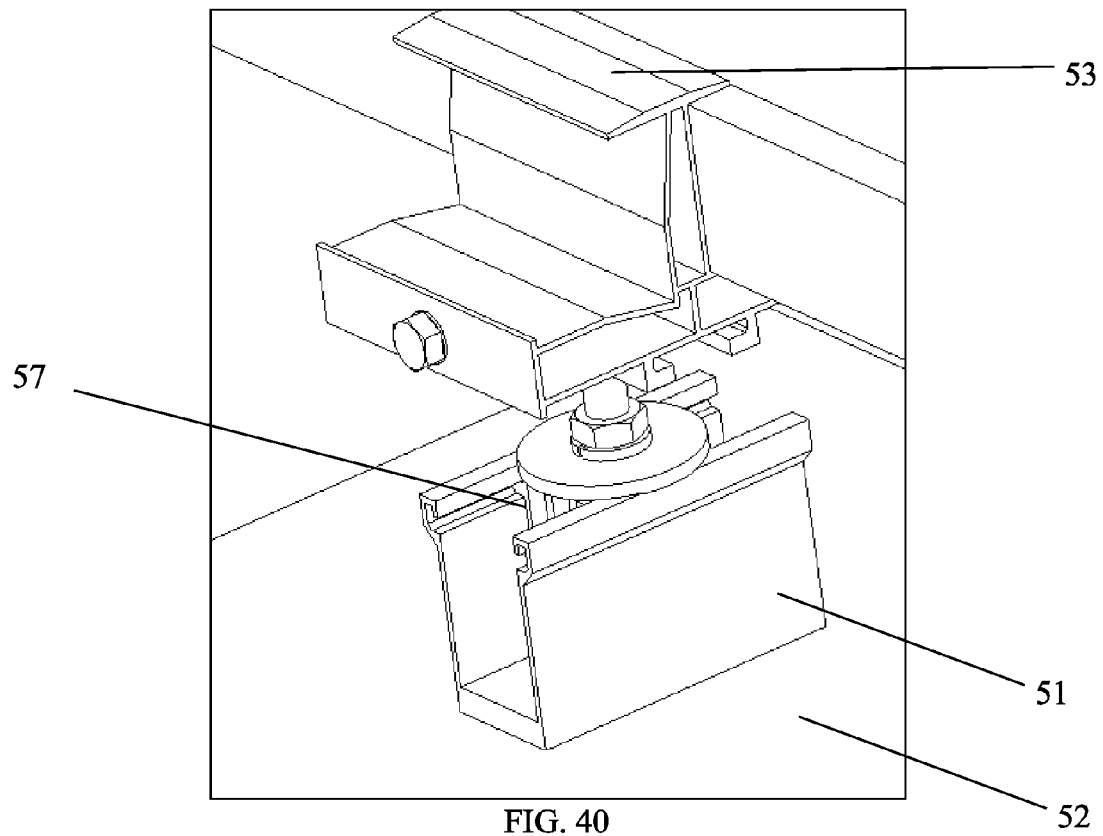
FIG. 40 is a perspective view of one component of one embodiment of the invention.

FIG. 38 shows three solar panels, 3, on solar panel support system, 1. Only three solar panels, 3, are used to show the features. Larger, solar panel support systems, 1, could normally be installed.

The clamping of the solar panel frame bottom can be similar to what has been explained and biting nuts can be used. Different designs can be used for panel support slides. See FIGS. 40-44. When the panel support bolt, 41, is tightened, it can clamp the solar panel frame bottom, 43, to either the short panel support-nut, 53, or the long panel support-nut, 56. A support biting nut, 58, is shown as one type of a tine on a nut in the out and fully tightened position. The support biting nut teeth, 59, present tines that can cut into and perforate the solar panel frame bottom, 43, and either the short panel support-nut, 43, or the long panel support-nut, 56.

Figure 43:
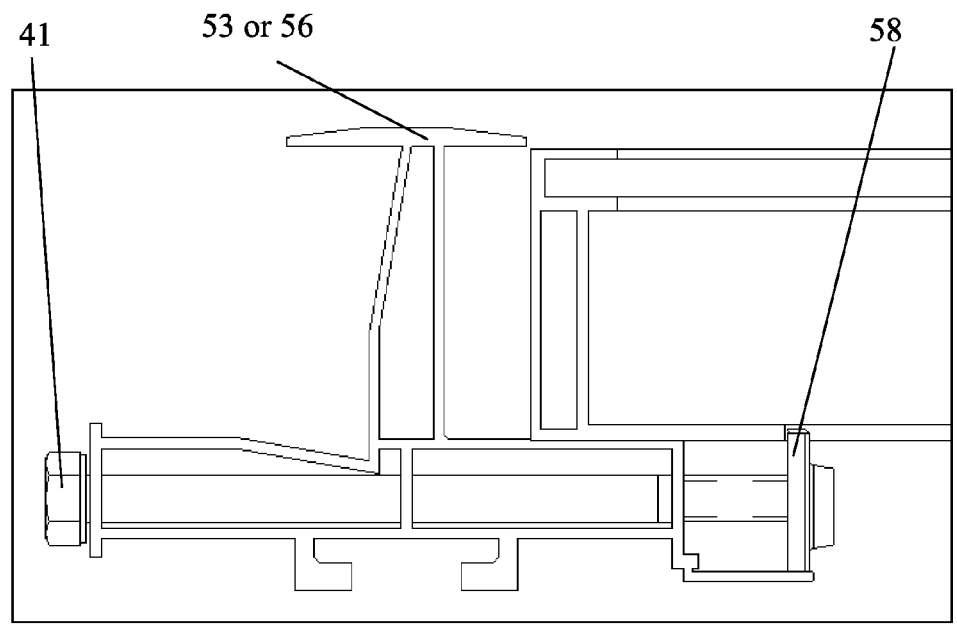
FIG. 43 is a cross-sectional view of one component of one embodiment of the invention.
Figure 44:
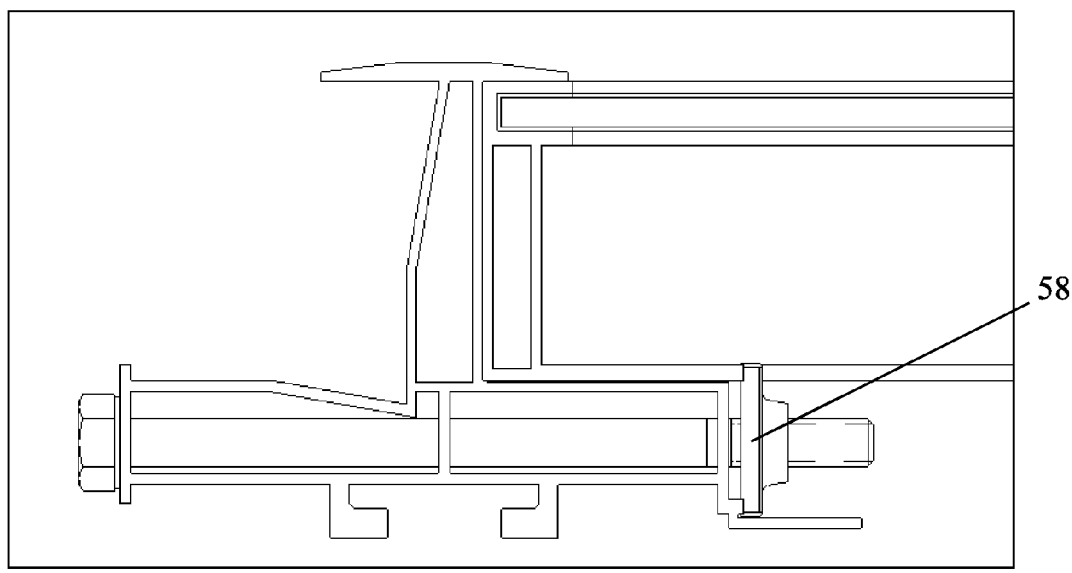
FIG. 44 is a cross-sectional view of one component of one embodiment of the invention.
Figure 45:
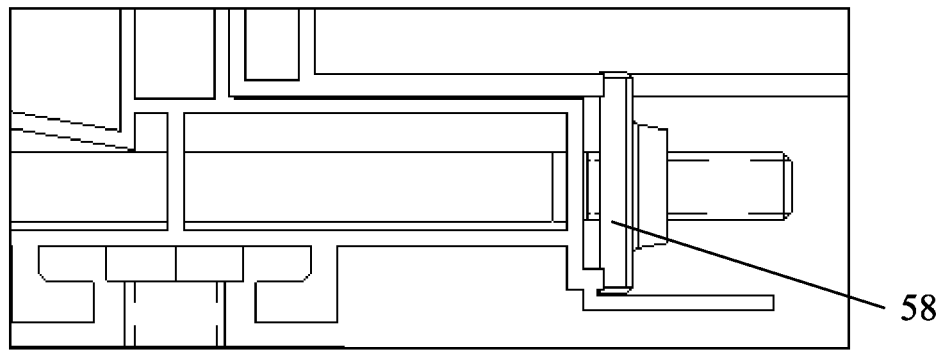
FIG. 45 is a cross-sectional view of one component of one embodiment of the invention.

As can be appreciated from FIG. 43, a solar panel movement restraint can respond to a clamp position adjuster. By operating the clamp position adjuster such as the panel support bolt, 41, the device can achieve the step of clamping a solar panel perhaps such as a the solar panel lip overhang and can internally intermediate support clamp and even top restrain the solar panel. By including a solar panel frame lip end restraint, the coupling and clamping can be hidden, protected, and universal for many solar panel designs. The solar panel underside lip capture seat can be used with many different brands of panels and the bottom lip compression clamp system and lip end clamp system can achieve the goals of providing a universal, cost effective, mount system. As shown, the solar panel movable restraint is situated in proximity to the solar panel coupler seat and the act of moving the solar panel movable restraint with respect to said solar panel coupler seat can be accomplished by turning the bolt or other element on an opposite side or second side from the panel to be affixed so that the panel itself does not impeded access during the assembly process when establishing the movable solar panel mount element at the desired position and tightness.

Figure 47:
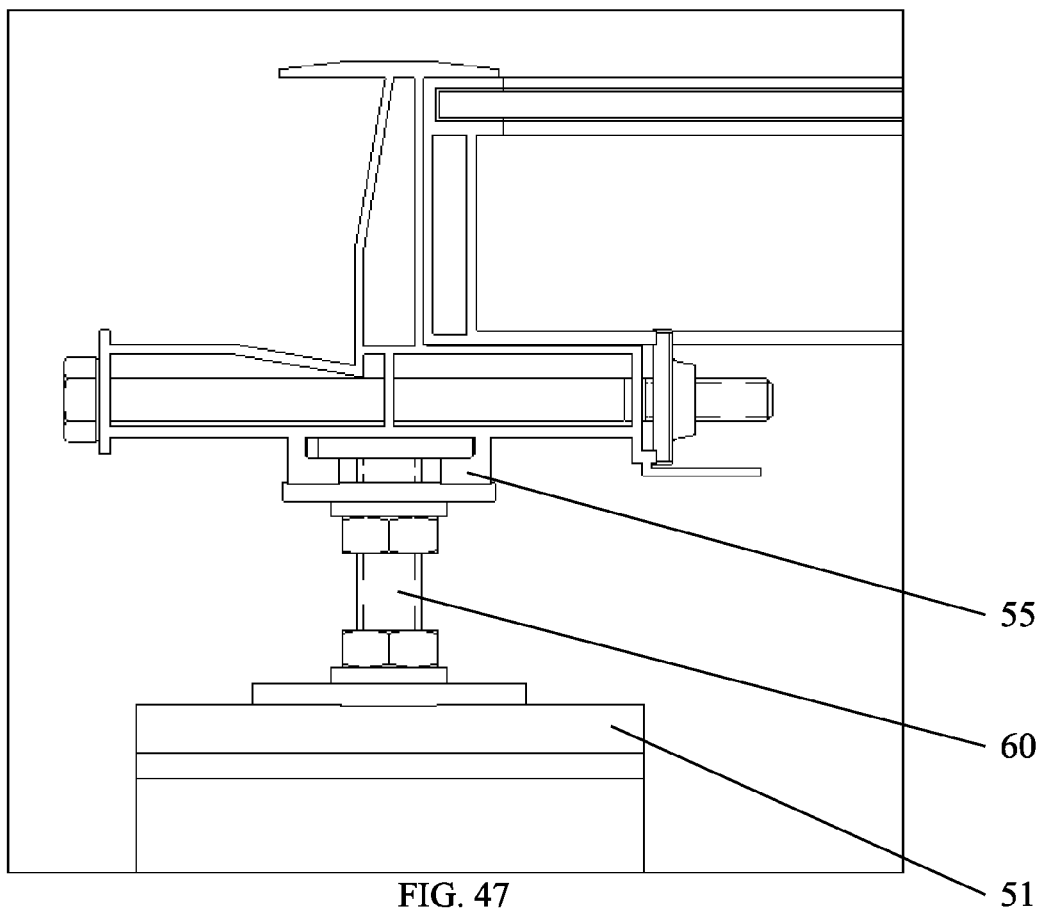
FIG. 47 is a cross-sectional view of one component of one embodiment of the invention.
Figure 50:
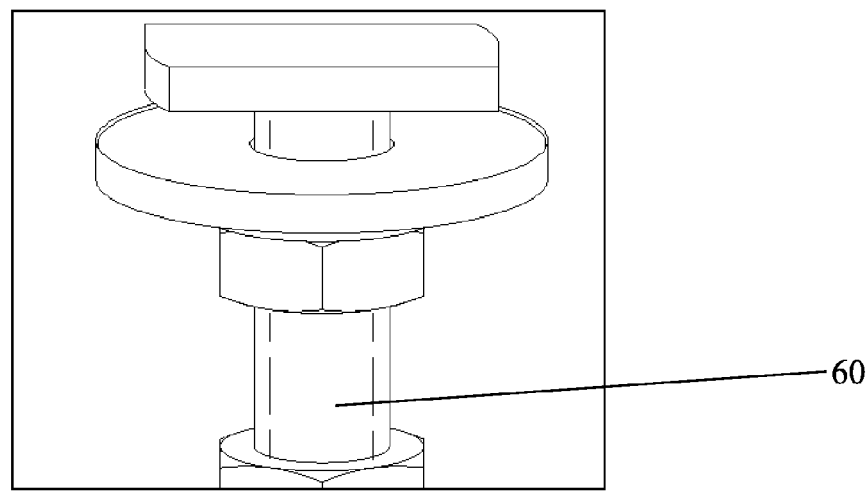
FIG. 50 is a perspective view of one component of one embodiment of the invention.
Figure 51:
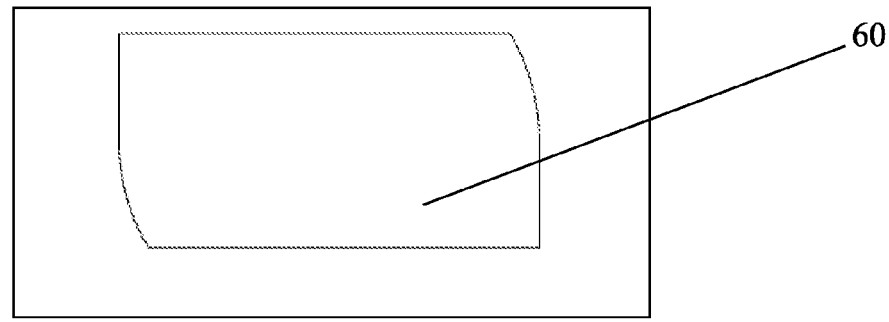
FIG. 51 is a cross-sectional view of one component of one embodiment of the invention.
Figure 52:
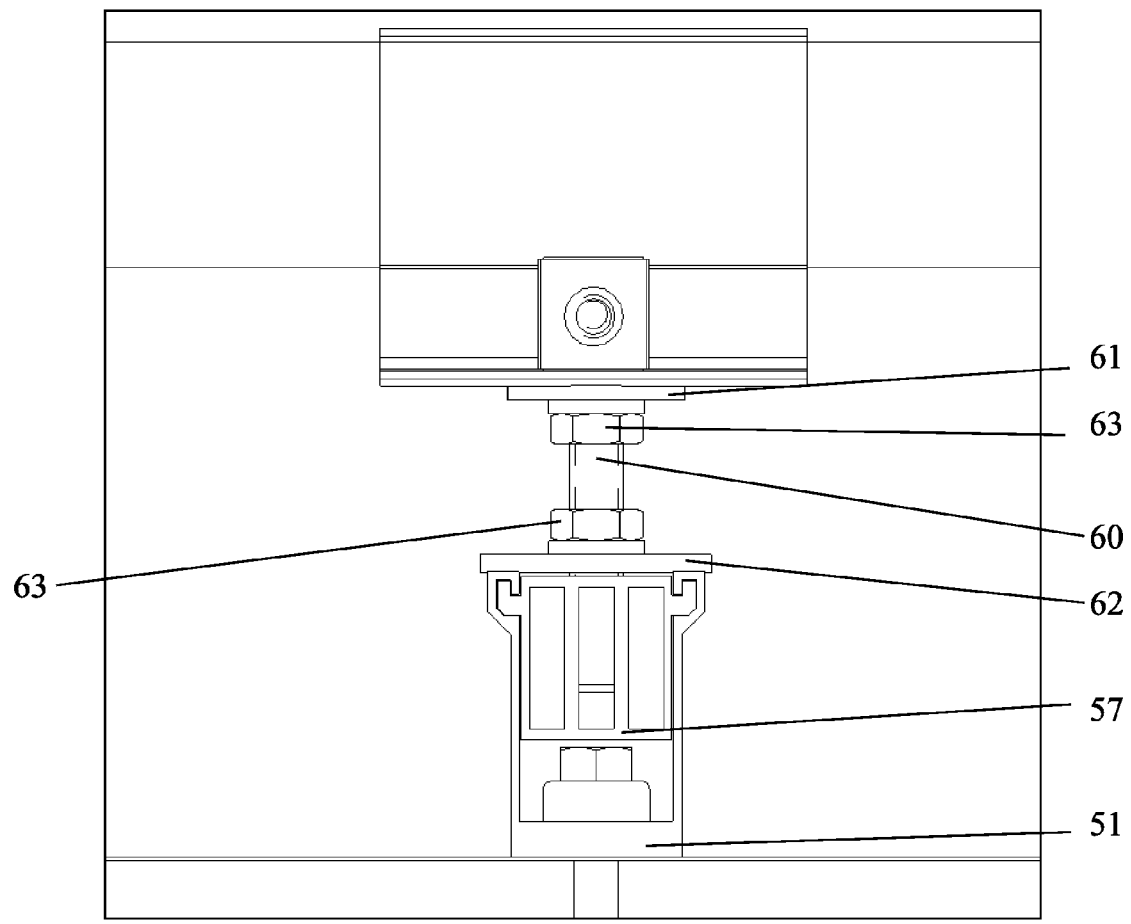
FIG. 52 is a perspective view of one component of one embodiment of the invention.

The mount riser such as T bolt, 60, height from roof, 2, can be set correctly prior to inserting it into the panel support C-channel, 55. The T-bolt, 60, may be positioned so the narrow side fits into the panel support C-channel, 55, as shown in FIG. 47. The T-bolt, 60, can be threaded into the slider-U, 57. Here, the slider-U, 57, is what slides in the roof mount U-channel, 51. The slider-U, 57, can freely slide as long as the T-bolt nut, 63 is not tightened. FIGS. 50 and 51 show the T-bolt, 6, in more detail.

Figure 46:
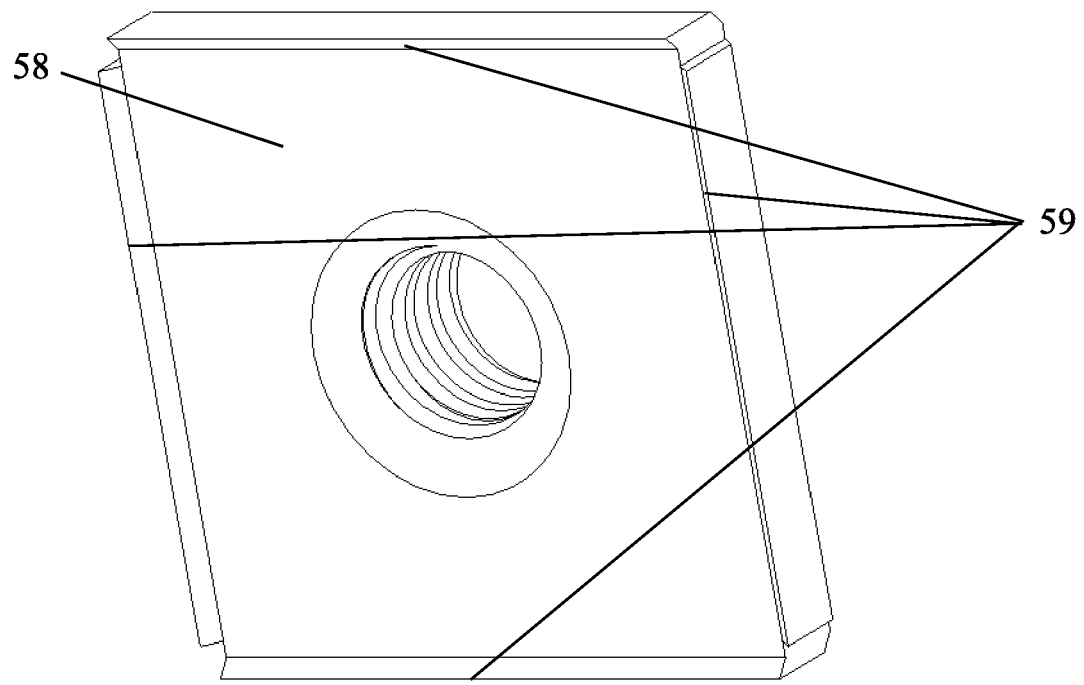
FIG. 46 is a perspective view of one component of one embodiment of the invention.
Figure 48:
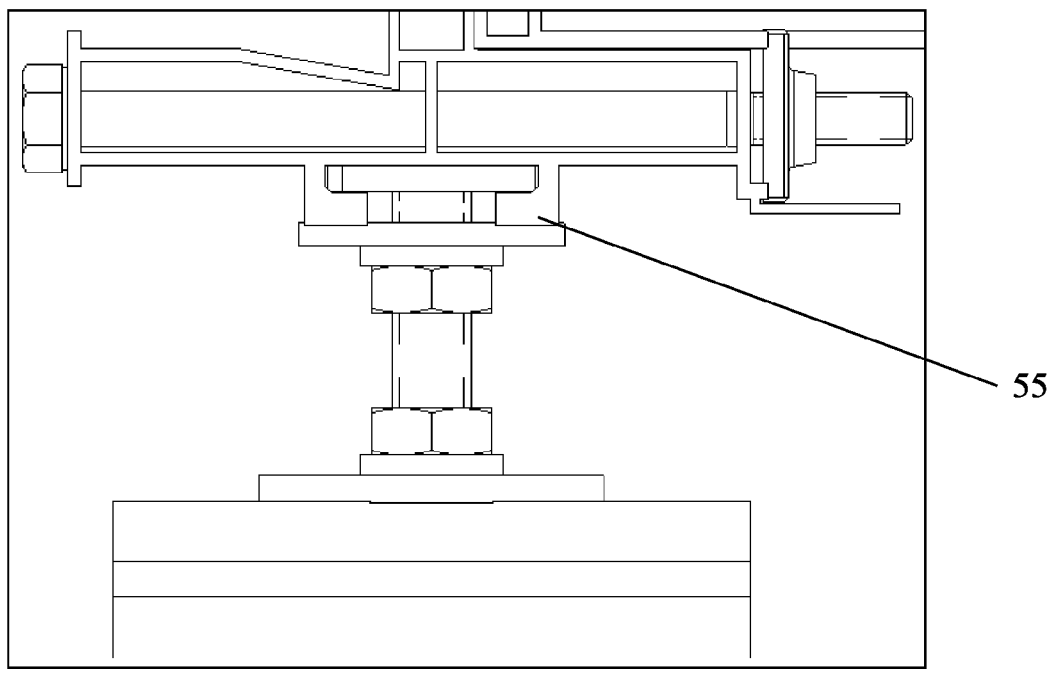
FIG. 48 is a cross-sectional view of one component of one embodiment of the invention.
Figure 49:
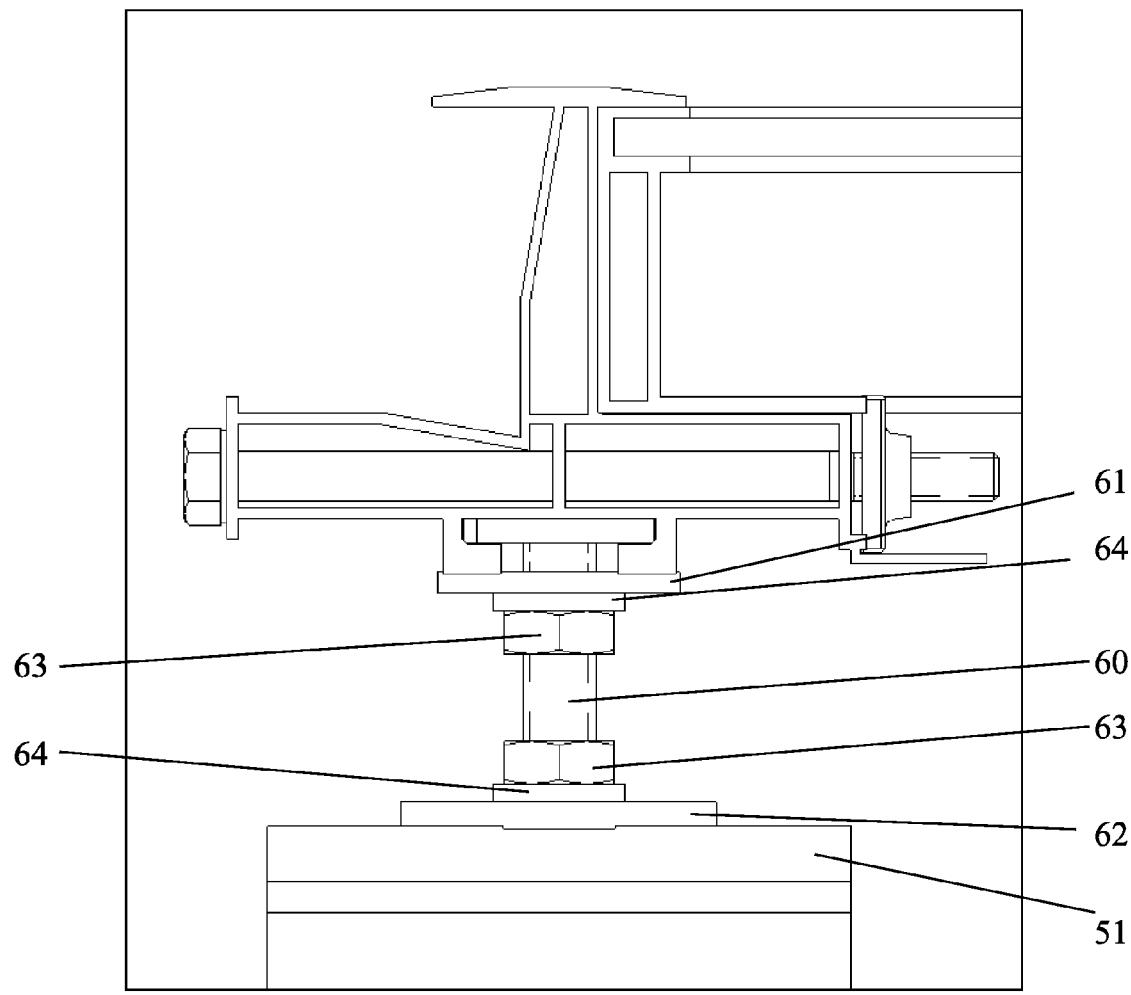
FIG. 49 is a cross-sectional view of one component of one embodiment of the invention.

In this embodiment, the T-bolt, 60 can then be turned to the wide position as shown in FIG. 48 and then the two T-bolt nuts, 63, may be tightened as shown in FIG. 49. The T-bolt nuts may have T-bolt lock washers, 64, as shown in FIGS. 47-49. When the T-bolts nuts, 63 are tight, the C-channel biting washer, 61 can have tines that may be driven into and perforate the panel support C-channel, 55, and the U-channel biting washer, 62, into the roof mount U-channel, 51. This can complete the electrical grounding between the solar panel frame bottom, 43, and the roof mount U-channel, 51. As shown in FIG. 46, a nut can have a linear tine on the nut. Alternatively, there can be a circular tine on a nut, an exterior terminus tine on a nut, and even an individual tine on a nut. Similarly, a washer can have such features as well and these can act with a bolt or the like to serve as a solar panel attachment bolt that acts to establish the solar panel movable restraint at a firm engagement position. These can also be employed to similarly serve to electrically ground when positioning a solar panel support slider adjacent the solar panel foundation mount even when, as shown in one embodiment in FIG. 40, acting to position a solar panel support slider by use of a first slider side and a second slider side forced tight adjacent as part of a solar panel foundation mount.

Figure 41:
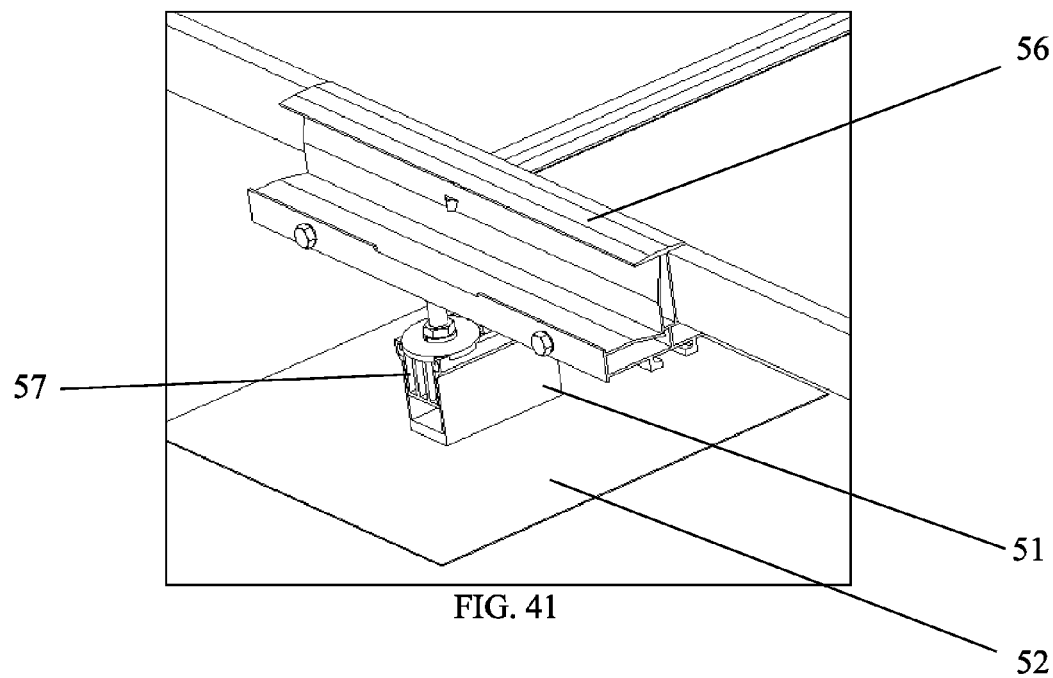
FIG. 41 is a perspective view of one component of one embodiment of the invention.
Figure 42:
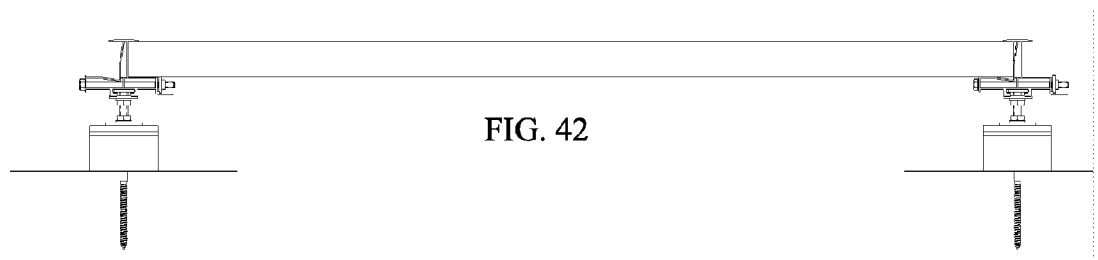
FIG. 42 is a perspective view of one component of one embodiment of the invention.
Figure 53:
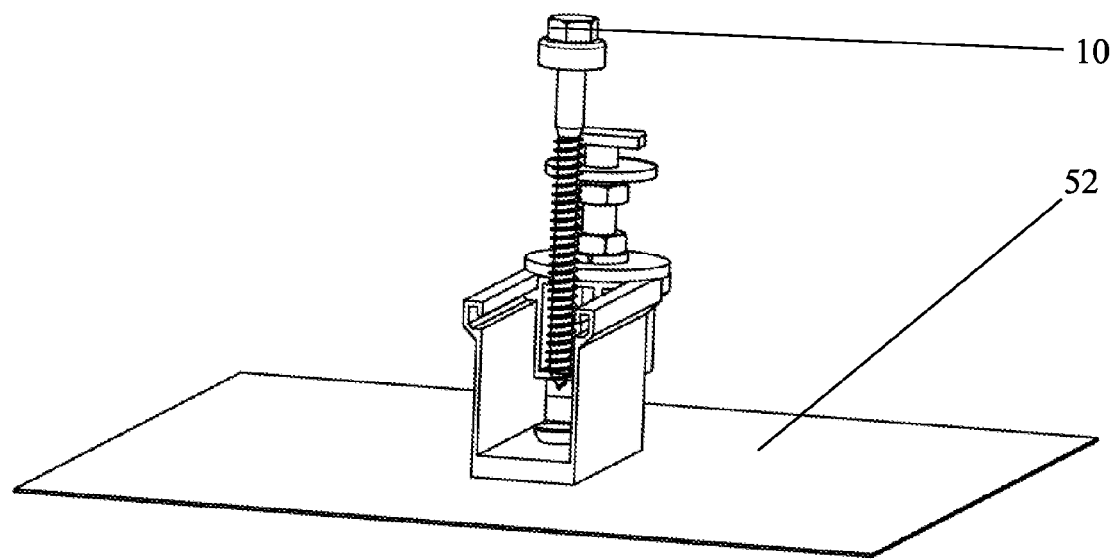
FIG. 53 is a perspective view of one component of one embodiment of the invention.
Figure 54:
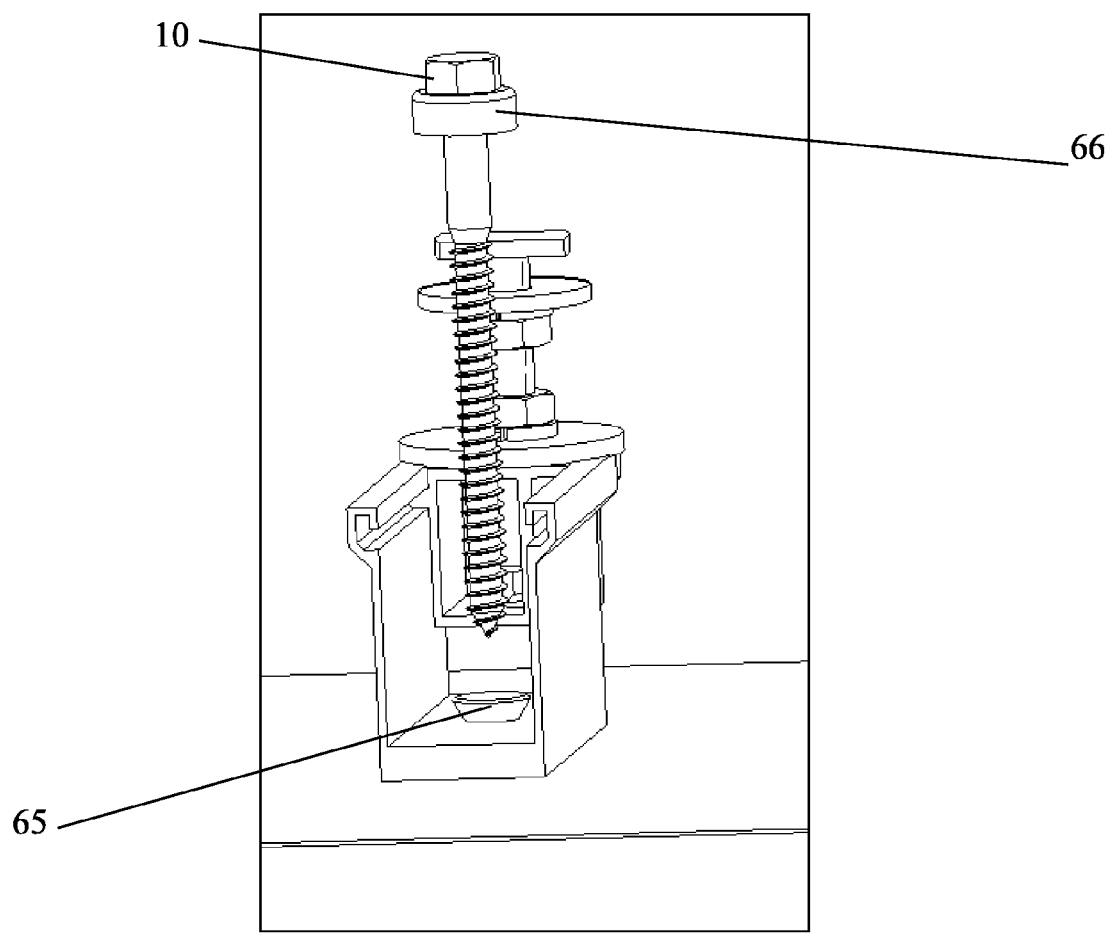
FIG. 54 is a perspective view of one component of one embodiment of the invention.
Figure 55:
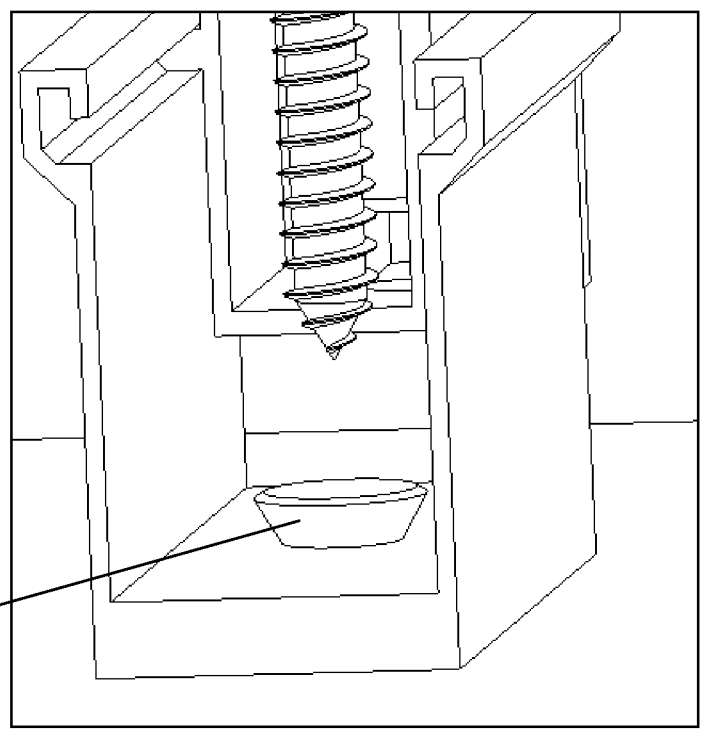
FIG. 55 is a perspective view of one component of one embodiment of the invention.
Figure 56:
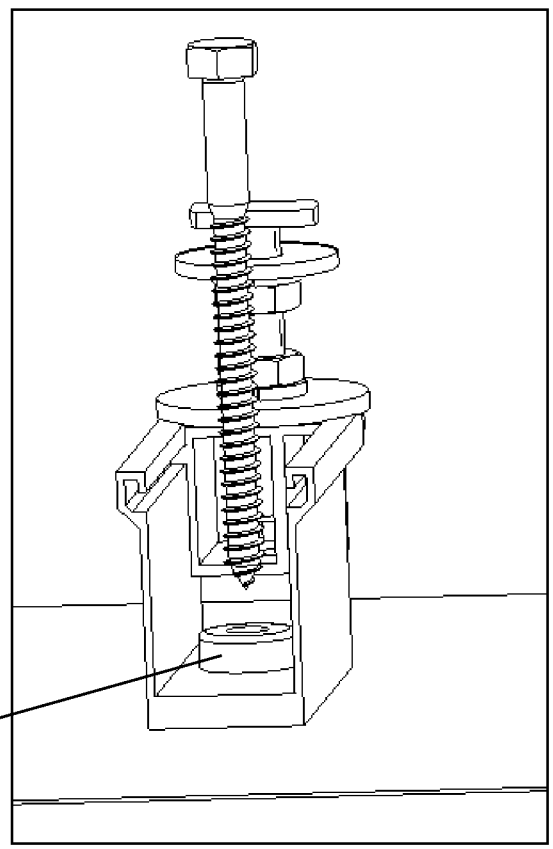
FIG. 56 is a perspective view of one component of one embodiment of the invention.
Figures 57, 58:
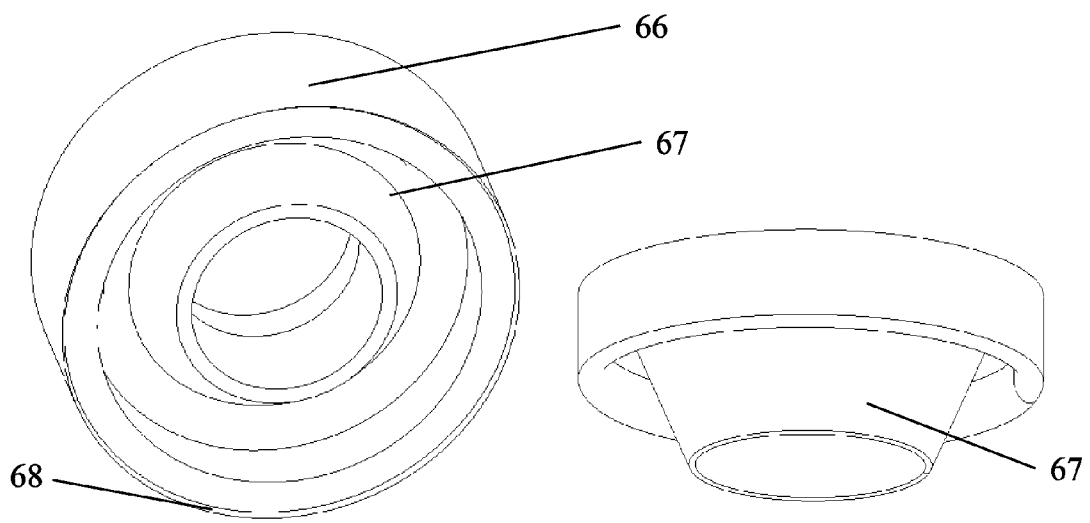
FIG. 57 is a perspective view of one component of one embodiment of the invention.
FIG. 58 is a perspective view of one component of one embodiment of the invention.
Figure 59:
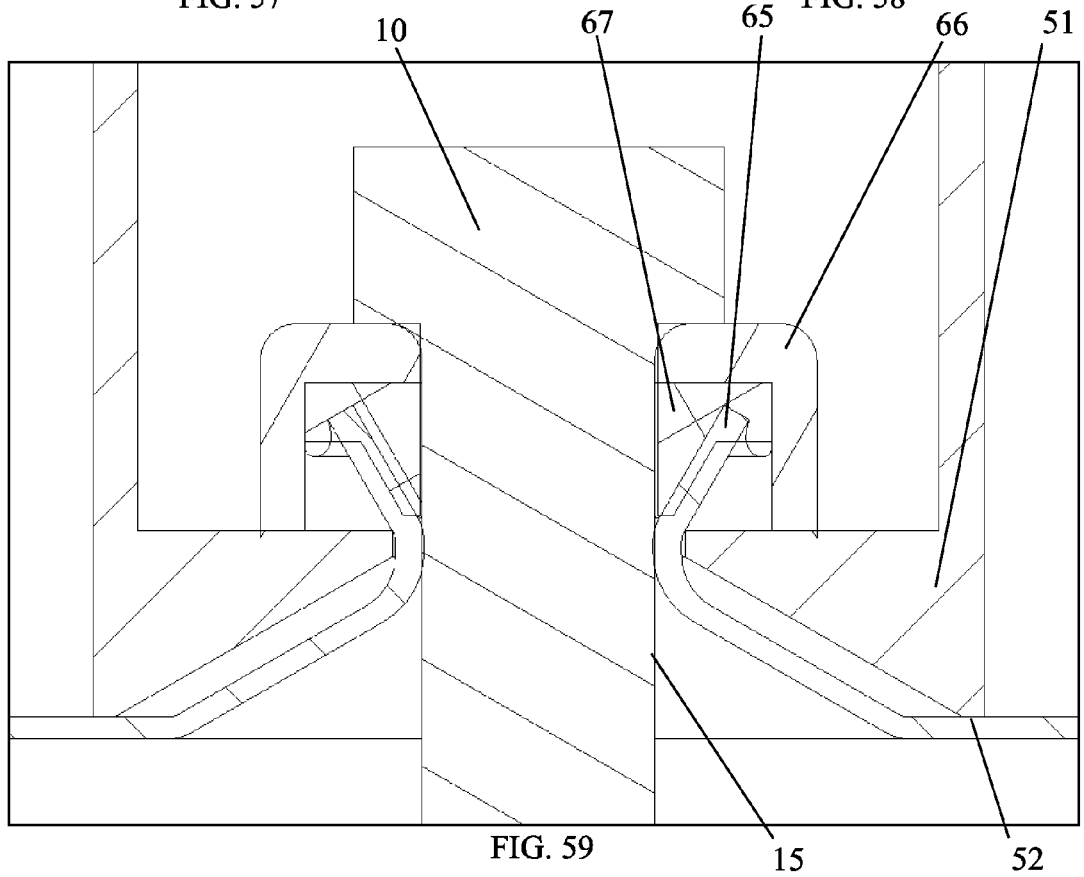
FIG. 59 is a cross-sectional view of one component of one embodiment of the invention.

As can be appreciated from FIG. 41, the flashing-flared, 52, may be placed under the roof shingles, 5 and 9, as shown in FIG. 4. The roof mount U-channel may be fastened to the roof, 2, with a lag bolt, 10. Refer also to FIG. 53. A lag cupped seal washer, 66, can be installed on the lag bolt, 10, as shown in FIG. 54 or it can be placed on the flashing cone lip, 65, before the installation of the lag bolt, 10, as shown in FIG. 56. The cupped seal, 67, and the cupped seal washer, 66, details are shown in FIGS. 57 and 58. These can include tines as well. When the lag bolt, 10, is fastened to the roof, 2, the cone area of the cone-hat seal, 67 can fit into the inside cone of the flashing cone lip, 65. The cone hat seal, 67, can be compressed between the inside of the flashing cone lip, 65, and the lag bolt shank, 15. The cone hat seal, 67, may also be compressed against the top of the flashing cone lip, 65, and the bottom inside of the cupped seal washer, 66. See FIG. 59 for the cross section of this seal. You can see clearly, that the compressed cone-hat seal, 67 can create a good seal. This compression creates a very good seal so no water should penetrate through from the top flashing surface. Note that under certain conditions, a very small amount of moisture may penetrate under the flashing so may be helpful to put sealant in the hole in the roof prior to screwing in the lag screw.

When the lag bolt, 10, is installed with tines on the washer, cupped seal washer biting lip, 68, as shown in FIG. 57, can penetrate into or perforate the roof mount U-Channel. All the metal parts in the solar panel system support may thus be electrically grounded to each other. By having the bottom flashing extending under the solar panel mount base, and by establishing flashing under at least a portion of solar panel mount base a good seal can be achieved.

Figure 60:
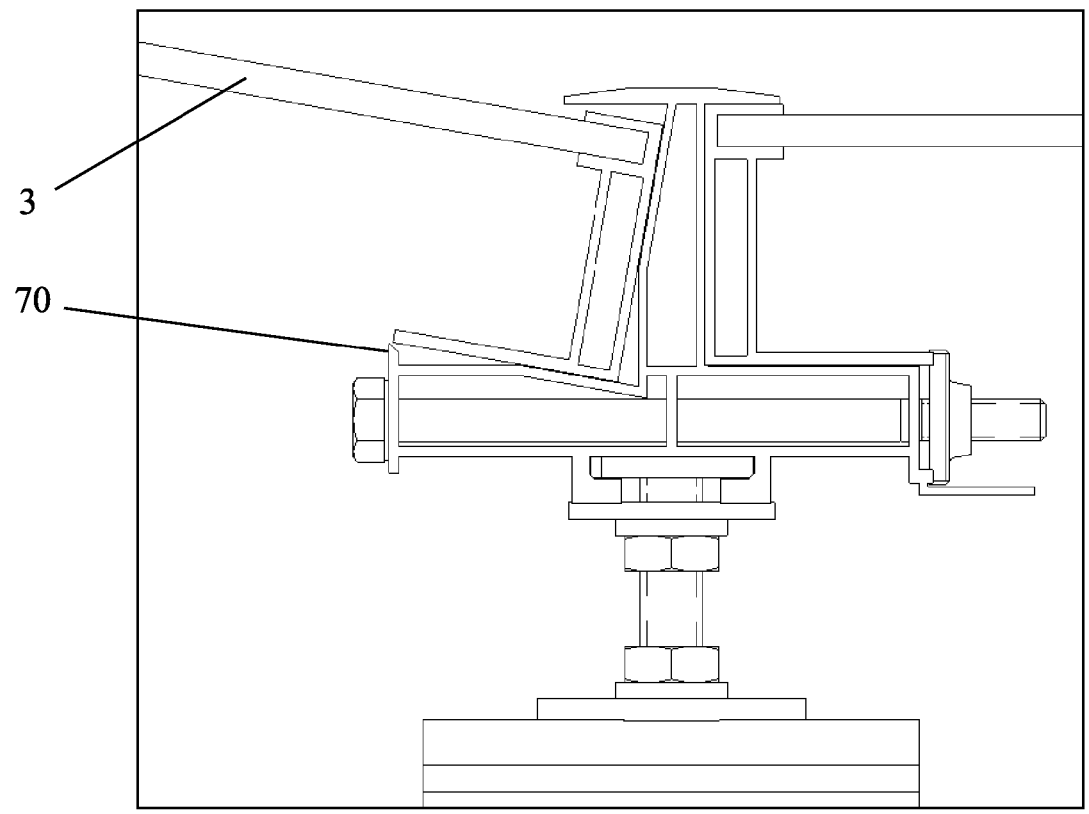
FIG. 60 is a cross-sectional view of one component of one embodiment of the invention.
Figure 61:
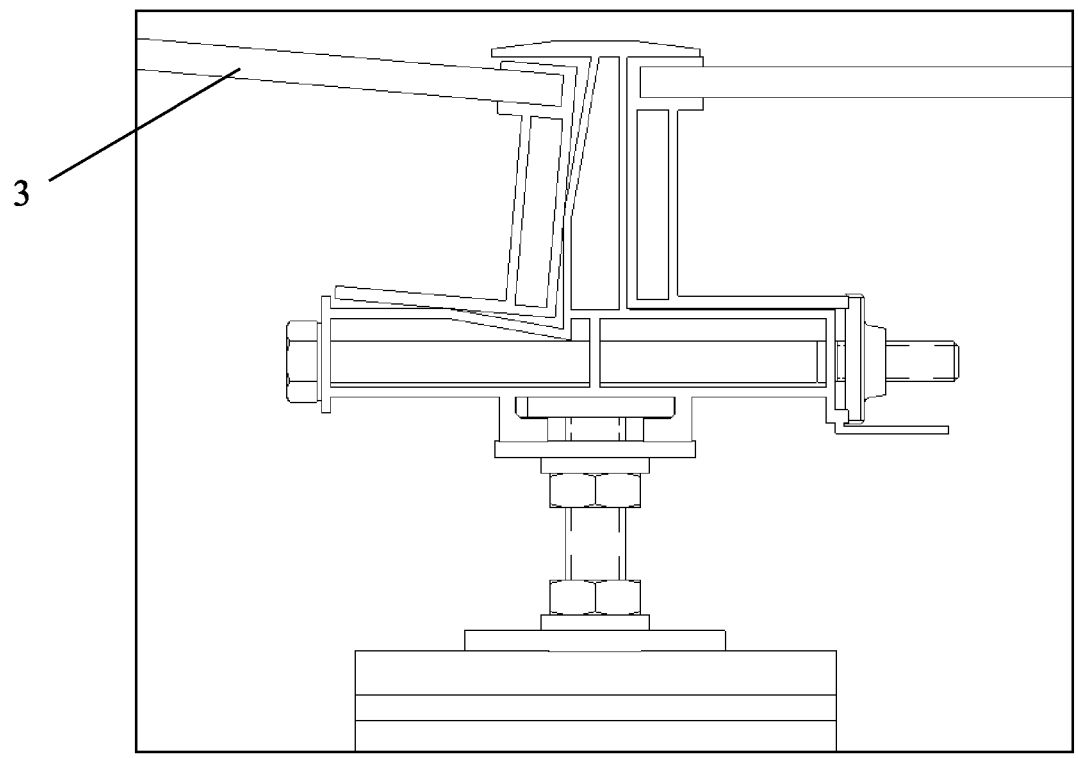
FIG. 61 is a cross-sectional view of one component of one embodiment of the invention.
Figure 62:
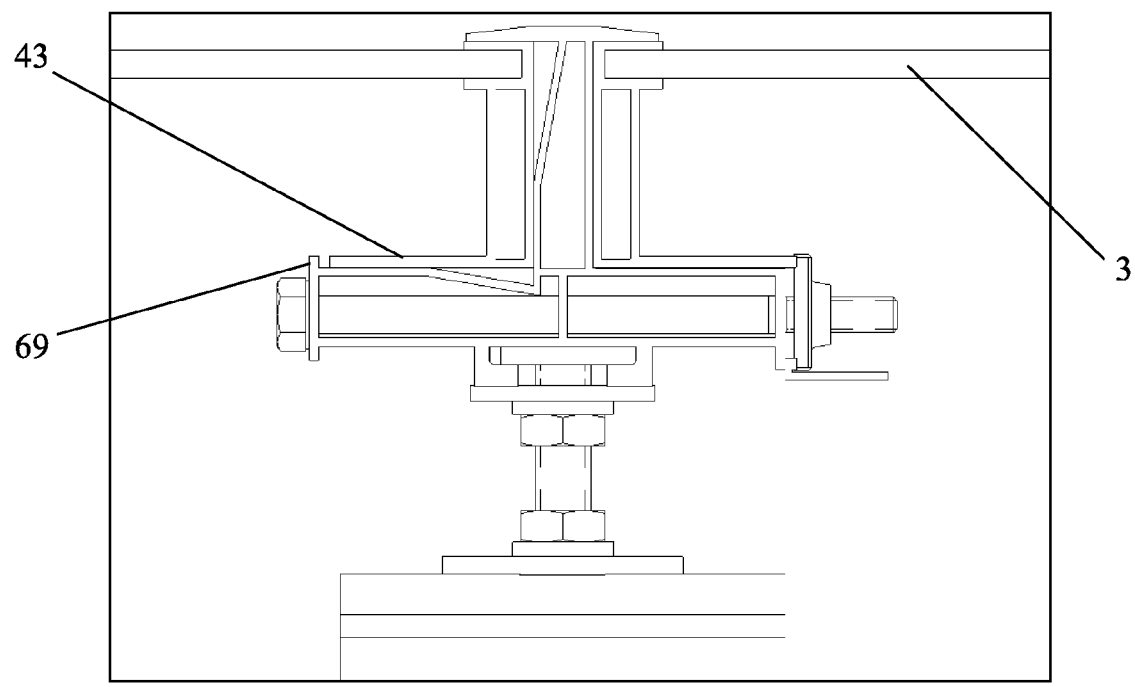
FIG. 62 is a cross-sectional view of one component of one embodiment of the invention.

As mentioned above, the solar panel mount can include one or more lateral movement seats such as on a non-clamped side. FIGS. 60-62 shows such an embodiment. This can be understood by noting the insertion of the non-clamped side of the solar panel, 3. The solar panel nearside and far side frame to the viewer has been removed to more clearly show the side solar panel frames. The seat in this embodiment is configured as a solar panel rotational insertion and is on a first side of said solar panel mount base with a coupler seat configured on the second side as shown. By positioning a solar panel at a solar panel rotational insertion seat as shown in the left side of the figure, the solar panel can then be easily angled into position at the solar panel rotational insertion seat. As shown, the design includes a rotational dip to allow insertion under the top restraint by placing the solar panel into the rotational dip. The solar panel is then rotated down into position. The steps of rotating down and retaining can be accomplished on opposed sides of the mount base as shown. As noted above, the clamp position adjuster can be accessed on the first base side so as not to be blocked by one panel that is to be clamped by accessing the clamp position adjuster on that first side of the mount base. The movement side panel can then be slid or can move laterally as may be needed or desired when another end of the panel is firmly affixed or clamped. In this manner, embodiments can provide a solar panel lateral movement accommodation mount and a solar panel lateral movement accommodation seat. As shown while on one side there can be a lateral movement solar panel mount, on the other side there can be a firmly fixed solar panel retainer mount, and these two mounts can even be opposed with respect to the intermediate support as shown. This embodiment can also have adjacent lateral movement solar panel mounts and adjacent firmly fixed solar panel retainer mounts. Thus embodiments can allow lateral movement of a first solar panel and adjacently allow lateral movement of a second solar panel. Opposite these it can also affix a third solar panel, and adjacently affixing a fourth solar panel that are opposed with respect to the intermediate support.

FIG. 60 shows the solar panel, 3, inserted at a slight angle. FIG. 61 shows the solar panel, 3, at a lower angle and FIG. 62 shows the solar panel, 3, at the installed position. The top restraint or panel support retaining lip, 69, can assure that the solar panel, 3, will remain in place after installation and under load conditions. In FIG. 60, a panel support retaining lip-shaped, 70, is shown. This type of shape may be able to pull in the solar panel, 3, more effectively. There can be some space between the panel support retaining lip, 69, and the edge of the solar panel frame bottom, 43, to allow for installation and part tolerances. The solar panel top restraint can act to achieve top restraining of the solar panel and can be considered one example of a holder lip. The panel can engage the holder lip. As shown in FIG. 60, the solar panel mount can have a solar panel dual top restraint so that it dual top restrains two solar panels, one on either side as shown. One solar panel single top restraint and be provide so as to only top restrain a single solar panel, and this can even be provided on a retainer side and thus present a retainer mount side top restraint. This can be the clamped side and can achieve clamp-side top restraining of the single solar panel if desired.

FIG. 62 shows how two panels can be mounted bilaterally. In embodiments, a solar panel retainer mount can be provided on a first side of the solar panel mount base, and a similar or different mount, here shown as a solar panel lateral movement first solar panel mount can be established on a second side of the solar panel mount. This achieves bilaterally mounting of a plurality of solar panels. In this embodiment, as but one example, one allows lateral movement of a solar panel and the other provides a firmly fixed second solar panel retainer mount that affixes a second solar panel. In other embodiments two clamps can be provided such as a first opposed solar panel clamp and a second opposed solar panel clamp.

Figure 63:
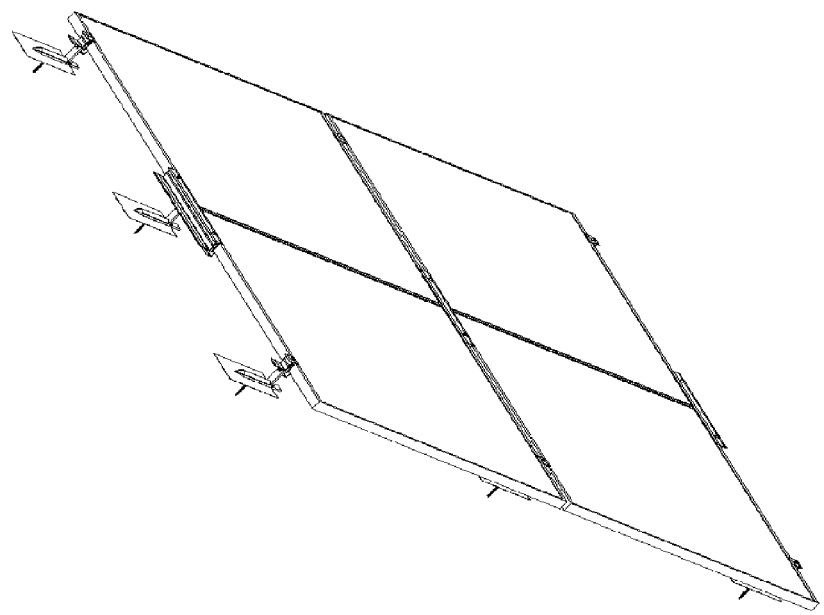
FIG. 63 is a perspective view of one embodiment of the invention.

FIG. 63 shows another variation of the solar panel support system, 1. The roof mount is special L-bracket with the module frame clamped from the top.

FIGS. 64, 66, 71-74 show the solar panel, 3, clamped between the short top panel support clamp, 73, and the short panel support-TC, 71, or the long top panel support clamp, 84, and the long panel support-TC, 72. FIG. 67 shows the solar panel, 3, clamped between the short top panel support clamp, 73, and the long panel support-TC, 72. Both the short panel support-TC, 71, and the long panel support-TC, 72, have a solar panel lip overhang such as the a panel support-top clamp lip, 85, that hooks around the end of the solar panel bottom lip such as at solar panel frame bottom, 43, as shown in FIGS. 66 and 72-75. This panel support-top clamp lip, 85 can aid in the alignment of the adjacent solar panels during the attachment of the long panel support-TC, 72 to the solar panel, 3. The lip overhang can be at a solar panel coupler seat as shown or at a lateral movement seat and can perpendicularly restrain movement whether clamped or laterally free. Particularly for an embodiment that includes some type of lateral movement seat, a solar panel perpendicular movement restraint can be configured so as to allow some amount of limited perpendicular movement such as only enough to be consistent with allowing lateral movement during installation, during use over years, during temperature expansion and contraction, or the like.

Figure 64:
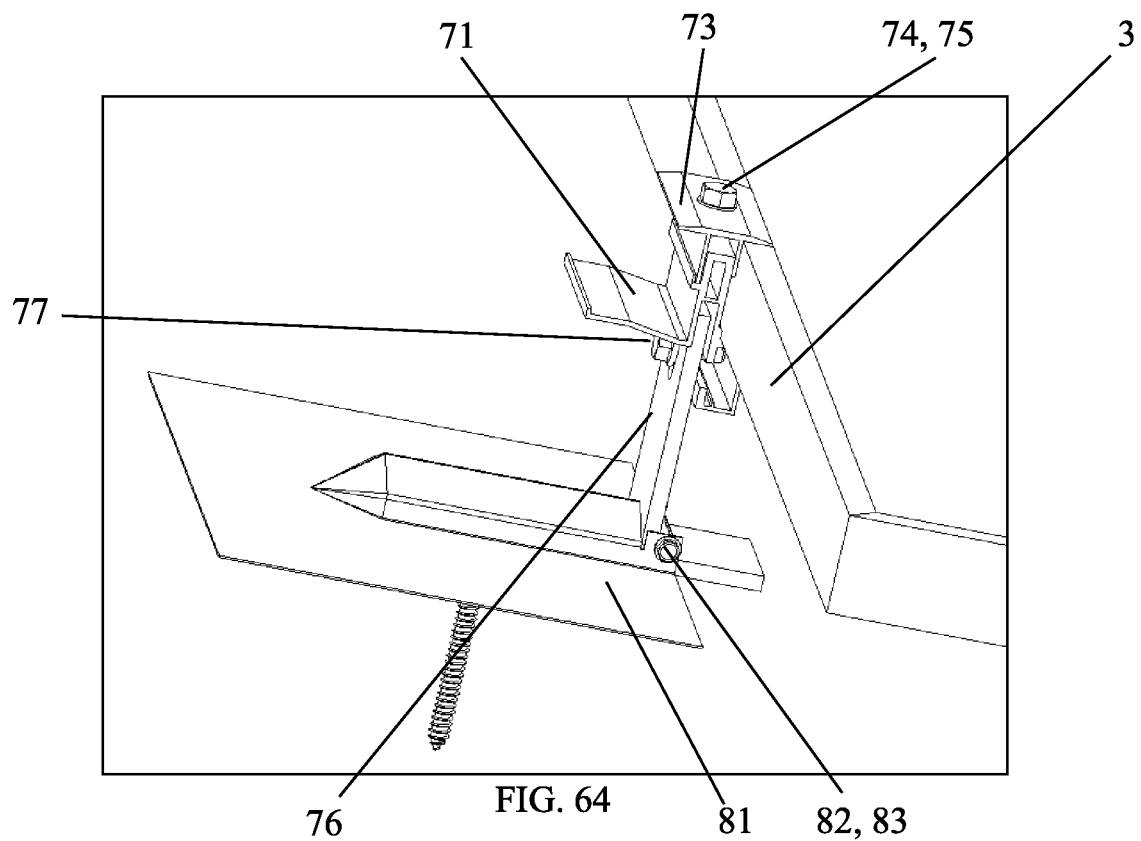
FIG. 64 is a perspective view of one component of one embodiment of the invention.
Figure 65:
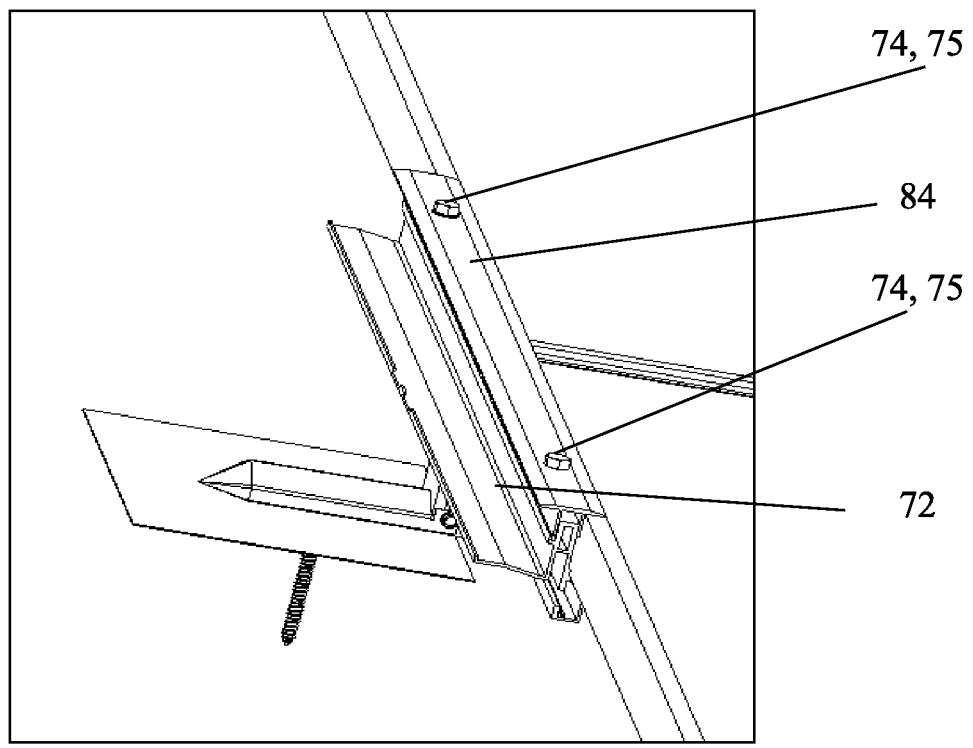
FIG. 65 is a perspective view of one component of one embodiment of the invention.
Figure 68:
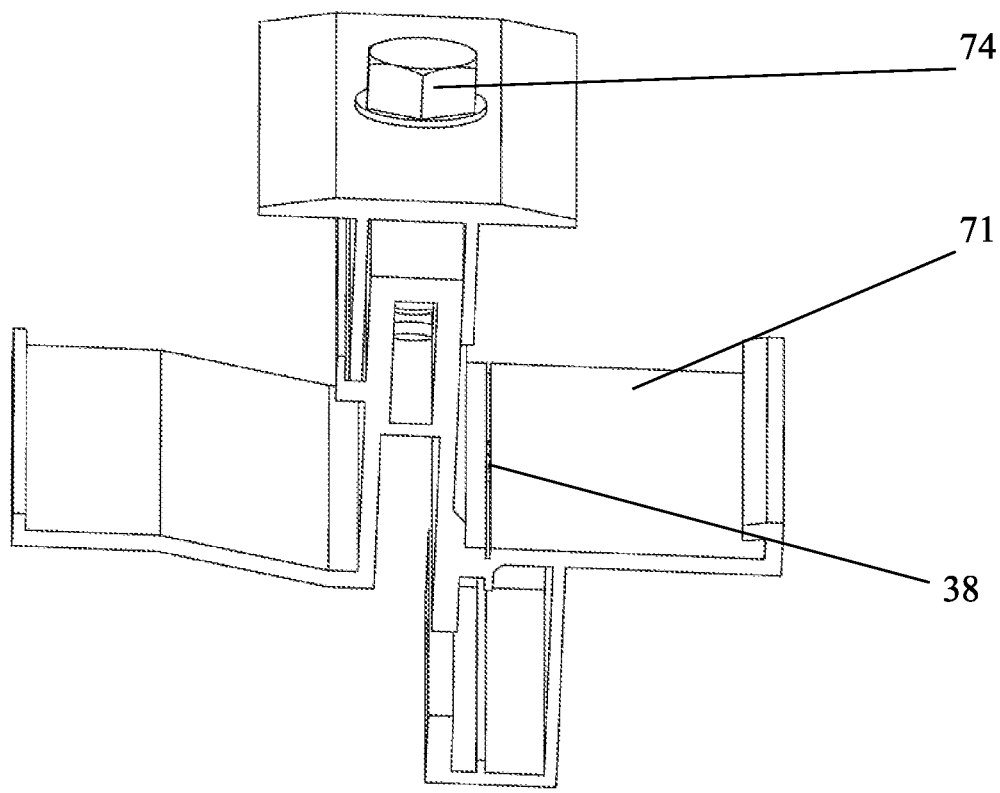
FIG. 68 is a perspective view of one component of one embodiment of the invention.
Figure 69:
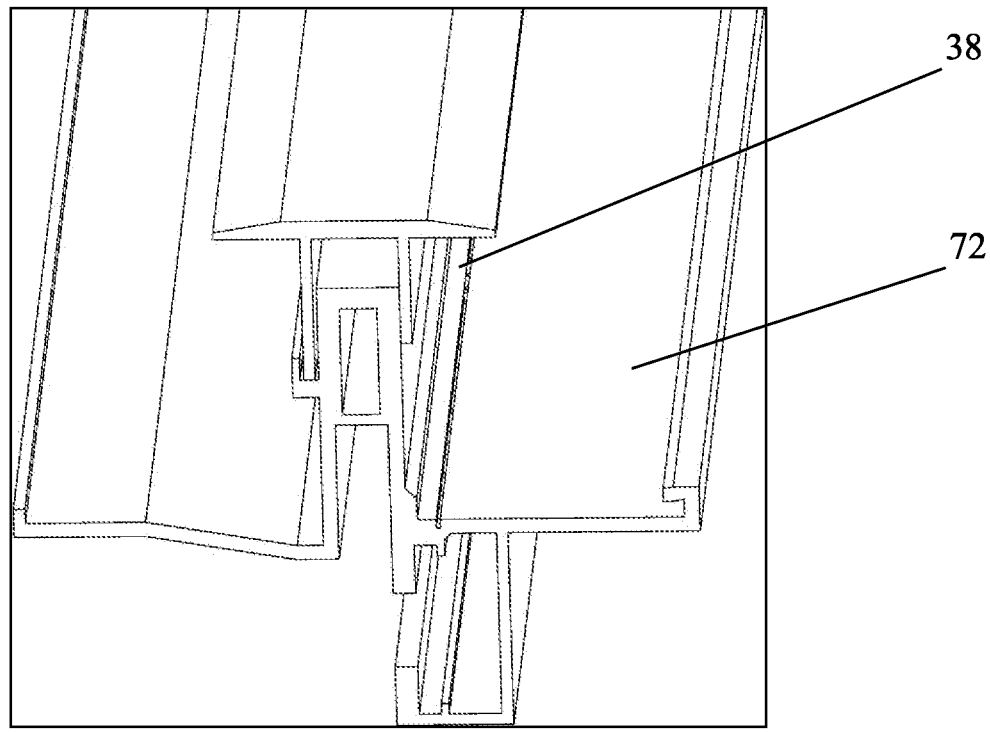
FIG. 69 is a perspective view of one component of one embodiment of the invention.
Figure 70:
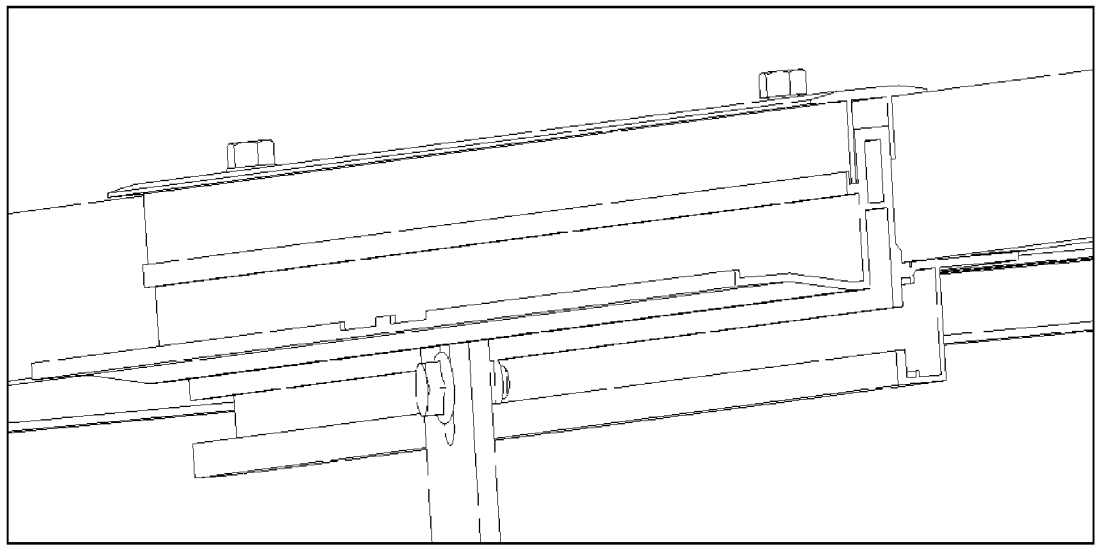
FIG. 70 is a cross-sectional view of one component of one embodiment of the invention.
Figure 71:
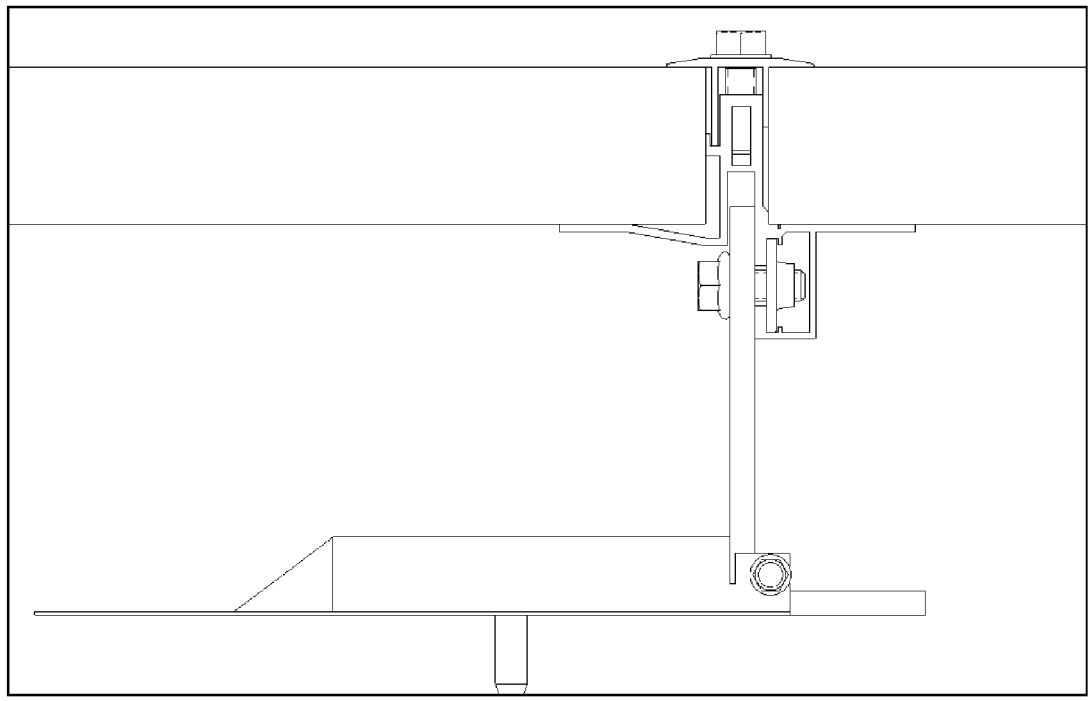
FIG. 71 is a cross-sectional view of one component of one embodiment of the invention.
Figure 72:
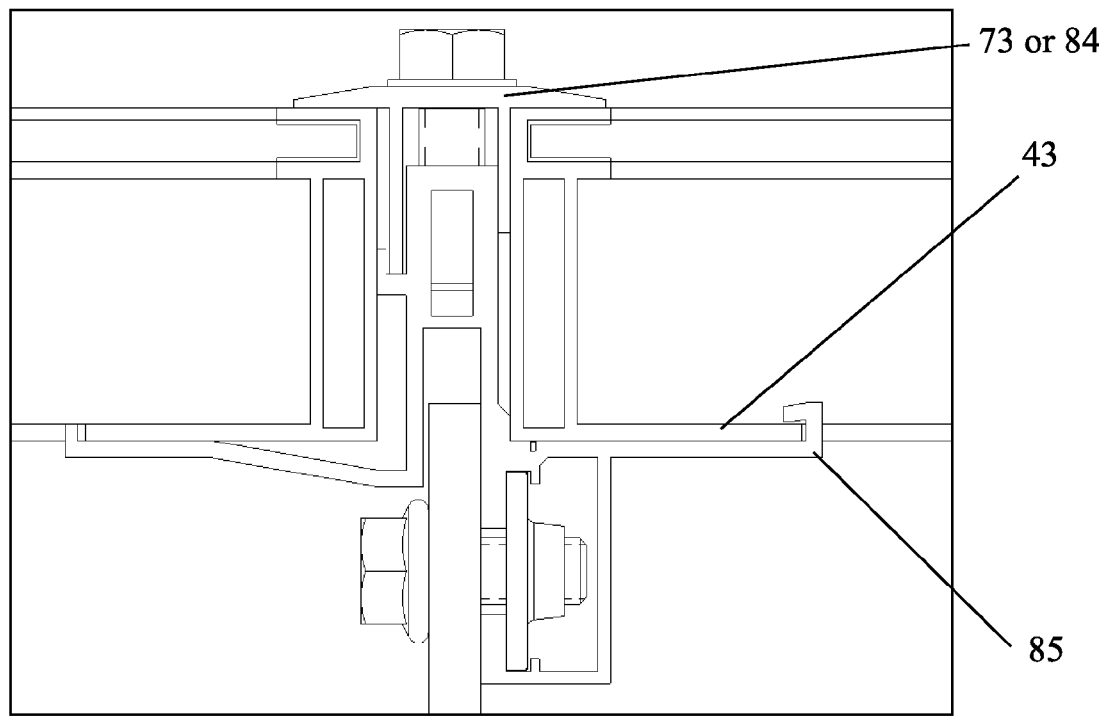
FIG. 72 is a cross-sectional view of one component of one embodiment of the invention.
Figure 73:
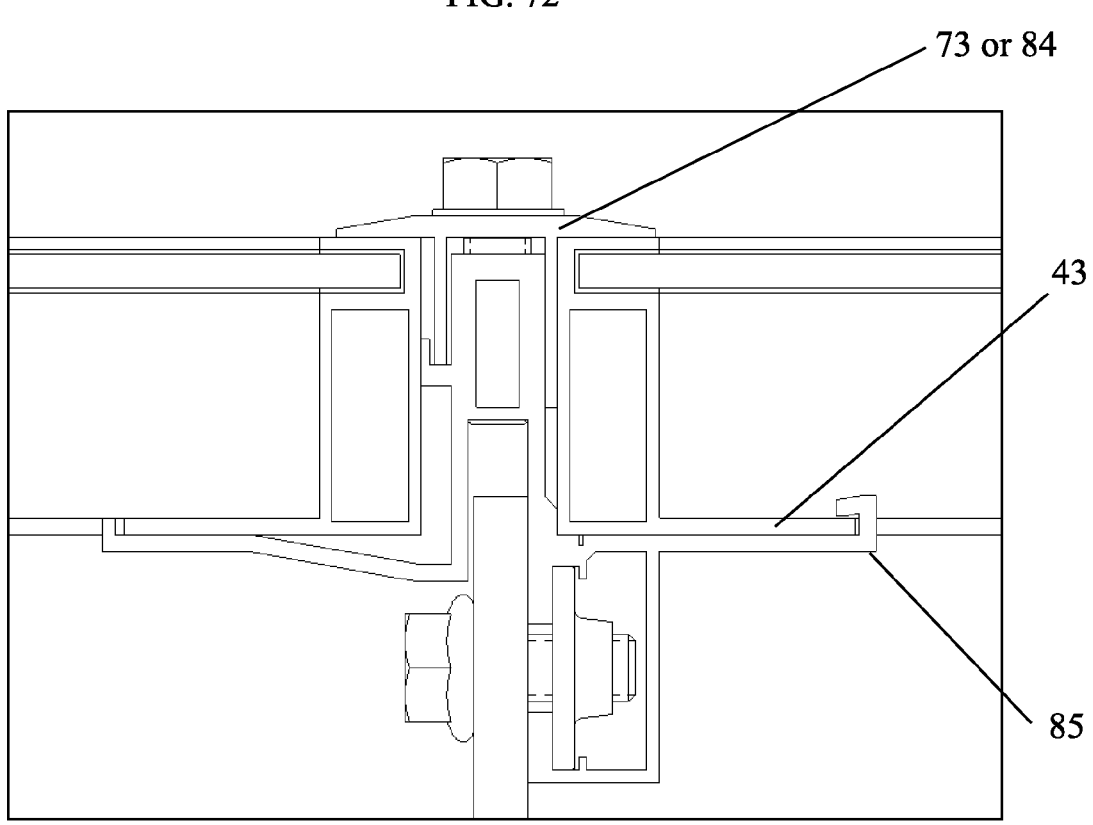
FIG. 73 is a cross-sectional view of one component of one embodiment of the invention.
Figure 74:
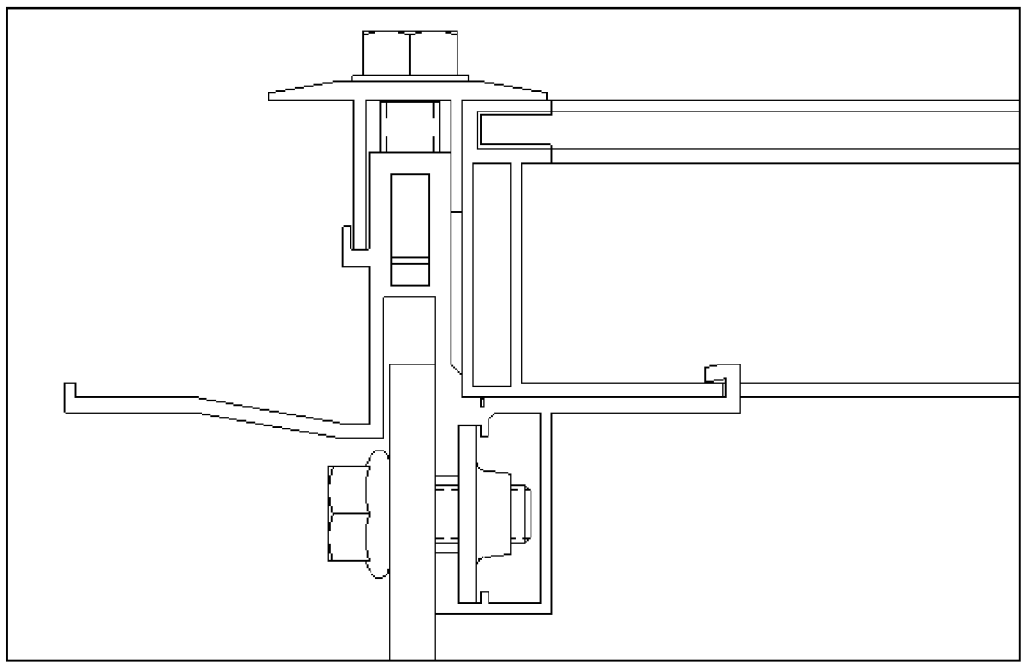
FIG. 74 is a cross-sectional view of one component of one embodiment of the invention.

There can be one biting bar, 38, on the short panel support-TC, 71, and two biting bars, 38, on the long panel support-TC, 72, as shown in FIGS. 68 and 69. The location of the biting bars, 38, can align with a top restraint and even a top retainer such as that bolts down to affix the solar panel perhaps by the top panel support clamp bolts, 74. Like the previous discussed solar panel support systems, the L-bracket can be attached anywhere along the edge of the solar panel, 3. Refer to FIGS. 64, 65 and 70. By rotating a solar panel top retainer such as configured as the short top panel support clamp, 73, on the long top panel support clamp, 84, two different solar panel, 3, heights as can be seen in FIGS. 72 and 73. This can act to hold down a solar panel by a top restrainer or to clamp a solar panel by a top retainer.

Figure 66:
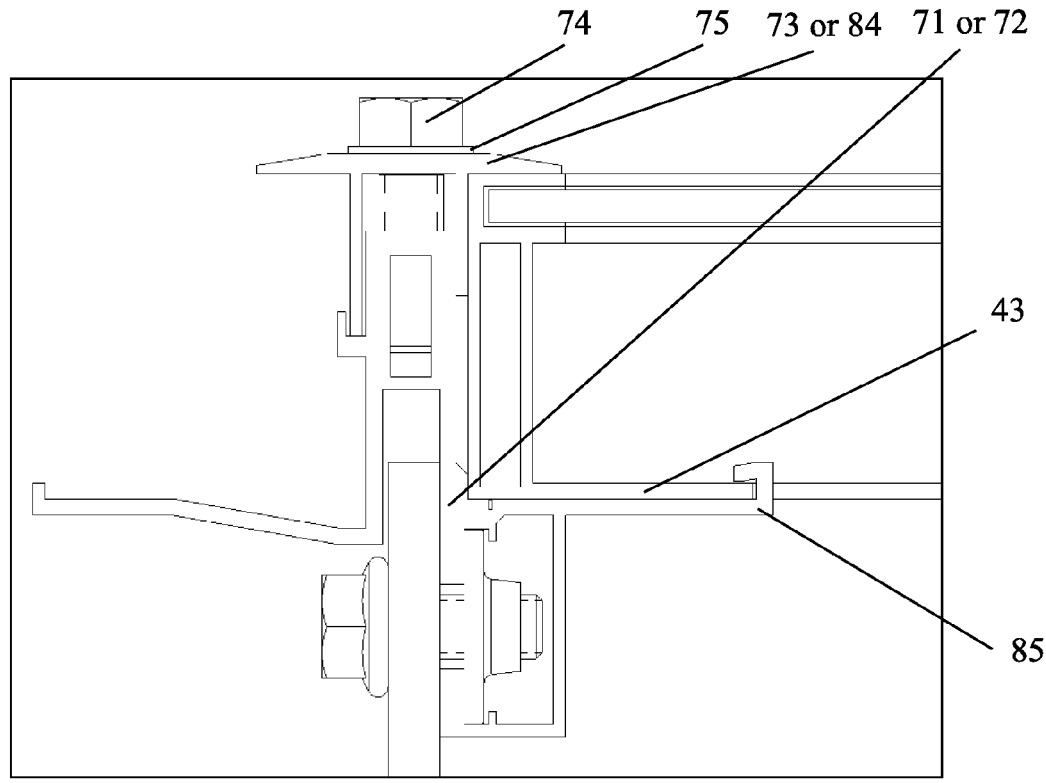
FIG. 66 is a cross-sectional view of one component of one embodiment of the invention.
Figure 67:
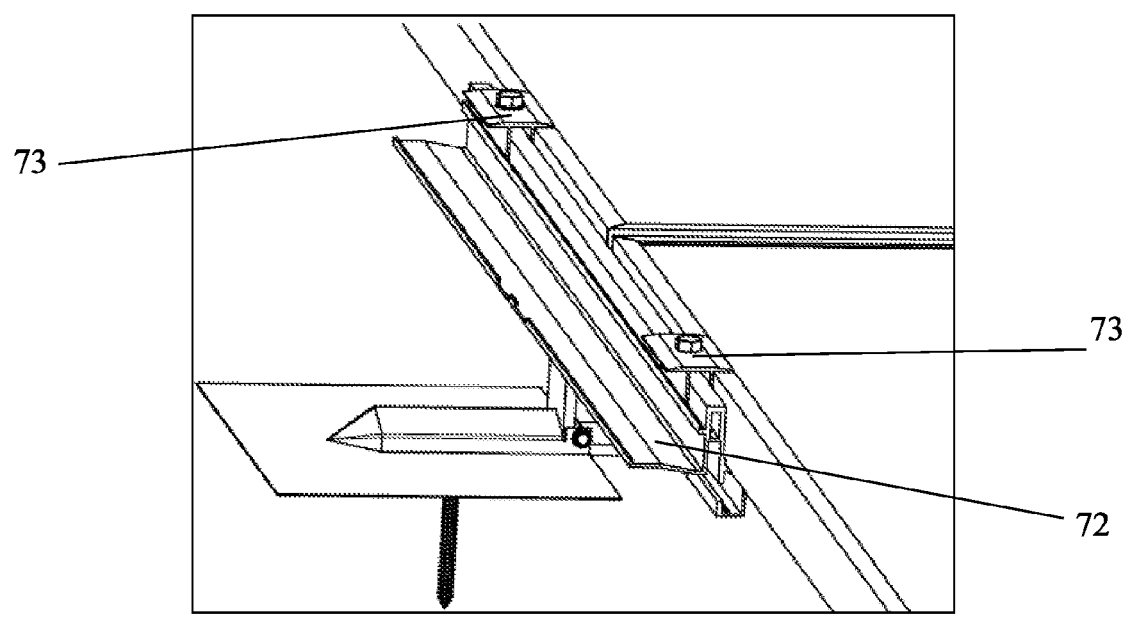
FIG. 67 is a perspective view of one component of one embodiment of the invention.

FIG. 66 shows how the panel support-top clamp, 71 or 72, can be pre-assembled to top panel support clamp, 73 or 84, With the top panel support clamp bolts, 74, screwed out, there is enough clearance to position the panel support-top clamp, 71 or 72, on the side of the solar panel, 8. This will save in installation time.

Figure 75:
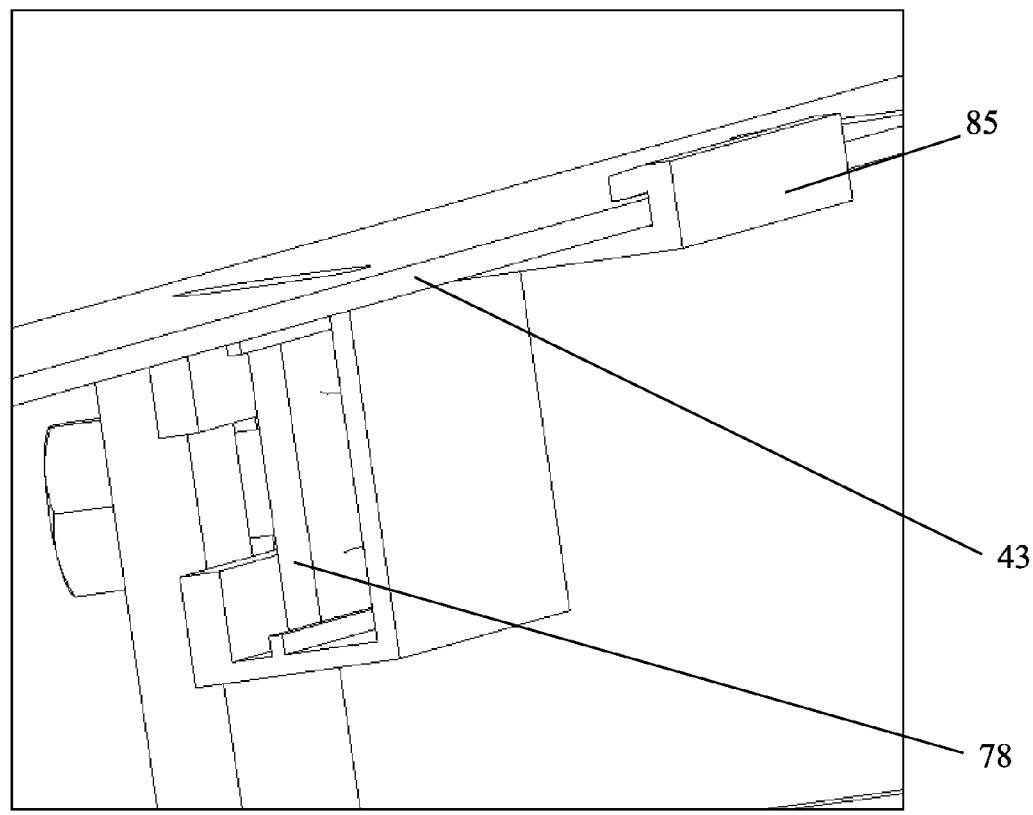
FIG. 75 is a perspective view of one component of one embodiment of the invention.
Figure 79:
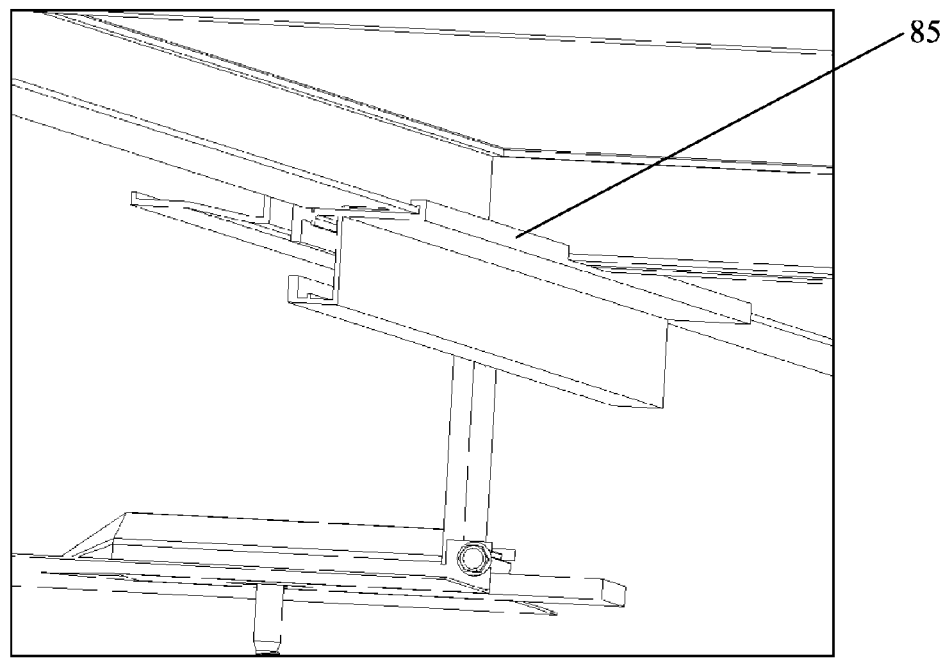
FIG. 79 is a perspective view of one component of one embodiment of the invention.
Figure 80:
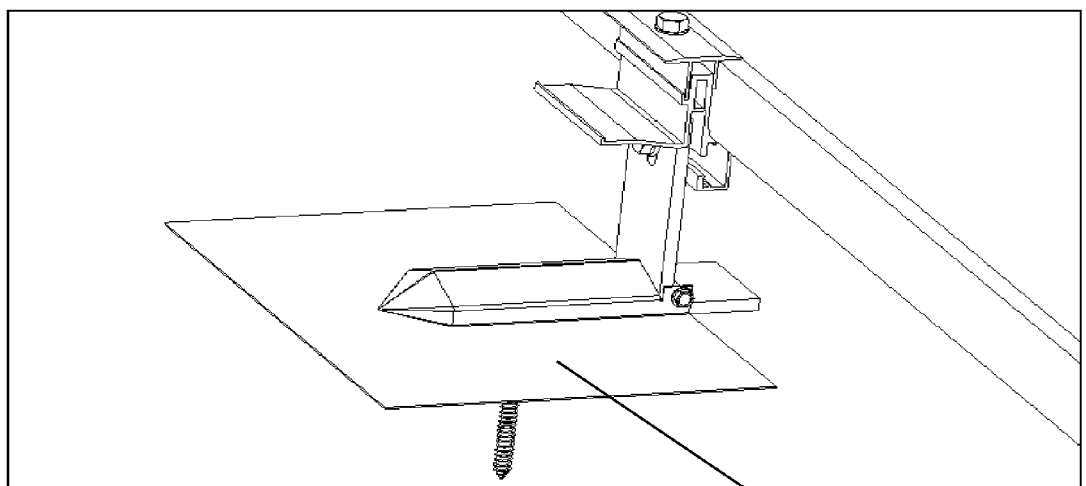
FIG. 80 is a perspective view of one component of one embodiment of the invention.

The L-bracket nut, 78, can have tines such as separate L-bracket biting prongs, 79, on the corners as shown in FIGS. 75-77. The L-bracket bolt, 86, can also be a serrated flange bolt to cut into the L-bracket, 76, during assembly if desired.

Figure 81:
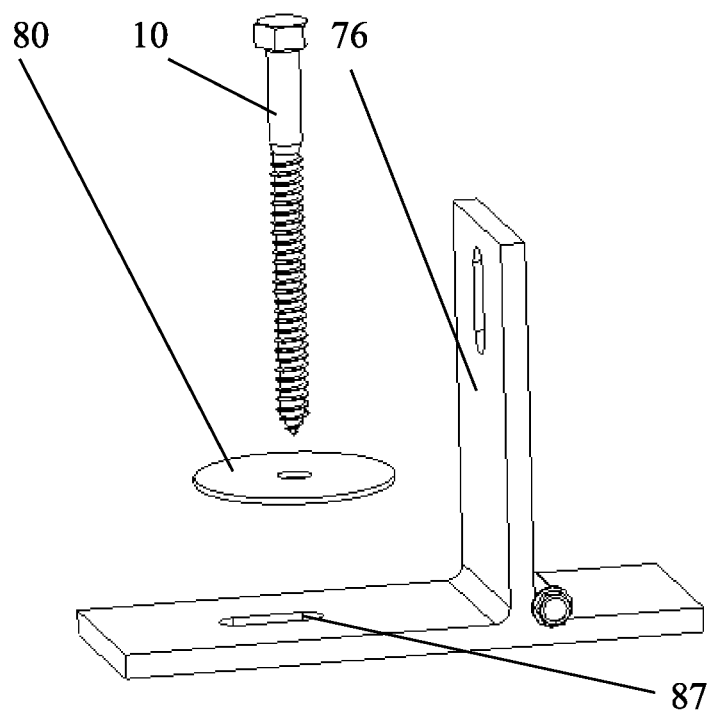
FIG. 81 is a perspective view of one component of one embodiment of the invention.
Figure 82:
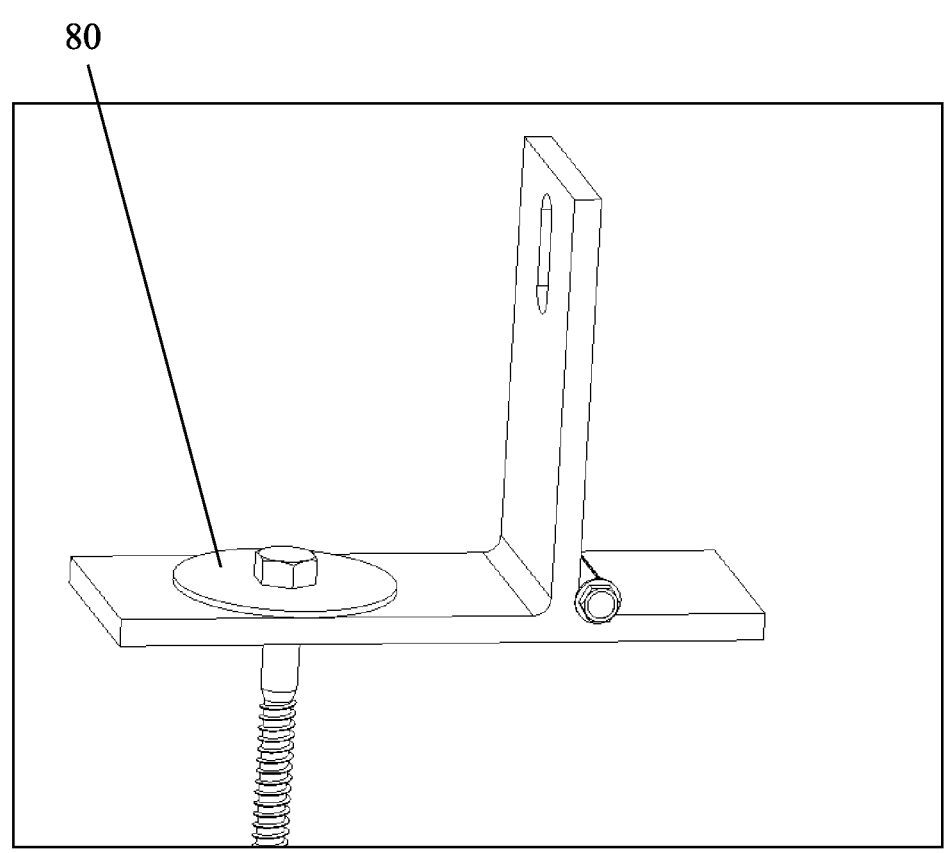
FIG. 82 is a perspective view of one component of one embodiment of the invention.
Figure 83:
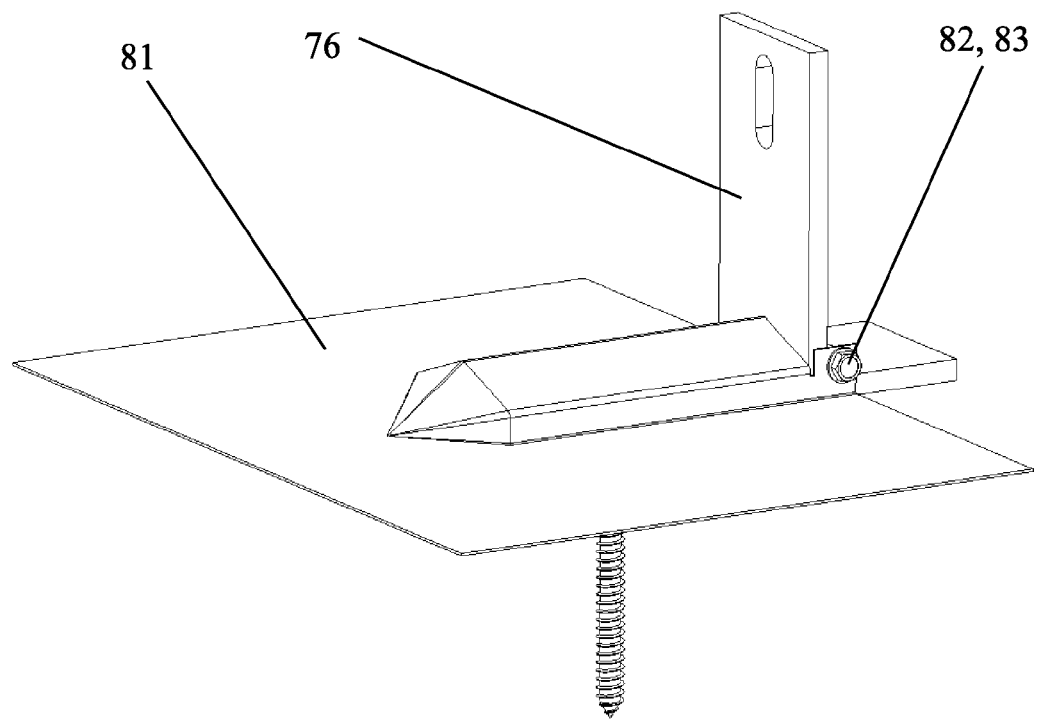
FIG. 83 is a perspective view of one component of one embodiment of the invention.

The L-bracket vertical slot, 86, can be another way to achieve a mount riser that allows for height adjustment of the solar panel mounts. The L-bracket horizontal slot, 87, can allow for adjustment in the up/down roof direction. See FIGS. 78 and 81. The L-bracket, 76, can be attached to a roof, 2, with a lag bolt, 10. A drilled hole, 6, may be required for the lag bolt, 10, similar to the one showed in FIG. 3. Before attaching the L-bracket, 76, a roofing sealant may be injected in the hole and the L-bracket horizontal slot, 87, may be over filled. When the lag bolt, 10 is screwed in the roof, 1, the L-bracket washer, 80, can push more sealant in the voids under the L-bracket, 76, and any voids between the L-bracket washer, 80, and the top of the L-bracket, 76. The L-bracket washer, 80, may be large enough to cover the L-bracket horizontal slot, 87. See FIGS. 81 and 82.

Figure 84:
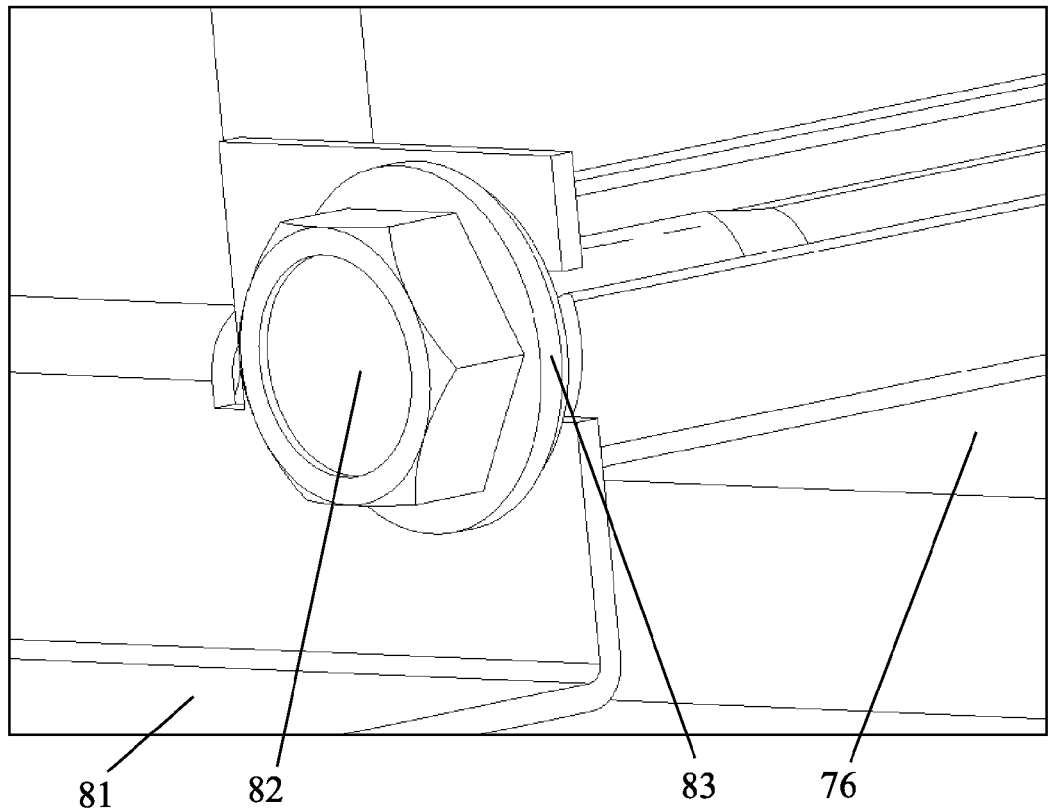
FIG. 84 is a cross-sectional view of one component of one embodiment of the invention.

The L-bracket flashing, 81, can then be placed under the shingles similar to FIG. 4. It can be placed over the L-bracket and screwed into L-bracket, 76, using the L-bracket flashing screw, 82, and L-bracket flashing lock washer, 83, as shown in FIG. 84. There can now be electrical grounding of all the metal parts from the solar module 3, to the L-bracket, 76, and between the rows of solar panels. The solar panel columns can be grounded per previous discussions. The lag bolt, 10, and the L-bracket washer, 80, could be grounded if the L-bracket washer, 80, was a biting washer. This may not be necessary since they are inaccessible under the grounded flashing.

Of course, in this patent, different features are discussed for various embodiments of a solar panel support system and this should not be viewed as limiting; other designs are possible in keeping with the teachings of this invention. The features of each of the solar panel support systems are not to be considered unique to that solar panel support system but should be considered as useful for all of the presented solar panel support systems and others as well. Any of the biting features on the washers, nuts or bars are examples and could change without distracting from the purpose of the biting features. Further, all the solar panels are shown in the landscape direction. These solar panels could also be in the portrait direction. Generally, while the invention has been described in connection with a preferred embodiment, it is not intended to limit the scope of the invention to the particular form set forth, but on the contrary, it is intended to cover such alternatives, modifications, and equivalents as may be included within the spirit and scope of the invention.

Figure 85:
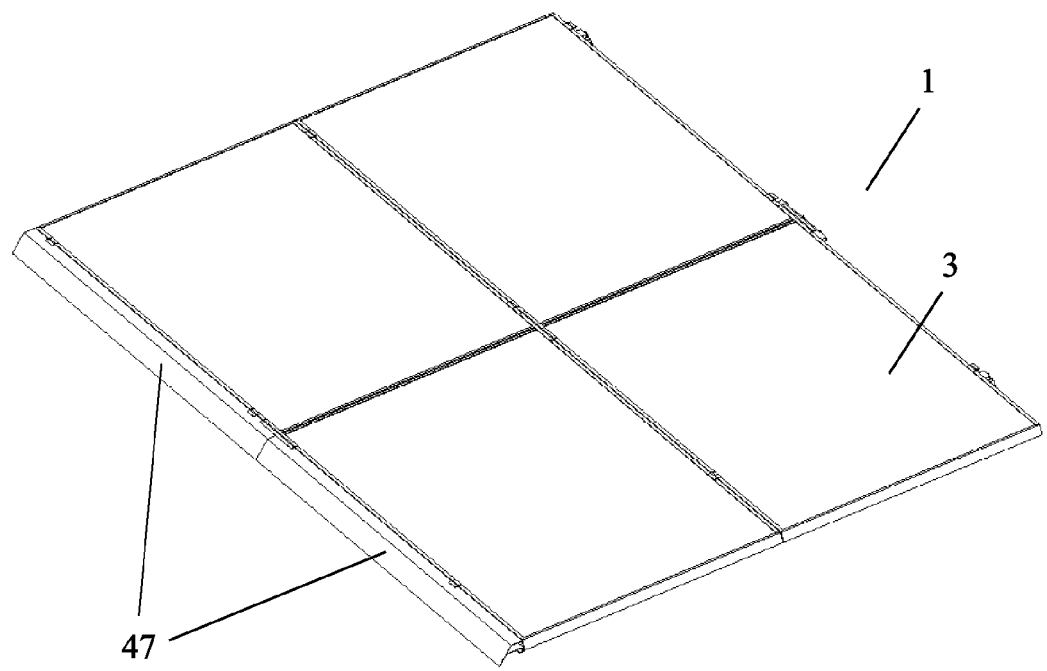
FIG. 85 is a perspective view of one embodiment of the invention.
Figure 86:
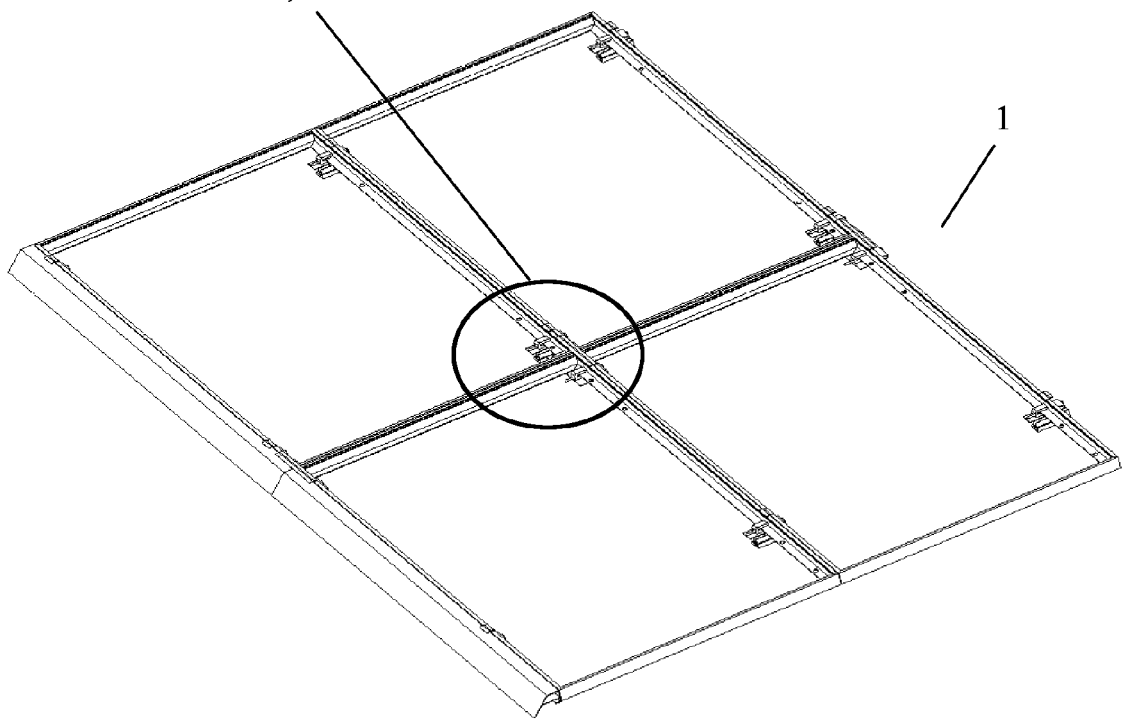
FIG. 86 is a perspective view of one embodiment of the invention.
Figure 87:
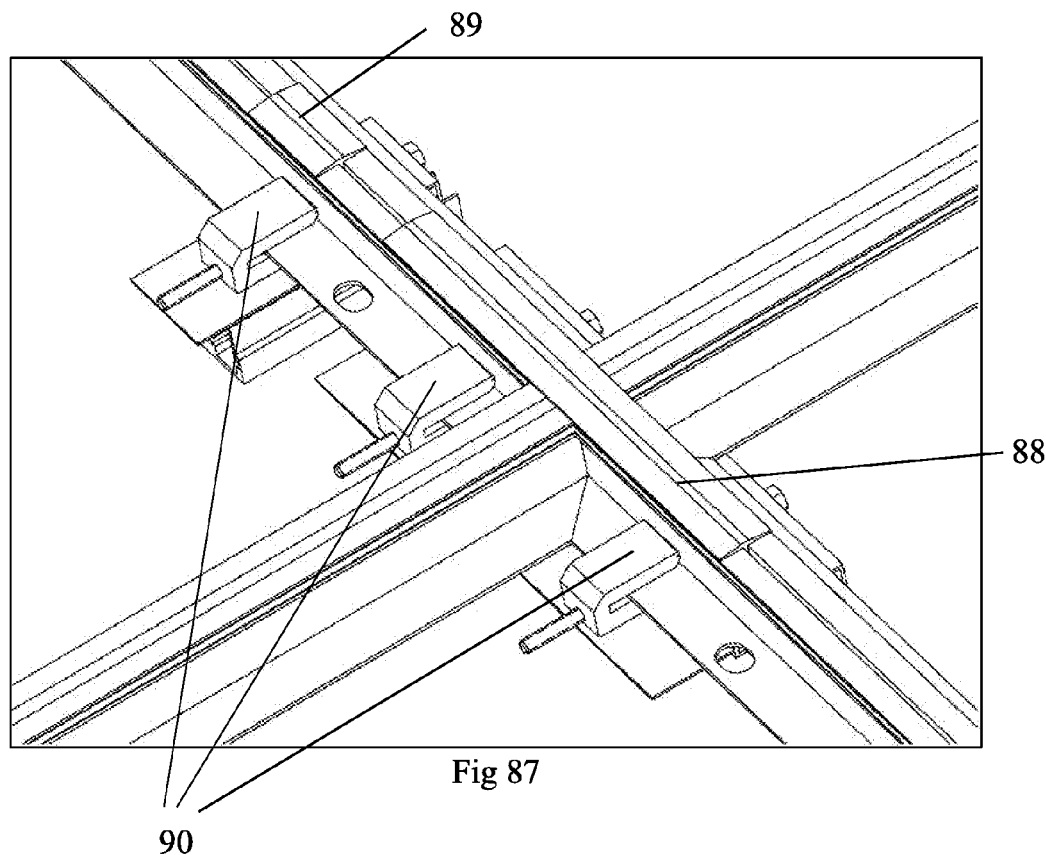
FIG. 87 is a perspective view of one component of one embodiment of the invention.
Figure 88:
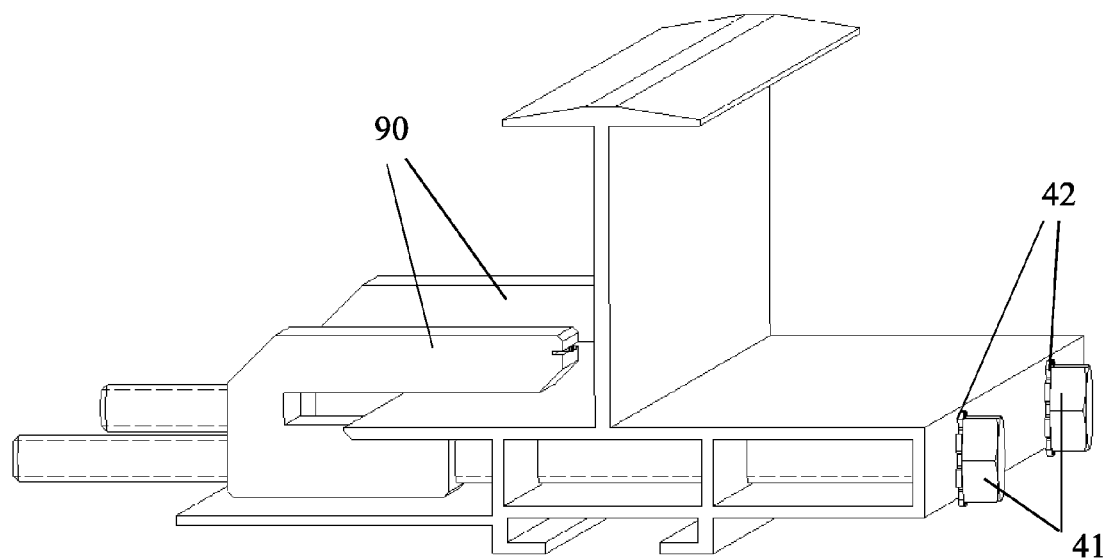
FIG. 88 is a cross-sectional view of one component of one embodiment of the invention.
Figure 90:
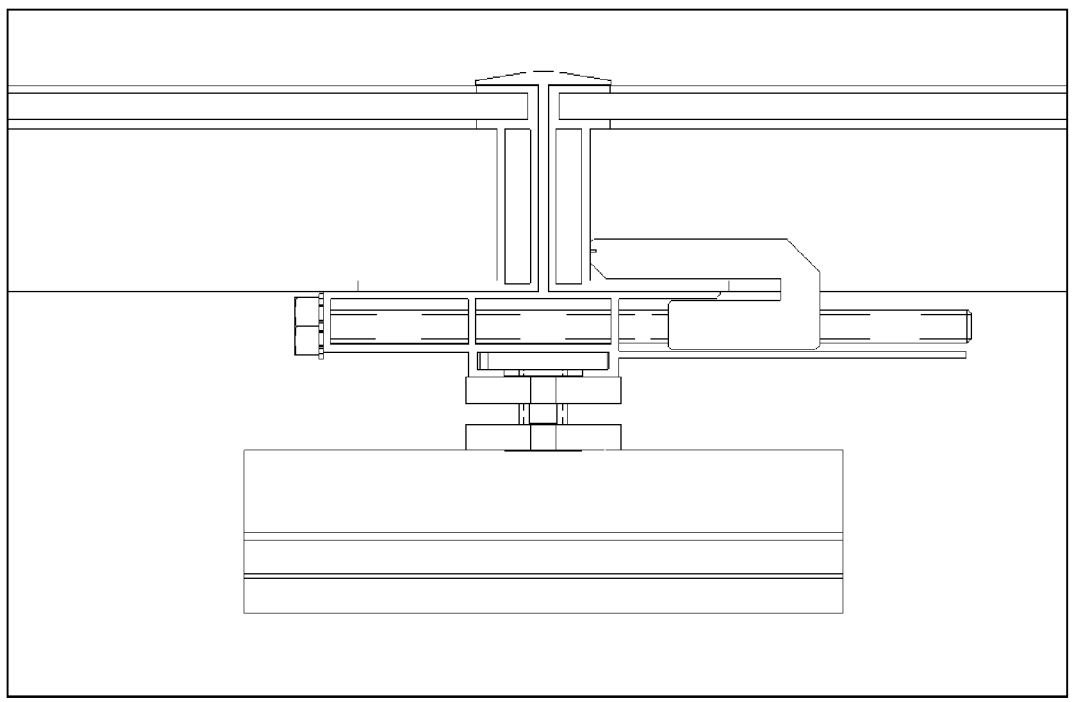
FIG. 90 is a cross-sectional view of one component of one embodiment of the invention.
Figure 91:
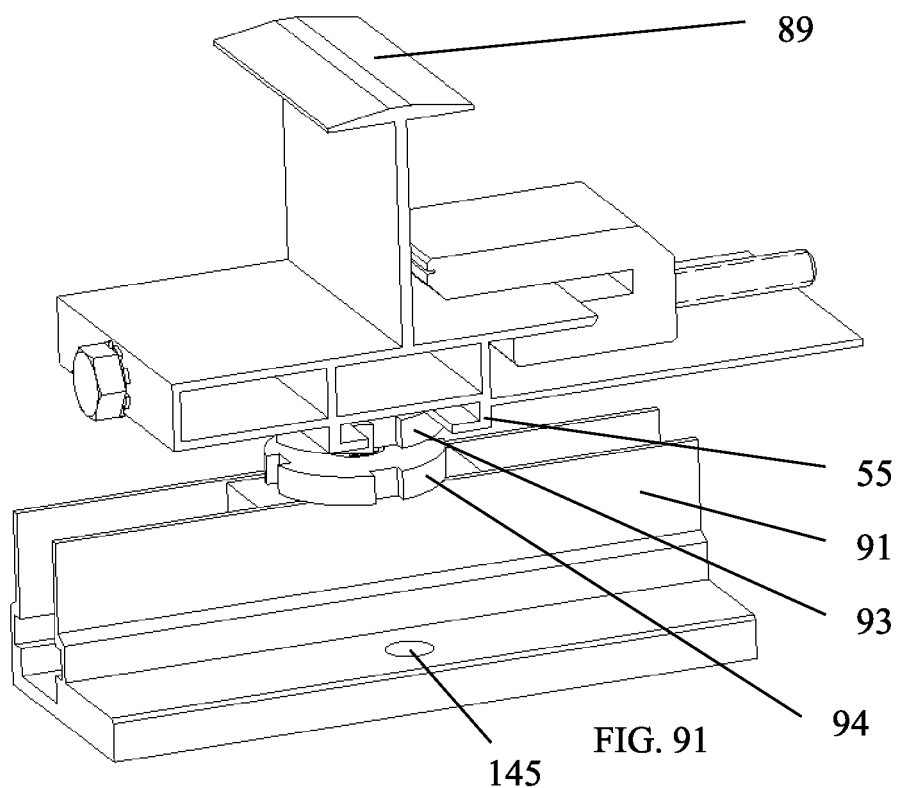
FIG. 91 is a perspective view of one component of one embodiment of the invention.
Figure 92:
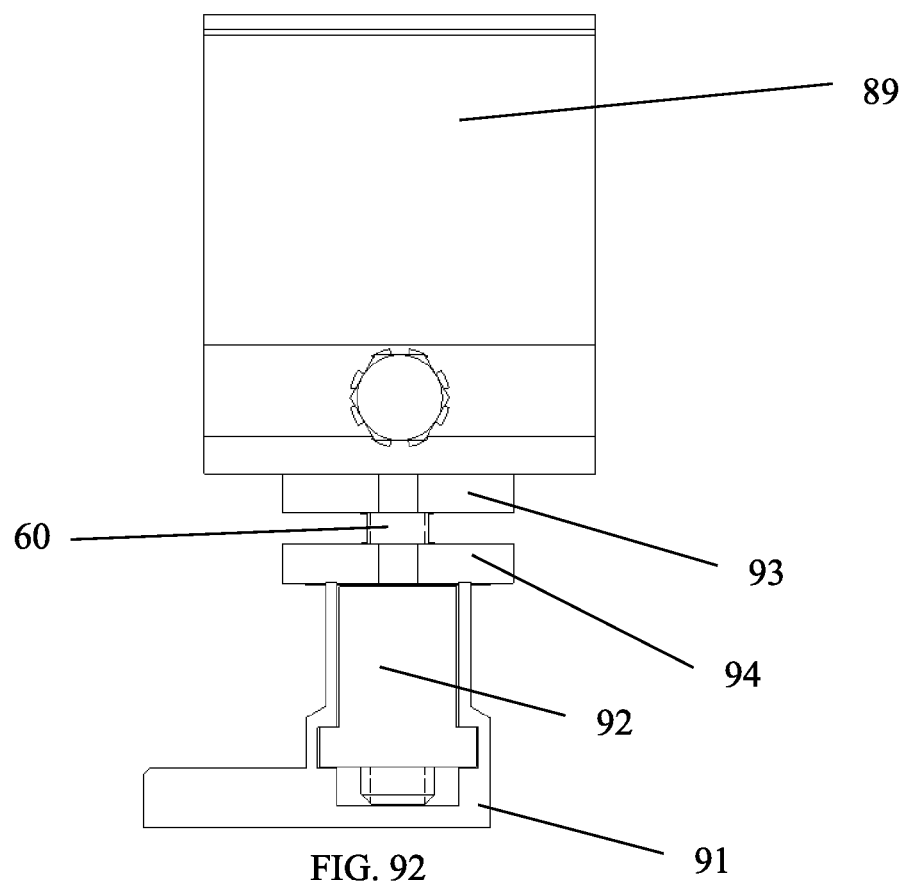
FIG. 92 is a cross-sectional view of one component of one embodiment of the invention.

Various other designs are possible. For example, FIG. 85 shows a four Solar Panel, 3, solar Panel Support System, 1, with front fascia, 47. FIG. 86, shows a this Solar Panel Support System, 1, with the middle of the Solar Panel (laminate), 3, removed so it is easier to view what is underneath. FIG. 87 shows a Long Panel Support-SI, 88, with two Panel Support Slides-SI, 90, which show how two of the Solar Panels, 3, may be joined together. A Short Panel Support-SI, 89, with one Panel Support Slides-SI, 90, is also shown. FIG. 90, also show this. FIGS. 87, 88, 90, 96-115, shows the Panel Support Bolt, 41, the Long Panel Supports, 88, the Short Panel Supports, 89, and the Panel Support Slides-SI, 90. Rotating the Panel Support Bolt, 41, moves the Panel Support Slide-SI, 90. FIG. 88 shows a solar panel mount system with a solar panel internal intermediate support restraint that achieves internally intermediate support clamping of the solar panel against the intermediate support. The design shown assembled n FIG. 88 presents a side clamp system and a solar panel mount side clamp system. In FIGS. 91 and 92, the Roof Mount Channel Hole, 145, is offset from the T-Bolt, 60. The Roof Mount US Channel, 91, can be mounted to other roof racking such as but not limited to standard solar rails, standard roof mounts, or Flashing, 8, 18 or 52 as shown previously. This applies to any roof mount channel shown in this patent if only a hole is shown in the roof mount channel.

Referring to FIGS. 91 and 92, when the tined roof mount biting top nut, 93, is loose, then the Long Panel Support-SI, 88 or the Short Panel Support-SI, 89, can move along Panel Support C-channel, 55, and when it is tight, then the Panel Supports, 88 or 89, can be locked to the T-Bolt, 60. Likewise, when the Roof Mount Biting Bottom Nut, 94 is loose, the Roof Mount US Slider, 92 can move freely in the Roof Mount US Channel, 91, but when it is tightened, the T-Bolt, 60 can be locked to the Roof Mount US Channel, 91, and the Roof Mount US Slider, 92 can be locked in place.

The mount riser, again such as T-Bolt, 60, can be used to adjust the height of the Panel Supports-SI, 88 or 89, prior to the Solar Panel, 3, installation on the Panel Supports-SI, 88 or 89. To aid the Solar Panel, 3, and fascia, 47, the tops of the T-Bolts, 60 or tops of the Panel Supports-SI, 88 or 89, can be adjusted so that they are coplanar to each other prior to the Solar Panel, 3, and fascia, 47 installations.

Figure 93:
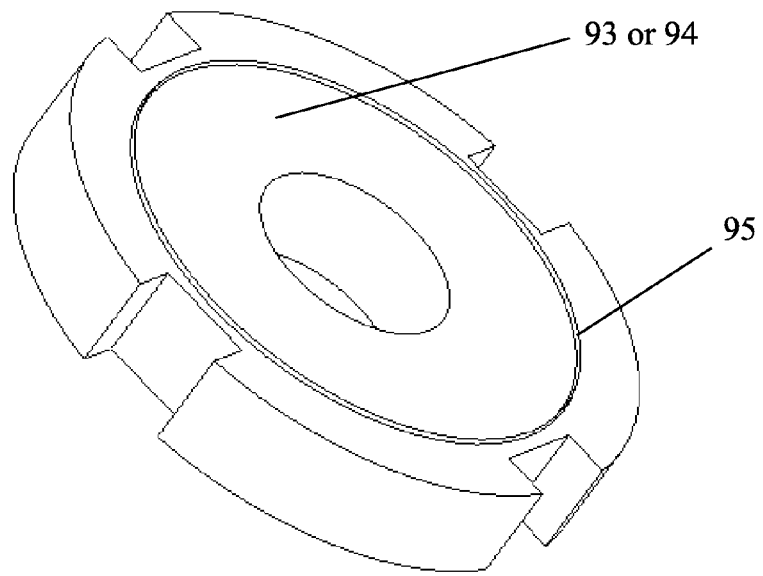
FIG. 93 is a perspective view of one component of one embodiment of the invention.

The Roof Mount Biting Top Nut, 93, in FIGS. 90-93, can be used like the C-Channel Biting Washer, 61, T-Bolt Lock Washer, 64 and T-Bolt Nut, 63 as shown in FIG. 49. The Roof Mount Biting Bottom Nut, 94, in FIGS. 90-93, is used like the U-Channel Biting Washer, 62, T-Bolt Lock Washer, 64 and T-Bolt Lock Washer, 63 as shown in FIG. 49. The grounding functions the same. The Roof Mount Biting Nut Biting Teeth, 95, as shown in FIG. 93, can cut into the Panel Supports-SI, 88 and 89, and the Roof Mount US Channel, 91, as shown in FIGS. 92 and 93.

FIG. 91 shows an embodiment with a solar panel top restraint attached to the intermediate support in the vicinity of the upper terminus of the intermediate support. The solar panel internal intermediate support restraint is clamped by tightening the bolt to internally intermediate support clamp the right solar panel against the intermediate support that is adjacent the solar panel coupler seat. As shown, the top restraint is integrally attached to and part of the intermediate support in the vicinity of said upper terminus and it acts to engage and clamp the solar panel. Note, that in FIGS. 91 and 92, only the Short Panel Support-SI, 89, is shown but the features explained in the previous paragraphs apply to the Long Panel Support-SI, 88, as well.

Figure 94:
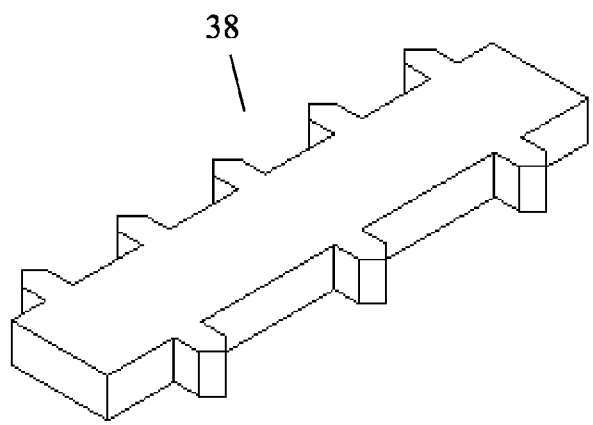
FIG. 94 is a perspective view of one component of one embodiment of the invention.
Figure 95:
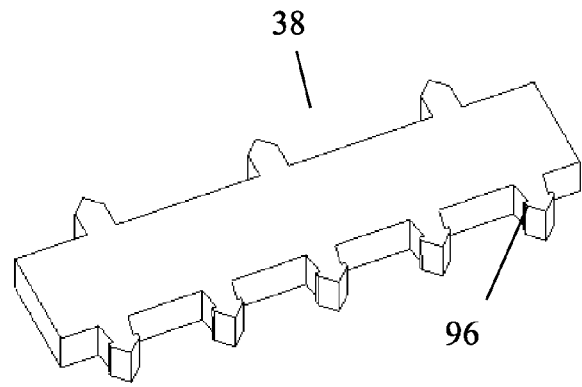
FIG. 95 is a perspective view of one component of one embodiment of the invention.

FIG. 94 shows how an intercalative junctionpiece can have a progressive solar system ground perforator tine to which a first solar panel system surface is responsive and a regressive solar system ground perforator tine to which a second solar panel system surface can be responsive. By progressive directionally perforating a first solar panel surface and regressive directionally perforating the second solar panel surface a good ground can be established. This can occur by operating a threaded nut perforator situated proximal to the solar panel mount element as shown. This can act to achieve forcing the threaded nut or other perforator closer to and even into the solar panel mount element. The tined element can be an interposed washer perforator situated between a threaded nut and the solar panel mount element as an attachment situated proximal to the solar panel mount element.

Figure 89:
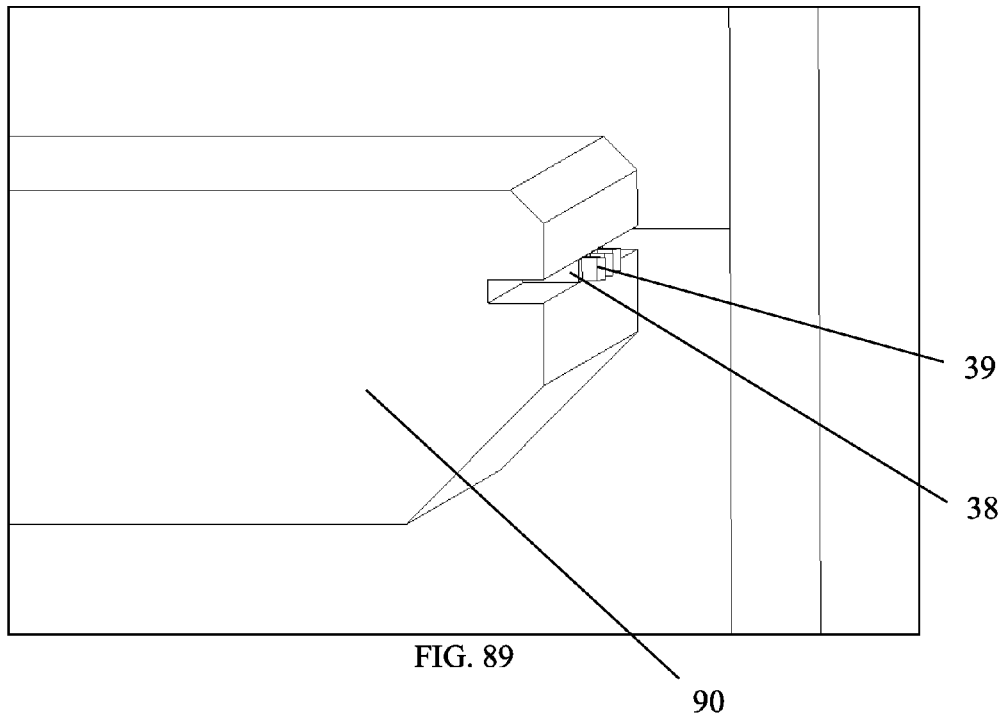
FIG. 89 is a perspective view of one component of one embodiment of the invention.

Embodiments can include some type of integral junctionpiece holder perhaps such as the slotted surface as especially shown in FIG. 89. This can also serve as a preferential side association junctionpiece that causes the intercalative junctionpiece or tined flat bar to preferentially associate and likely remain positioned on one or another piece or surface. As shown there can be a slot preferential side association junctionpiece or more generally a side preferential tine association junctionpiece. As shown in FIG. 94, the tines can be barbed to retain preferentially to one side when perforated into the surface. The barbed tine junctionpiece can be part of a system that achieves the step of integrally holding a unitary junctionpiece. On installation, the unitary junctionpiece shown can be inserted into the slotted surface and once tightened can be preferentially associated with that surface by the slot, the surface, or my mechanical deformation through the junctionpiece being forced into or against the surface. This can be controlled by using different substances such as a harder and softer surface or by using aluminum and stainless steel as but one example.

Figure 96:
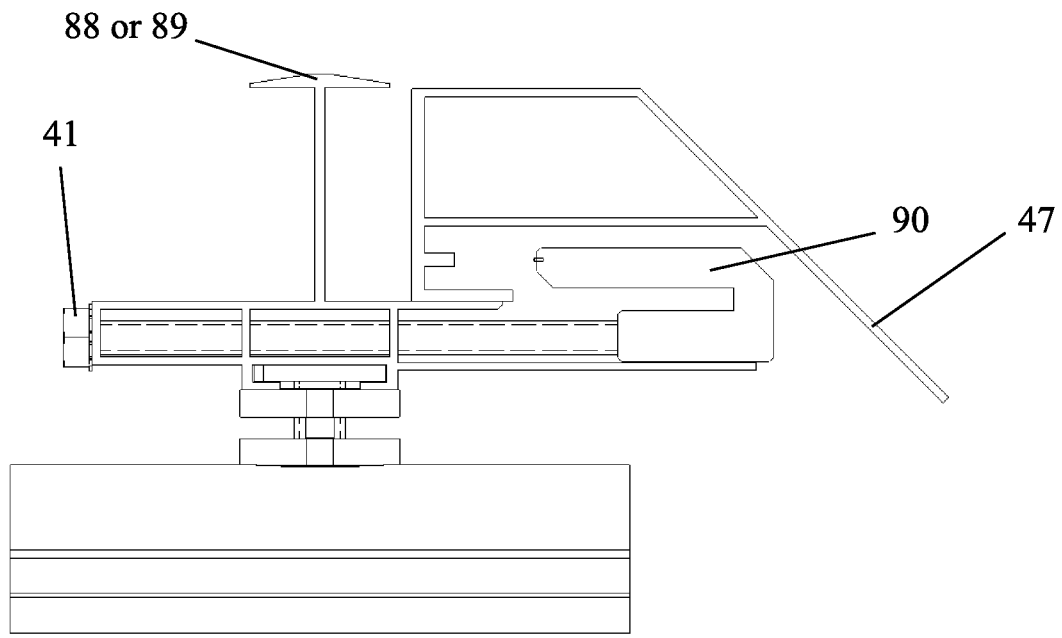
FIG. 96 is a cross-sectional view of one component of one embodiment of the invention.
Figure 97:
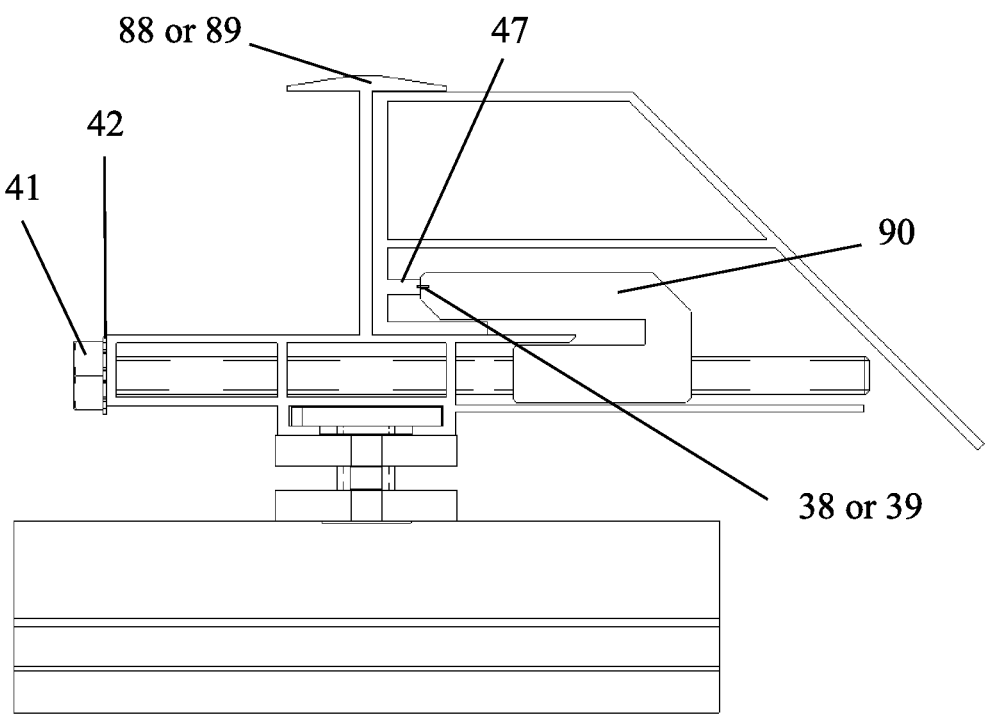
FIG. 97 is a cross-sectional view of one component of one embodiment of the invention.

FIGS. 96-102 shows how a Solar Panel, 3, and fascia, 47, can be inserted and fastened in the Solar Panel Support System, 1. This is a typical way but does not limit to the only sequence of installation. This sequence is for a Solar Panel Support System, 1, with fascia, 47. Some prior sequences will be talked about later in this Patent. The fascia, 47, may be installed first, as shown in FIG. 96. The fascia, 47, is usually installed on the lower part of the roof. The Panel Support Bolt, 41, is tightened as shown in FIG. 97. Similar to the Solar Panel, 3, the fascia, 47, can be joined together using the Long Panel Support-SI, 88, and supported using the short panel support-SI, 89. The Long Panel Support-SI, 88, can be used also to support the fascia, 47. When the fascia, 47 is clamped as shown in FIG. 97, the tines or Biting Bar Teeth, 39 and 96, penetrate into and perforate the fascia, 47, completing the electrical ground between the Panel Support Slide-SI, 90, and the fascia, 47.

Figure 98:
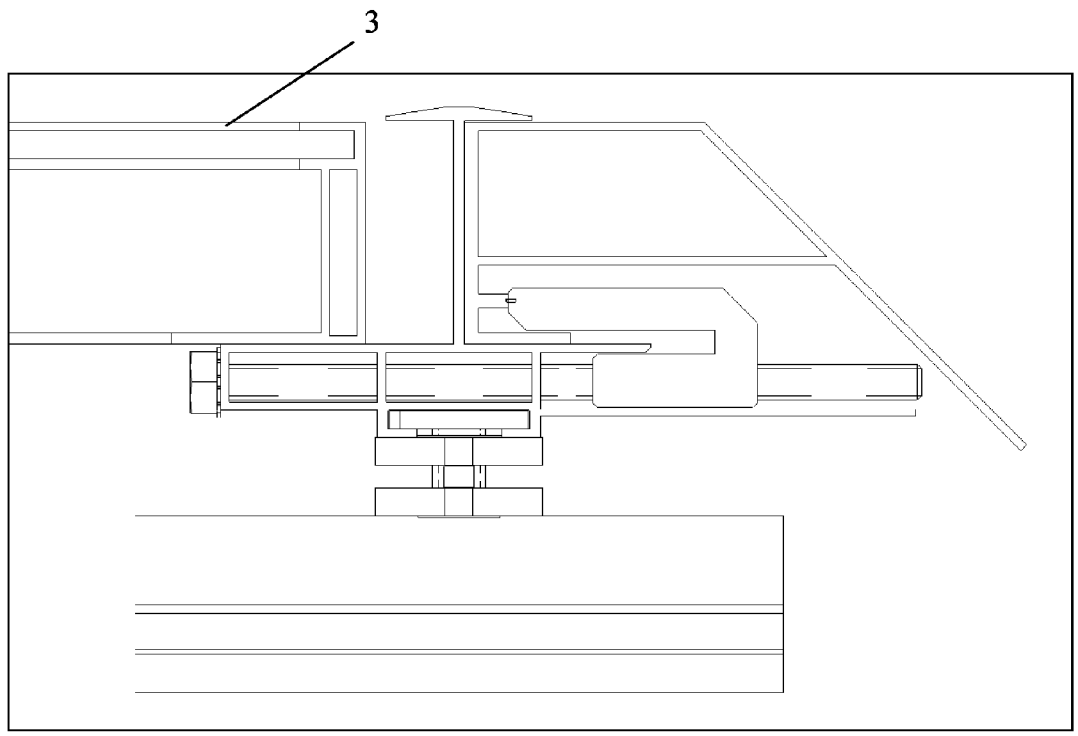
FIG. 98 is a cross-sectional view of one component of one embodiment of the invention.
Figure 99:
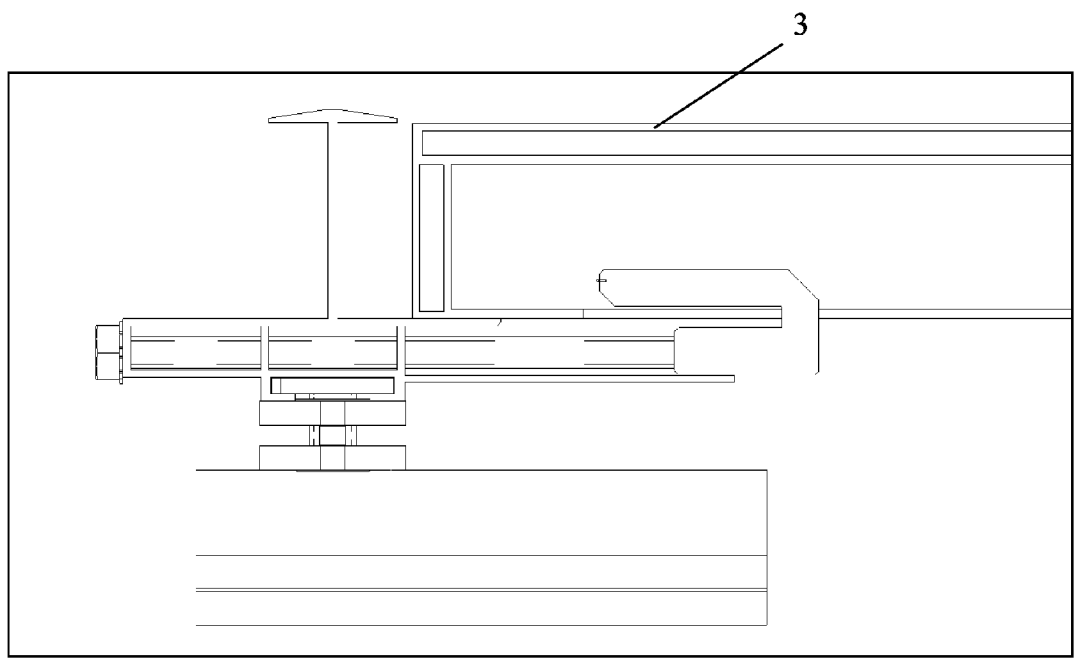
FIG. 99 is a cross-sectional view of one component of one embodiment of the invention.
Figure 100:
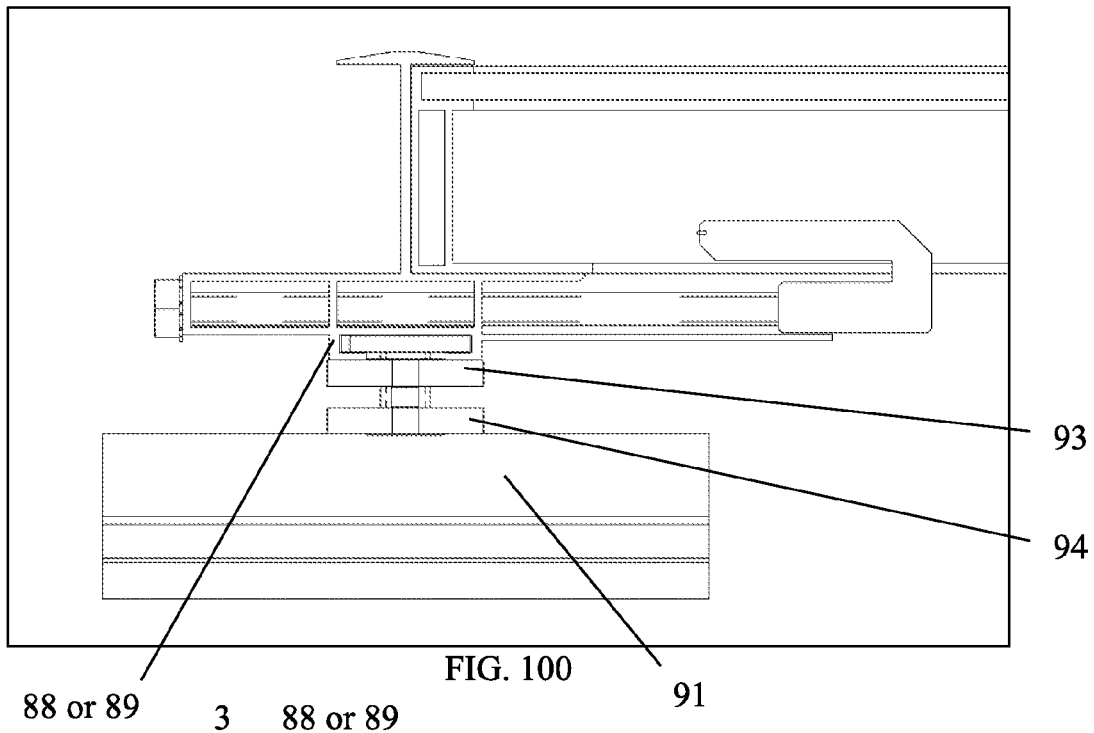
FIG. 100 is a cross-sectional view of one component of one embodiment of the invention.
Figure 101:
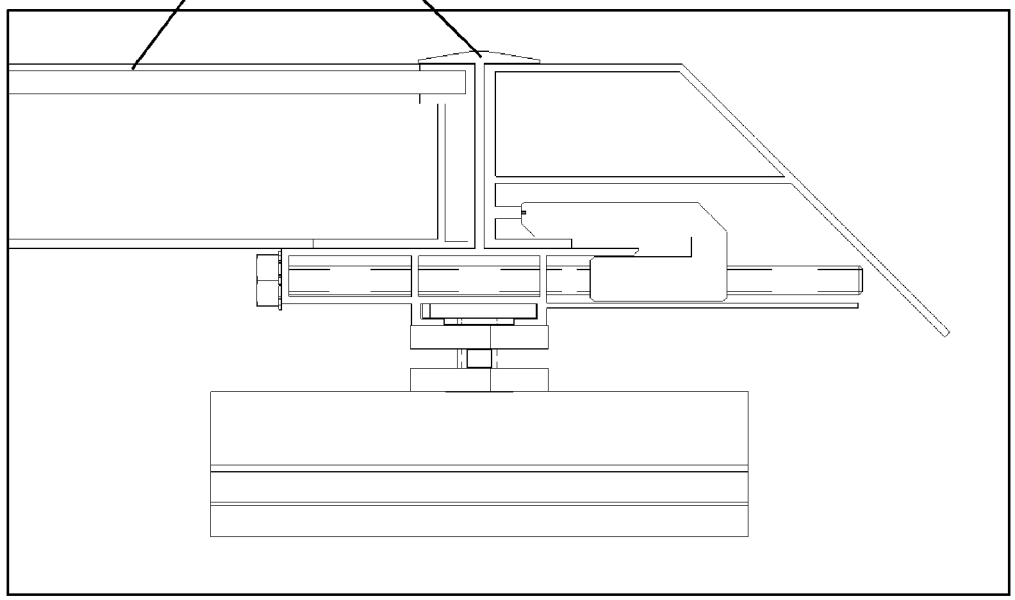
FIG. 101 is a cross-sectional view of one component of one embodiment of the invention.
Figure 102:
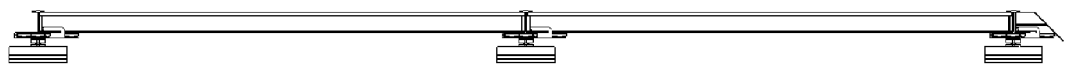
FIG. 102 is a perspective view of one embodiment of the invention.
Figure 103:
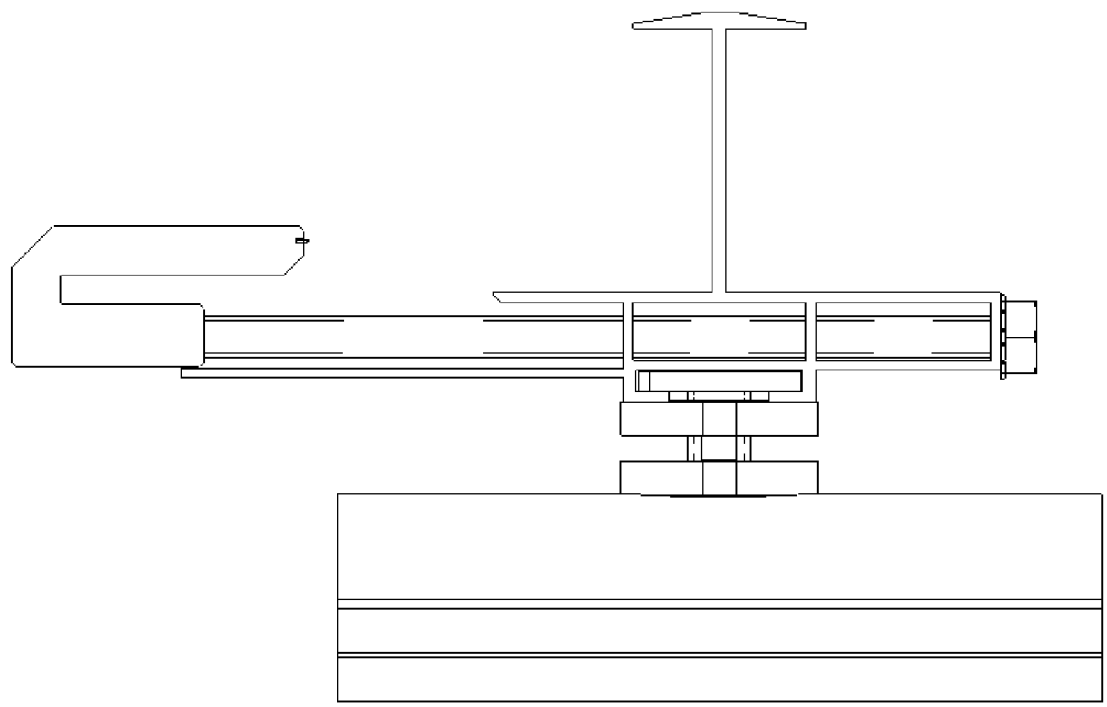
FIG. 103 is a cross-sectional view of one component of one embodiment of the invention.
Figure 104:
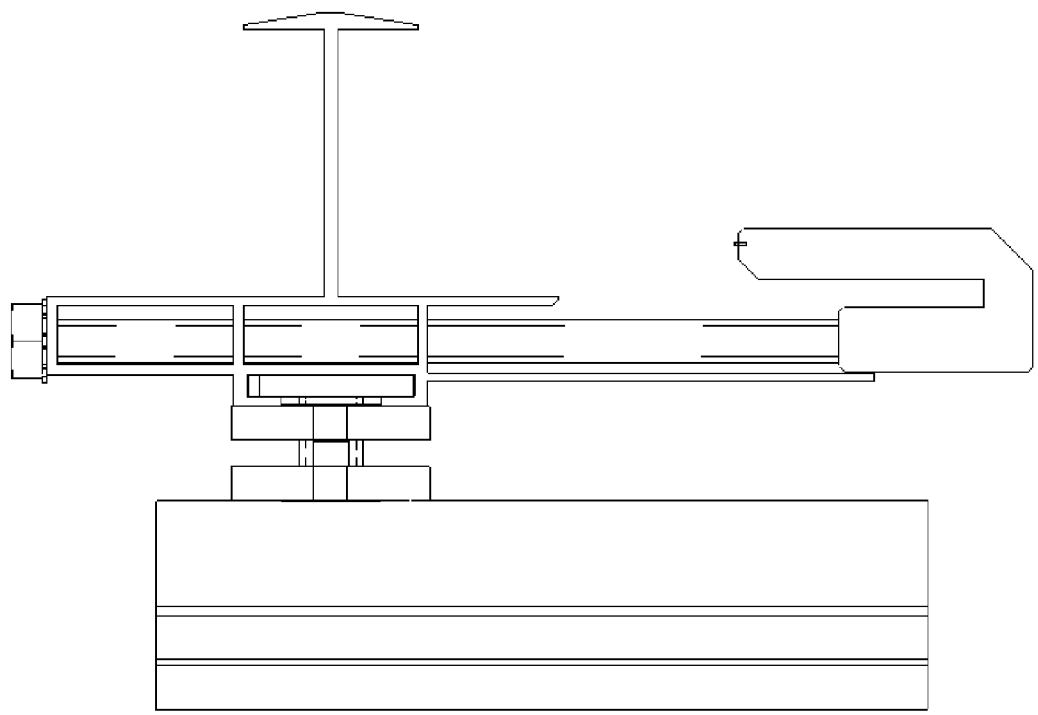
FIG. 104 is a cross-sectional view of one component of one embodiment of the invention.

FIGS. 98 and 99 show the Solar Panel, 3, in the installation position. The Short Panel Supports-SI, 89 (and the Long Panel Support, 88, if used as a mount), would then be moved or pushed to the right as shown in FIG. 100, This also moves or pushes the Solar Panel, 3, to the position as shown in FIG. 101. FIG. 102 shows the final installation. FIGS. 102 to 113 show the Solar Panel, 3, typical installation if a fascia, 47, is not used.

Figure 105:
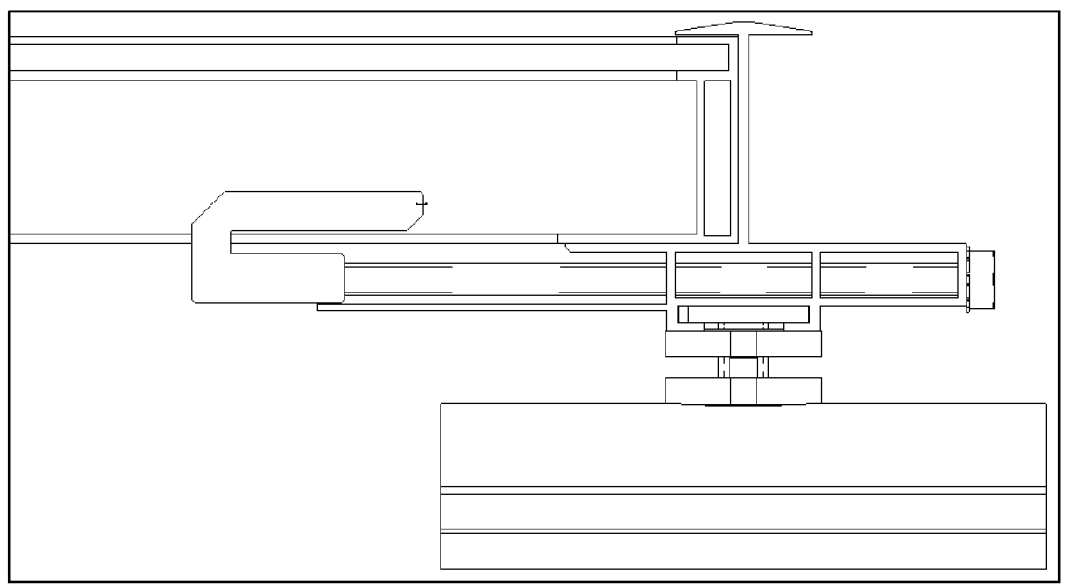
FIG. 105 is a cross-sectional view of one component of one embodiment of the invention.
Figure 106:
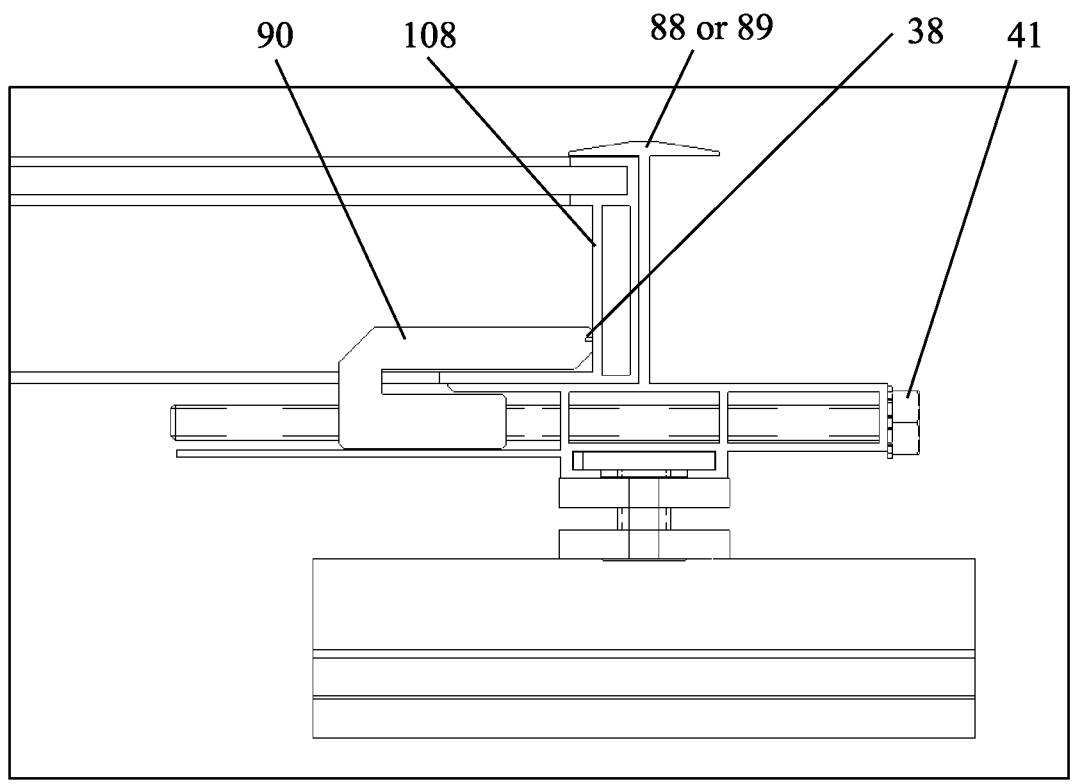
FIG. 106 is a cross-sectional view of one component of one embodiment of the invention.
Figure 107:
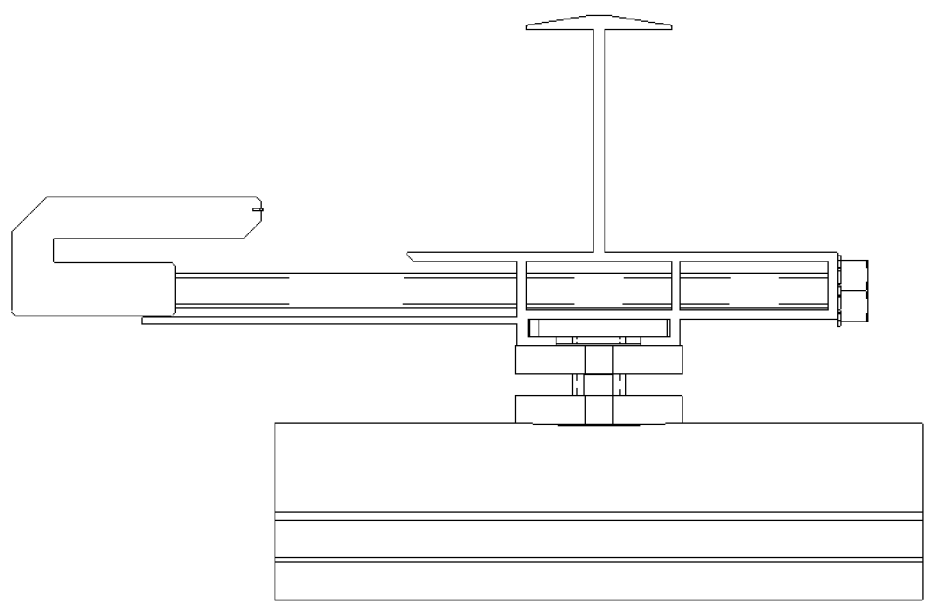
FIG. 107 is a cross-sectional view of one component of one embodiment of the invention.
Figure 108:
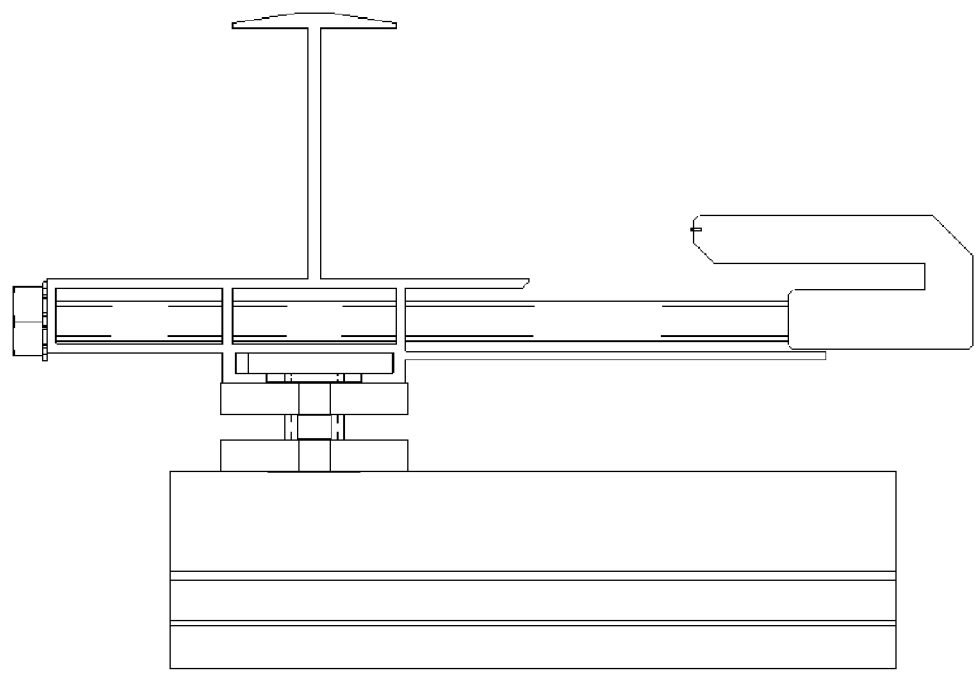
FIG. 108 is a cross-sectional view of one component of one embodiment of the invention.
Figure 109:
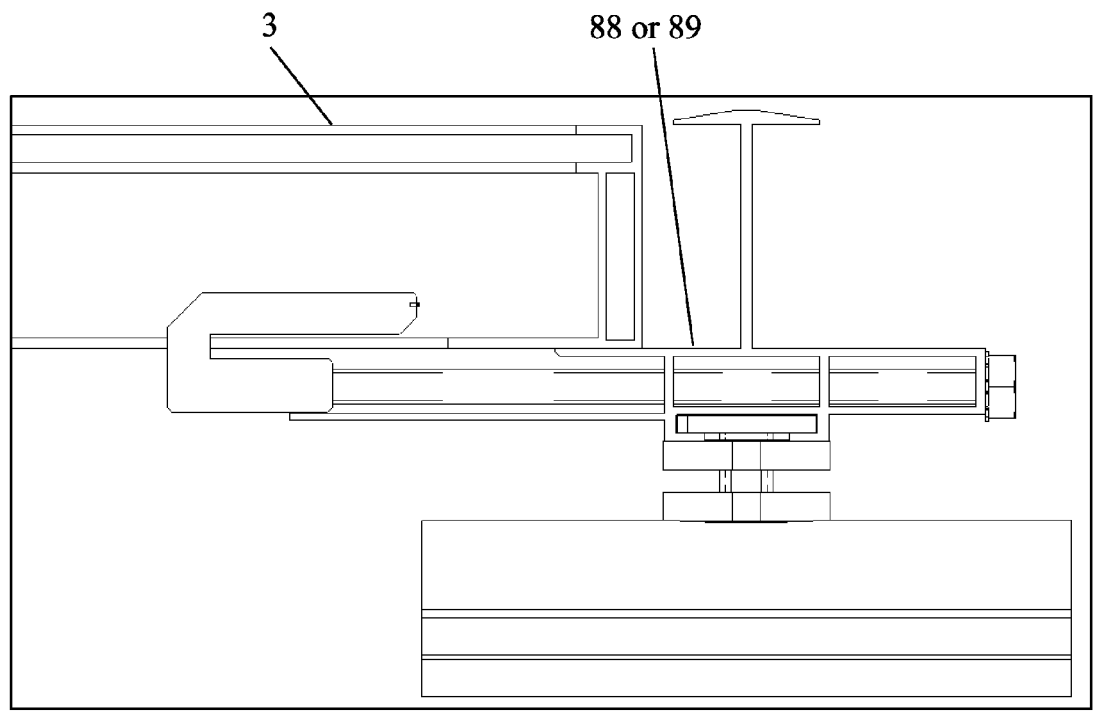
FIG. 109 is a cross-sectional view of one component of one embodiment of the invention.
Figure 110:
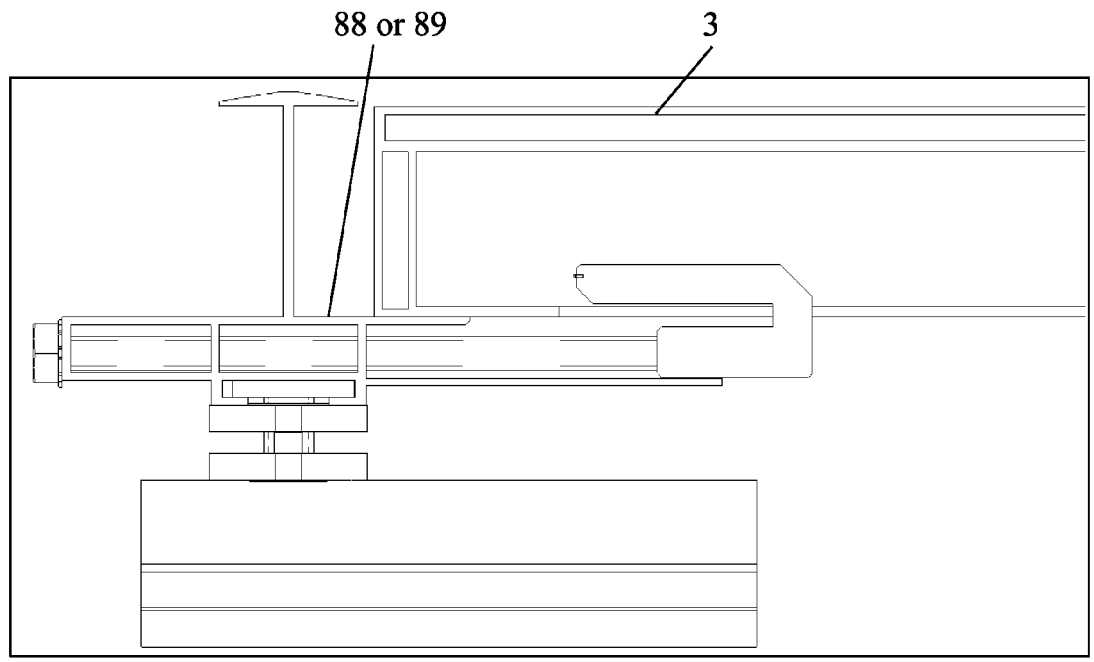
FIG. 110 is a cross-sectional view of one component of one embodiment of the invention.
Figure 111:
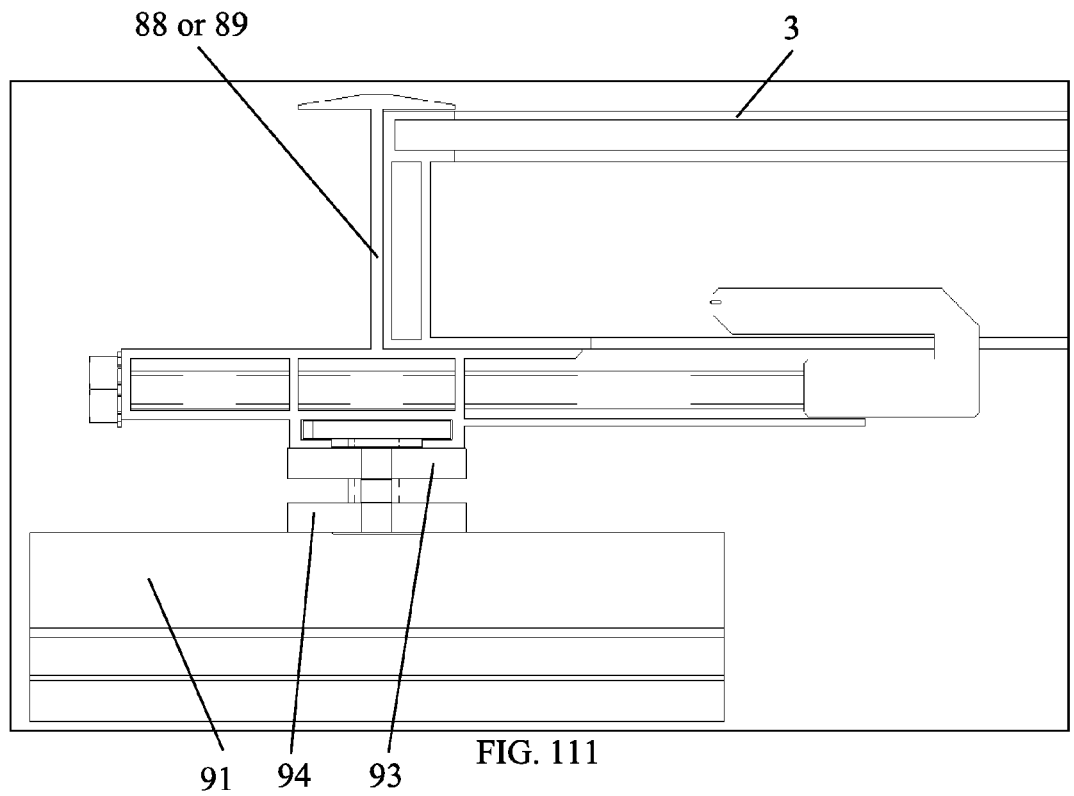
FIG. 111 is a cross-sectional view of one component of one embodiment of the invention.
Figure 112:
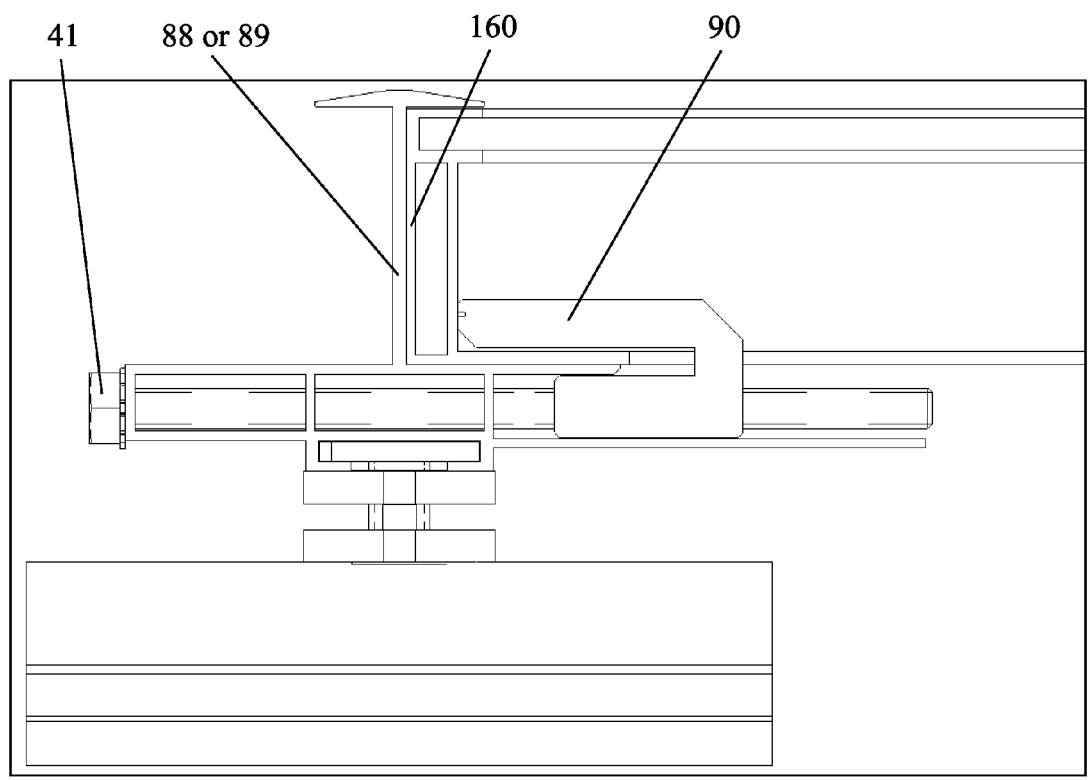
FIG. 112 is a cross-sectional view of one component of one embodiment of the invention.
Figure 113:
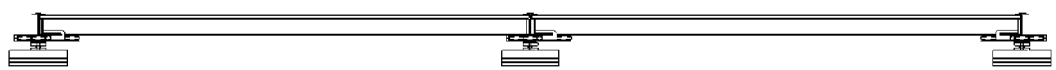
FIG. 113 is a perspective view of one embodiment of the invention.

FIG. 105 shows a solar panel movable restraint situated in proximity to a solar panel coupler seat. The at least one movable restraint can be moved with respect to said solar panel coupler seat to move the solar panel against the intermediate support above the solar panel retainer mount. Tightening the bolt can establish the movable solar panel mount element at a desired position and can retain it in that position such as to clamp the solar panel to the mount. Grounding between Solar Panel Inner Frame, 108, and the Panel Support Slide-SI, 90, is through the Biting Bar, 38. See FIG. 106. Grounding between all metal parts occur on each row occurs during this installation. Additional grounding is required between rows, which was discussed in the previous provisional patent. Similarly, FIG. 110 and on show the step of clamping the solar panel into position at the solar panel retainer mount and then firmly fixing the solar panel into position at the solar panel retainer mount by the solar panel movable restraint. This involves positioning a solar panel at the solar panel retainer mount, then capturing the solar panel at the solar panel retainer mount, and ultimately retaining the panel as desired. As shown, the solar panel mount base on the foundation can have a structure foundation attachment extending through the solar panel mount base on the structure foundation.

Figure 114:
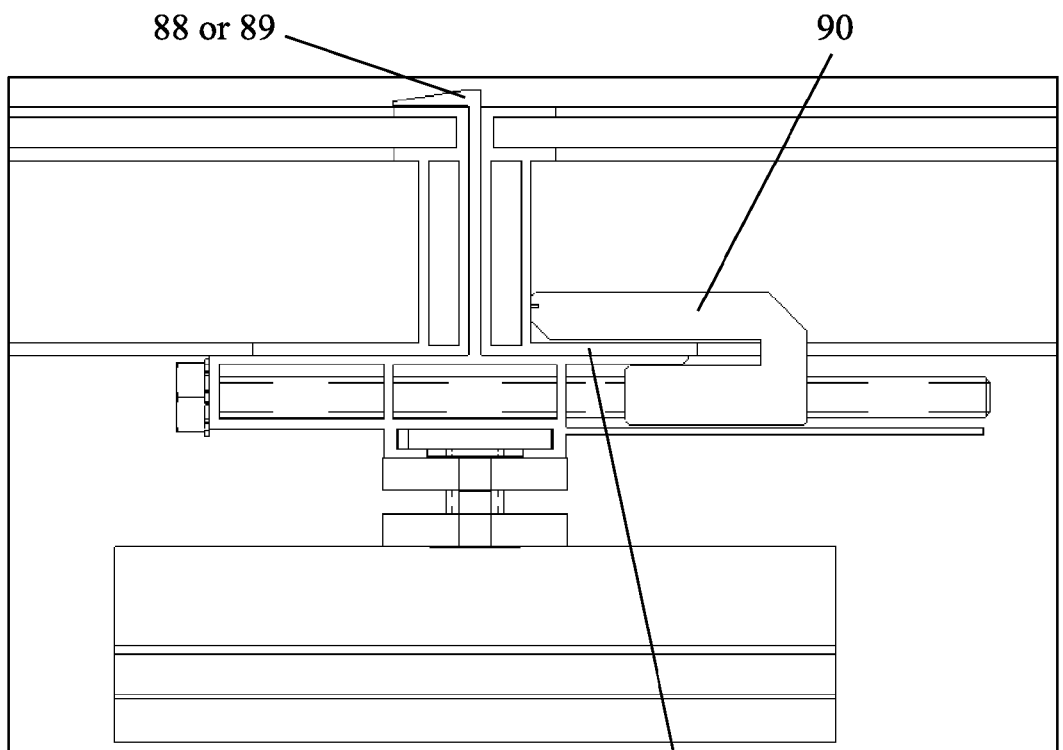
FIG. 114 is a cross-sectional view of one component of one embodiment of the invention.
Figure 115:
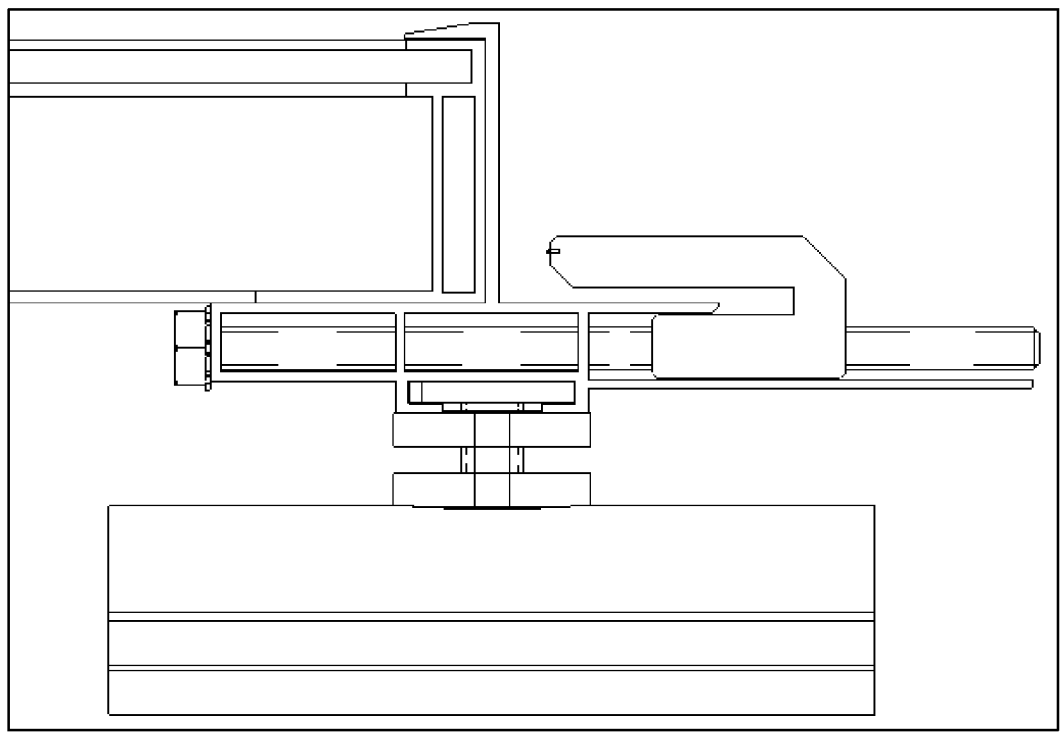
FIG. 115 is a cross-sectional view of one component of one embodiment of the invention.
Figure 122:
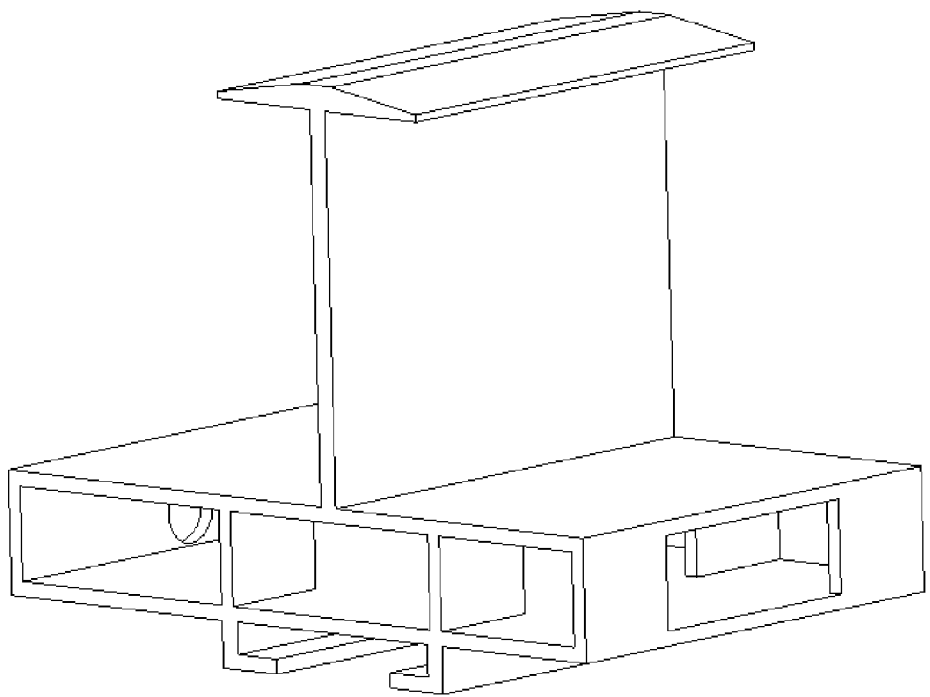
FIG. 122 is a perspective view of one component of one embodiment of the invention.

FIGS. 114 and 115, show that the lip on the Panel Supports-SI, 88 or 89, above the Panel Support Slide-SI, 90, may be removed. The Solar Panel, 3, would still be retained by the Panel Support Slide-SI, 90. By providing a retainer configured to secure the solar panel movable restraint at a desired position relative to said solar panel coupler seat, the solar panel can be retained at a solar panel retainer mount. In this embodiment, it can be understood that act of retaining of the solar panel is as an internally clamped item at the solar panel retainer seat. The retaining act can also retain at least one perforation tine in the solar panel mount element for grounding. FIG. 122 shows how a top can be restrained and FIG. 73 shows how a top can be retained perhaps by a top panel clamp.

Figure 120:
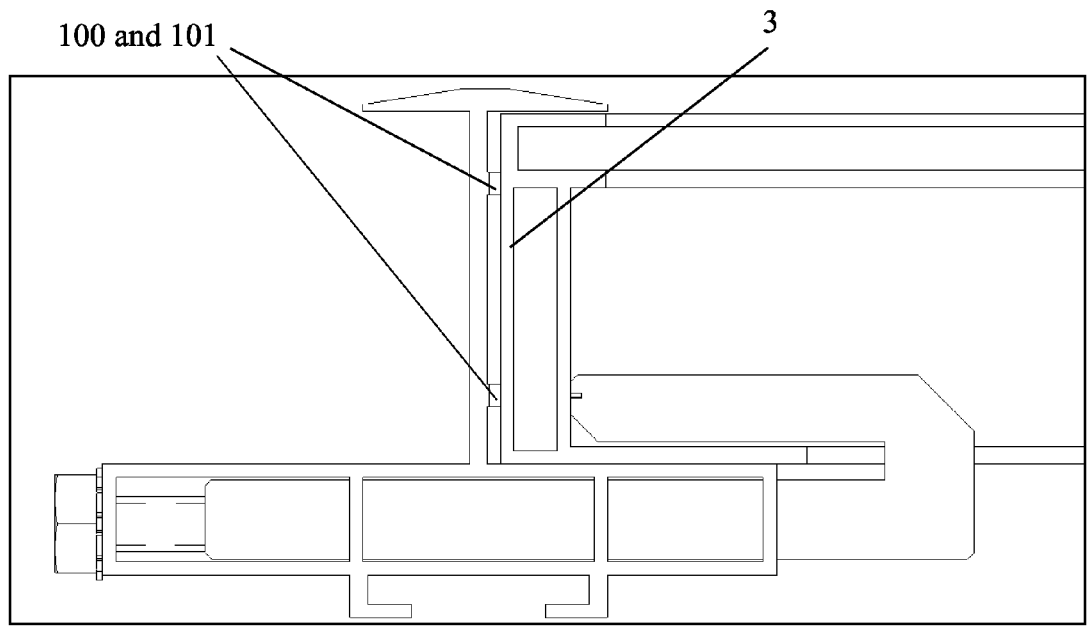
FIG. 120 is a cross-sectional view of one component of one embodiment of the invention.
Figure 121:
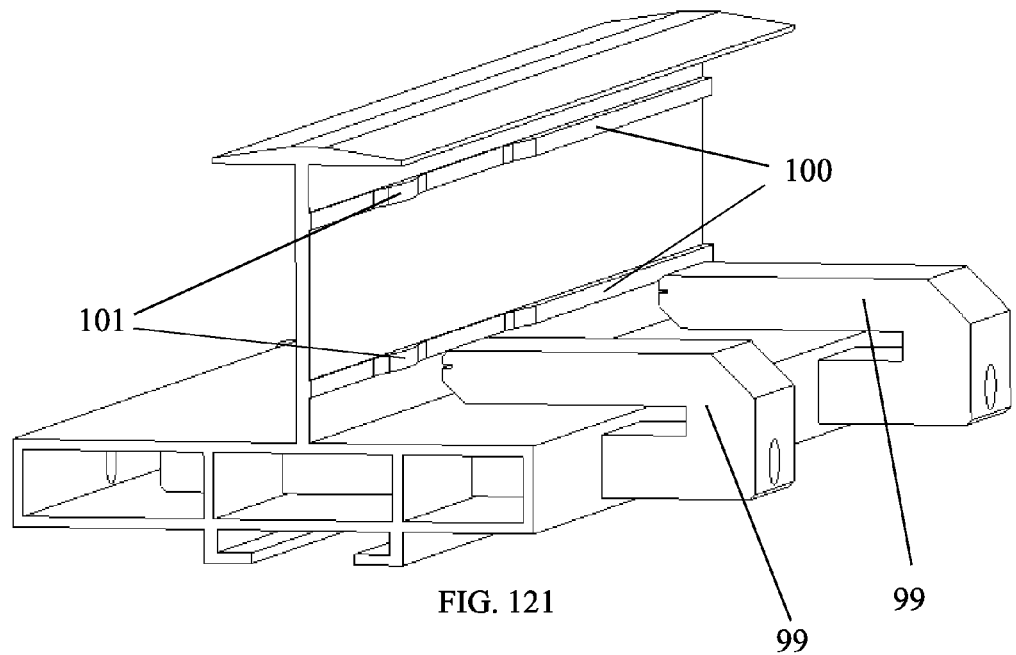
FIG. 121 is a perspective view of one component of one embodiment of the invention.
Figure 123:
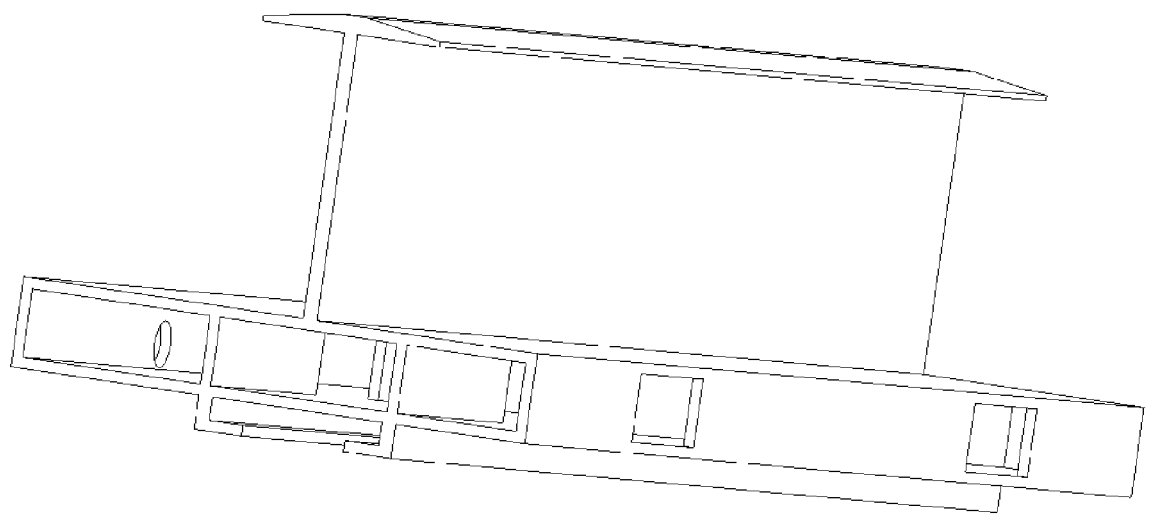
FIG. 123 is a perspective view of one component of one embodiment of the invention.

FIGS. 116 to 123 show a more rigid way to hold the Panel Support Slide-SIL, 99, in the Long Panel Support-SIL, 97 and the Short Panel Support SIL, 98. FIGS. 122 and 123 show the holes in the Long Panel Support-SIL, 97, and the Short Panel Support SIL, 98. The Panel Support Slide-SIL, 99, can hold the Solar Panel, 3, against the Long Panel Support-SIL, 97. With tolerance in the squareness of the Solar Modules, 3, and the straightness of the Long Panel Support-SIL, 97, the Solar Modules, 3, may not be in a straight line in the row direction. FIGS. 120 and 121, show the Panel Support Flat Bumps, 100, and the Panel Support Short Bumps, 101, to correct this row straightness. One Solar Panel, 3, is pushed up against Panel Support Flat Bumps, 100. The adjacent Solar Panel, 3, is pushed up against the Panel Support Short Bumps, 101. This adjacent Solar Panel, 3, can rotate slightly around the Panel Support Short Bumps, 101, to allow the rows to be adjusted to be straight.

Figure 124:
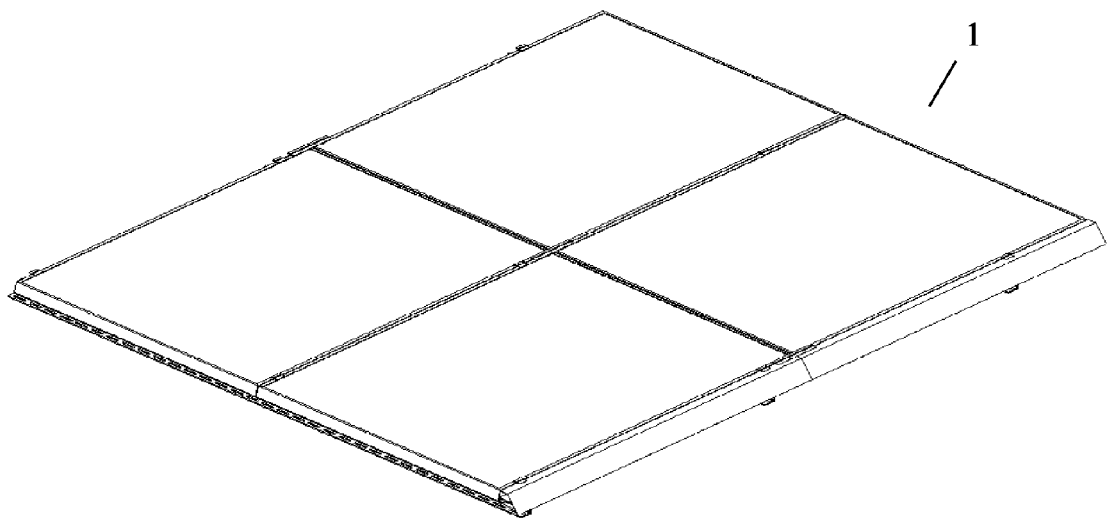
FIG. 124 is a perspective view of one embodiment of the invention.
Figure 125:
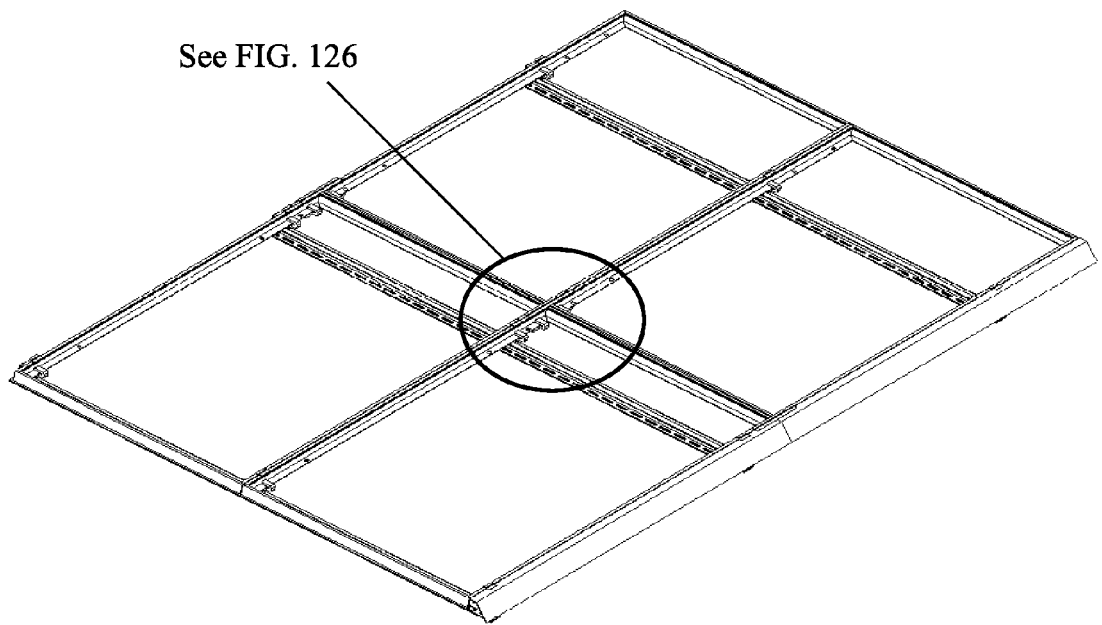
FIG. 125 is a perspective view of one embodiment of the invention.
Figure 126:
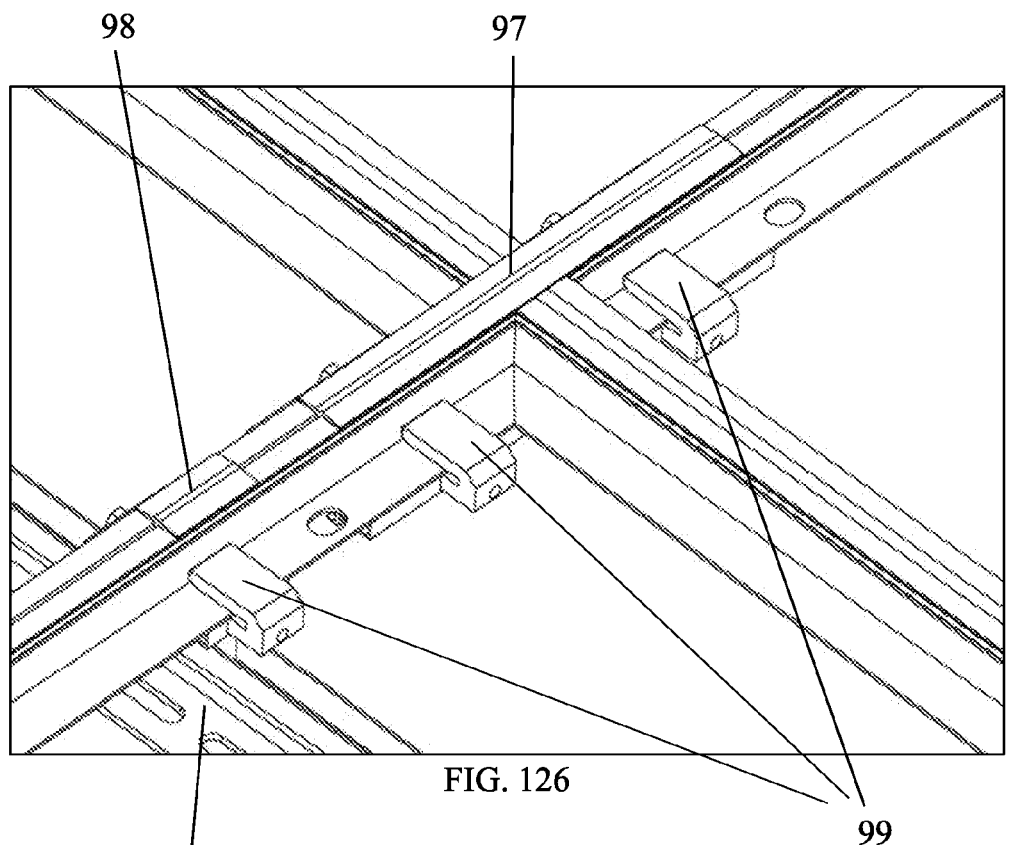
FIG. 126 is a perspective view of one component of one embodiment of the invention.

FIGS. 124-129 shows another variation Solar Panel Support System, 1. FIG. 124 shows a four Solar Panel, 3, Solar Panel Support System, 1. FIG. 125 shows the same system with the middle of the Solar Panels, 3, removed. FIGS. 125 to 129 show a Panel Support System, 1, with Roof Mount US Channel-Long Rails, 102. Under certain load conditions and roof tile mounts, it is advantageous to use a rail under the system. These Roof Mount US Channel-Long Rails, 102, function as this rail and also as the Roof Mount Channels in this embodiment.

Figure 127:
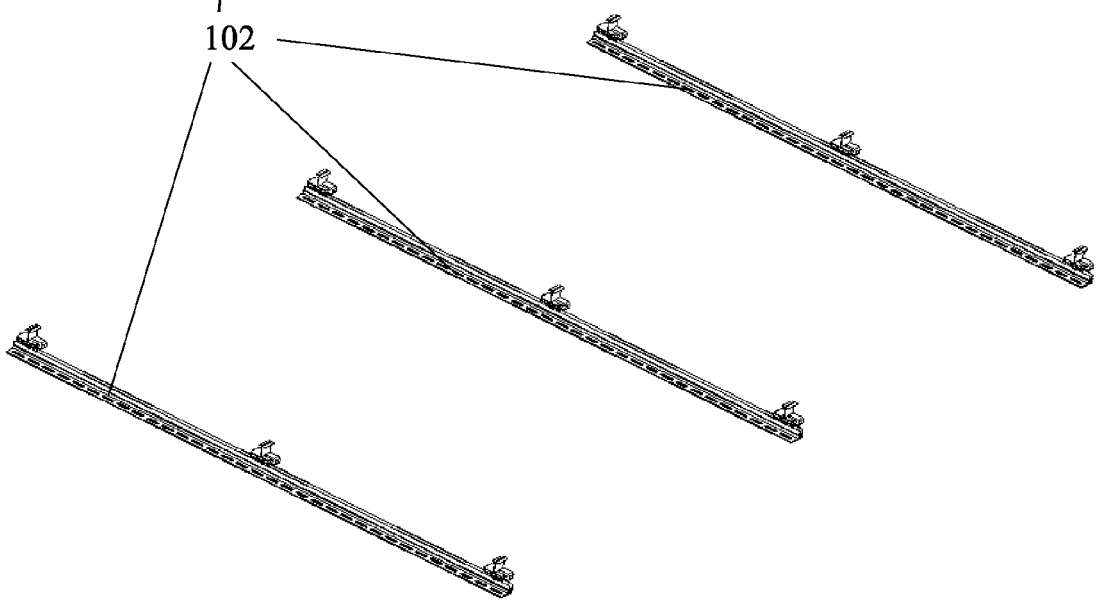
FIG. 127 is a perspective view of one embodiment of the invention.
Figure 128:
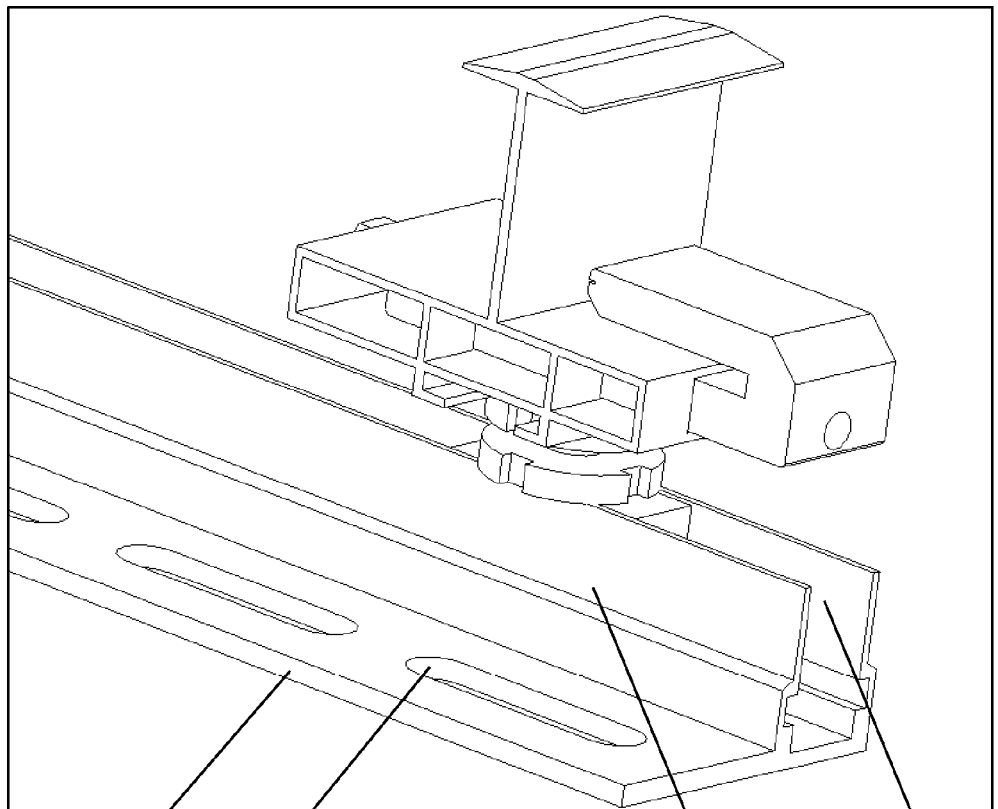
FIG. 128 is a perspective view of one component of one embodiment of the invention.
Figure 129:
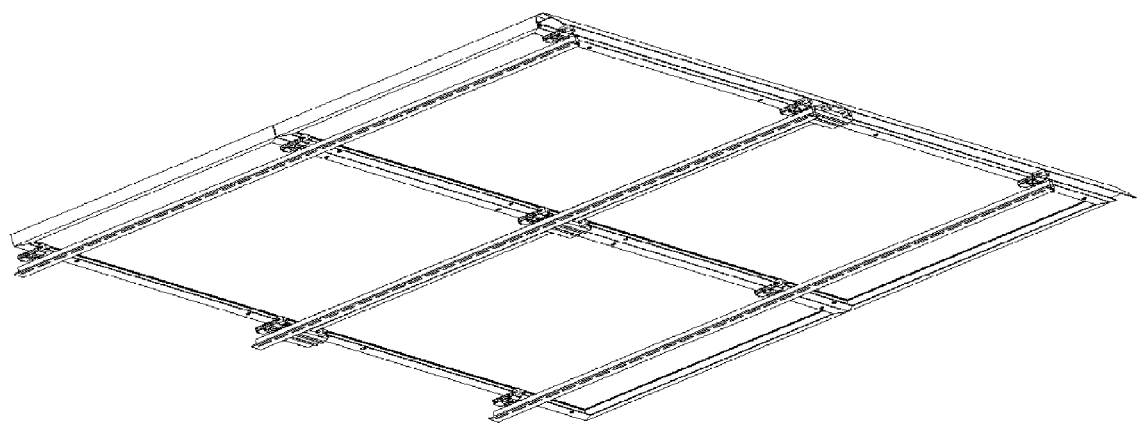
FIG. 129 is a perspective view of one embodiment of the invention.

FIGS. 127 and 128, show the Roof Mount US Channel-Long Rails, 102, with Roof Mount US Channel-Long Slots, 142, in the Roof Mount US Channel-Long Lip, 144. These Roof Mount US Channel-Long Slots, 142, can be used to attach to other roof mounts. Roof Mount US Channel-Long Rails, 102, could be a continuous length or in shorter lengths and spliced together. Roof Mount US Channel-Long Lip, 144, is shown in FIG. 128, at the bottom of the Roof Mount US Channel-Long Rails, 102. This Roof Mount US Channel-Long Lip, 144, could be located anywhere along the Roof Mount US Channel-Long Side, 143.

Figure 130:
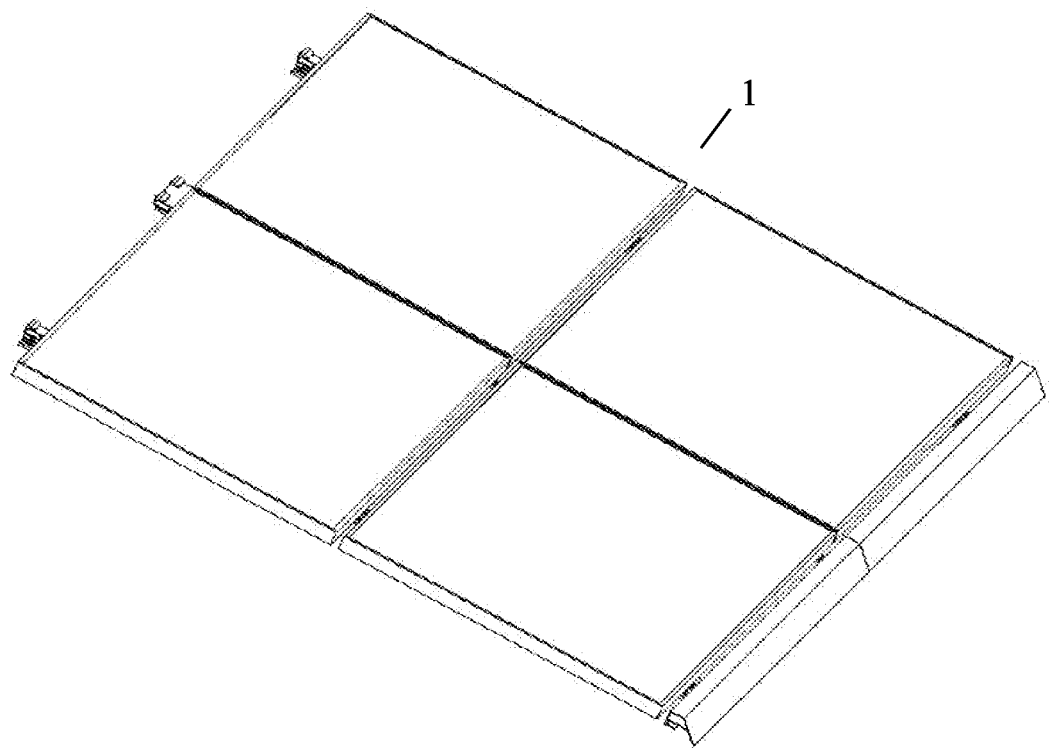
FIG. 130 is a perspective view of one embodiment of the invention.
Figure 131:
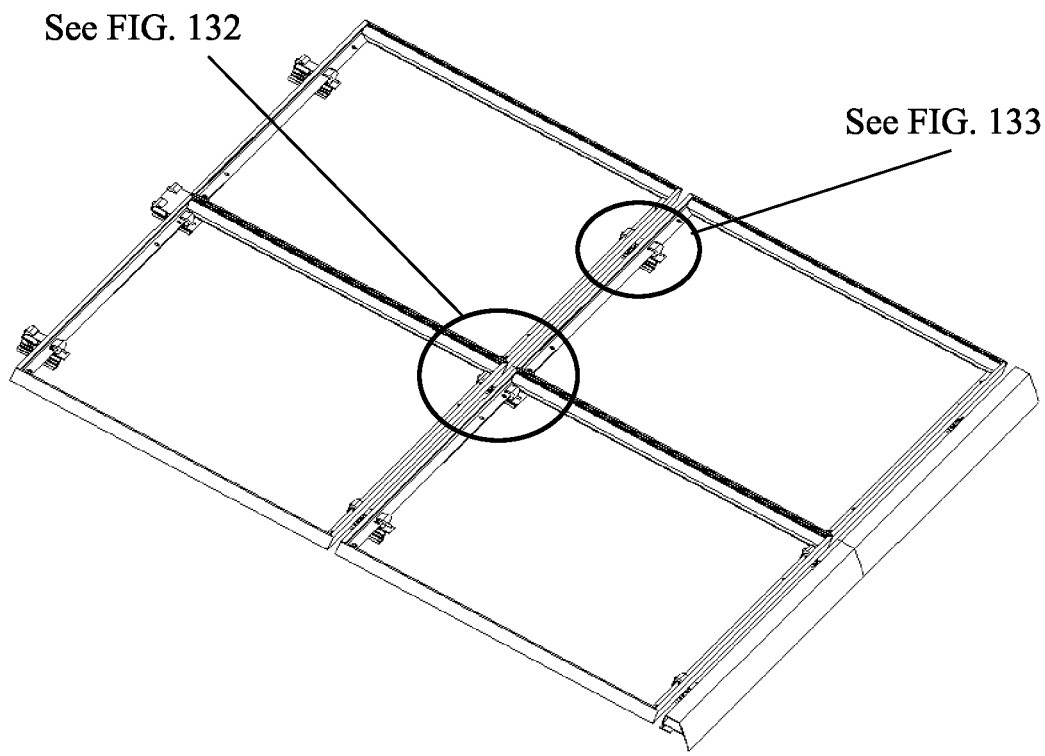
FIG. 131 is a perspective view of one embodiment of the invention.
Figure 132:
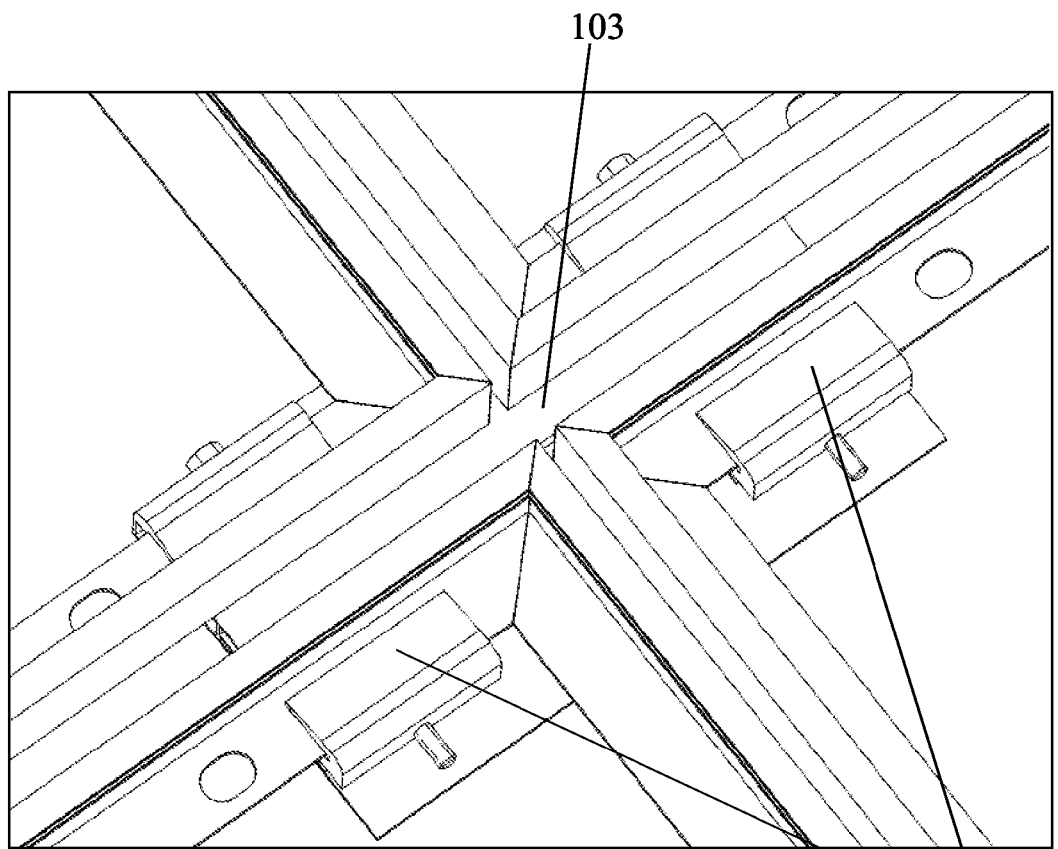
FIG. 132 is a perspective view of one component of one embodiment of the invention.
Figure 133:
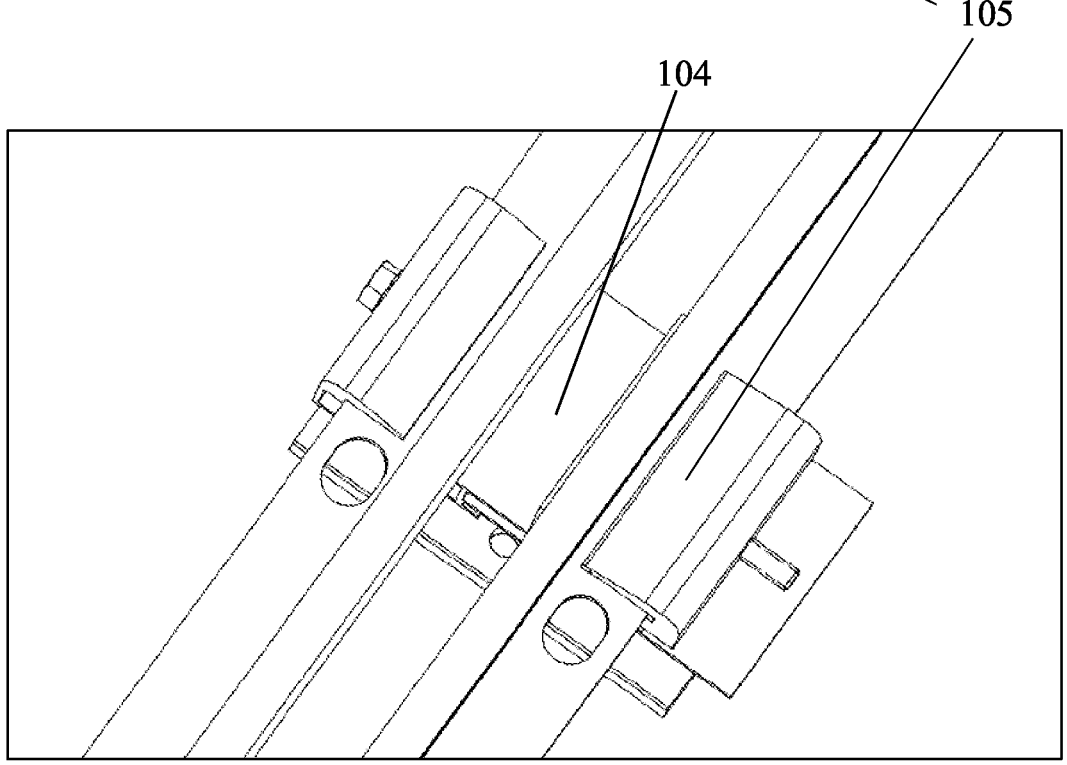
FIG. 133 is a perspective view of one component of one embodiment of the invention.
Figure 134:
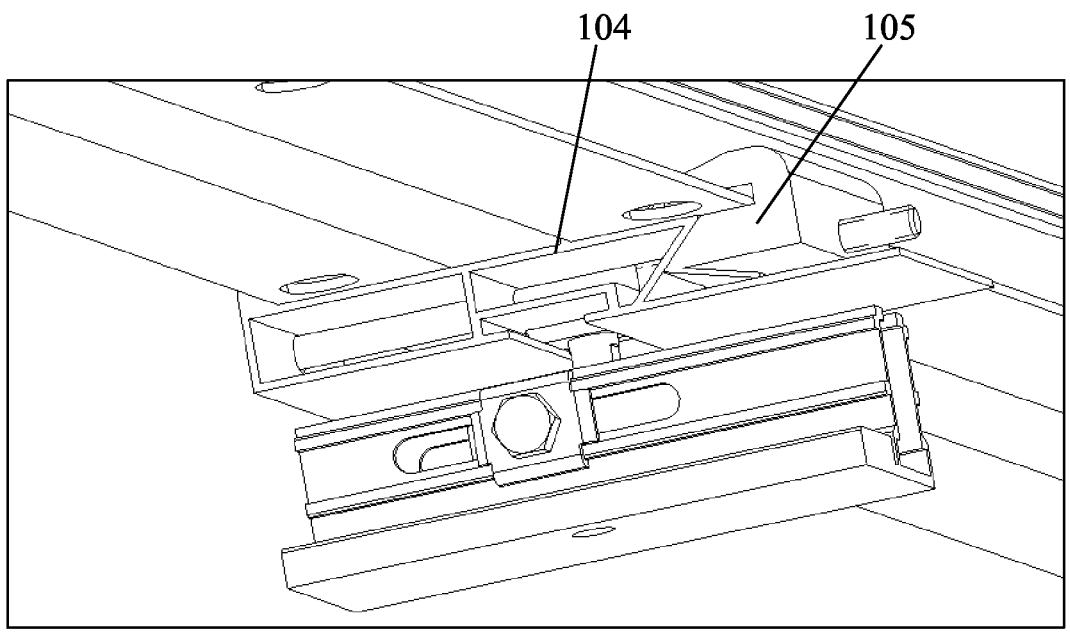
FIG. 134 is a perspective view of one component of one embodiment of the invention.
Figure 135:
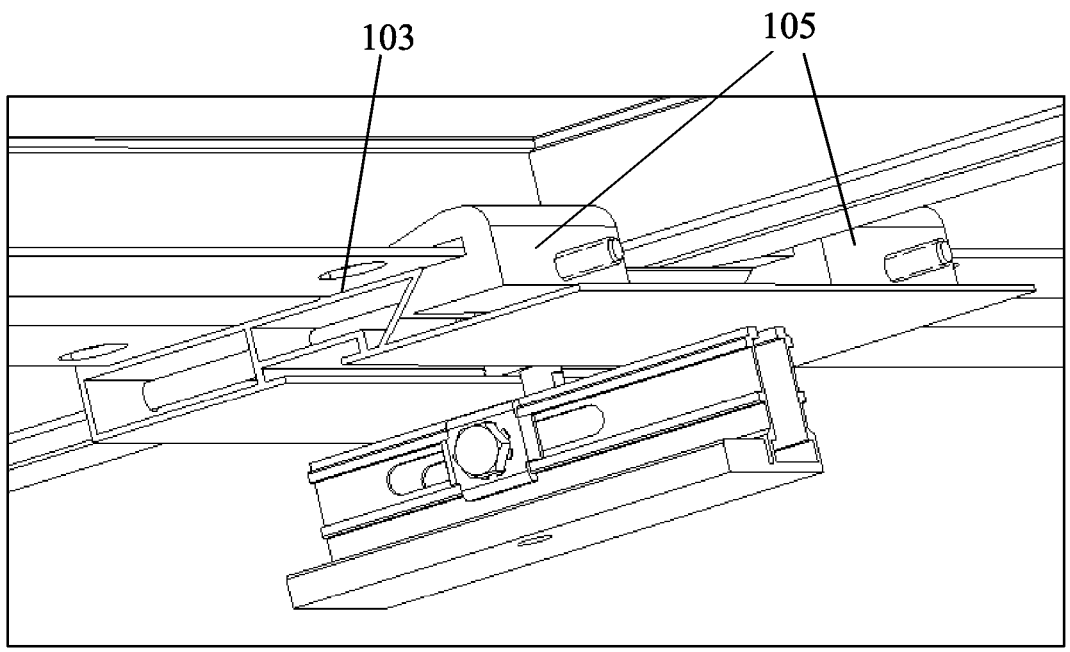
FIG. 135 is a perspective view of one component of one embodiment of the invention.
Figure 136:
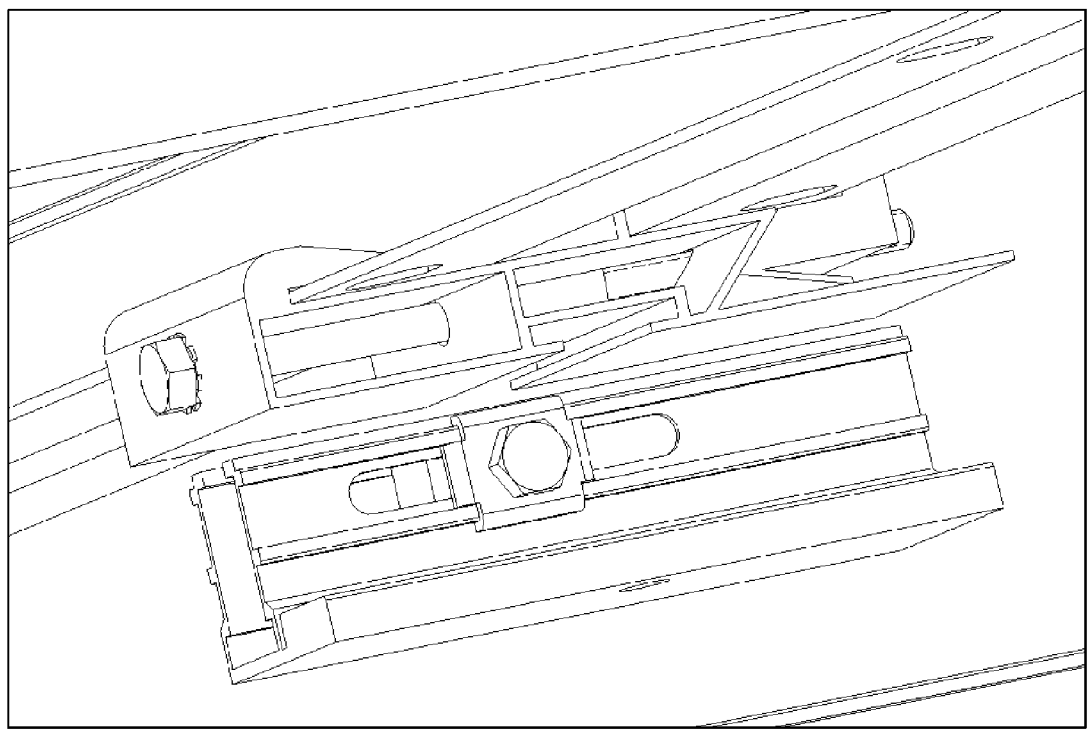
FIG. 136 is a perspective view of one component of one embodiment of the invention.
Figure 137:
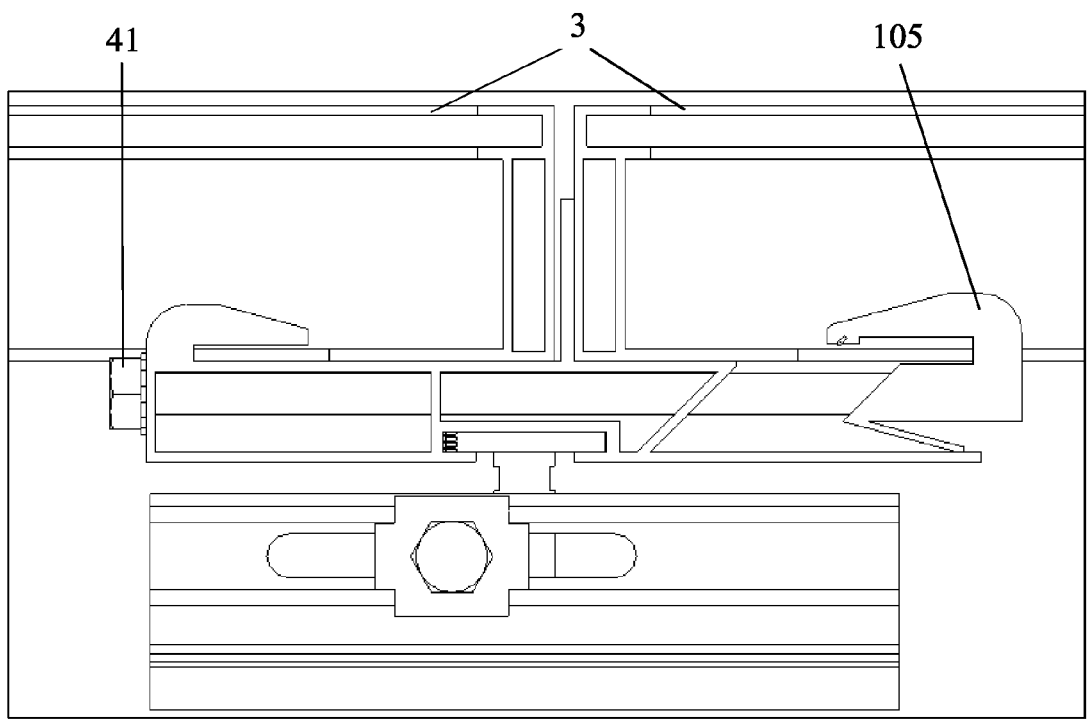
FIG. 137 is a cross-sectional view of one component of one embodiment of the invention.
Figure 138:
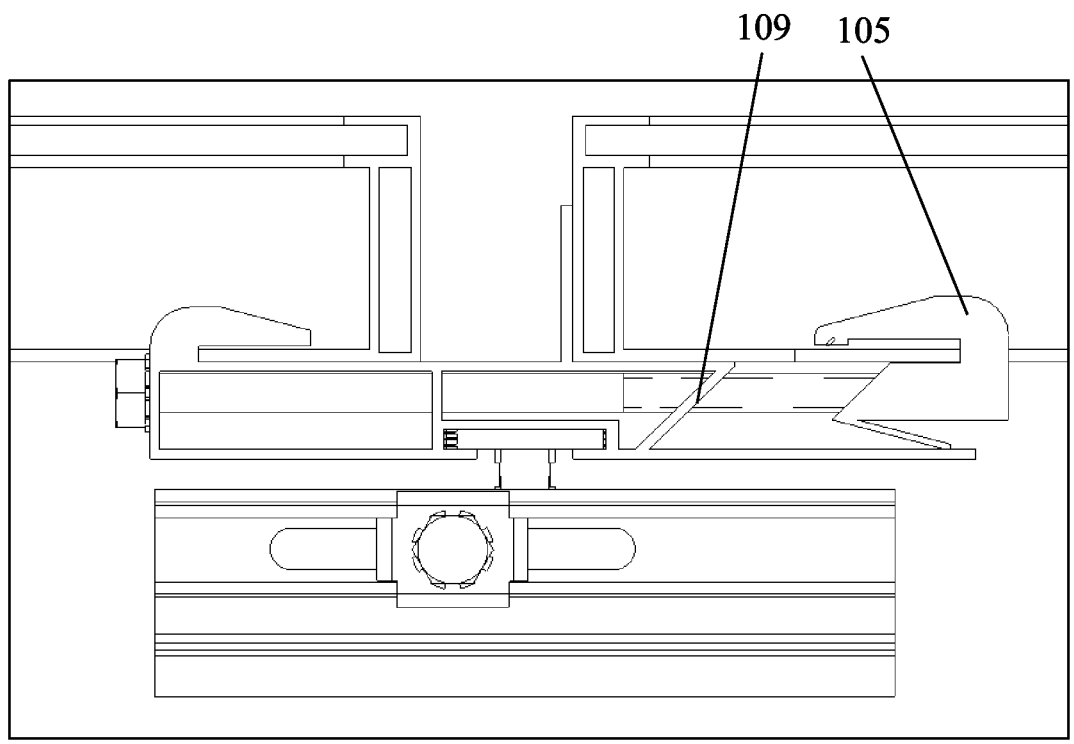
FIG. 138 is a cross-sectional view of one component of one embodiment of the invention.
Figure 139:
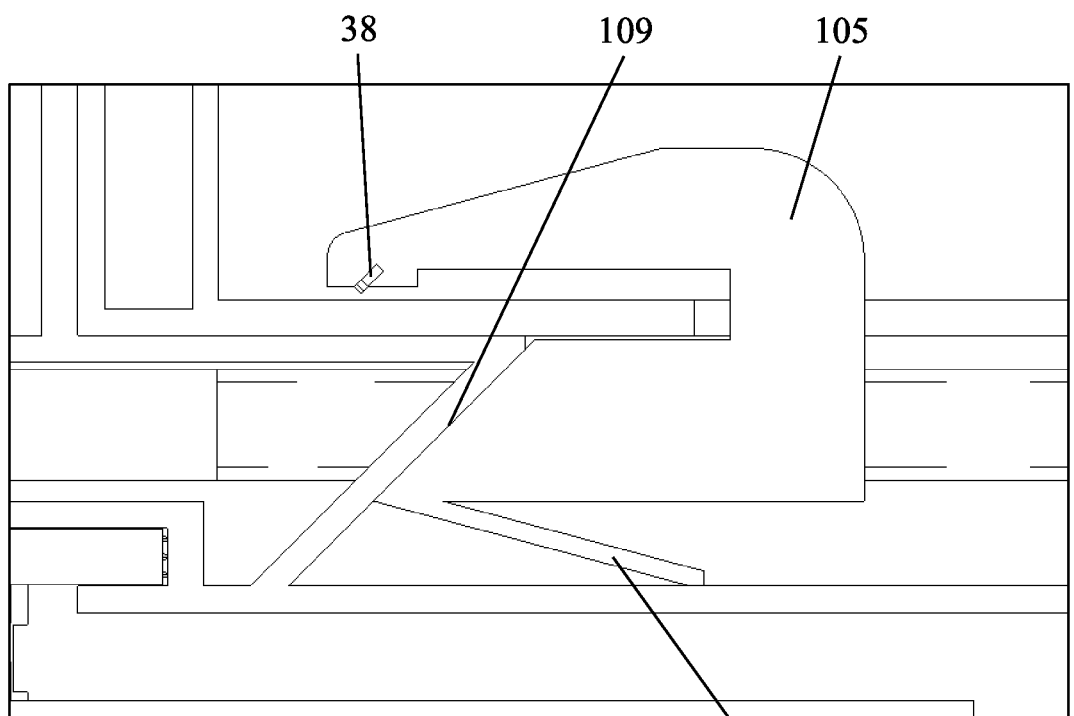
FIG. 139 is a cross-sectional view of one component of one embodiment of the invention.
Figure 140:
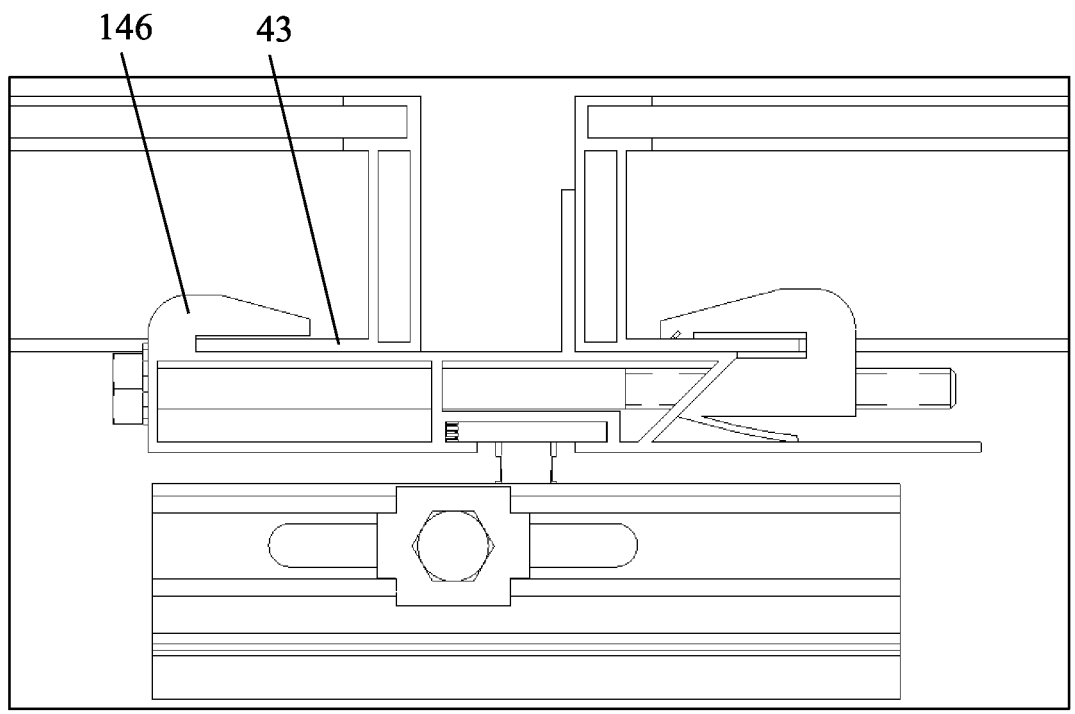
FIG. 140 is a cross-sectional view of one component of one embodiment of the invention.
Figure 141:
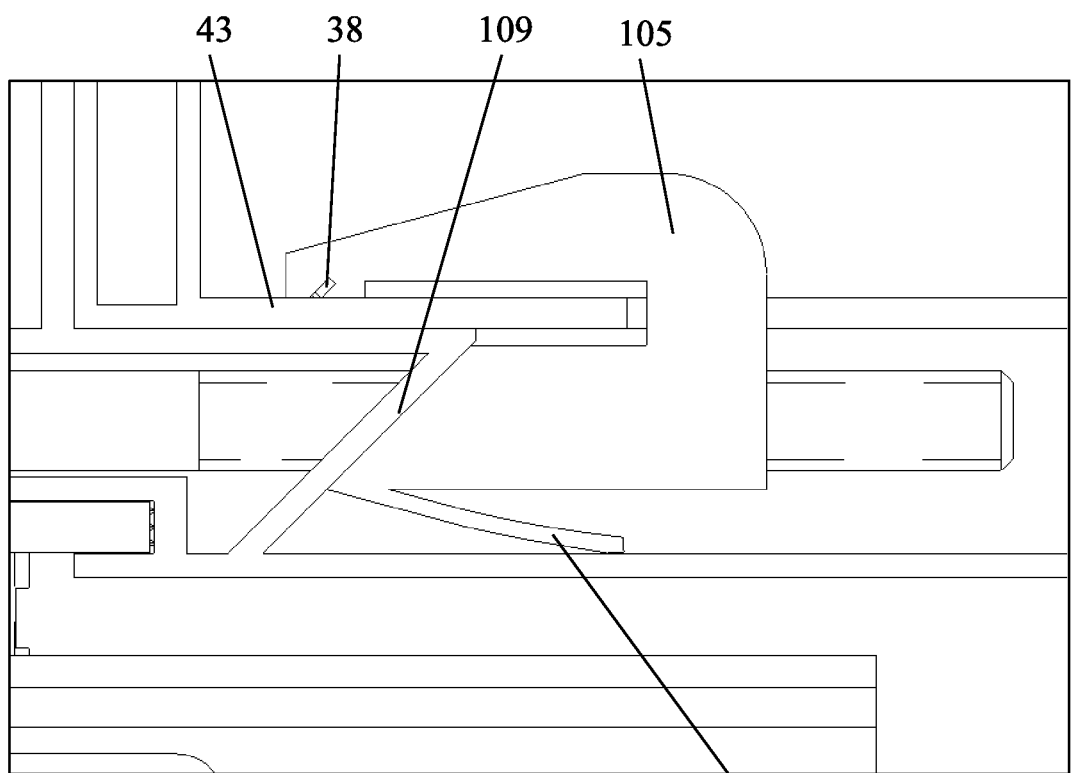
FIG. 141 is a cross-sectional view of one component of one embodiment of the invention.
Figure 142:
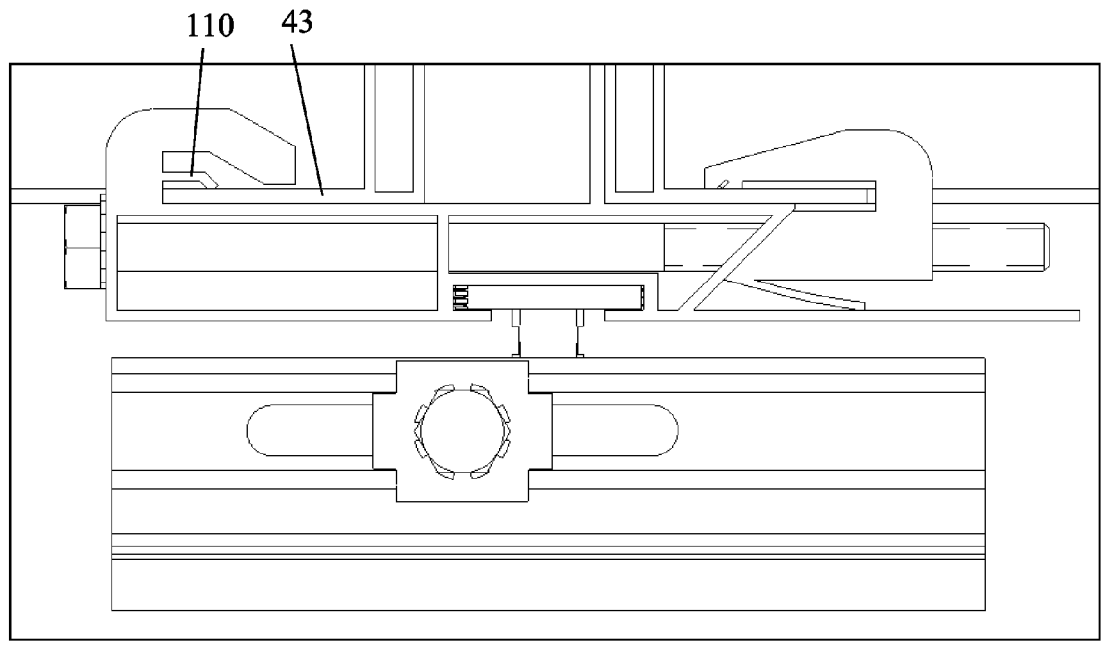
FIG. 142 is a cross-sectional view of one component of one embodiment of the invention.
Figure 143:
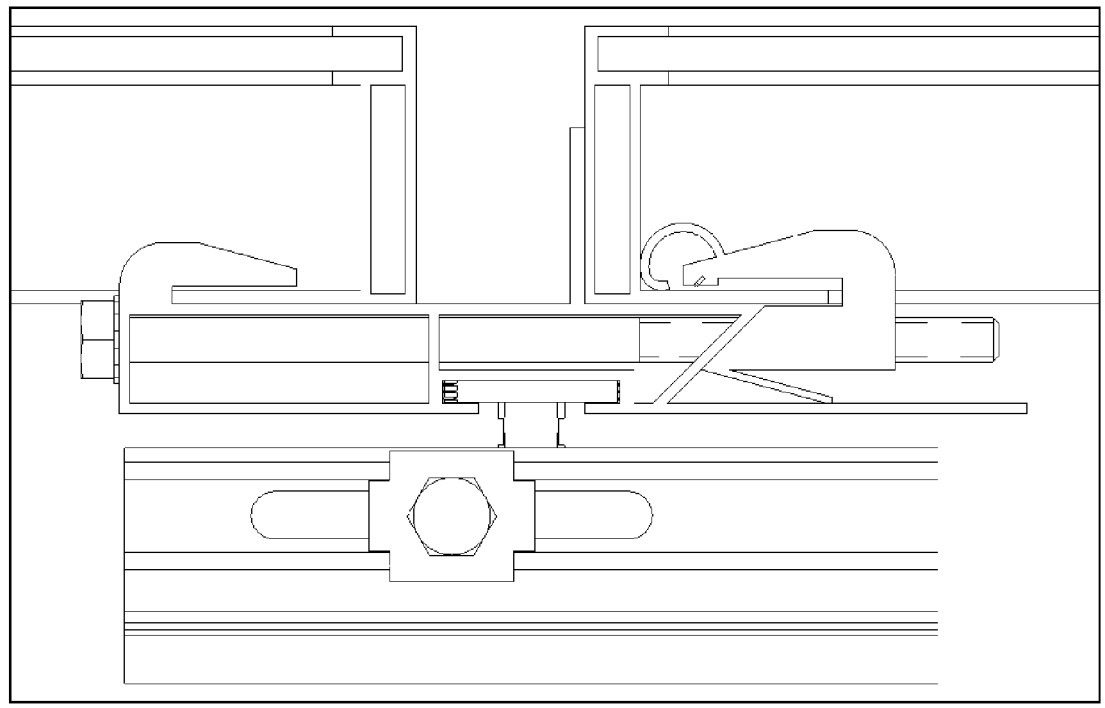
FIG. 143 is a cross-sectional view of one component of one embodiment of the invention.
Figure 144:
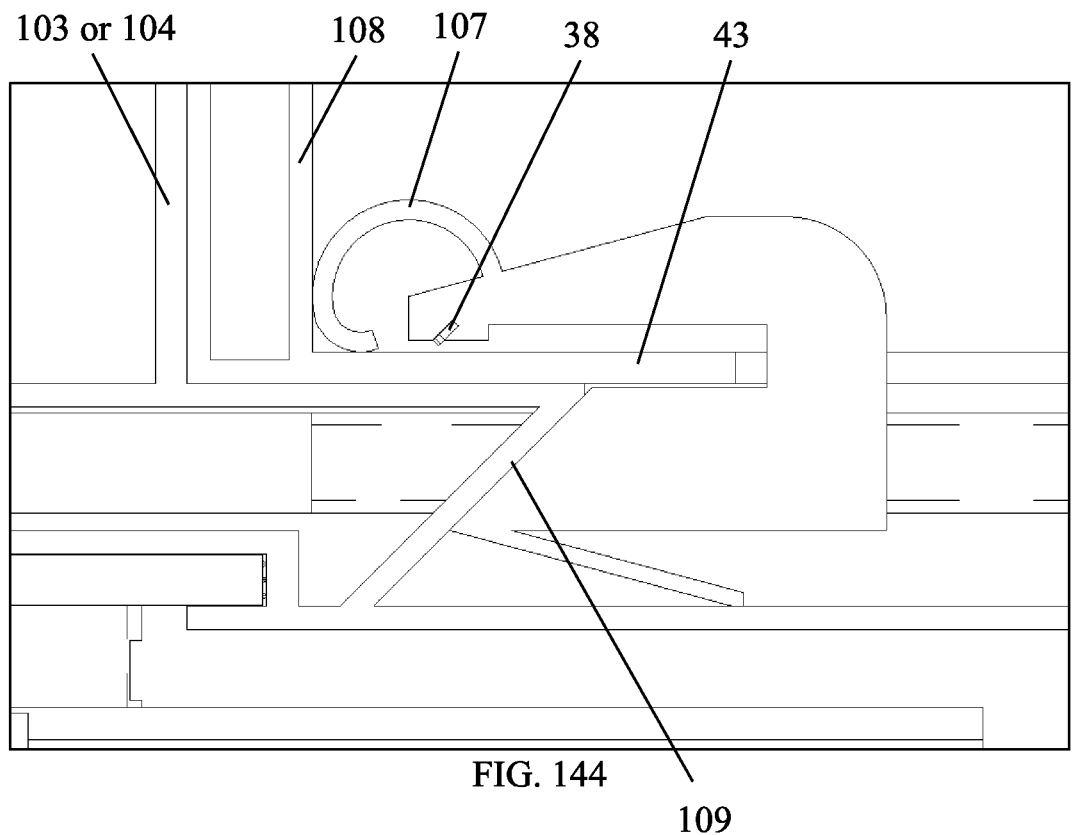
FIG. 144 is a cross-sectional view of one component of one embodiment of the invention.

FIG. 130 shows another Solar Panel Support System, 1 and FIG. 131 shows this same system with the middle of the Solar Panel, 3, removed. As especially depicted in FIG. 137, this embodiment can have a dissociation guide and a wedge clamp. As shown, the Panel Support Slide-SIW, 105, can force the Solar Panel Frame Bottom, 43, against the seat such as Long Panel Support-SIW, 103, and the Short Panel Support-SIW, 104, as shown in FIGS. 132-136, and 140-142. In FIGS. 137 and 139, shows the Panel Support Slide-SIW, 105, above the Solar Panel Frame Bottom, 43. It is kept up to protect the Biting Bar, 38, with the aid of dissociation guide or bias member such as the Panel Support Slide-SIW Up Flexture, 106. As the Panel Support Bolt, 41 is tightened, the Panel Support Slide-SIW, 105, is forced down along the Panel Support Angled Wall, 109, by the wedge element until it clamps the Solar Panel Frame Bottom, 43, as shown in FIGS. 140 and 141. This has forced the Biting Bar, 38, into the Solar Panel Frame Bottom, 43, thus creating grounding between the Panel Support Slide-SIW, 105, and the Solar Panel, 3. FIG. 137 shows the insertion position when the Solar Panels, 3, are first installed. The right Solar Panel, 3, would be installed first and then clamped down. The left Solar Panel, 3, would then be installed and pulled to the left to position it under the Panel Support SIW Retaining Finger, 146. The dissociation guide to which the solar panel movable restraint is responsive, such as the Panel Support Slide-SIW Up Flexture, 106 acts to dissociate the solar panel movable restraint from the solar panel and the coupler seat while the step of moving the solar panel movable restraint with respect to the solar panel coupler seat is accomplished. This can be accomplished by flexibly opposing movement of the solar panel movable restraint against or towards the solar panel coupler seat. This dissociation guide can be a mount integral dissociation guide and multiple such guides can be provided in some embodiments. As an integral solar panel mount component it can be provided as part of the movable restraint as shown. As shown in FIG. 142 and others, there can be an upper integral dissociation guide, perhaps such as Panel Support Slide-SIW Finger Flexture, 110 not on a movable restraint, and a lower integral dissociation guide such as the Panel Support Slide-SIW Up Flexture, 106. These items can be integral or a separate dissociation guide perhaps even such as a springed dissociation guide.

Figure 145:
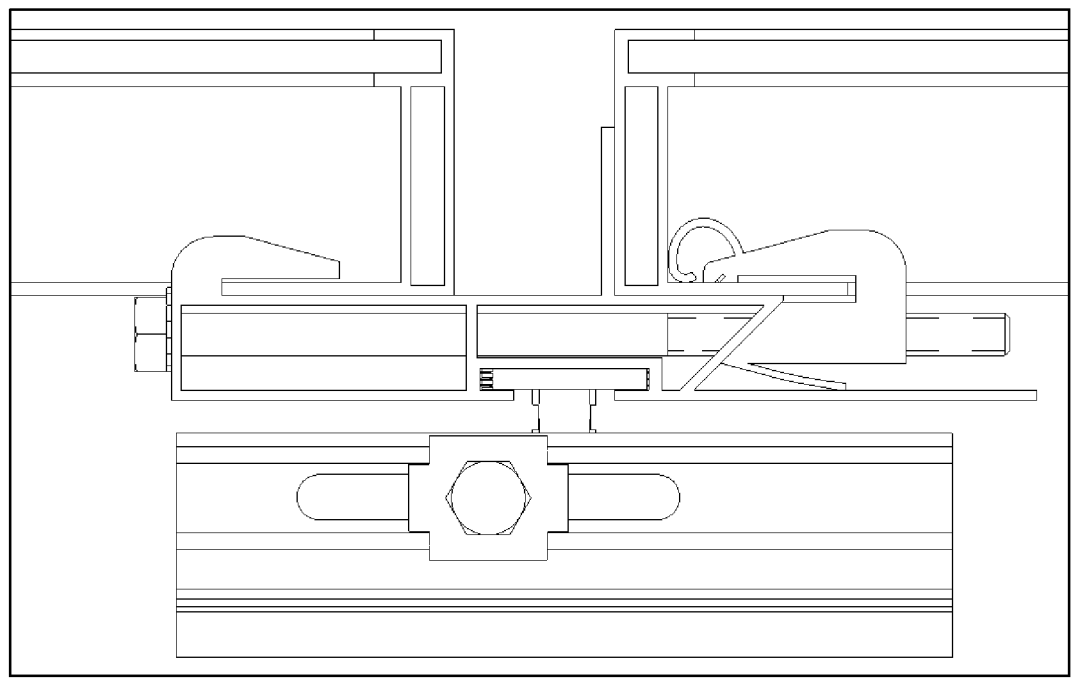
FIG. 145 is a cross-sectional view of one component of one embodiment of the invention.
Figure 146:
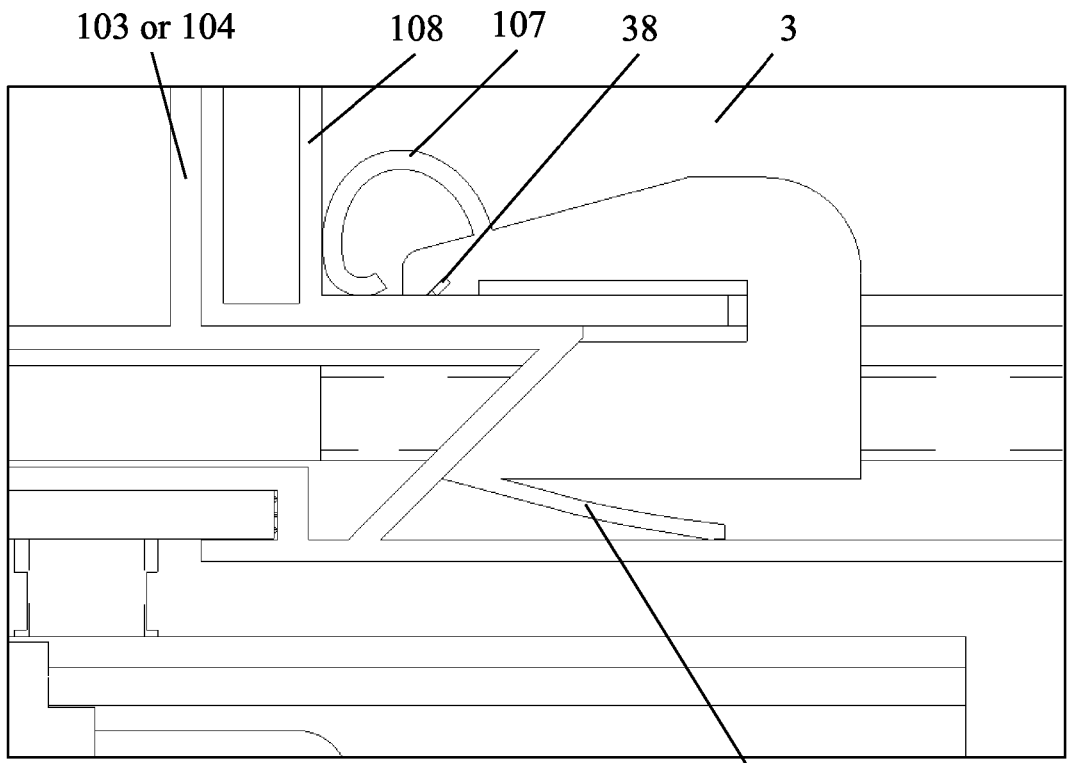
FIG. 146 is a cross-sectional view of one component of one embodiment of the invention.

Similarly, there can be at least one adverse movement bias element that biases the solar panel movable restraint away from the solar panel and the coupler seat. A seat proximate bias element, can act proximate to the solar panel coupler seat as shown. In operation, this can be overcome by a non-dissociation coupler element configured to overcome dissociation by said dissociation guide, non-dissociating at least one solar panel mount component, by a non-adverse bias coupler element, or by a non-oppositional coupler element. This can be provided such as by a clamping member, perhaps such as shown through a wedge member responsive to the threaded adjuster. By causing wedge movement of the solar panel movement restraint a solar panel lip overhang can be wedge clamped to the solar panel to affix it in position. At least partially reducing the step of biasing the solar panel movable restraint away from said solar panel coupler seat can be part of the installation process. FIGS. 143 to 146, show a Panel Support Slide-SIW Flexture, 107 to keep the Biting Bar, 38, off the Solar Panel Frame Bottom, 43, and push Solar Panel Inner Frame, 108, which seats the Solar Panel, 3, against the Long Panel Support-SIW, 103, and the Short Panel Support-SIW, 104. FIGS. 145 and 146 show the Panel Support Slide-SIW Flexture, 107, in a compressed state.

As shown in FIG. 141, the wedge can serve as one type of a solar panel mount base compression member that applies a solar panel mount base compressive force such as to the bottom lip of the solar panel. As such a panel lip compressive force member or also a base compressive force member or a base compression clamp system, the panel can be held in place such as through base compression. There can also be a small gap between the Panel Support SIW Retaining Finger, 146, and the Solar Panel Frame Bottom, 43. To help subside rattling, a Panel Support Slide-SIW Finger Flexture, 110, is shown in FIG. 142. This Panel Support Slide-SIW Finger Flexture, 110, will put an additional down force on the Solar Panel Frame Bottom, 43.

FIG. 137 also shows an open top intermediate support that does not extend beyond the panel height. Embodiments can have a standard panel height intermediate support or one that is shorter than a standard panel height.

Figure 147:
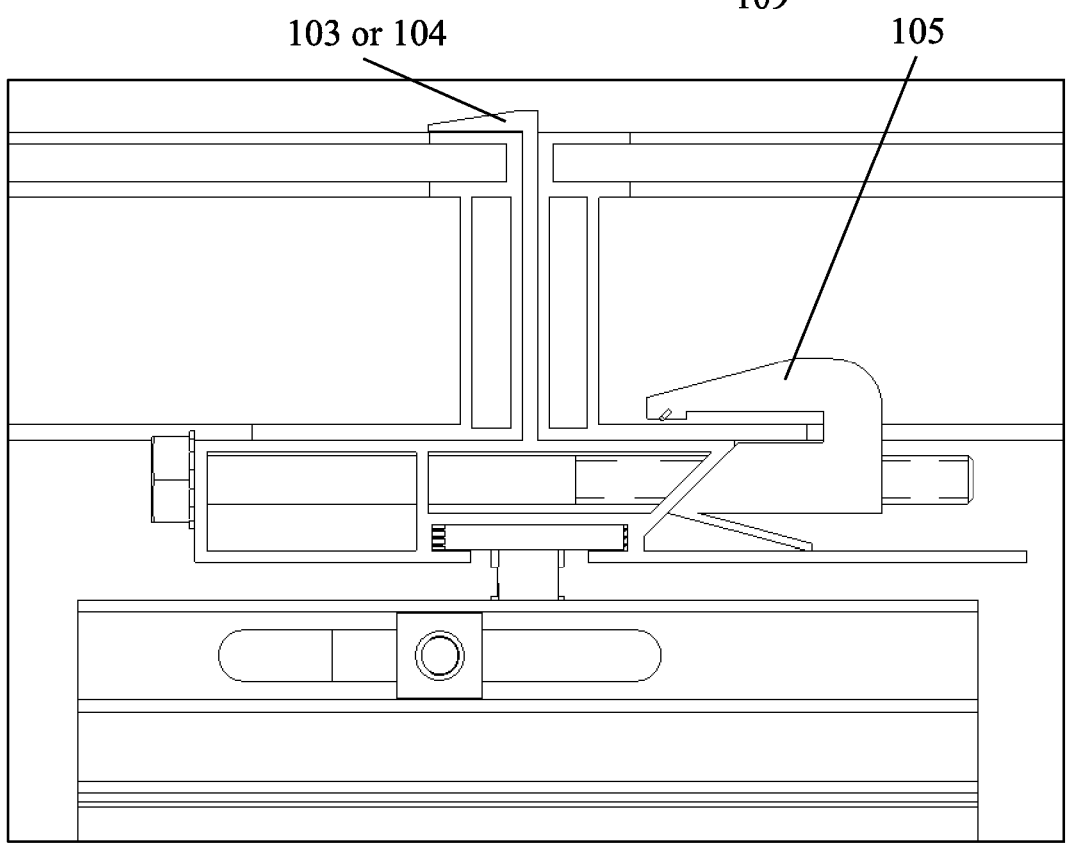
FIG. 147 is a cross-sectional view of one component of one embodiment of the invention.

FIG. 147 shows that the lip on Long Panel Support-SIW, 103, and the Short Panel Support-SIW, 104, can be removed and still will be held down with the Panel Support Slide-SIW, 105.

Grounding between the T-Bolt, 60, and the Long Panel Support-SIW, 103, and the Short Panel Support-SIW, 104, can be accomplished by creating an interference fit between portions of the T-Bolt, 60, and the Long Panel Support-SIW, 103, and the Short Panel Support-SIW, 104.

Figure 116:
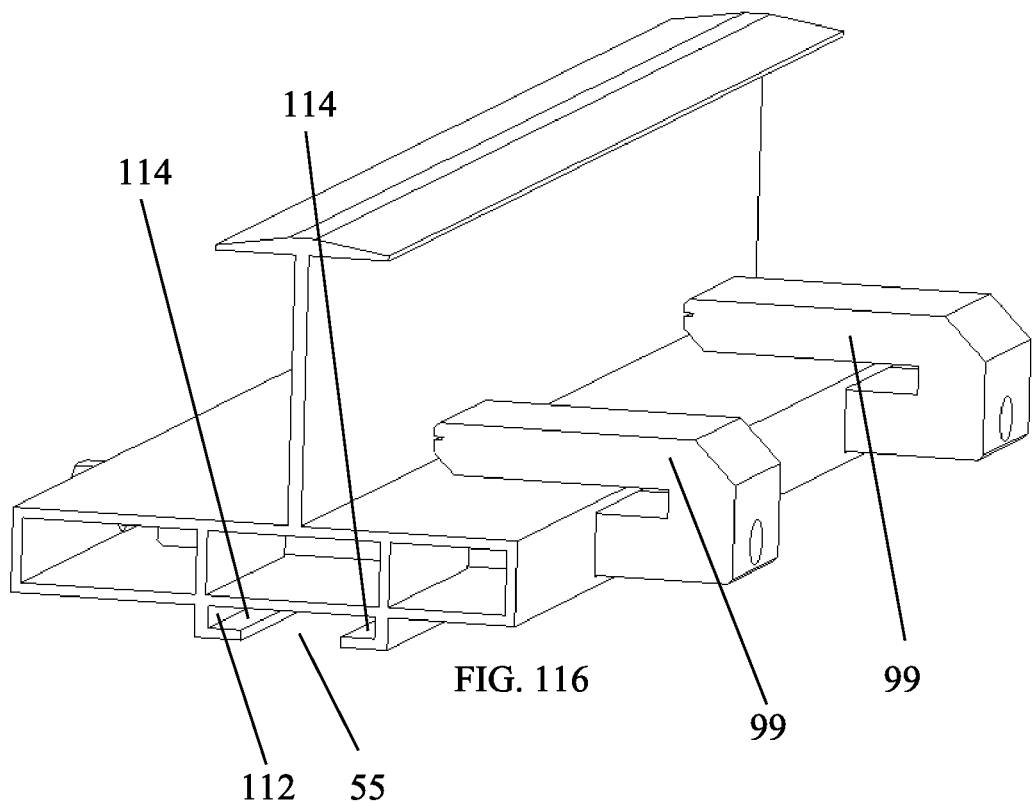
FIG. 116 is a perspective view of one component of one embodiment of the invention.
Figure 117:
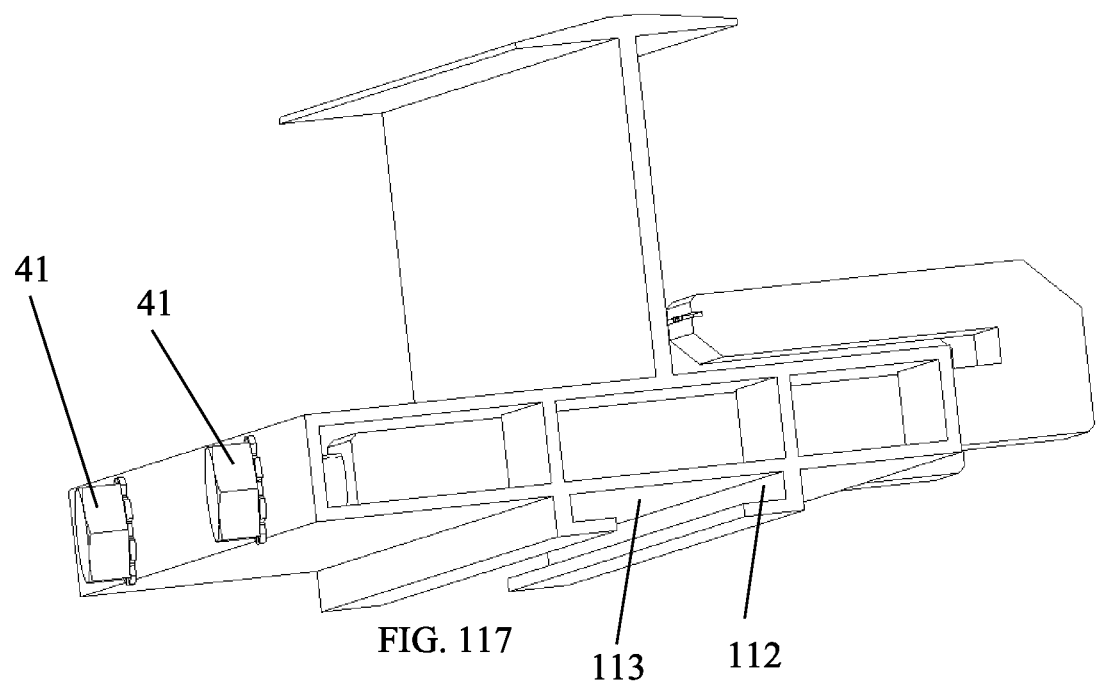
FIG. 117 is a perspective view of one component of one embodiment of the invention.
Figure 118:
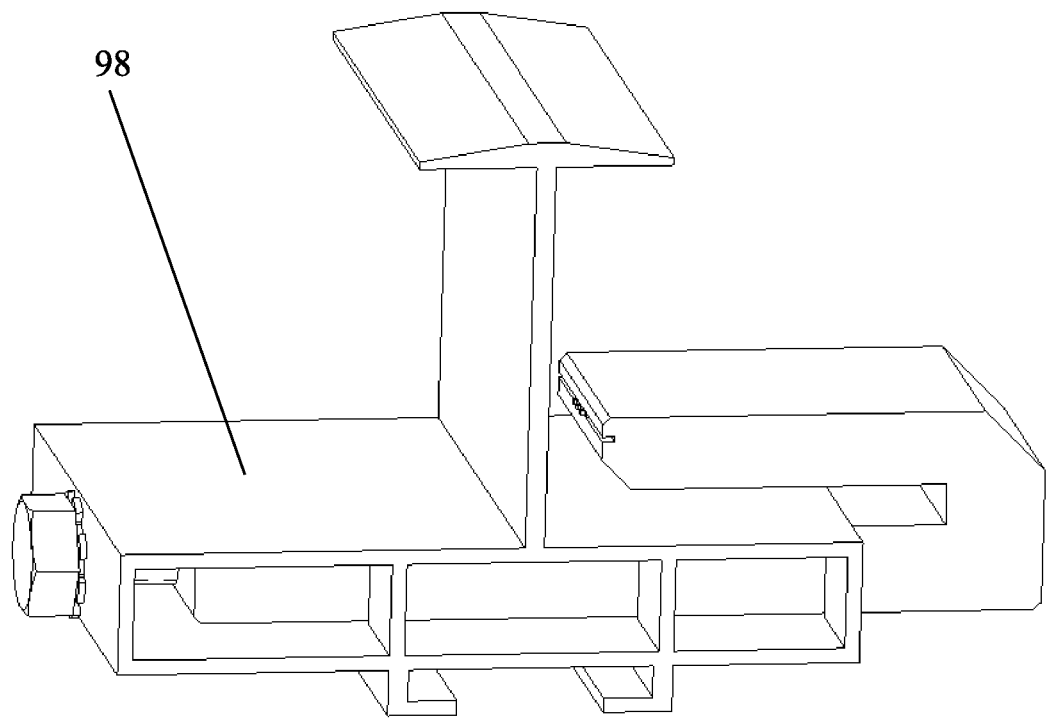
FIG. 118 is a perspective view of one component of one embodiment of the invention.
Figure 119:
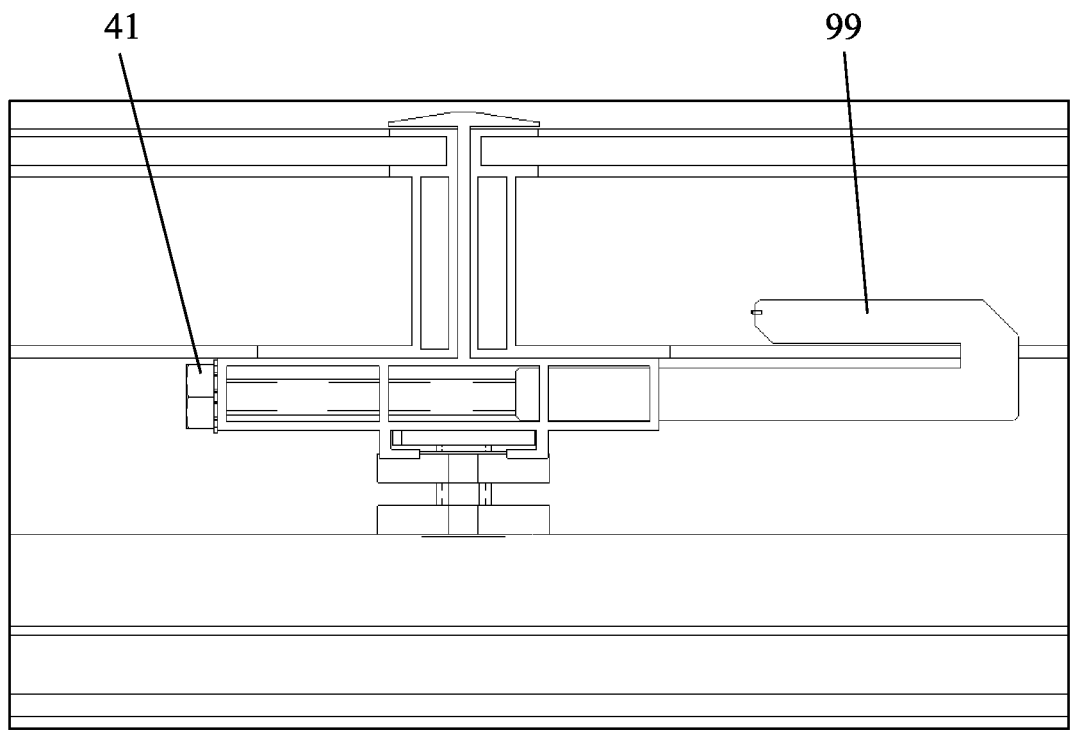
FIG. 119 is a cross-sectional view of one component of one embodiment of the invention.
Figure 148:
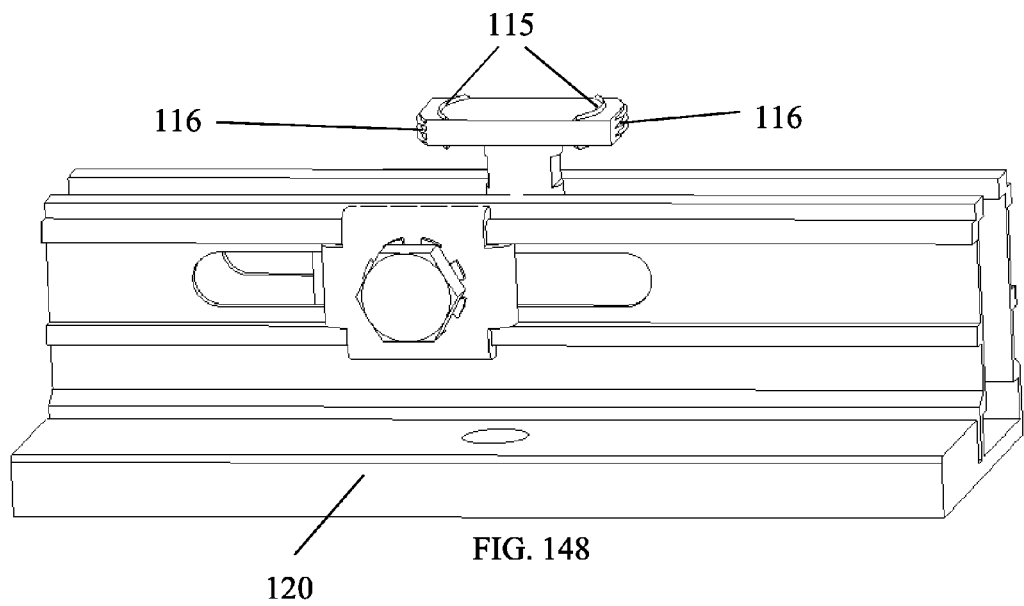
FIG. 148 is a perspective view of one component of one embodiment of the invention.
Figure 149:
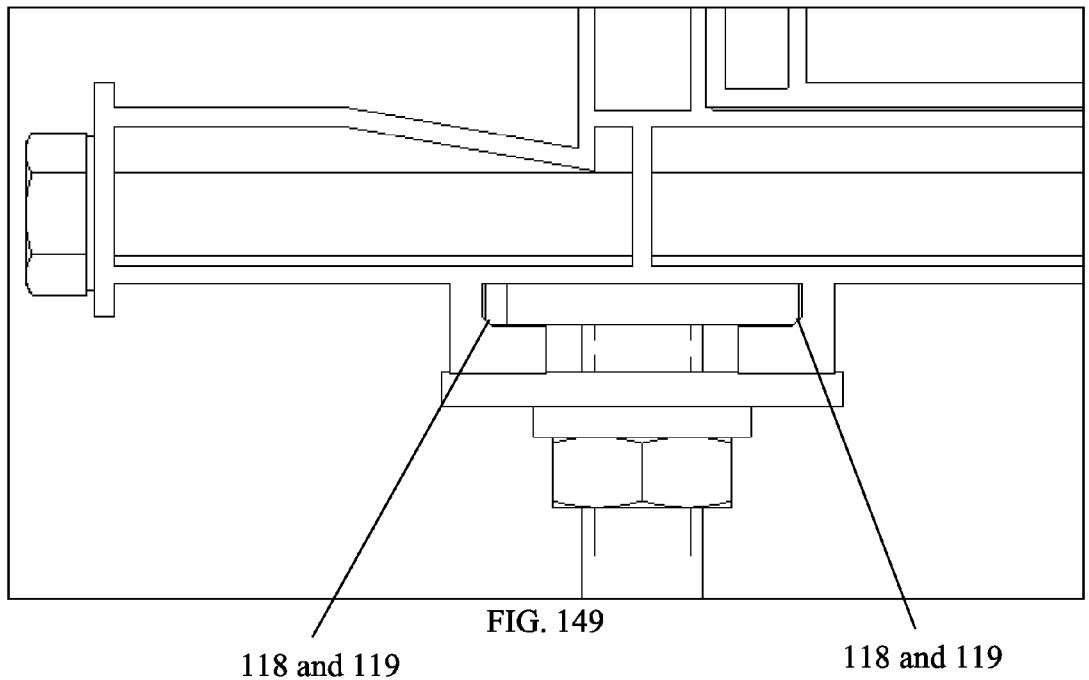
FIG. 149 is a cross-sectional view of one component of one embodiment of the invention.
Figure 150:
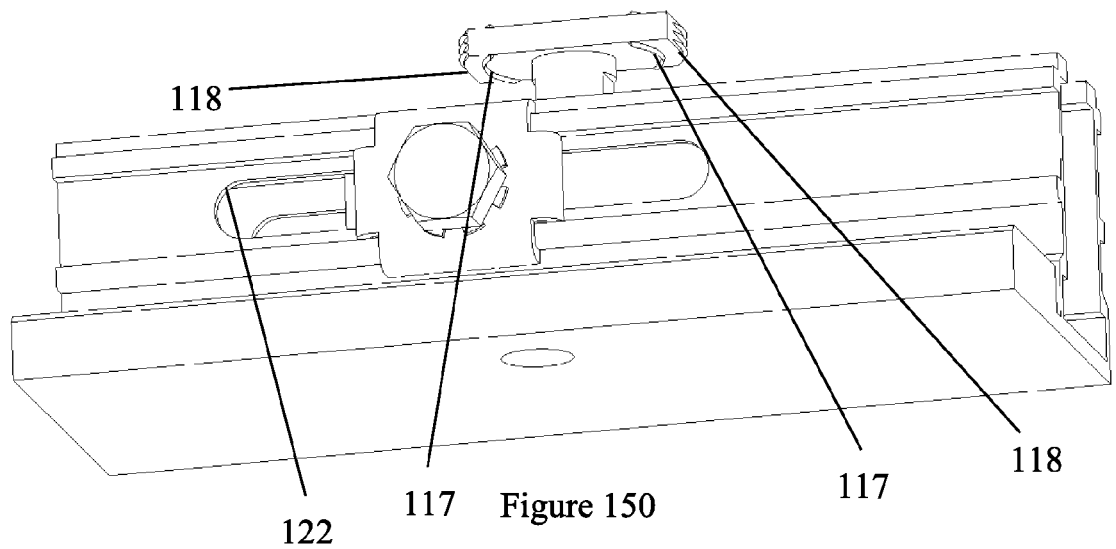
FIG. 150 is a perspective view of one component of one embodiment of the invention.
Figure 151:
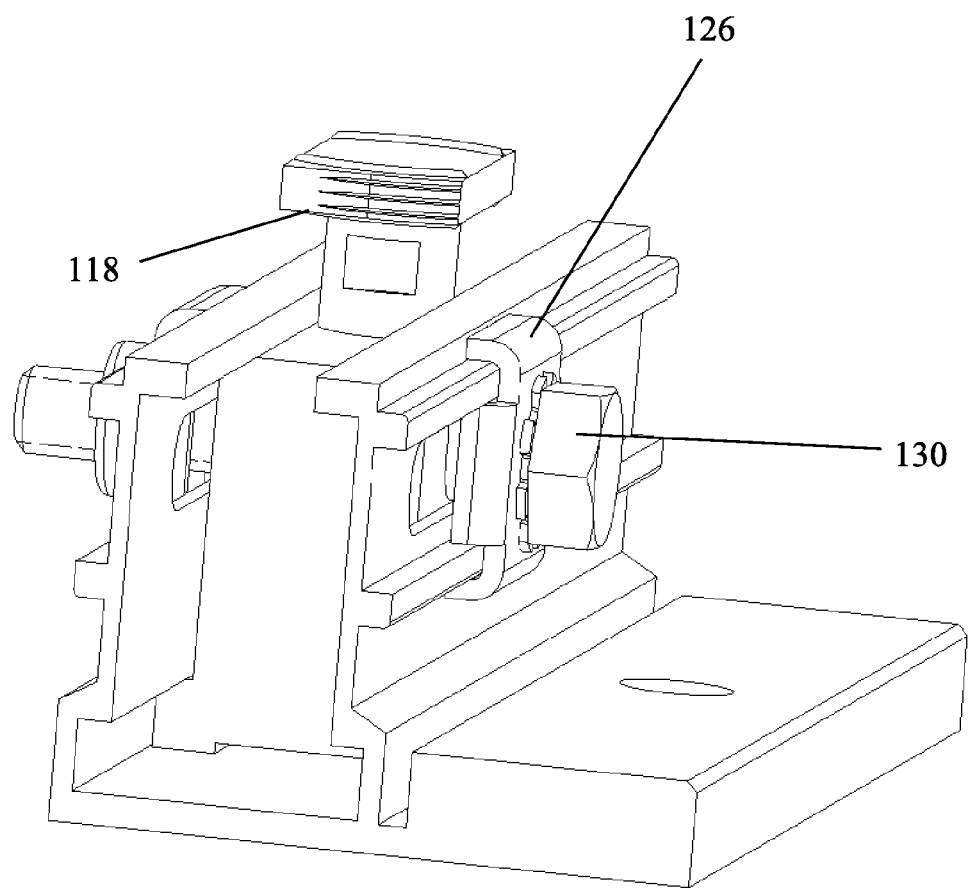
FIG. 151 is a perspective view of one component of one embodiment of the invention.

FIG. 149 is an enlargement of FIG. 48. In FIGS. 149 to 151 there is interference between the T-Bolt Top Biting Corner, 118, and the Panel Support C-Channel Corner, 119, when the T-Bolt, 60, is rotated into the Panel Support C-Channel, 55, shown in FIG. 116. This interference could also be at the opposite edge of the T-Bolt, 60. Other biting surfaces can be formed on the T-Bolt, 60, as shown in FIGS. 148 and 150. Referring to FIGS. 116 117, 148 and 150, when the T-Bolt, 60, is rotated into the Panel Support C-Channel, 55, as shown in FIG. 116, The T-Bolt Bottom Biting Teeth, 117, would cut into the Panel Support C-Channel Bottom, 114, the T-Bolt Side Biting Teeth, 116, would cut into the Panel Support C-Channel Sides, 112, and the T-Bolt Top Biting teeth, 115, would cut into the Panel Support C-Channel Top, 113. You need at least one of these biting teeth, 115, 116, 117 or 118 to form a ground path.

Figure 152:
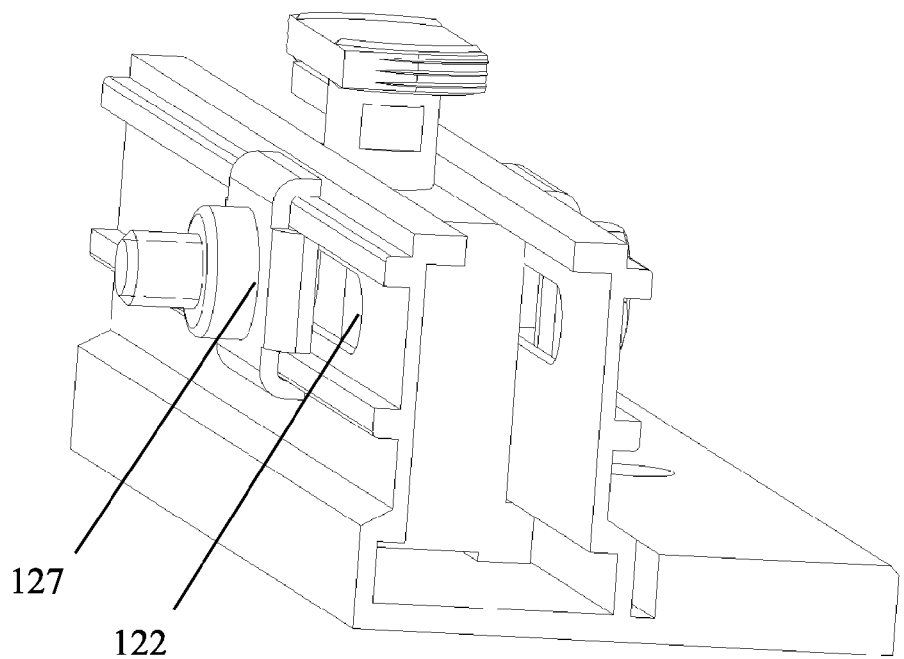
FIG. 152 is a perspective view of one component of one embodiment of the invention.

As FIG. 151 shows, a foundation mount base can have a first side member adjacent a first slider side as on the left in the figure, and a second side member adjacent a second slider side as on the right in the figure. A slider retainer element such as the Channel Bolt, 130, can be attached to the first slider side and the second slider side to opposite side engage the solar panel support slider by the solar panel foundation mount. This can then act to retain the solar panel support slider by said solar panel foundation mount. The mount riser shown in FIG. 153 extends from said solar panel support slider to set the height of the actual panel mount base. This can also be retained in position by the step of opposite side engaging. As such there can be a mount riser retainer that acts as a compression restraint. This can be achieved by tightening a singular retainer element such as a threaded retainer or the transverse bolt, 130 as shown. The design shown assembled in FIG. 152 presents a side clamp system and a solar panel mount side clamp system.

Figure 153:
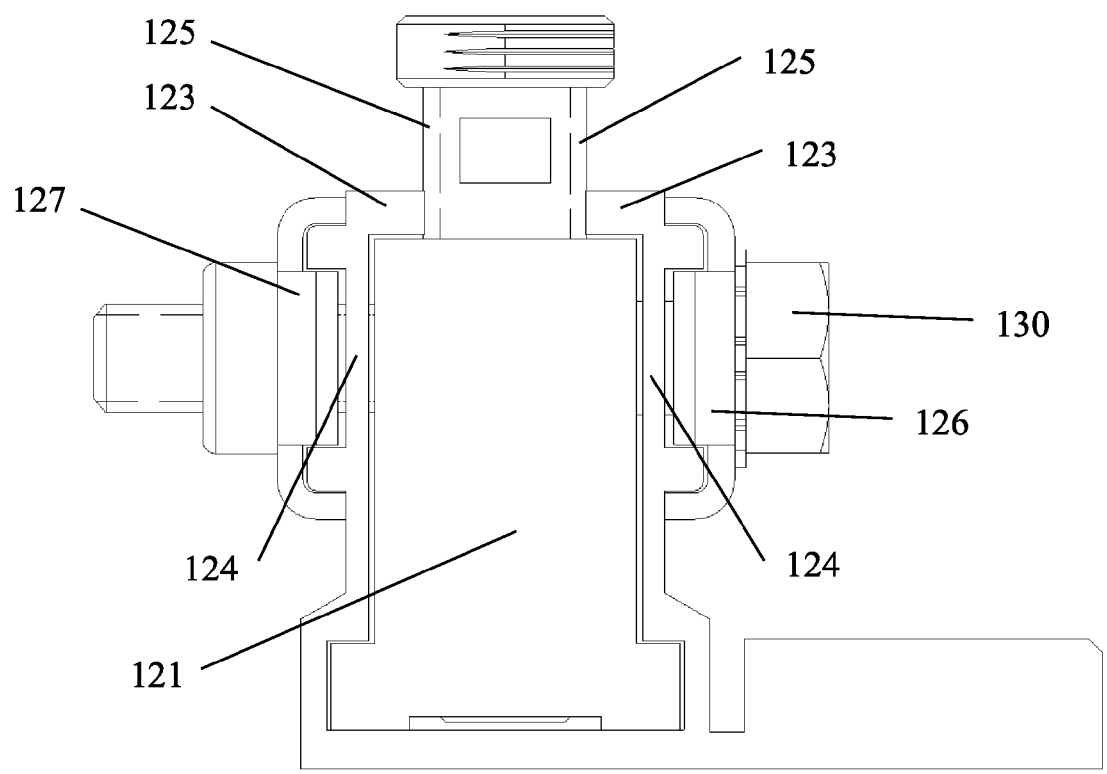
FIG. 153 is a cross-sectional view of one component of one embodiment of the invention.
Figure 154:
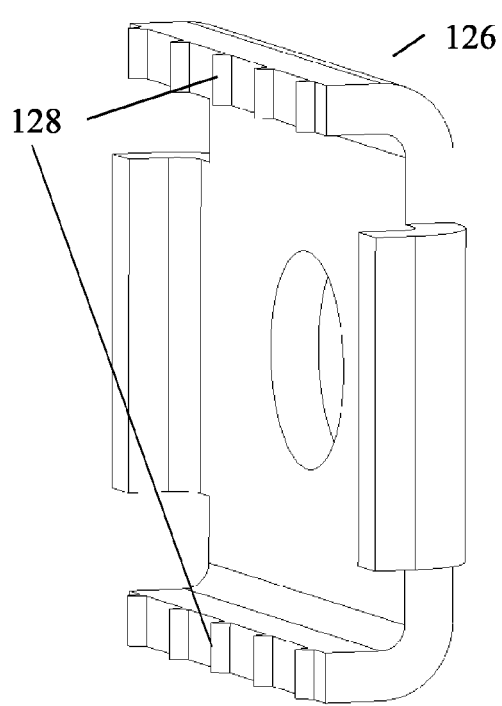
FIG. 154 is a perspective view of one component of one embodiment of the invention.
Figure 155:
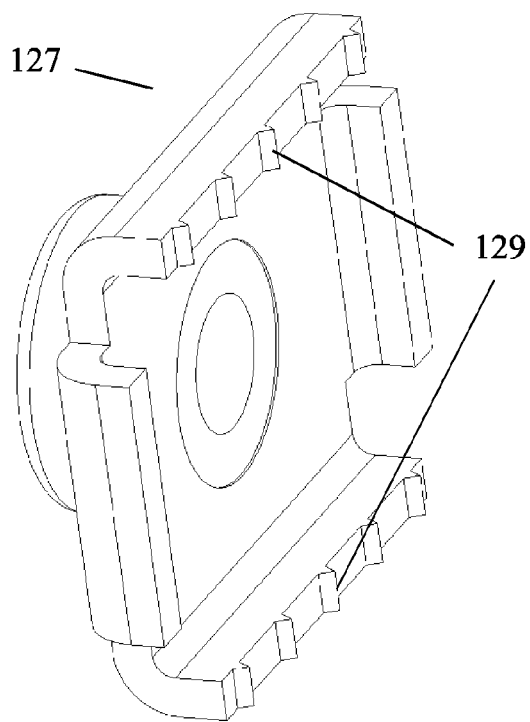
FIG. 155 is a perspective view of one component of one embodiment of the invention.
Figure 156:
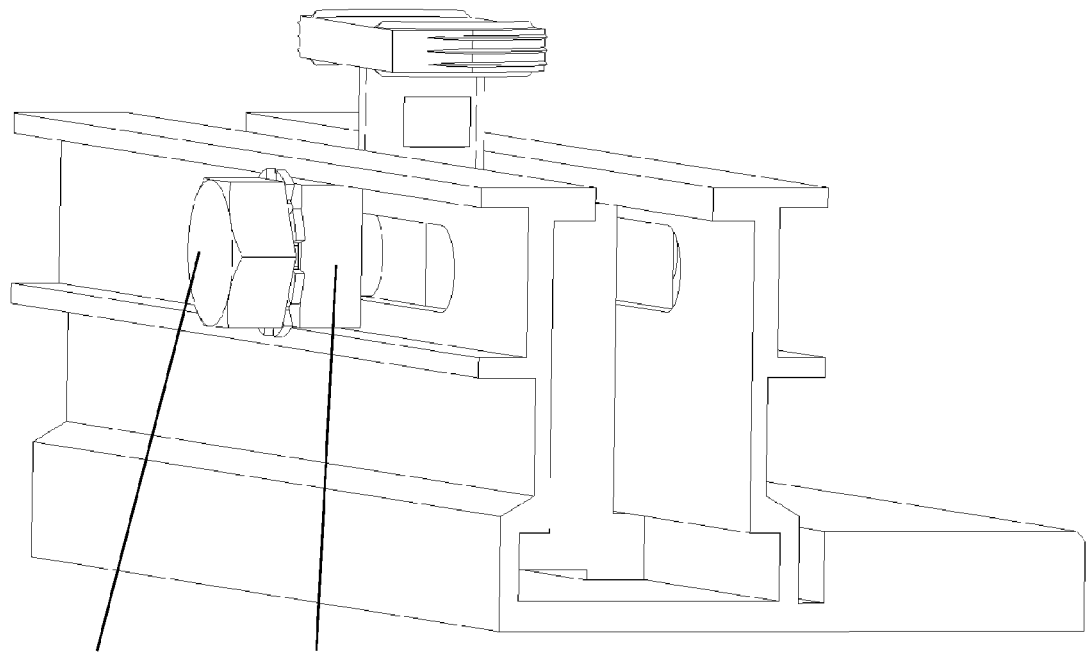
FIG. 156 is a perspective view of one component of one embodiment of the invention.
Figure 157:
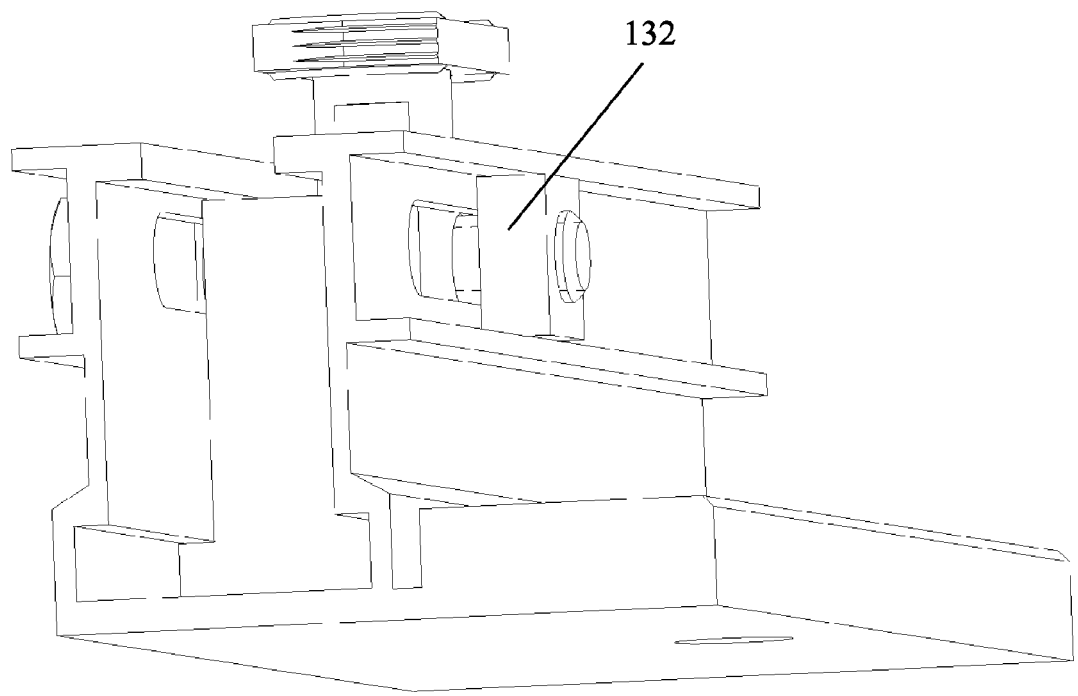
FIG. 157 is a perspective view of one component of one embodiment of the invention.
Figure 158:
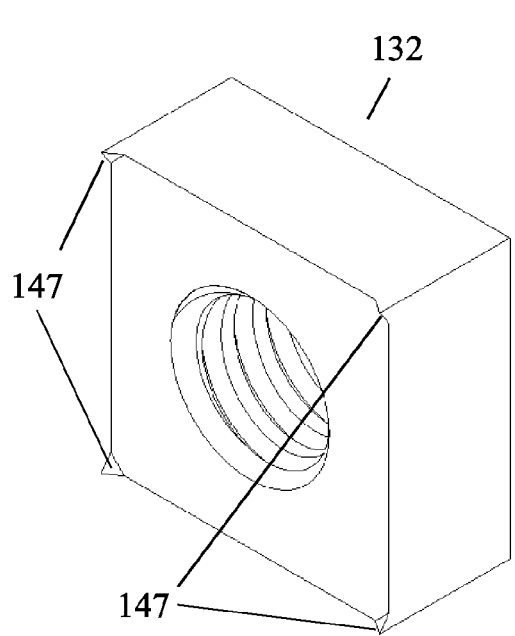
FIG. 158 is a perspective view of one component of one embodiment of the invention.
Figure 159:
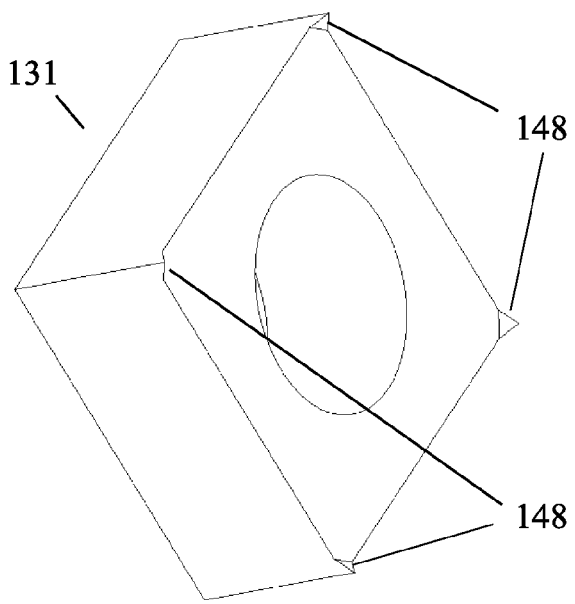
FIG. 159 is a perspective view of one component of one embodiment of the invention.

FIGS. 148, 150-159, shows another way to create and ground between the Roof Mount US Slot Channel, 120, and the T-Bolt, 60. Referring to FIGS. 153 and 156, when the Channel Bolt, 130, is tightened, the separate tines such as the Roof Mount US Slot Channel Lips, 123, are forced into the T-Bolt Thread, 125, which creates a ground between the Roof Mount US Slot Channel, 120, and the T-Bolt, 60. This also secures the Roof Mount US Slot Slider, 121, to the Roof Mount US Slot Channel Sides, 124 by friction between the Roof Mount US Slot Channel Sides, 124, and the Roof Mount US Slot Slider, 121, the friction force on the Roof Mount US Slot Channel Sides, 124, by the Biting Channel Formed Washer, 126, Biting Channel Formed Nut, 127, Biting Channel Square Washer, 131, and Biting Channel Square Nut, 132 and the anchoring of the Biting Channel Formed Washer Teeth, 128, Biting Channel Formed Nut Teeth, 129, Biting Channel Square Nut Teeth, 147, and Biting Channel Square Washer Teeth, 148 to the Roof Mount US Slot Channel Sides, 124.

The Biting Channel Formed Nut Teeth, 129, Biting Channel Square Nut Teeth, 147, and Biting Channel Square Washer Teeth, 148, also create a ground path between the Roof Mount US Slot Slider, 121, to the Channel Bolt, 130. The Roof Mount US Slot Slider, 121, is adjustable within the Roof Mount US Slot, 122. If there were a slippage between the Roof Mount US Slot Slider, 121, and Roof Mount US Slot Channel, 120, it would be limited to slippage only to the end of the Roof Mount US Slot, 122.

FIGS. 160 to 168 show another roof mount and panel support with an open top intermediate support that does not extend beyond the panel height. As shown this embodiment does not provide a top panel restraint above the intermediate support. FIGS. 164 to 167 show a short panel support but would apply to a long panel support also. Especially with reference to FIG. 163, it can be appreciated how the solar panel frame lip end restraint acts to solar panel lip end clamp the solar panel against the intermediate support and how the design can present a solar panel underside lip capture seat for bottom lip compression clamping of the solar panel.

Figure 164:
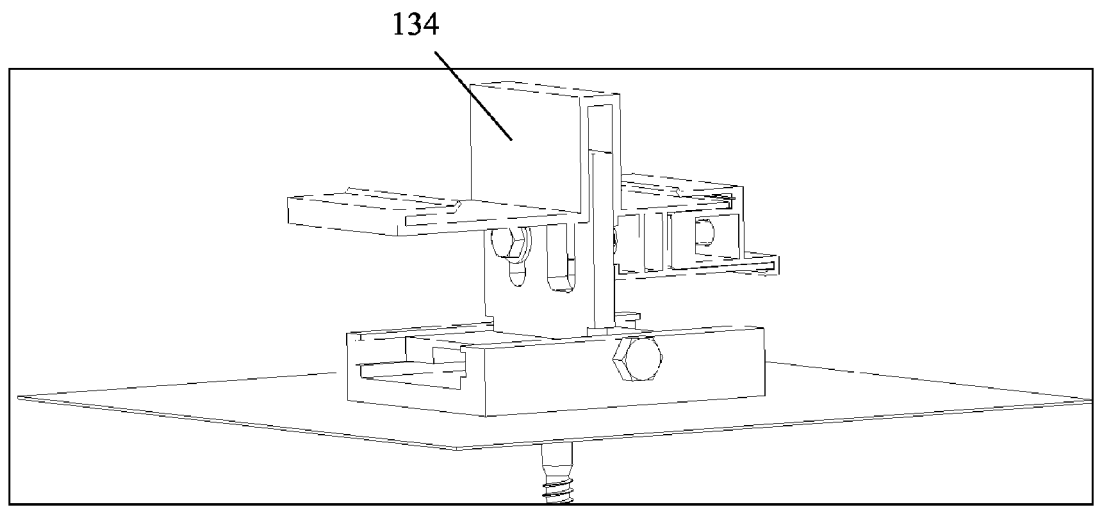
FIG. 164 is a perspective view of one component of one embodiment of the invention.
Figure 165:
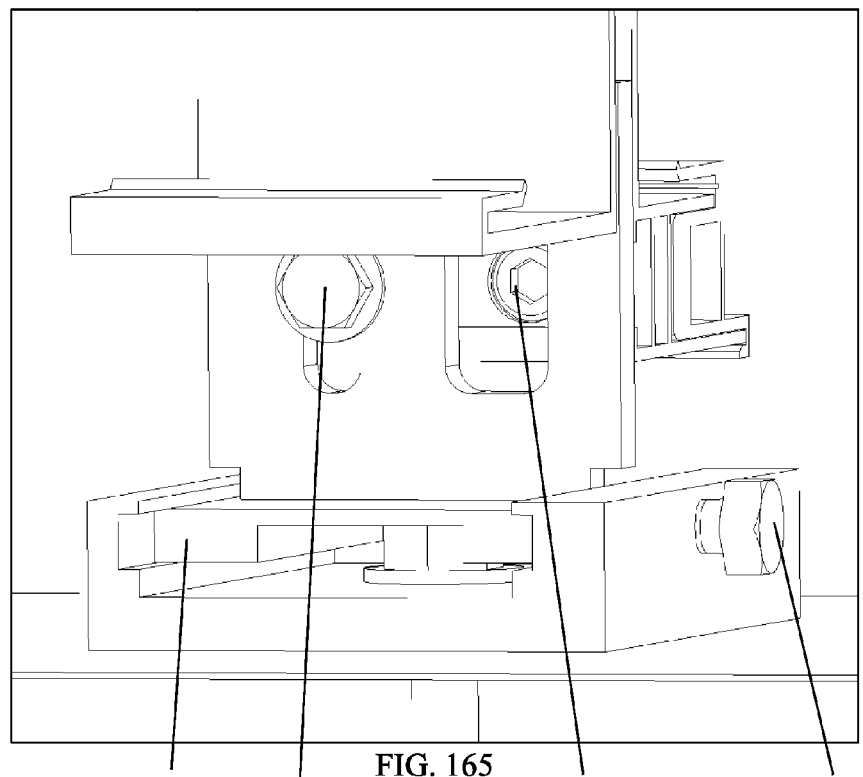
FIG. 165 is a perspective view of one component of one embodiment of the invention.
Figure 166:
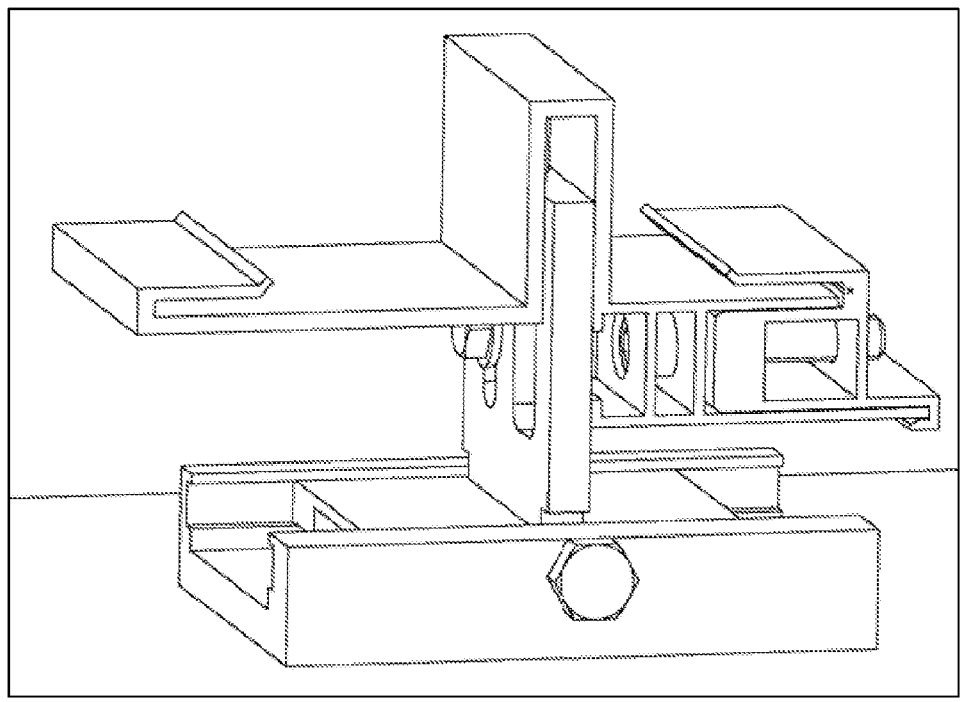
FIG. 166 is a perspective view of one component of one embodiment of the invention.
Figure 167:
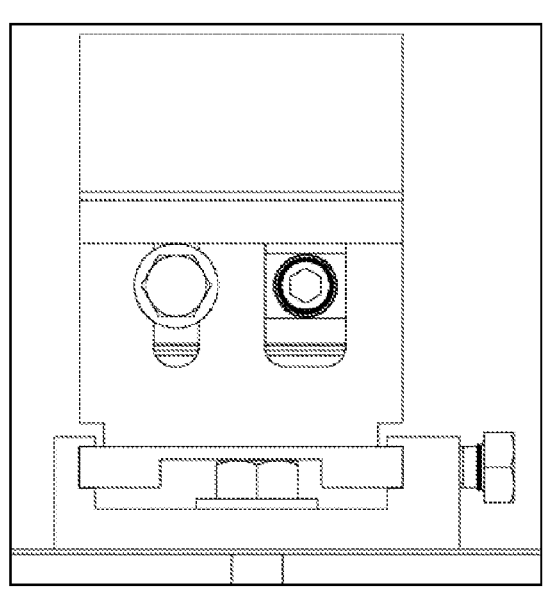
FIG. 167 is a perspective view of one component of one embodiment of the invention.
Figure 168:
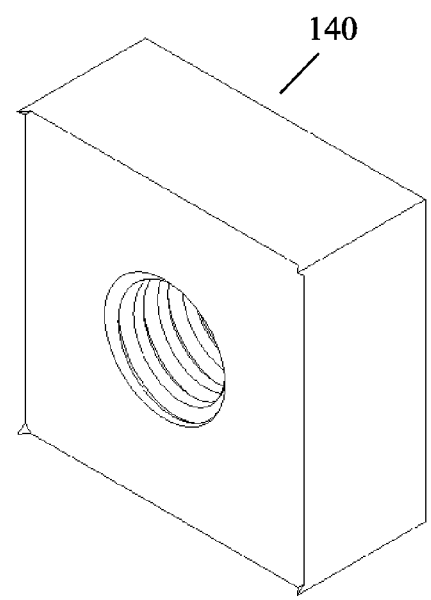
FIG. 168 is a perspective view of one component of one embodiment of the invention.

As shown in FIG. 164 on the left side, embodiments can have a solar panel perpendicular movement restraint situated in proximity to the solar panel lateral movement mount. This solar panel perpendicular movement restraint can restrain solar panel perpendicular movement in a manner that allows some amount of limited perpendicular movement, while yet still allowing solar panel lateral movement within the solar panel mount. This can be achieved by the overhanging a solar panel lip as shown. As mentioned above, the solar panel perpendicular movement restraint can be configured so as to allow some amount of limited perpendicular movement (as compared to the lateral movement) for installation, for use over years, for temperature expansion and contraction, or the like.

Figure 160:
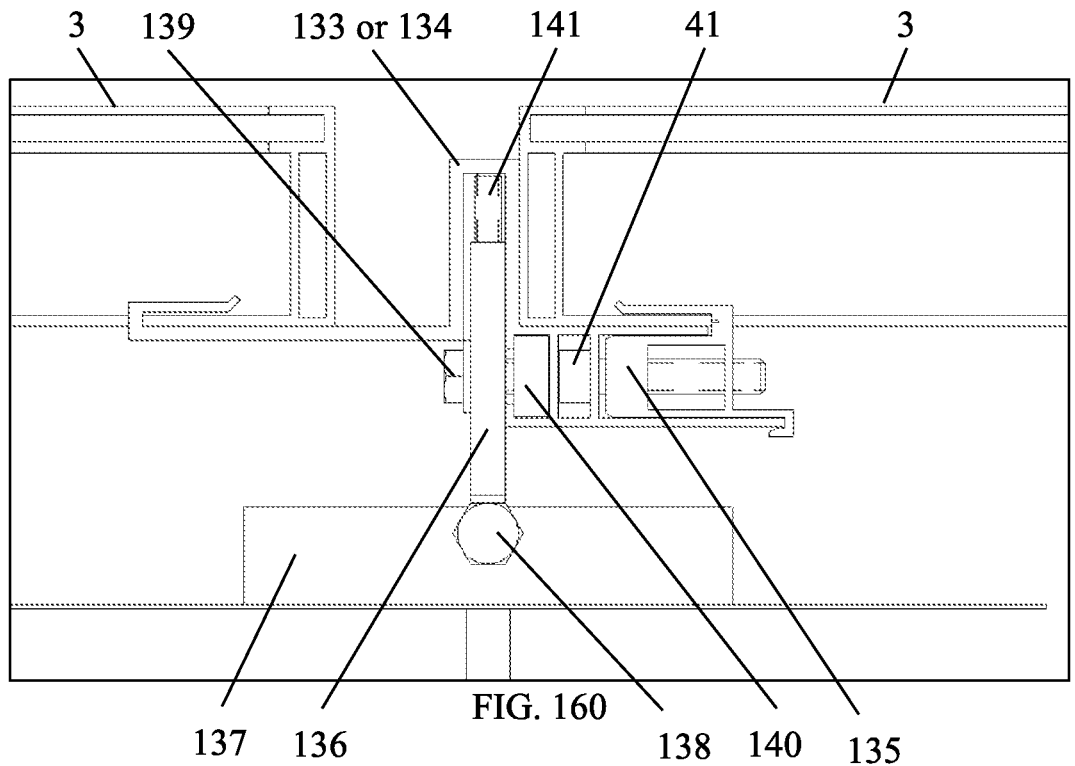
FIG. 160 is a cross-sectional view of one component of one embodiment of the invention.

The Panel Support Height Adjust Screw, 141, as seen in FIG. 160, can be adjusted to so that the tops of the Panel Support Height Adjust Screw, 141, are close to coplanar prior to Solar Panel, 3, installation. Since the top of the Panel Support Height Adjust Screw, 141, can fix the location of the Long Panel Support-TS, 133 and the Short Panel Support-TS, 134, it can aid in the installation of the Long Panel Support-TS, 133, and the Solar Panels, 3. Since the location of the Panel Support Height Adjust Screw, 141, to the Short Panel Support-TS, 134, is close to the same, the Panel Support Height Adjust Screw, 141, could be adjusted from the top through a hole in the top of the Short Panel Support-TS, 134.

Figure 161:
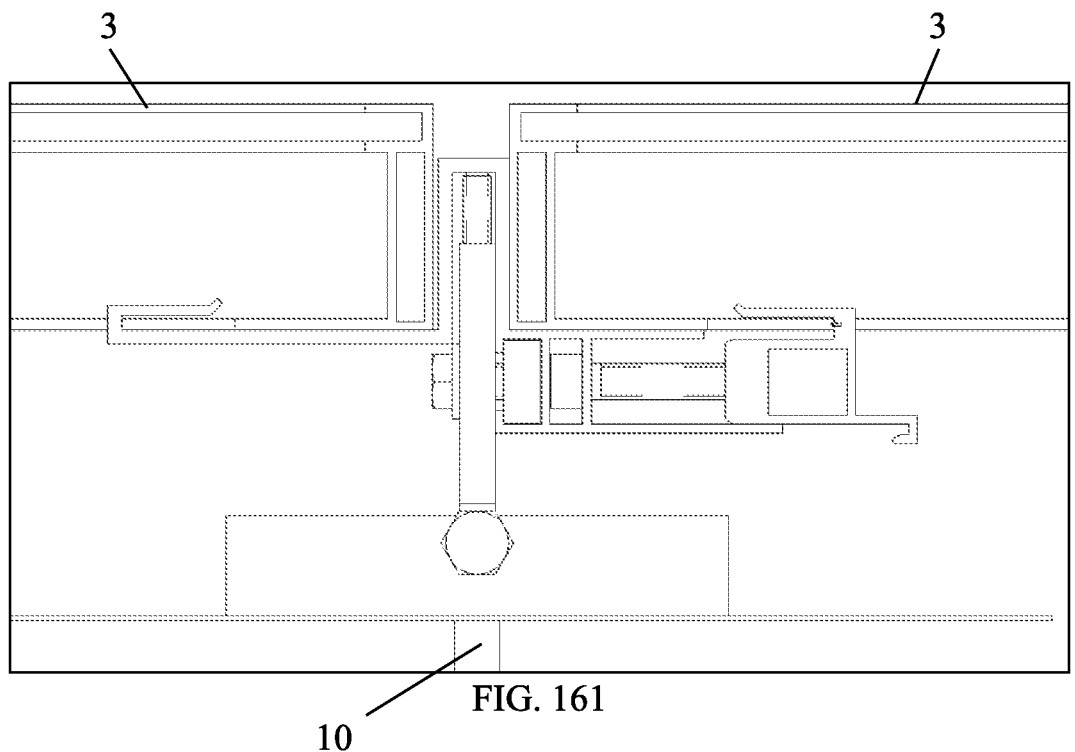
FIG. 161 is a cross-sectional view of one component of one embodiment of the invention.
Figure 162:
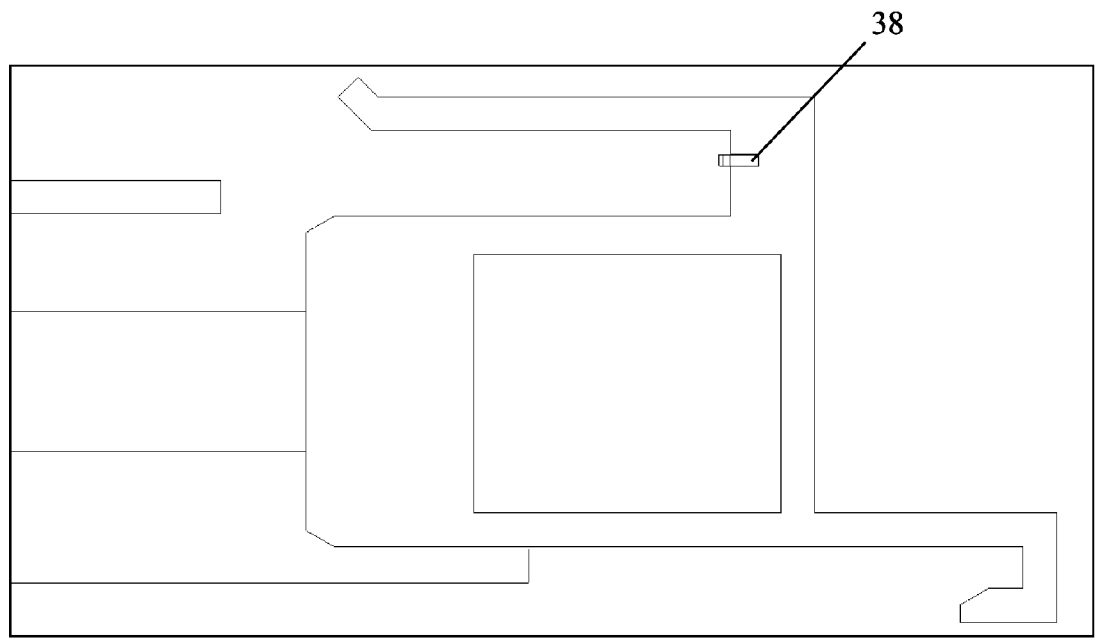
FIG. 162 is a cross-sectional view of one component of one embodiment of the invention.
Figure 163:
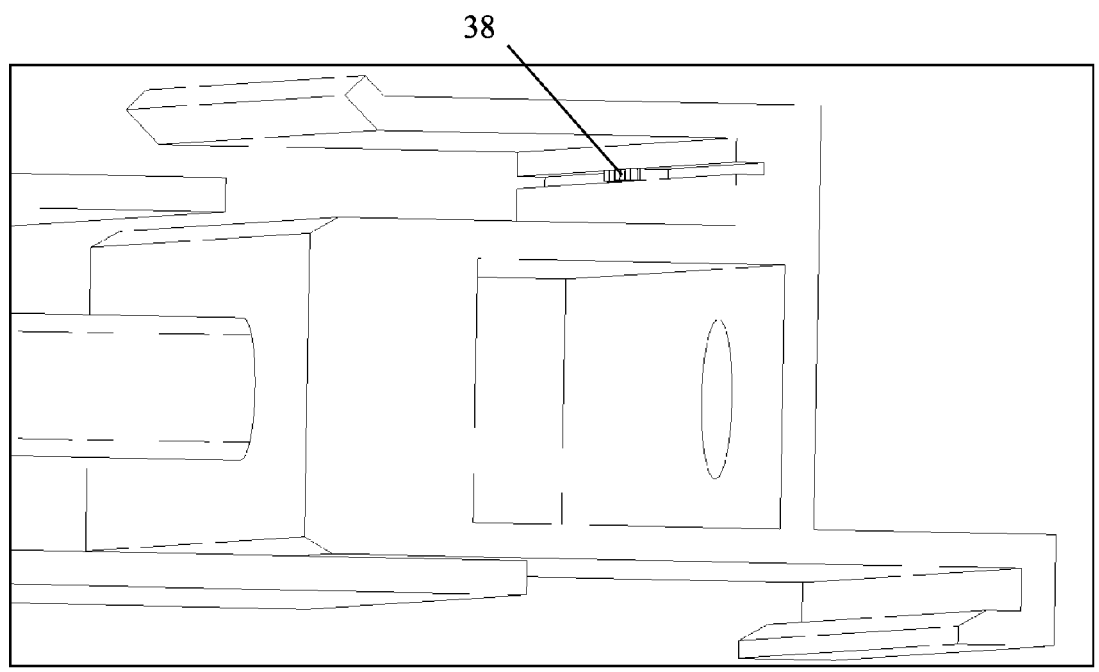
FIG. 163 is a perspective view of one component of one embodiment of the invention.

The Channel Support Height Lock Bolt, 139, can secure the Long Panel Support-TS, 133 and the Short Panel Support-TS, 134, to the Roof Mount Channel T, 137. This may be done after the right Solar Panel, 3, is installed but before the left Solar panel, 3, is installed. Referring to FIGS. 160 and 161, the Panel Support Slide-TS, 135, can secure the right Solar Panel, 3, to the Long Panel Support-TS, 133 and the Short Panel Support-TS, 134. The left Solar Panel, 3 can then be pulled to the left as shown in FIG. 160. The Roof Mount Channel T Lock Bolt, 138, can locks the Roof Mount T Slider, 136 to the Roof Mount Channel T, 137.

The Channel Support Height Biting Nut, 140, and tines or serrations on the Channel Support Height Lock Bolt, 139 can create ground through from the Long Panel Support-TS, 133 or the Short Panel Support-TS, 134, to the Roof Mount T Slider, 136. Grounding from the Solar Panel, 3 to the Panel Support Slide-TS, 135, is established through the Biting Bar, 38. The Panel Support Bolt, 41, can create a ground between the Panel Support Slide-TS, 135 and the Long Panel Support-TS, 133 or the Short Panel Support-TS, 134. The Roof Mount Channel T Lock Bolt, 138, can create a ground path from the Roof Mount T Slider, 136, to the Roof Mount Channel T, 137. The grounding from the Roof Mount Channel T, 137 to the Lag Bolt, 10 and Flashing, 8, 18, and 52, can be as discussed previously. With the row Solar Panel, 3 to adjacent Solar Panel, 3, grounding created with the Long Panel Support-TS, 133, all the metal parts can be grounded in each row. Grounding from row to row was covered earlier. This total grounding applies to all the Solar Panel Support Systems, 1, in this patent.

In this disclosure, and all different features discussed for various solar panel support systems should be considered as useful for all of the presented solar panel support systems and for many others as well. Any of the biting features on the washers, nuts or bars are examples and could change without distracting from the purpose of the biting features. Again, all the solar panels were shown in the landscape direction. These solar panels could also be in the portrait direction.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention.

Figure 169:
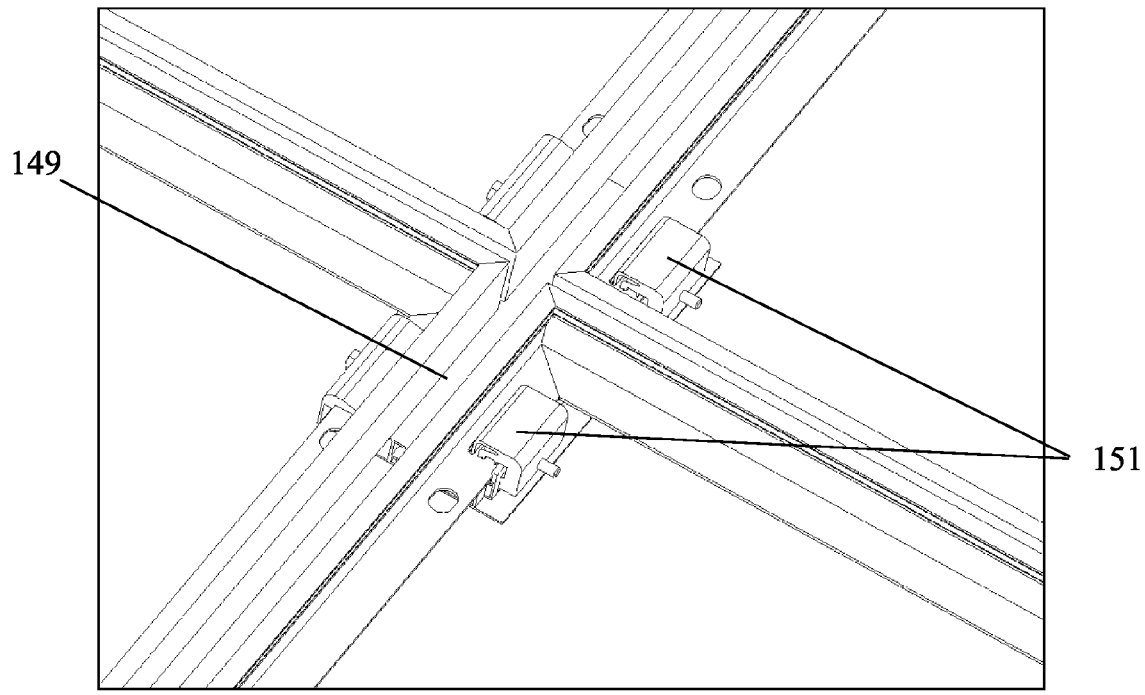
FIG. 169 is a perspective view of one component of one embodiment of the invention.
Figure 170:
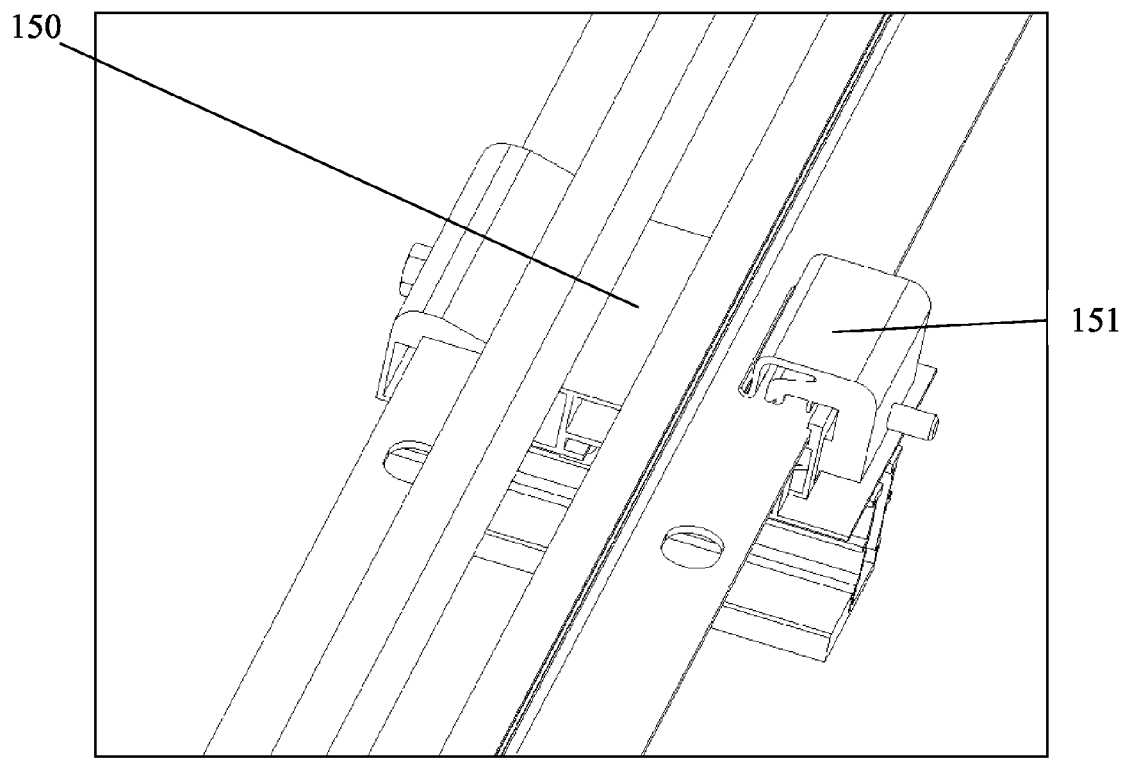
FIG. 170 is a perspective view of one component of one embodiment of the invention.
Figure 171:
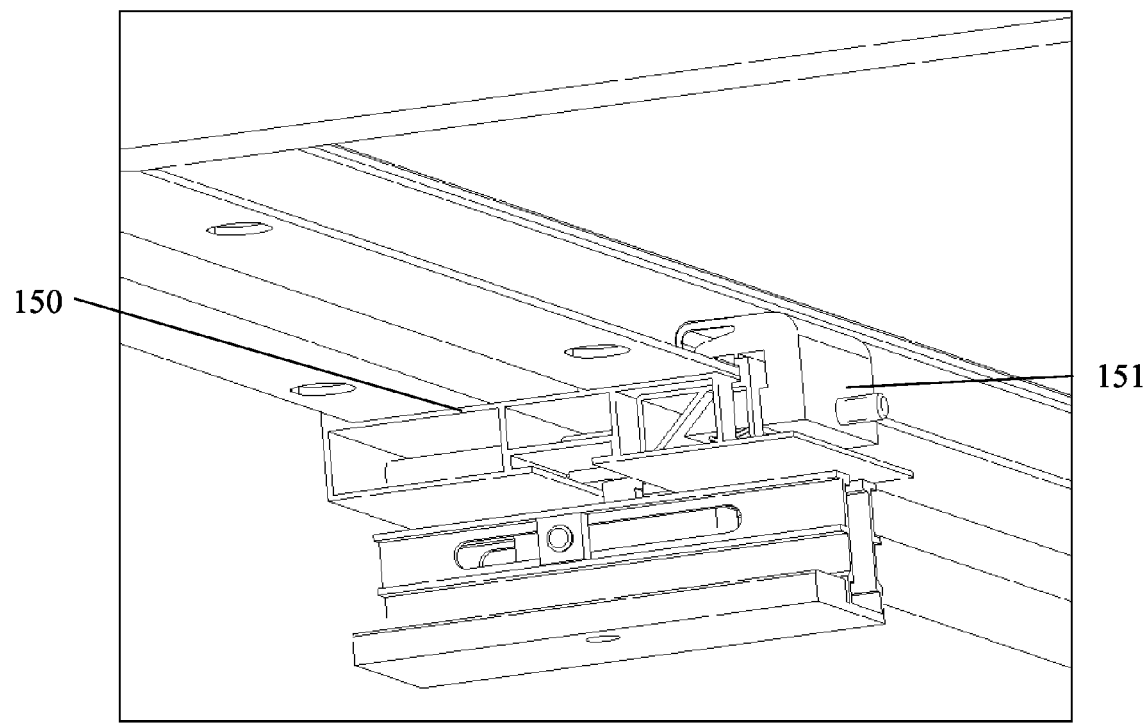
FIG. 171 is a perspective view of one component of one embodiment of the invention.
Figure 172:
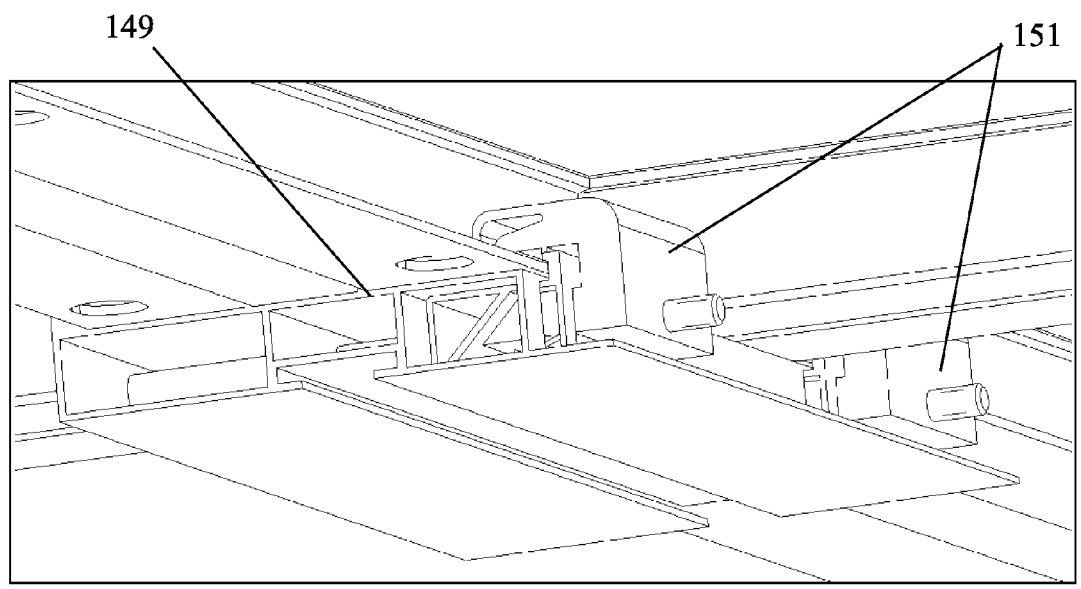
FIG. 172 is a perspective view of one component of one embodiment of the invention.
Figure 173:
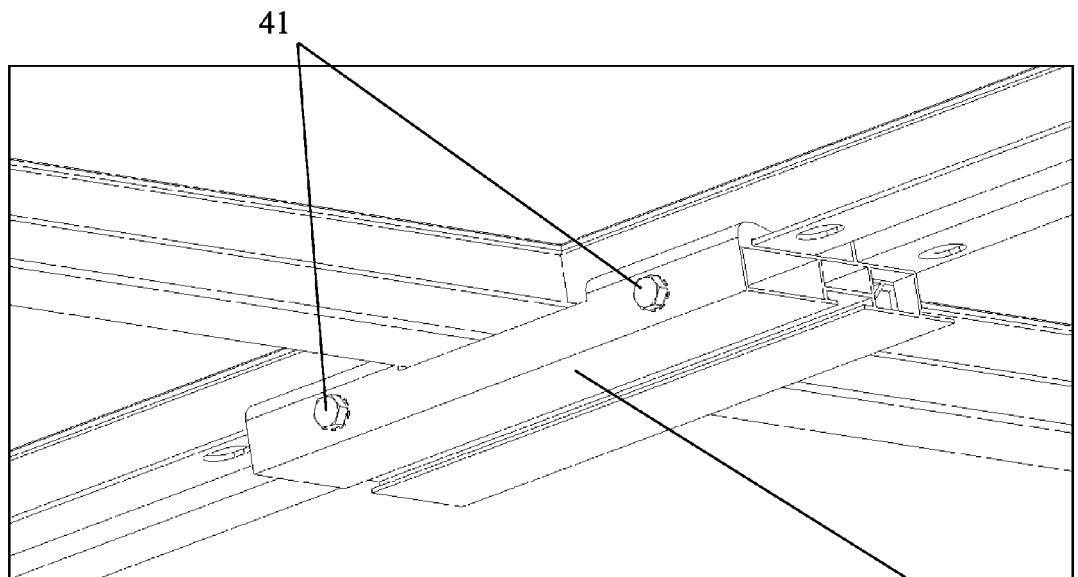
FIG. 173 is a perspective view of one component of one embodiment of the invention.
Figure 174:
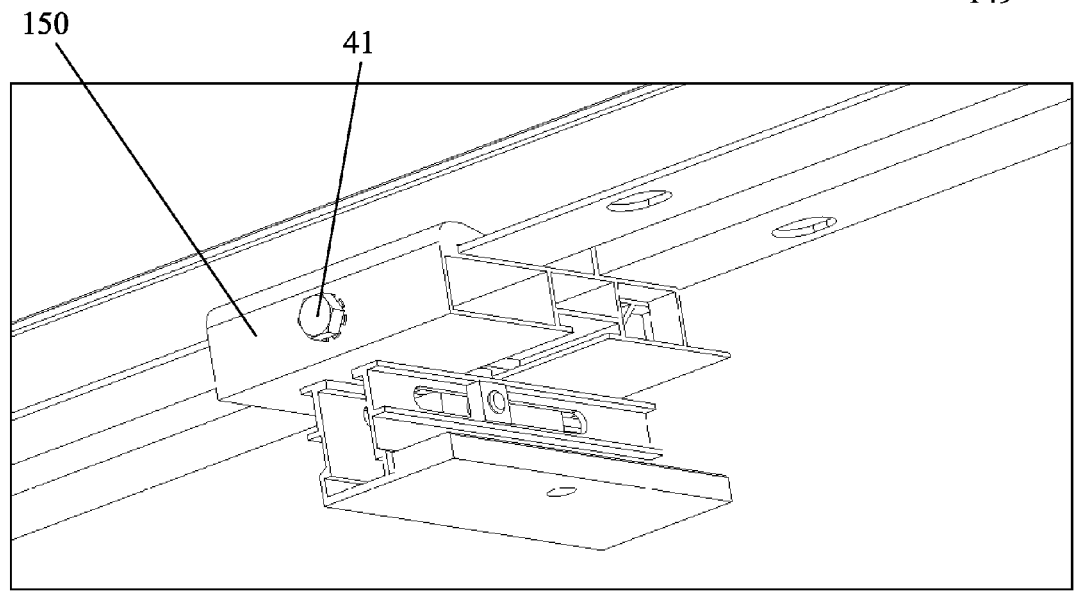
FIG. 174 is a perspective view of one component of one embodiment of the invention.

FIG. 169 shows another Solar Panel Support System, 1, Solar Panel, 3, with the middle of the Solar Panel, 3, removed. The corner of the 4 Solar Panels are shown with the Panel Support Slide-SIWL, 151, and the Long Panel Support-SIWL, 149, shown. FIG. 170, shows the Short Panel Support-SIWL, 150, and the Panel Support Slide-SIWL, 151. Refer also to FIGS. 171 and 172 for additional details on different views.

Figure 175:
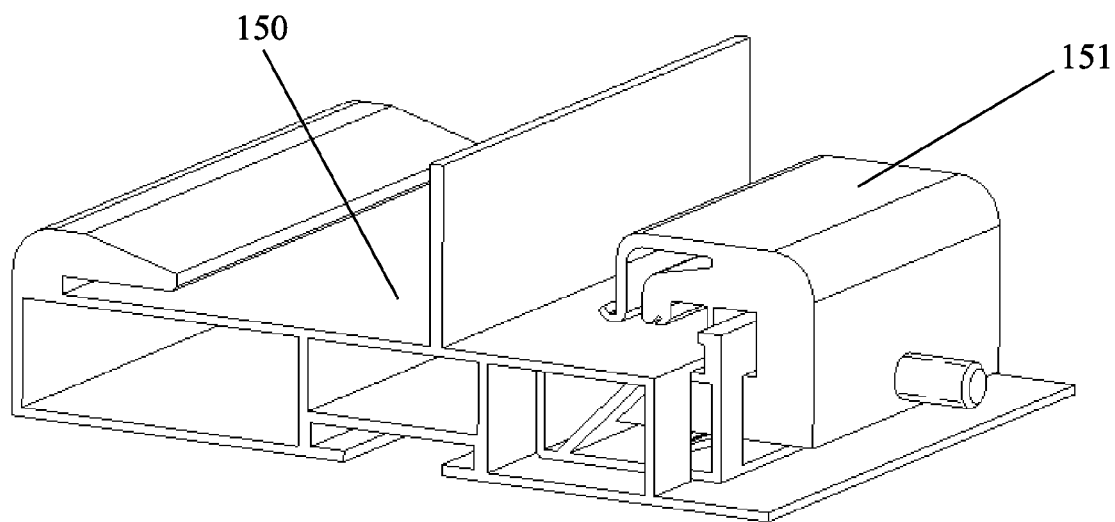
FIG. 175 is a perspective view of one component of one embodiment of the invention.

FIG. 175 shows a conjoined solar panel lateral movement accommodation seat on the left side of the solar panel mount base that is conjoined with respect to the solar panel retainer mount on the rights side of the mount base. The lateral stop extending above the solar panel mount base in between the solar panel retainer mount and the solar panel lateral movement accommodation seat can serve as a stop. The left side can allow a degree of free lateral movement for the solar panel at the solar panel lateral movement accommodation mount. Naturally, two lateral movement seats or two clamped mounts can be provided such as by establishing a second lateral movement accommodation seat or a second coupler seat.

Figure 176:
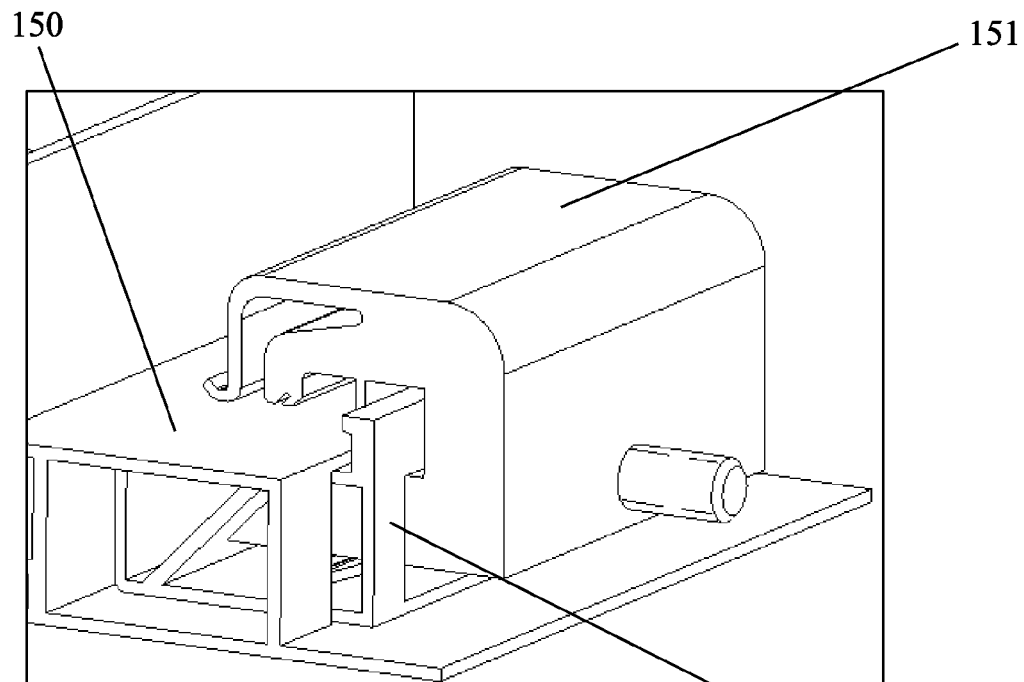
FIG. 176 is a perspective view of one component of one embodiment of the invention.

In FIGS. 175 and 176, the Solar Panel, 3, has been removed to show more detail on the Panel Support Slide-SIWL, 151, and the Short Panel Support-SIWL, 150. The clamping action is the same on the Long Panel Support-SIWL, 149. In FIGS. 176-180, the Panel Support Slide-SIWL, 151, slides inside the Panel Support SIWL Wedge Slide, 156, and the Panel Support SIWL Wedge Slide, 156, can slide inside the Long Panel Support-SIWL, 149, or the Short Panel Support-SIWL, 150.

Figure 177:
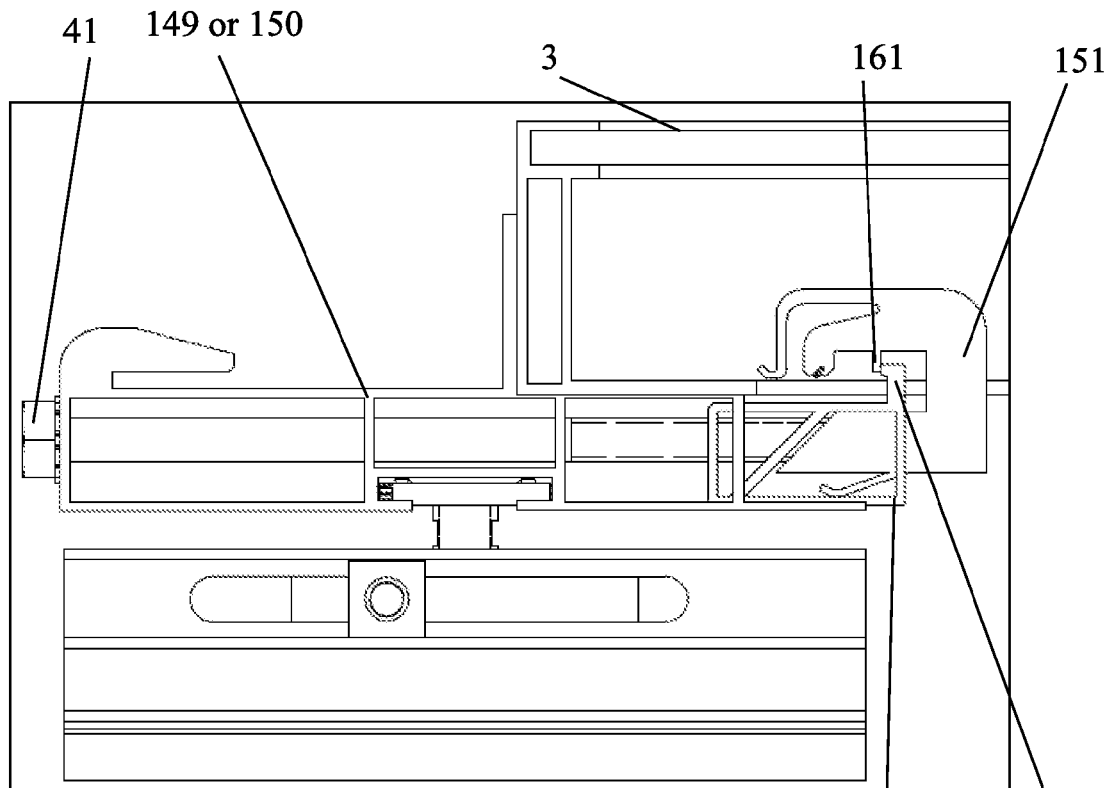
FIG. 177 is a cross-sectional view of one component of one embodiment of the invention.

FIG. 177 can be used to highlight that embodiments can have an open top intermediate support that does not extend beyond the panel height and to show how designs do not provide a top panel restraint above the intermediate support. This is shown on an embodiment that has a wedge member responsive to the threaded adjuster that causes wedge movement of the solar panel movement restraint with a solar panel lip overhang.

Figure 178:
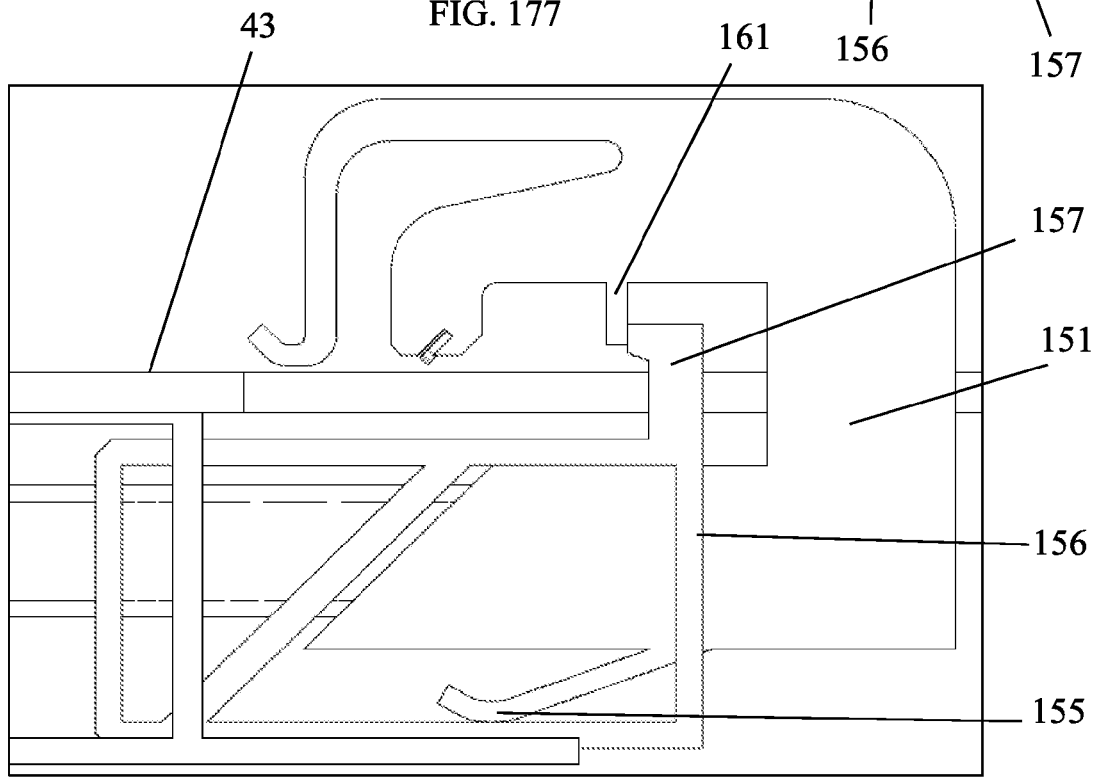
FIG. 178 is a cross-sectional view of one component of one embodiment of the invention.

FIGS. 177 and 178, show the Solar Panel, 3, in the unclamped position in the Long Panel Support-SIWL, 149, or the Short Panel Support-SIWL, 150. The Panel Support Bolt, 41, has been turned out to accept the Solar Panel. The Panel Support Slide-SIWL Bottom Lip, 161, contacts and pulls out the Panel Support SiWL Wedge Slide Lip, 157, to slide the Panel Support Slide-SIWL, 151, and Panel Support SIWL Wedge Slide, 156, out far enough to accept the Solar Panel, 3. The Panel Support Slide-SIWL Bottom Flexture, 155, pushes the Panel Support Slide-SIWL, 151, in the up position so the Panel Support Slide-SIWL, 151, can slide over the Solar Panel Frame Bottom, 43.

Figure 179:
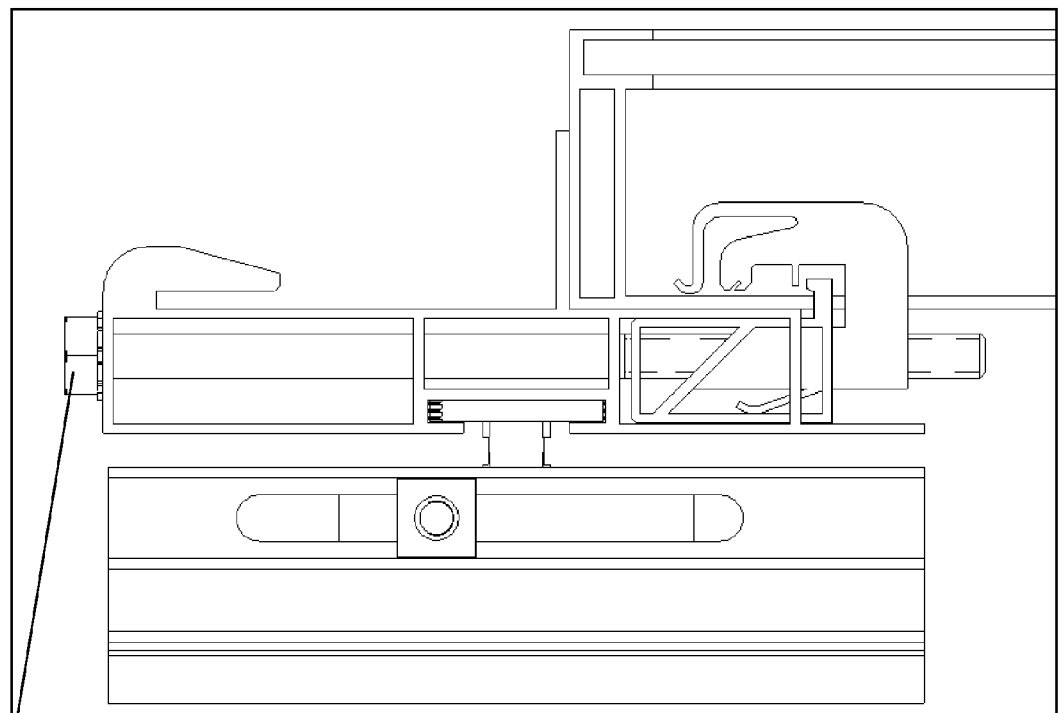
FIG. 179 is a cross-sectional view of one component of one embodiment of the invention.
Figure 180:
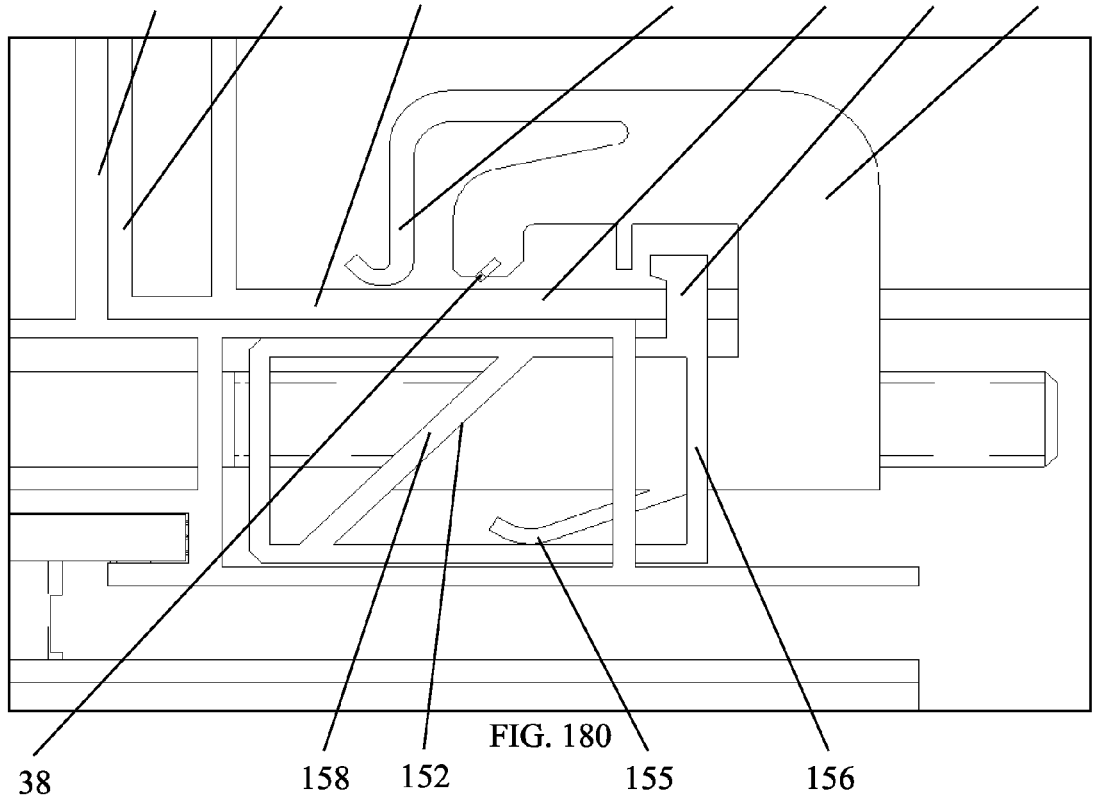
FIG. 180 is a cross-sectional view of one component of one embodiment of the invention.

FIGS. 179 and 180, shows the Panel Support Slide-SIWL, 151, in the position to start clamping the Solar Panel Frame Bottom, 43. The Panel Support Bolt, 41, was turned in to get the Panel Support Slide-SIWL, 151, in this position.

Figure 181:
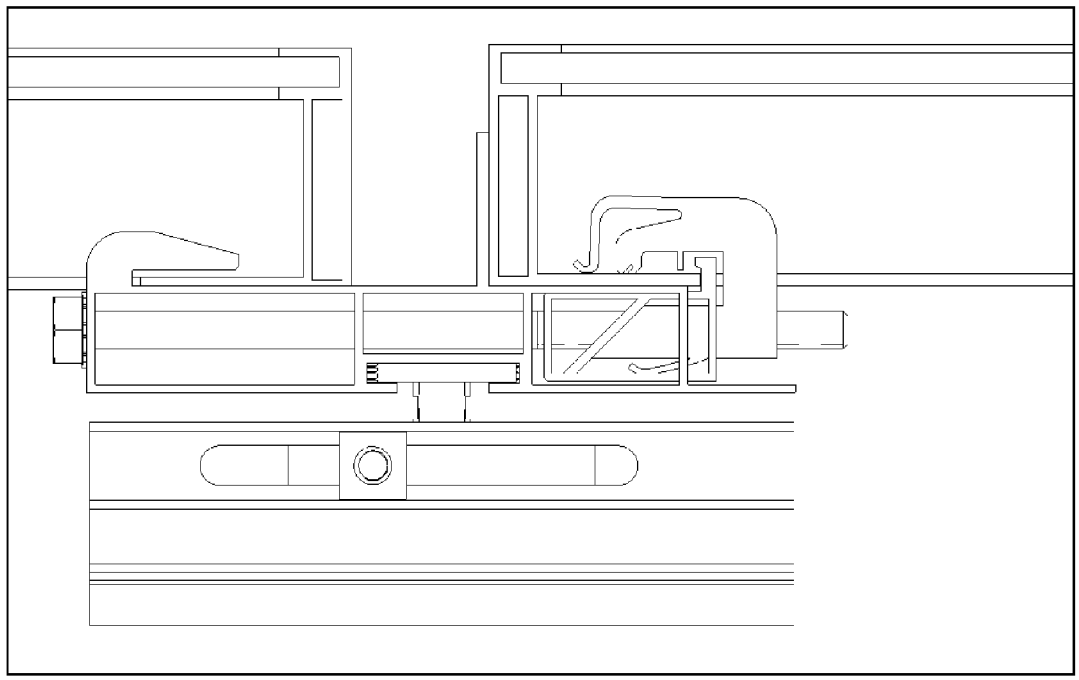
FIG. 181 is a cross-sectional view of one component of one embodiment of the invention.
Figure 182:
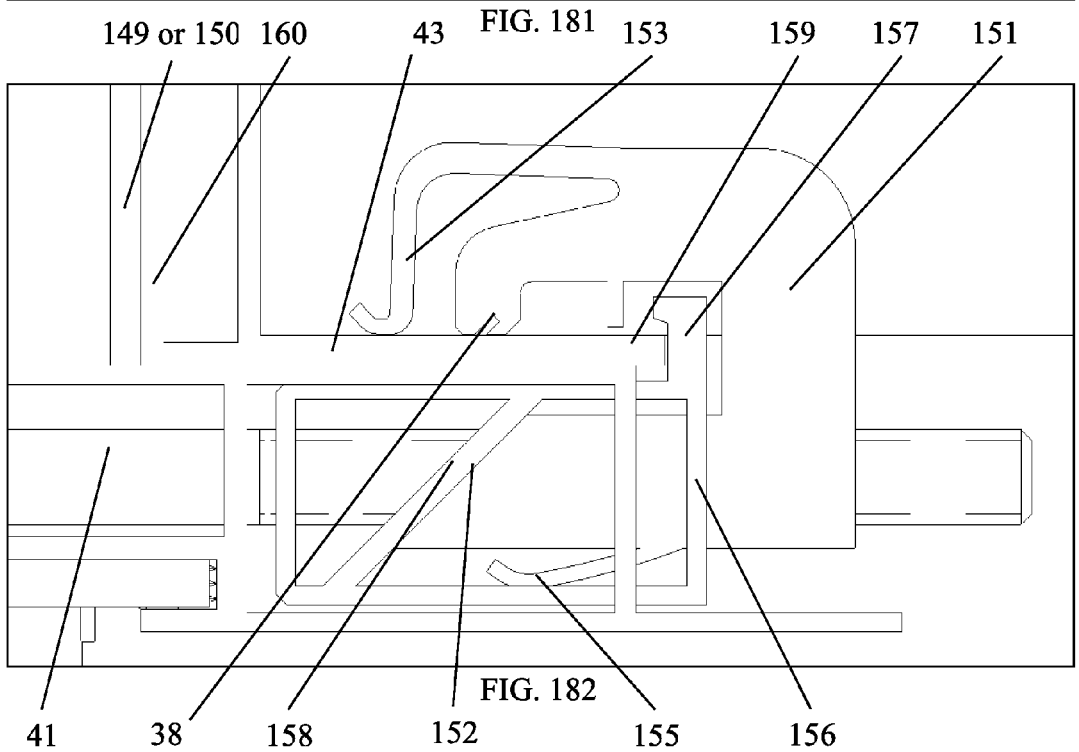
FIG. 182 is a cross-sectional view of one component of one embodiment of the invention.

As the Panel Support Bolt, 41, is tightened further, the Panel Support Slide-SIWL Angled Face, 152, Panel Support will slide down the Panel Support SiWL Wedge Slide Angled Face, 158, and the Panel Support Slide-SIWL Up Front Flexture, 153, will contact the Solar Panel Frame Bottom, 43, and this will push the Panel Support SiWL Wedge Slide Lip, 157, against the Solar Panel Frame Lip End, 159, which will force the Solar Panel Frame Outside, 160, against the Long Panel Support-SIWL, 149, or the Short Panel Support-SIWL, 150. This will continue until the Panel Support Slide-SIWL, 151, is firmly pushing down on the Solar Panel Frame Bottom, 43, and the Biting Bar, 38, is firmly embedded in the Solar Panel Frame Bottom, 43 as shown in FIGS. 181 and 182. Note that Panel Support Slide-SIWL Up Front Flexture, 153, held up the Biting Bar, 38, in the Panel Support Slide-SIWL, 151, until the Solar Panel Frame Outside, 160, was against the Long Panel Support-SIWL, 149, or the Short Panel Support-SIWL, 150.

Figure 183:
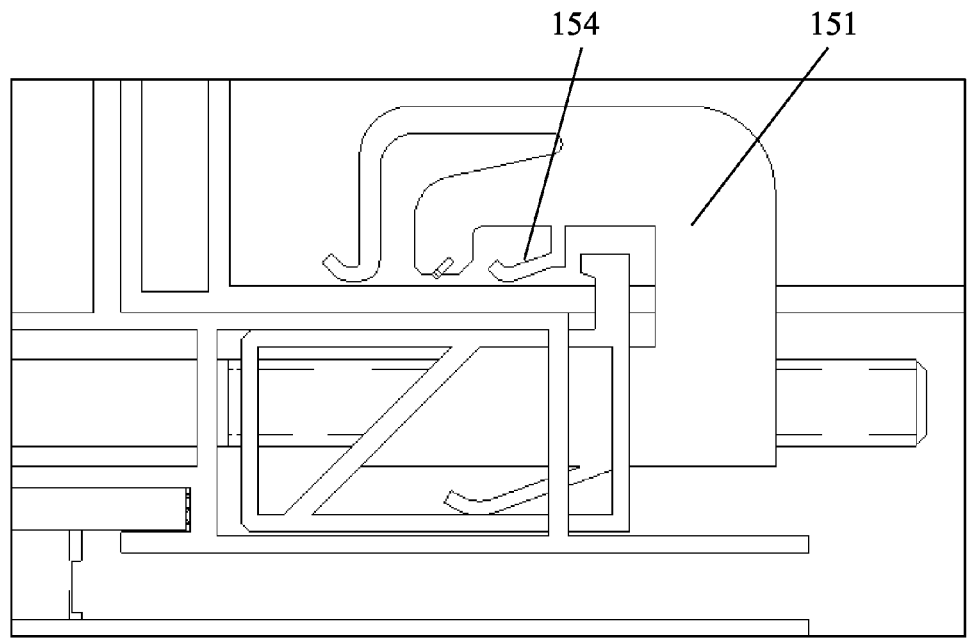
FIG. 183 is a cross-sectional view of one component of one embodiment of the invention.
Figure 184:
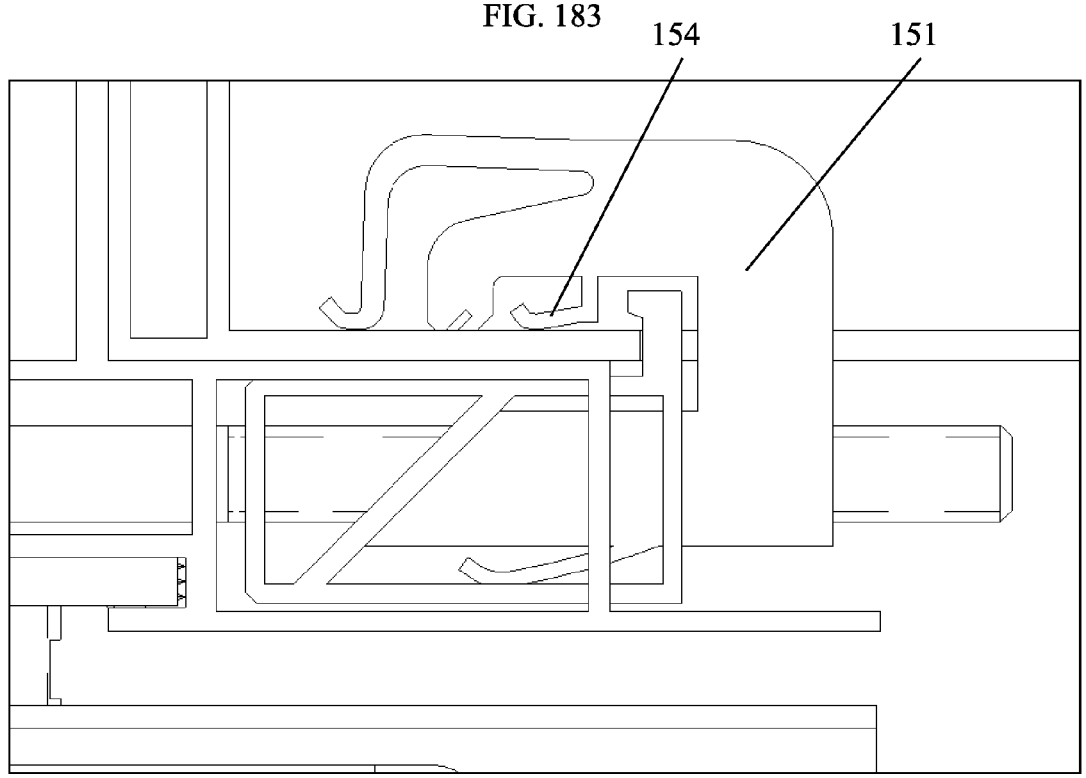
FIG. 184 is a cross-sectional view of one component of one embodiment of the invention.

FIGS. 180 and 182 show the oppositional flexture and the clamp that at least partially reduces said step of biasing the solar panel movable restraint away from the solar panel coupler seat. It also similarly shows the non-dissociation coupler element configured to overcome dissociation by the dissociation guide, such as by applying force to a portion of the solar panel as by the wedge member serving as a non-oppositional coupler element and a non-adverse bias coupler element. FIGS. 183 and 184 show an addition of a Panel Support Slide-SIWL Mid Flexture, 154. One or more of these flextures can be used. In this patent, flextures are shown to create forces but these forces can be made by other means such as but not limited to coil springs and springed elements. The Panel Support Bolt, 41, can be used to pull the panel support slides. This action is not limited to using a bolt but can be accomplished by using, but not limited to, a cam, lever, or other means. Pulling down of the panel support slide on the solar panel frame bottom by using a wedge action, but this can be accomplished by other methods as well. It is the action that a force down on the solar panel frame can be created with a force not in the direction of the panel support bolt. This bolt creates forces in multiple directions which seats and holds the solar panel frame in the panel supports.

Again, different features were discussed for various solar panel support systems. The features of each of the solar panel support systems are not to be considered unique to one solar panel support system but should be considered as useful for all of the presented solar panel support systems. Any of the biting features on the washers, nuts or bars are examples and could change without distracting from the purpose of the biting features. All the solar panels were shown in the landscape direction. These solar panels could also be in the portrait direction. While the invention has been described in connection with a preferred embodiment, it is not intended to limit the scope of the invention to the particular form set forth, but on the contrary, it is intended to cover such alternatives, modifications, and equivalents as may be included within the spirit and scope of the invention.

As can be easily understood from the foregoing, the basic concepts of the present invention may be embodied in a variety of ways. It involves both mounting techniques as well as devices to accomplish the appropriate mounting. In this application, the mounting techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "clamp" should be understood to encompass disclosure of the act of "clamping"—whether explicitly discussed or not—and, conversely, were there effectively disclosure of the act of "clamping", such a disclosure should be understood to encompass disclosure of a "clamp" and even a "means for clamping." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed below or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the mounting devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A solar panel mount system comprising:
    a solar panel coupler seat comprising a solar panel foundation mount;
    a solar panel support slider having a first slider side and a second slider side, and positioned adjacent said solar panel foundation mount:
    a first side member adjacent said first slider side;
    a second side member adjacent said second slider side;
    a slider retainer element attached to said first slider side and said second slider side; and
    a mount riser extending from said solar panel support slider;
    a solar panel movable restraint situated in proximity to said solar panel coupler seat;
    a dissociation guide to which said solar panel movable restraint is responsive; and
    a retainer configured to secure said solar panel movable restraint at a desired position relative to said solar panel coupler seat.

2. A solar panel mount system as described in claim 1 further comprising a clamp position adjuster to which said solar panel movement restraint is responsive.

3. A solar panel mount system as described in claim 2 wherein said clamp position adjuster to which said solar panel movement restraint is responsive comprises a threaded adjuster.

4. A solar panel mount system as described in claim 3 further comprising a wedge member responsive to said threaded adjuster.

5. A solar panel mount system as described in claim 4 wherein said solar panel movable restraint situated in proximity to said solar panel coupler seat comprises a solar panel lip overhang.

6. A solar panel mount system as described in claim 1 wherein said dissociation guide to which said solar panel movable restraint is responsive comprises at least one mount integral dissociation guide.

7. A solar panel mount system as described in claim 6 wherein said mount integral dissociation guide comprises an upper integral dissociation guide.

8. A solar panel mount system as described in claim 6 wherein said mount integral dissociation guide comprises a lower integral dissociation guide.

9. A solar panel mount system as described in claim 1 further comprising:
    a solar panel lateral movement mount; and
    a firmly fixed solar panel retainer mount.

10. A solar panel mount system as described in claim 9 further comprising a solar panel perpendicular movement restraint situated in proximity to said solar panel lateral movement mount.

11. A solar panel mount system as described in claim 9 wherein said solar panel mount system comprises a quadrilateral solar panel mount system.

12. A solar panel mount system as described in claim 11 wherein said firmly fixed solar panel retainer mount comprises:
    a firmly fixed third solar panel retainer mount; and
    an adjacent firmly fixed fourth solar panel retainer mount.

13. A solar panel mount system as described in claim 1 wherein said solar panel mount system comprises a bilateral solar panel mount system.

14. A solar panel mount system as described in claim 13 wherein said bilateral solar panel mount system comprises:
    a first opposed solar panel clamp; and
    a second opposed solar panel clamp.

15. A solar panel mount system comprising:
    a first solar panel system surface;
    a second solar panel system surface;
    a tined flat bar adjacent to said first solar panel system surface and said second solar panel system surface;
    a progressive solar system ground perforator tine to which said first solar panel system surface is responsive; and
    a regressive solar system ground perforator tine to which said second solar panel system surface is responsive.

16. A solar panel mount system as described in claim 15 wherein said first solar panel system surface and said second solar panel system surface comprise a first substance and wherein said tined flat bar comprises a different second substance.

17. A solar panel mount system as described in claim 15 wherein at least one of said first solar panel system surface and said second solar panel system surface is configured to accept less than the maximum width of said tined flat bar.

18. A solar panel mount system as described in claim 15 wherein said tined flat bar adjacent said first solar panel system surface and said second solar panel system surface comprises a preferential side association junctionpiece.

19. A solar panel mount system comprising:
a solar panel mount base;
bottom flashing extending under said solar panel mount base;
a permanent underside sealed junction that comprises a crimp, wherein said permanent underside sealed junction is between said solar panel mount base and said bottom flashing; and
a structure foundation attachment extending through said solar panel mount base.

20. A solar panel mount system as described in claim 19 wherein said crimp comprises an inner radius deformation capture.

21. A solar panel mount system as described in claim 1 and further comprising a mount riser side engagement.

22. A solar panel mount system as described in claim 1 and further comprising a riser rotational restraint.

23. A solar panel mount system as described in claim 21 wherein said mount riser side engagement and said slider retainer element attached to said first slider side and said second slider side comprise a side compression restraint.

* * * * *